(12) United States Patent
Gonsky et al.

(10) Patent No.: US 12,540,358 B2
(45) Date of Patent: Feb. 3, 2026

(54) RNASET2 COMPOSITIONS AND METHODS OF TREATMENT THEREWITH

(71) Applicant: Cedars-Sinai Medical Center, Los Angeles, CA (US)

(72) Inventors: Rebecca Gonsky, Los Angeles, CA (US); Stephan R. Targan, Santa Monica, CA (US)

(73) Assignee: CEDARS-SINAI MEDICAL CENTER, Los Angeles, CA (US)

( * ) Notice: Subject to any disclaimer, the term of this patent is extended or adjusted under 35 U.S.C. 154(b) by 1151 days.

(21) Appl. No.: 17/333,877

(22) Filed: May 28, 2021

(65) Prior Publication Data

US 2021/0395824 A1   Dec. 23, 2021

Related U.S. Application Data

(63) Continuation of application No. PCT/US2019/063429, filed on Nov. 26, 2019.

(60) Provisional application No. 62/795,430, filed on Jan. 22, 2019, provisional application No. 62/772,988, filed on Nov. 29, 2018.

(51) Int. Cl.
    *C12Q 1/6883*   (2018.01)
    *A61K 38/00*    (2006.01)
    *C07K 14/47*    (2006.01)

(52) U.S. Cl.
    CPC ........ *C12Q 1/6883* (2013.01); *C07K 14/4703* (2013.01); *A61K 38/00* (2013.01); *C12Q 2600/112* (2013.01)

(58) Field of Classification Search
    CPC ............ C12Q 1/6883; C12Q 2600/112; C12Q 2600/106; C12Q 2600/156; C07K 14/4703; C07K 2319/30; C07K 14/525; A61K 38/00; C12N 9/22
    USPC ..................... 435/6.1, 91.1, 91.31, 455, 458; 514/44 R, 44 A; 536/23.1, 24.5
    See application file for complete search history.

(56) References Cited

U.S. PATENT DOCUMENTS

| | | |
|---|---|---|
| 4,229,447 A | 10/1980 | Porter |
| 4,476,116 A | 10/1984 | Anik |
| 4,596,795 A | 6/1986 | Pitha |
| 4,755,386 A | 7/1988 | Hsiao et al. |
| 5,011,692 A | 4/1991 | Fujioka et al. |
| 5,017,381 A | 5/1991 | Maruyama et al. |
| 5,116,817 A | 5/1992 | Anik |
| 5,229,135 A | 7/1993 | Philippon et al. |
| 5,739,136 A | 4/1998 | Ellinwood, Jr. et al. |
| 5,837,284 A | 11/1998 | Mehta et al. |
| 5,840,329 A | 11/1998 | Bai |
| 5,858,401 A | 1/1999 | Bhalani et al. |
| 6,391,452 B1 | 5/2002 | Antonsen et al. |
| 6,667,048 B1 | 12/2003 | Lambert et al. |
| 6,812,339 B1 | 11/2004 | Venter et al. |
| 6,960,563 B2 | 11/2005 | Egbaria et al. |
| 7,138,237 B1 | 11/2006 | Targan et al. |
| 8,039,240 B2 | 10/2011 | Roiz et al. |
| 10,322,174 B2 | 6/2019 | Bilsborough et al. |
| 10,668,185 B2 | 6/2020 | Watkins et al. |
| 10,689,439 B2 | 6/2020 | Watkins et al. |
| 11,136,386 B2 | 10/2021 | Kruidenier et al. |
| 11,162,943 B2 | 11/2021 | Jain et al. |
| 11,186,872 B2* | 11/2021 | Gonsky ................. C12Q 1/686 |
| 11,292,848 B2 | 4/2022 | Watkins et al. |
| 11,440,954 B2 | 9/2022 | Watkins et al. |
| 2001/0006970 A1 | 7/2001 | Seidman et al. |
| 2001/0022971 A1 | 9/2001 | Braun et al. |
| 2002/0068313 A1 | 6/2002 | Braun et al. |
| 2004/0043931 A1 | 3/2004 | Hersberg et al. |
| 2004/0053242 A1 | 3/2004 | Volker et al. |
| 2004/0203076 A1 | 10/2004 | Targan et al. |
| 2005/0112627 A1 | 5/2005 | Dervieux et al. |
| 2006/0286571 A1 | 12/2006 | Dervieux |
| 2010/0015156 A1 | 1/2010 | Dubinsky et al. |
| 2010/0099083 A1 | 4/2010 | Raelson et al. |
| 2010/0129386 A1 | 5/2010 | Elson et al. |
| 2010/0167285 A1 | 7/2010 | Schreiber et al. |
| 2010/0190162 A1 | 7/2010 | Rotter et al. |
| 2011/0045476 A1 | 2/2011 | Barken et al. |
| 2011/0207667 A1 | 8/2011 | Shoseyou et al. |
| 2011/0229471 A1 | 9/2011 | Rotter et al. |
| 2011/0319284 A1 | 12/2011 | Wehkamp et al. |
| 2012/0041082 A1 | 2/2012 | Rotter et al. |
| 2012/0053131 A1 | 3/2012 | Rotter et al. |
| 2012/0114654 A1 | 5/2012 | Classon et al. |
| 2012/0208900 A1 | 8/2012 | Dubinsky et al. |

(Continued)

FOREIGN PATENT DOCUMENTS

| | | |
|---|---|---|
| JP | 2014500014 A | 1/2014 |
| WO | WO-02085309 A2 | 10/2002 |

(Continued)

OTHER PUBLICATIONS

PCT/US2021/035543 Invitation to Pay Additional Fees dated Sep. 13, 2021.
Ansel, et al., Pharmaceutical Dosage Forms and Drug Delivery Systems 213, 6th Edition (1995).
Baranzini: Insights into microbiome research 6: The role of consorita in stuydying the role of microbes in health and disease. Mult Scler 25(3):336-337 (2019).
Biener-Ramanujan et al.: Diagnostic and therapeutic potential of RNASET2 in Crohn's disease: Disease-risk polymorphism modulates allelic-imbalance in expression and circulating protein levels and recombinant-RNASET2 attenuates pro-inflammatory cytokine secretion. Frontiers in Immunology. 13:999155 (2022).

(Continued)

*Primary Examiner* — Jane J Zara
(74) *Attorney, Agent, or Firm* — JONES DAY

(57) ABSTRACT

Described herein are methods, systems, compositions, and kits useful for the diagnosis and/or treatment of a disease or condition in a subject. The present disclosure relates to methods and systems for identifying and stratifying patients suitable for treatment with a modulator of RNASET2, as described herein.

13 Claims, 28 Drawing Sheets

Specification includes a Sequence Listing.

(56) References Cited

U.S. PATENT DOCUMENTS

| | | |
|---|---|---|
| 2012/0329172 A1 | 12/2012 | Singh et al. |
| 2013/0225439 A1 | 8/2013 | Princen et al. |
| 2013/0266963 A1 | 10/2013 | Hauenstein et al. |
| 2013/0344621 A1 | 12/2013 | Wang et al. |
| 2014/0045276 A1 | 2/2014 | Singh et al. |
| 2014/0141983 A1 | 5/2014 | Singh et al. |
| 2014/0179549 A1 | 6/2014 | Farraye et al. |
| 2015/0086567 A1 | 3/2015 | Gonsky et al. |
| 2015/0313904 A1 | 11/2015 | Kolatch et al. |
| 2015/0355195 A1 | 12/2015 | Singh et al. |
| 2016/0208329 A1 | 7/2016 | Targan et al. |
| 2016/0334401 A1 | 11/2016 | Lockton et al. |
| 2016/0356790 A1 | 12/2016 | Singh et al. |
| 2017/0010281 A1 | 1/2017 | Singh et al. |
| 2017/0096491 A1 | 4/2017 | Classon et al. |
| 2017/0219605 A1 | 8/2017 | Singh et al. |
| 2017/0254806 A1 | 9/2017 | Singh et al. |
| 2017/0315117 A1 | 11/2017 | Singh et al. |
| 2017/0328923 A1 | 11/2017 | Salbato et al. |
| 2018/0051078 A1 | 2/2018 | Targan et al. |
| 2018/0156781 A1 | 6/2018 | Shih et al. |
| 2018/0305459 A1* | 10/2018 | McGovern ......... G01N 33/6854 |
| 2019/0194754 A1 | 6/2019 | Mcgovern et al. |
| 2019/0300957 A1 | 10/2019 | Gonsky et al. |
| 2020/0157203 A1* | 5/2020 | Watkins ................. A61P 1/00 |
| 2020/0241006 A1 | 7/2020 | Naik et al. |
| 2020/0255510 A1 | 8/2020 | Watkins et al. |
| 2020/0264171 A1 | 8/2020 | Jain et al. |
| 2020/0342958 A1 | 10/2020 | Mcgovern et al. |
| 2020/0362025 A1 | 11/2020 | Kruidenier et al. |
| 2021/0070871 A1 | 3/2021 | Watkins et al. |
| 2021/0079473 A1 | 3/2021 | Mcgovern et al. |
| 2021/0093718 A1 | 4/2021 | Bilsborough et al. |
| 2021/0101988 A1 | 4/2021 | Kruidenier et al. |
| 2021/0122828 A1 | 4/2021 | Watkins et al. |
| 2021/0238684 A1 | 8/2021 | Bilsborough et al. |
| 2021/0395824 A1 | 12/2021 | Targan et al. |
| 2022/0162703 A1 | 5/2022 | Gonsky et al. |
| 2023/0287499 A1 | 9/2023 | Gonsky et al. |

FOREIGN PATENT DOCUMENTS

| | | | |
|---|---|---|---|
| WO | WO-2011060098 A1 | 5/2011 | |
| WO | WO 2012064682 A1 | 5/2012 | |
| WO | WO-2013044169 A1 | 3/2013 | |
| WO | WO-2014160883 A1 | 10/2014 | |
| WO | WO-2015035261 A1 | 3/2015 | |
| WO | WO-2015114633 A1 | 8/2015 | |
| WO | WO-2015136446 A1 | 9/2015 | |
| WO | WO-2015166461 A1 | 11/2015 | |
| WO | WO-2017161342 A1 * | 9/2017 | ............... A61P 1/00 |
| WO | WO-2019209995 A2 | 10/2019 | |
| WO | WO-2019210203 A1 | 10/2019 | |
| WO | WO-2020010139 A1 | 1/2020 | |
| WO | WO-2020112890 A1 | 6/2020 | |
| WO | WO-2020113116 A1 | 6/2020 | |
| WO | WO-2020139748 A1 | 7/2020 | |
| WO | WO-2020163713 A1 | 8/2020 | |
| WO | WO-2020163715 A1 | 8/2020 | |
| WO | WO-2020232125 A1 | 11/2020 | |
| WO | WO-2021081365 A1 | 4/2021 | |
| WO | WO-2021108694 A1 | 6/2021 | |
| WO | WO-2021247770 A1 | 12/2021 | |

OTHER PUBLICATIONS

Chu et al.: A genome-wide association study identifies two new risk loci for Graves' disease. Nature Genetics; 43/9:897-901 (2011).
Eisenberg et al.: A-to-I RNA editing—immune protector and transcriptome diversifier. Nat Rev Genet. 19(8):473-490 (2018).
EP21818394.5 Extended European Search report dated Jun. 6, 2024.
Fransen et al., Inflammatory bowel disease: the genetic background and beyond. University of Groningen PhD Dissertation http://www.rug.nl/research/portal/files/12805965/Complete_dissertation.pdf (2014).
Garibaldi et al.: Isolation of Newly Transcribed RNA Using the Metabolic Label 4-thiouridine. Methods in molecular biology. 1648:169-176 (2017).
Ge et al.: MicroRNA-125a suppresses intestinal mucosal inflammation through targeting ETS-1 in patients with inflammatory bowel diseases. J. Autoimmun. 101:109-120 (2019).
Gibson, Mark. Pharmaceutical Preformulation and Formulation. CRC Press LLC (2004).
Gonsky et al.: Association of RNASET2 Gene Polymorphisms with Decreased Expression and Clinical Characteristics of Severity in Crohn's Disease; HHS Public Access; Gastroenterology; 153(1); 219-232 (2017).
Gonsky et al.: Enhancer Role of STAT5 in CD2 Activation of IFN-γ Gene Expression. J. Immunol. 173:6241-6247 (2004).
Gonsky et al.: Recombinant RNASET2 Modulates IFNγ Secretion: A Novel Potential CD Therapeutic. AGA Abstracts. 156(6): Supplement 1 S-652 (2019).
Gonsky et al.: RNASET2: A CD Severity Biomarker Related to TL1A Driven Inflammation. AAGA Abstracts. Gastroenterology. Su1856:S-571 (2016).
Gonsky et al.: RNASET2 Risk Variant as a Novel Blood Based Diagnostic for Defining a Severe CD Patient Population Responsive to Directed RNASET2 Therapeutics. AAGA Abstracts. Gastroenterology. 158(6):S-791 (2020).
Hughes et al.: Transcriptional Regulation of the Interleukin-2 Gene in Normal Human Peripheral Blood T Cells. J. Biol Chem. 271:5369-5377 (1996).
Japanese Patent Application No. 2018-548196 Office Action dated Nov. 15, 2021.
Jostins et al.: Host-microbe interactions have shaped the genetic architecture of inflammatory bowel disease. Nature 491(7422):119-124 (2012).
Landers, Carol J. et al. Selected Loss of Tolerance Evidenced by Crohn's Disease-associated Immune Responses to Auto- and Microbial Antigens. Gastroenterology 123(3):689-699 (2002).
Lu et al.: Toll-like Receptors and Inflammatory Bowel Disease. front Immunol. 9(Article 72):1-9 (2018).
Manning et al.: The roles of RNA processing in translating genotype to phenotype. Nat Rev Mol Cell Biol. 18(2):102-114 (2017).
Mcgovern et al., Genetics of inflammatory bowel diseases. Gastroenterology 149(5):1163-1176 (2015).
PCT/US2021/035543 International Search Report and Written Opinion dated Nov. 12, 2021.
Prometheus Biosciences, Inc. Form S-1 Registration Statement as filed with the Securities and Exchange Commission on Feb. 19, 2021 (246 pages).
Quin et al.: ADAR RNA Modifications, the Epitranscriptome and Innate Immunity. Trends Biochem Sci. 46(9):1-14 (2021).
Roiz et al.: Human recombinant RNASET2: A potential anti-cancer drug; Oncoscience; vol. 3, No. 2; 71-84 (2016).
Russell et al.: L.A. Transcription factor Ets-1 in cytokine and chemokine gene regulation. Cytokine. 51:217-226 (2010).
Saxon, Andrew et al. A Distinct Subset of Antineutrophil Cytoplasmic Antibodies is Associated With Inflammatory Bowel Disease. The Journal of Allergy and Clinical Immunology 86(2):202-210 (1990).
Scharl et al.: Pathophysiology of fistula formation in Crohn's disease. World J Gastrointest Pathophysiol. 5:205-212 (2014)
Simon et al.: StateHub-StatePaintR: rapid and reproducible chromatin state evaluation for custom genome annotation. bioRxiv pp. 1-22 (2017).
Singh, Shailesh K, and Venkatesh Naini. Dosage forms: Non-Parenteral. Encyclopedia of Pharmaceutical Technology, 2nd Edition 1:754-757 (2002).
Soldner et al.: Parkinson-associated risk variant in distal enhancer of α-synuclein modulates target gene expression. Nature. 533(7601):95-99 (2016).
Wu et al.: Distant Coupling between RNA editing and alternative splicing of the osmosensitive cation channel Tmem63b. J Biol Chem. 295(52):18199-18212 (2020).

(56) References Cited

OTHER PUBLICATIONS

Wu et al.: Recent Developments in the Biology and Medicinal Chemistry of CDK9 Inhibitors: An Update. J Biol Chem. 63:13228-13257 (2020).

Kang et al.: Polymorphisms of the centrosomal gene (FGFR1OP) and lung cancer risk: a meta-analysis of 14 463 cases and 44 188 controls. Carcinogenesis. 37(3):280-289 (2016).

PCT/US2019/063429 International Preliminary Report on Patentability dated Jun. 10, 2021.

PCT/US2019/063429 International Search Report and Written Opinion dated Mar. 3, 2020.

Unpublished WIPO Application No. PCT/US2021/035543, inventors Gonsky; Rebecca et al., filed on Jun. 2, 2021.

Ben-Horin, Shomron et al. Optimizing anti-TNF treatments in inflammatory bowel disease. Autoimmunity Reviews 13(1):24-30 (2014). Published Online Jul. 19, 2013.

Peyrin-Biroulet, Laurent et al. Impact of azathioprine and tumour necrosis factor antagonists on the need for surgery in newly diagnosed Crohn's disease. Gut 60(7):930-936 (2011).

Yang, Suk-Kyun et al. Genome-wide association study of Crohn's disease in Koreans revealed three new susceptibility loci and common attributes of genetic susceptibility across ethnic populations. Gut 63(1):80-87 (2014). Published Online Jul. 14, 2013.

Adamset al., 2014, "Two-stage genome-wide methylation profiling in childhood-onset Crohn's Disease implicates epigenetic alterations at the VMP1/MIR21 and HLA loci," Inflamm. Bowel Dis., 20(10):1784-1793.

Beaudoin et al., 2013, "Deep resequencing of GWAS loci identifies rare variants in CARD9, IL23R and RNF186 that are associated with ulcerative colitis," PLoS Genet., 9(9):e1003723 (11 pages).

International Searching Authority, International Search Report and Written Opinion for International Patent Application No. PCT/US2017/023082 (Pub No. WO2017161342) mailed Aug. 15, 2017 (13 pages).

Jin et al., 2013, "TL1A/TNFSF15 directly induces proinflammatory cytokines, including TNFα, from CD3+CD161+T cells to exacerbate gut inflammation," Mucosal. Immunol., 6(5):886-899 (Epub 2012).

\* cited by examiner

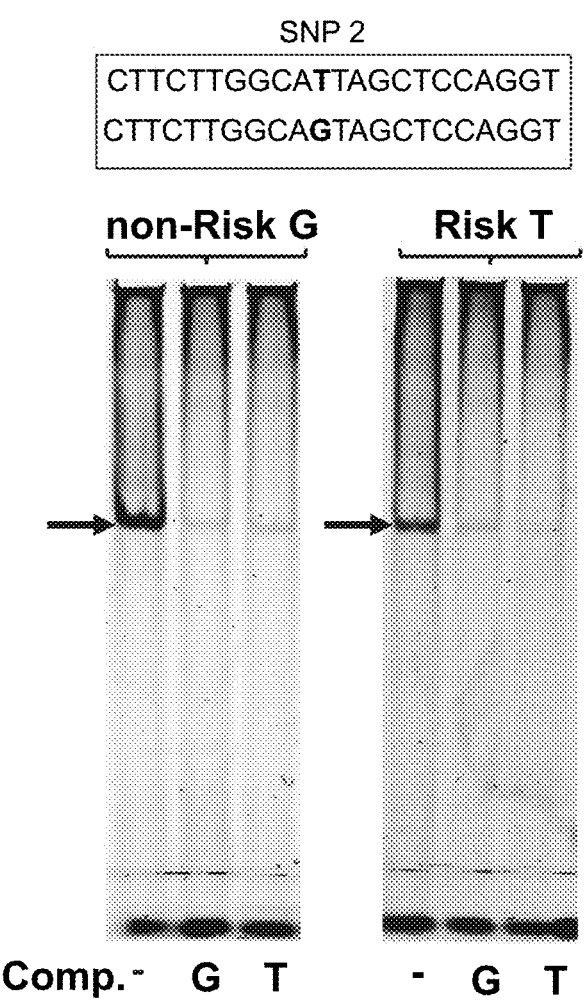

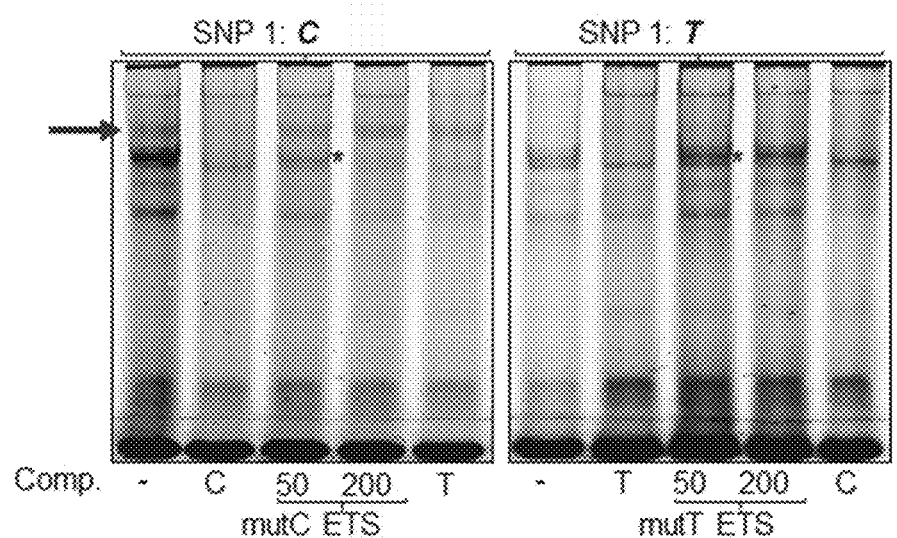

SEQUENCE LISTING

```
<160> NUMBER OF SEQ ID NOS: 394

<210> SEQ ID NO 1
<211> LENGTH: 95
<212> TYPE: DNA
<213> ORGANISM: Homo sapiens

<400> SEQUENCE: 1
```

```
cagagatgac ttccgggctc ctggggcccg cggggagggg caggtgaggc cccttctagg    60
aatgttggtg ctcccagcac ctagcaccgg gagac                               95

<210> SEQ ID NO 2
<211> LENGTH: 101
<212> TYPE: DNA
<213> ORGANISM: Homo sapiens
<220> FEATURE:
<221> NAME/KEY: modified_base
<222> LOCATION: (51)..(51)
<223> OTHER INFORMATION: a, c, t, g, unknown or other

<400> SEQUENCE: 2
tgtttatttt cgacacagtt ctccccaccc ctgagaattc ttgtcacttc ntcctgtact    60
gcccacttct actcccccac ccccacatcg gaagctaatg a                       101

<210> SEQ ID NO 3
<211> LENGTH: 101
<212> TYPE: DNA
<213> ORGANISM: Homo sapiens
<220> FEATURE:
<221> NAME/KEY: modified_base
<222> LOCATION: (51)..(51)
<223> OTHER INFORMATION: a, c, t, g, unknown or other

<400> SEQUENCE: 3
ttaattctga agagaccaag atactttcac cacacaacct cttcttggca ntagctccag    60
gtttcctgtt tccatgccag cttttgctgg gttatgctac a                       101

<210> SEQ ID NO 4
<211> LENGTH: 101
<212> TYPE: DNA
<213> ORGANISM: Homo sapiens
<220> FEATURE:
<221> NAME/KEY: modified_base
<222> LOCATION: (51)..(51)
<223> OTHER INFORMATION: a, c, t, g, unknown or other

<400> SEQUENCE: 4
ccagaacgca aagccagcca tggcgcatgg ctcagaatac tagaaattag ncttttcccc    60
agtctaactg tctctactgg tgtgctaacc tttcatctta g                       101

<210> SEQ ID NO 5
<211> LENGTH: 101
<212> TYPE: DNA
<213> ORGANISM: Homo sapiens
<220> FEATURE:
<221> NAME/KEY: modified_base
<222> LOCATION: (51)..(51)
<223> OTHER INFORMATION: a, c, t, g, unknown or other

<400> SEQUENCE: 5
gtgcgcgctt ggtgcacgat cctgaagggg agctccgagg ggcccgggtc nccagggctg    60
ctgcggccat tcccggagcc cggcgcgggg cccgcgagat a                       101

<210> SEQ ID NO 6
<211> LENGTH: 117
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 6
```
cagagatgac ttccgggctc ctggggcccg cggggagggg caggtgaggc ccagggctgg    60
gtgagggcca ggcccttcta ggaatgttgg tgctcccagc acctagcacc gggagac       117

<210> SEQ ID NO 7
<211> LENGTH: 101
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 7
tgtttatttt cgacacagtt ctccccaccc ctgagaattc ttgtcacttc ctcctgtact    60
gcccacttct actcccccac ccccacatcg gaagctaatg a                       101

<210> SEQ ID NO 8
<211> LENGTH: 101
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 8
ttaattctga agagaccaag atactttcac cacacaacct cttcttggca ttagctccag    60
gtttcctgtt tccatgccag cttttgctgg gttatgctac a                       101

<210> SEQ ID NO 9
<211> LENGTH: 101
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 9
ccagaacgca aagccagcca tggcgcatgg ctcagaatac tagaaattag gcttttcccc    60
agtctaactg tctctactgg tgtgctaacc tttcatctta g                       101

<210> SEQ ID NO 10
<211> LENGTH: 101
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 10
gtgcgcgctt ggtgcacgat cctgaagggg agctccgagg ggcccgggtc gccagggctg    60
ctgcggccat tcccggagcc cggcgcgggg cccgcgagat a                       101

<210> SEQ ID NO 11
<211> LENGTH: 256
<212> TYPE: PRT
<213> ORGANISM: Homo sapiens

<400> SEQUENCE: 11

Met Arg Pro Ala Ala Leu Arg Gly Ala Leu Leu Gly Cys Leu Cys Leu
1               5                   10                  15

Ala Leu Leu Cys Leu Gly Gly Ala Asp Lys Arg Leu Arg Asp Asn His
            20                  25                  30

```
Glu Trp Lys Lys Leu Ile Met Val Gln His Trp Pro Glu Thr Val Cys
         35                  40                  45

Glu Lys Ile Gln Asn Asp Cys Arg Asp Pro Pro Asp Tyr Trp Thr Ile
 50                  55                  60

His Gly Leu Trp Pro Asp Lys Ser Glu Gly Cys Asn Arg Ser Trp Pro
 65                  70                  75                  80

Phe Asn Leu Glu Glu Ile Lys Asp Leu Leu Pro Glu Met Arg Ala Tyr
                 85                  90                  95

Trp Pro Asp Val Ile His Ser Phe Pro Asn Arg Ser Arg Phe Trp Lys
                100                 105                 110

His Glu Trp Glu Lys His Gly Thr Cys Ala Ala Gln Val Asp Ala Leu
            115                 120                 125

Asn Ser Gln Lys Lys Tyr Phe Gly Arg Ser Leu Glu Leu Tyr Arg Glu
130                 135                 140

Leu Asp Leu Asn Ser Val Leu Leu Lys Leu Gly Ile Lys Pro Ser Ile
145                 150                 155                 160

Asn Tyr Tyr Gln Val Ala Asp Phe Lys Asp Ala Leu Ala Arg Val Tyr
                165                 170                 175

Gly Val Ile Pro Lys Ile Gln Cys Leu Pro Pro Ser Gln Asp Glu Glu
                180                 185                 190

Val Gln Thr Ile Gly Gln Ile Glu Leu Cys Leu Thr Lys Gln Asp Gln
            195                 200                 205

Gln Leu Gln Asn Cys Thr Glu Pro Gly Glu Gln Pro Ser Pro Lys Gln
210                 215                 220

Glu Val Trp Leu Ala Asn Gly Ala Ala Glu Ser Arg Gly Leu Arg Val
225                 230                 235                 240

Cys Glu Asp Gly Pro Val Phe Tyr Pro Pro Lys Lys Thr Lys His
                245                 250                 255
```

<210> SEQ ID NO 12
<211> LENGTH: 184
<212> TYPE: PRT
<213> ORGANISM: Homo sapiens

<400> SEQUENCE: 12

```
Glu Gly Cys Asn Arg Ser Trp Pro Phe Asn Leu Glu Glu Ile Lys Asp
 1               5                  10                  15

Leu Leu Pro Glu Met Arg Ala Tyr Trp Pro Asp Val Ile His Ser Phe
             20                  25                  30

Pro Asn Arg Ser Arg Phe Trp Lys His Glu Trp Glu Lys His Gly Thr
         35                  40                  45

Cys Ala Ala Gln Val Asp Ala Leu Asn Ser Gln Lys Lys Tyr Phe Gly
 50                  55                  60

Arg Ser Leu Glu Leu Tyr Arg Glu Leu Asp Leu Asn Ser Val Leu Leu
 65                  70                  75                  80

Lys Leu Gly Ile Lys Pro Ser Ile Asn Tyr Tyr Gln Val Ala Asp Phe
                 85                  90                  95

Lys Asp Ala Leu Ala Arg Val Tyr Gly Val Ile Pro Lys Ile Gln Cys
                100                 105                 110

Leu Pro Pro Ser Gln Asp Glu Glu Val Gln Thr Ile Gly Gln Ile Glu
            115                 120                 125

Leu Cys Leu Thr Lys Gln Asp Gln Gln Leu Gln Asn Cys Thr Glu Pro
130                 135                 140

Gly Glu Gln Pro Ser Pro Lys Gln Glu Val Trp Leu Ala Asn Gly Ala
145                 150                 155                 160
```

```
Ala Glu Ser Arg Gly Leu Arg Val Cys Glu Asp Gly Pro Val Phe Tyr
                165                 170                 175

Pro Pro Pro Lys Lys Thr Lys His
            180

<210> SEQ ID NO 13
<211> LENGTH: 164
<212> TYPE: PRT
<213> ORGANISM: Homo sapiens

<400> SEQUENCE: 13

Met Arg Ala Tyr Trp Pro Asp Val Ile His Ser Phe Pro Asn Arg Ser
1               5                   10                  15

Arg Phe Trp Lys His Glu Trp Glu Lys His Gly Thr Cys Ala Ala Gln
                20                  25                  30

Val Asp Ala Leu Asn Ser Gln Lys Lys Tyr Phe Gly Arg Ser Leu Glu
            35                  40                  45

Leu Tyr Arg Glu Leu Asp Leu Asn Ser Val Leu Leu Lys Leu Gly Ile
50                  55                  60

Lys Pro Ser Ile Asn Tyr Tyr Gln Val Ala Asp Phe Lys Asp Ala Leu
65                  70                  75                  80

Ala Arg Val Tyr Gly Val Ile Pro Lys Ile Gln Cys Leu Pro Pro Ser
                85                  90                  95

Gln Asp Glu Glu Val Gln Thr Ile Gly Gln Ile Glu Leu Cys Leu Thr
            100                 105                 110

Lys Gln Asp Gln Gln Leu Gln Asn Cys Thr Glu Pro Gly Glu Gln Pro
        115                 120                 125

Ser Pro Lys Gln Glu Val Trp Leu Ala Asn Gly Ala Ala Glu Ser Arg
    130                 135                 140

Gly Leu Arg Val Cys Glu Asp Gly Pro Val Phe Tyr Pro Pro Pro Lys
145                 150                 155                 160

Lys Thr Lys His

<210> SEQ ID NO 14
<211> LENGTH: 17
<212> TYPE: DNA
<213> ORGANISM: Homo sapiens

<400> SEQUENCE: 14
ccagggctgg gtgaggg                                                17

<210> SEQ ID NO 15

<400> SEQUENCE: 15

000

<210> SEQ ID NO 16

<400> SEQUENCE: 16

000

<210> SEQ ID NO 17

<400> SEQUENCE: 17

000
```

```
<210> SEQ ID NO 18
<400> SEQUENCE: 18
000

<210> SEQ ID NO 19
<400> SEQUENCE: 19
000

<210> SEQ ID NO 20
<400> SEQUENCE: 20
000

<210> SEQ ID NO 21
<400> SEQUENCE: 21
000

<210> SEQ ID NO 22
<400> SEQUENCE: 22
000

<210> SEQ ID NO 23
<400> SEQUENCE: 23
000

<210> SEQ ID NO 24
<400> SEQUENCE: 24
000

<210> SEQ ID NO 25
<400> SEQUENCE: 25
000

<210> SEQ ID NO 26
<400> SEQUENCE: 26
000

<210> SEQ ID NO 27
<400> SEQUENCE: 27
000

<210> SEQ ID NO 28
<400> SEQUENCE: 28
000

<210> SEQ ID NO 29
```

<400> SEQUENCE: 29

000

<210> SEQ ID NO 30
<400> SEQUENCE: 30

000

<210> SEQ ID NO 31
<400> SEQUENCE: 31

000

<210> SEQ ID NO 32
<400> SEQUENCE: 32

000

<210> SEQ ID NO 33
<400> SEQUENCE: 33

000

<210> SEQ ID NO 34
<400> SEQUENCE: 34

000

<210> SEQ ID NO 35
<400> SEQUENCE: 35

000

<210> SEQ ID NO 36
<400> SEQUENCE: 36

000

<210> SEQ ID NO 37
<400> SEQUENCE: 37

000

<210> SEQ ID NO 38
<400> SEQUENCE: 38

000

<210> SEQ ID NO 39
<400> SEQUENCE: 39

000

<210> SEQ ID NO 40
<400> SEQUENCE: 40

000

<210> SEQ ID NO 41

<400> SEQUENCE: 41

000

<210> SEQ ID NO 42

<400> SEQUENCE: 42

000

<210> SEQ ID NO 43

<400> SEQUENCE: 43

000

<210> SEQ ID NO 44

<400> SEQUENCE: 44

000

<210> SEQ ID NO 45

<400> SEQUENCE: 45

000

<210> SEQ ID NO 46

<400> SEQUENCE: 46

000

<210> SEQ ID NO 47

<400> SEQUENCE: 47

000

<210> SEQ ID NO 48

<400> SEQUENCE: 48

000

<210> SEQ ID NO 49

<400> SEQUENCE: 49

000

<210> SEQ ID NO 50

<400> SEQUENCE: 50

000

<210> SEQ ID NO 51

<400> SEQUENCE: 51

000

<210> SEQ ID NO 52

<400> SEQUENCE: 52

000

<210> SEQ ID NO 53

<400> SEQUENCE: 53

000

<210> SEQ ID NO 54

<400> SEQUENCE: 54

000

<210> SEQ ID NO 55

<400> SEQUENCE: 55

000

<210> SEQ ID NO 56

<400> SEQUENCE: 56

000

<210> SEQ ID NO 57

<400> SEQUENCE: 57

000

<210> SEQ ID NO 58

<400> SEQUENCE: 58

000

<210> SEQ ID NO 59

<400> SEQUENCE: 59

000

<210> SEQ ID NO 60

<400> SEQUENCE: 60

000

<210> SEQ ID NO 61

<400> SEQUENCE: 61

000

<210> SEQ ID NO 62

<400> SEQUENCE: 62

000

<210> SEQ ID NO 63

<400> SEQUENCE: 63

000

<210> SEQ ID NO 64

<400> SEQUENCE: 64

000

<210> SEQ ID NO 65

<400> SEQUENCE: 65

000

<210> SEQ ID NO 66

<400> SEQUENCE: 66

000

<210> SEQ ID NO 67

<400> SEQUENCE: 67

000

<210> SEQ ID NO 68

<400> SEQUENCE: 68

000

<210> SEQ ID NO 69

<400> SEQUENCE: 69

000

<210> SEQ ID NO 70

<400> SEQUENCE: 70

000

<210> SEQ ID NO 71

<400> SEQUENCE: 71

000

<210> SEQ ID NO 72

<400> SEQUENCE: 72

000

<210> SEQ ID NO 73

<400> SEQUENCE: 73

000

<210> SEQ ID NO 74

<400> SEQUENCE: 74

000

<210> SEQ ID NO 75

<400> SEQUENCE: 75

000

<210> SEQ ID NO 76

<400> SEQUENCE: 76

000

<210> SEQ ID NO 77

<400> SEQUENCE: 77

000

<210> SEQ ID NO 78

<400> SEQUENCE: 78

000

<210> SEQ ID NO 79

<400> SEQUENCE: 79

000

<210> SEQ ID NO 80

<400> SEQUENCE: 80

000

<210> SEQ ID NO 81

<400> SEQUENCE: 81

000

<210> SEQ ID NO 82

<400> SEQUENCE: 82

000

<210> SEQ ID NO 83

<400> SEQUENCE: 83

000

<210> SEQ ID NO 84

<400> SEQUENCE: 84

000

<210> SEQ ID NO 85

<400> SEQUENCE: 85

000

-continued

<210> SEQ ID NO 86

<400> SEQUENCE: 86

000

<210> SEQ ID NO 87

<400> SEQUENCE: 87

000

<210> SEQ ID NO 88

<400> SEQUENCE: 88

000

<210> SEQ ID NO 89

<400> SEQUENCE: 89

000

<210> SEQ ID NO 90

<400> SEQUENCE: 90

000

<210> SEQ ID NO 91

<400> SEQUENCE: 91

000

<210> SEQ ID NO 92

<400> SEQUENCE: 92

000

<210> SEQ ID NO 93

<400> SEQUENCE: 93

000

<210> SEQ ID NO 94

<400> SEQUENCE: 94

000

<210> SEQ ID NO 95

<400> SEQUENCE: 95

000

<210> SEQ ID NO 96

<400> SEQUENCE: 96

000

```
<210> SEQ ID NO 97
<400> SEQUENCE: 97
000

<210> SEQ ID NO 98
<400> SEQUENCE: 98
000

<210> SEQ ID NO 99
<400> SEQUENCE: 99
000

<210> SEQ ID NO 100
<400> SEQUENCE: 100
000

<210> SEQ ID NO 101
<400> SEQUENCE: 101
000

<210> SEQ ID NO 102
<400> SEQUENCE: 102
000

<210> SEQ ID NO 103
<400> SEQUENCE: 103
000

<210> SEQ ID NO 104
<400> SEQUENCE: 104
000

<210> SEQ ID NO 105
<400> SEQUENCE: 105
000

<210> SEQ ID NO 106
<400> SEQUENCE: 106
000

<210> SEQ ID NO 107
<400> SEQUENCE: 107
000

<210> SEQ ID NO 108
```

```
<400> SEQUENCE: 108
000

<210> SEQ ID NO 109
<400> SEQUENCE: 109
000

<210> SEQ ID NO 110
<400> SEQUENCE: 110
000

<210> SEQ ID NO 111
<400> SEQUENCE: 111
000

<210> SEQ ID NO 112
<400> SEQUENCE: 112
000

<210> SEQ ID NO 113
<400> SEQUENCE: 113
000

<210> SEQ ID NO 114
<400> SEQUENCE: 114
000

<210> SEQ ID NO 115
<400> SEQUENCE: 115
000

<210> SEQ ID NO 116
<400> SEQUENCE: 116
000

<210> SEQ ID NO 117
<400> SEQUENCE: 117
000

<210> SEQ ID NO 118
<400> SEQUENCE: 118
000

<210> SEQ ID NO 119
<400> SEQUENCE: 119
```

000

<210> SEQ ID NO 120

<400> SEQUENCE: 120

000

<210> SEQ ID NO 121

<400> SEQUENCE: 121

000

<210> SEQ ID NO 122

<400> SEQUENCE: 122

000

<210> SEQ ID NO 123

<400> SEQUENCE: 123

000

<210> SEQ ID NO 124

<400> SEQUENCE: 124

000

<210> SEQ ID NO 125

<400> SEQUENCE: 125

000

<210> SEQ ID NO 126

<400> SEQUENCE: 126

000

<210> SEQ ID NO 127

<400> SEQUENCE: 127

000

<210> SEQ ID NO 128

<400> SEQUENCE: 128

000

<210> SEQ ID NO 129

<400> SEQUENCE: 129

000

<210> SEQ ID NO 130

<400> SEQUENCE: 130

000

<210> SEQ ID NO 131

<400> SEQUENCE: 131

000

<210> SEQ ID NO 132

<400> SEQUENCE: 132

000

<210> SEQ ID NO 133

<400> SEQUENCE: 133

000

<210> SEQ ID NO 134

<400> SEQUENCE: 134

000

<210> SEQ ID NO 135

<400> SEQUENCE: 135

000

<210> SEQ ID NO 136

<400> SEQUENCE: 136

000

<210> SEQ ID NO 137

<400> SEQUENCE: 137

000

<210> SEQ ID NO 138

<400> SEQUENCE: 138

000

<210> SEQ ID NO 139

<400> SEQUENCE: 139

000

<210> SEQ ID NO 140

<400> SEQUENCE: 140

000

<210> SEQ ID NO 141

<400> SEQUENCE: 141

000

<210> SEQ ID NO 142

<400> SEQUENCE: 142

000

<210> SEQ ID NO 143

<400> SEQUENCE: 143

000

<210> SEQ ID NO 144

<400> SEQUENCE: 144

000

<210> SEQ ID NO 145

<400> SEQUENCE: 145

000

<210> SEQ ID NO 146

<400> SEQUENCE: 146

000

<210> SEQ ID NO 147

<400> SEQUENCE: 147

000

<210> SEQ ID NO 148

<400> SEQUENCE: 148

000

<210> SEQ ID NO 149

<400> SEQUENCE: 149

000

<210> SEQ ID NO 150

<400> SEQUENCE: 150

000

<210> SEQ ID NO 151

<400> SEQUENCE: 151

000

<210> SEQ ID NO 152

<400> SEQUENCE: 152

000

<210> SEQ ID NO 153

<400> SEQUENCE: 153

000

<210> SEQ ID NO 154

<400> SEQUENCE: 154

000

<210> SEQ ID NO 155

<400> SEQUENCE: 155

000

<210> SEQ ID NO 156

<400> SEQUENCE: 156

000

<210> SEQ ID NO 157

<400> SEQUENCE: 157

000

<210> SEQ ID NO 158

<400> SEQUENCE: 158

000

<210> SEQ ID NO 159

<400> SEQUENCE: 159

000

<210> SEQ ID NO 160

<400> SEQUENCE: 160

000

<210> SEQ ID NO 161

<400> SEQUENCE: 161

000

<210> SEQ ID NO 162

<400> SEQUENCE: 162

000

<210> SEQ ID NO 163

<400> SEQUENCE: 163

000

<210> SEQ ID NO 164

<400> SEQUENCE: 164

000

<210> SEQ ID NO 165

<400> SEQUENCE: 165

000

<210> SEQ ID NO 166

<400> SEQUENCE: 166

000

<210> SEQ ID NO 167

<400> SEQUENCE: 167

000

<210> SEQ ID NO 168

<400> SEQUENCE: 168

000

<210> SEQ ID NO 169

<400> SEQUENCE: 169

000

<210> SEQ ID NO 170

<400> SEQUENCE: 170

000

<210> SEQ ID NO 171

<400> SEQUENCE: 171

000

<210> SEQ ID NO 172

<400> SEQUENCE: 172

000

<210> SEQ ID NO 173

<400> SEQUENCE: 173

000

<210> SEQ ID NO 174

<400> SEQUENCE: 174

000

<210> SEQ ID NO 175

<400> SEQUENCE: 175

000

```
<210> SEQ ID NO 176

<400> SEQUENCE: 176

000

<210> SEQ ID NO 177

<400> SEQUENCE: 177

000

<210> SEQ ID NO 178

<400> SEQUENCE: 178

000

<210> SEQ ID NO 179

<400> SEQUENCE: 179

000

<210> SEQ ID NO 180

<400> SEQUENCE: 180

000

<210> SEQ ID NO 181

<400> SEQUENCE: 181

000

<210> SEQ ID NO 182

<400> SEQUENCE: 182

000

<210> SEQ ID NO 183

<400> SEQUENCE: 183

000

<210> SEQ ID NO 184

<400> SEQUENCE: 184

000

<210> SEQ ID NO 185

<400> SEQUENCE: 185

000

<210> SEQ ID NO 186

<400> SEQUENCE: 186

000

<210> SEQ ID NO 187
```

<400> SEQUENCE: 187

000

<210> SEQ ID NO 188

<400> SEQUENCE: 188

000

<210> SEQ ID NO 189

<400> SEQUENCE: 189

000

<210> SEQ ID NO 190

<400> SEQUENCE: 190

000

<210> SEQ ID NO 191

<400> SEQUENCE: 191

000

<210> SEQ ID NO 192

<400> SEQUENCE: 192

000

<210> SEQ ID NO 193

<400> SEQUENCE: 193

000

<210> SEQ ID NO 194

<400> SEQUENCE: 194

000

<210> SEQ ID NO 195

<400> SEQUENCE: 195

000

<210> SEQ ID NO 196

<400> SEQUENCE: 196

000

<210> SEQ ID NO 197

<400> SEQUENCE: 197

000

<210> SEQ ID NO 198

<400> SEQUENCE: 198

000

<210> SEQ ID NO 199

<400> SEQUENCE: 199

000

<210> SEQ ID NO 200

<400> SEQUENCE: 200

000

<210> SEQ ID NO 201

<400> SEQUENCE: 201

000

<210> SEQ ID NO 202

<400> SEQUENCE: 202

000

<210> SEQ ID NO 203

<400> SEQUENCE: 203

000

<210> SEQ ID NO 204

<400> SEQUENCE: 204

000

<210> SEQ ID NO 205

<400> SEQUENCE: 205

000

<210> SEQ ID NO 206

<400> SEQUENCE: 206

000

<210> SEQ ID NO 207

<400> SEQUENCE: 207

000

<210> SEQ ID NO 208

<400> SEQUENCE: 208

000

<210> SEQ ID NO 209
<211> LENGTH: 8
<212> TYPE: PRT
<213> ORGANISM: Homo sapiens

<400> SEQUENCE: 209

```
Gly Phe Thr Phe Ser Thr Tyr Gly
1               5
```

<210> SEQ ID NO 210
<211> LENGTH: 8
<212> TYPE: PRT
<213> ORGANISM: Homo sapiens

<400> SEQUENCE: 210

```
Ile Ser Gly Thr Gly Arg Thr Thr
1               5
```

<210> SEQ ID NO 211
<211> LENGTH: 14
<212> TYPE: PRT
<213> ORGANISM: Homo sapiens

<400> SEQUENCE: 211

```
Thr Lys Glu Arg Gly Asp Tyr Tyr Gly Val Phe Asp Tyr
1               5                   10
```

<210> SEQ ID NO 212
<211> LENGTH: 6
<212> TYPE: PRT
<213> ORGANISM: Homo sapiens

<400> SEQUENCE: 212

```
Gln Thr Ile Ser Ser Trp
1               5
```

<210> SEQ ID NO 213
<211> LENGTH: 3
<212> TYPE: PRT
<213> ORGANISM: Homo sapiens

<400> SEQUENCE: 213

```
Ala Ala Ser
1
```

<210> SEQ ID NO 214
<211> LENGTH: 8
<212> TYPE: PRT
<213> ORGANISM: Homo sapiens

<400> SEQUENCE: 214

```
Gln Gln Tyr His Arg Ser Trp Thr
1               5
```

<210> SEQ ID NO 215
<211> LENGTH: 121
<212> TYPE: PRT
<213> ORGANISM: Homo sapiens

<400> SEQUENCE: 215

```
Glu Val Gln Leu Leu Glu Ser Gly Gly Gly Leu Val Gln Pro Gly Lys
1               5                   10                  15

Ser Leu Arg Leu Ser Cys Ala Val Ser Gly Phe Thr Phe Ser Thr Tyr
            20                  25                  30

Gly Met Asn Trp Val Arg Gln Ala Pro Gly Lys Gly Leu Glu Trp Val
        35                  40                  45

Ser Ser Ile Ser Gly Thr Gly Arg Thr Thr Tyr His Ala Asp Ser Val
    50                  55                  60
```

Gln Gly Arg Phe Thr Val Ser Arg Asp Asn Ser Lys Asn Ile Leu Tyr
65                  70                  75                  80

Leu Gln Met Asn Ser Leu Arg Ala Asp Asp Thr Ala Val Tyr Phe Cys
                85                  90                  95

Thr Lys Glu Arg Gly Asp Tyr Tyr Gly Val Phe Asp Tyr Trp Gly
            100                 105                 110

Gln Gly Thr Leu Val Thr Val Ser Ser
            115                 120

<210> SEQ ID NO 216
<211> LENGTH: 106
<212> TYPE: PRT
<213> ORGANISM: Homo sapiens

<400> SEQUENCE: 216

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Thr Ile Ser Ser Trp
            20                  25                  30

Leu Ala Trp Tyr Gln Gln Thr Pro Glu Lys Ala Pro Lys Leu Leu Ile
        35                  40                  45

Tyr Ala Ala Ser Asn Leu Gln Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Tyr His Arg Ser Trp Thr
                85                  90                  95

Phe Gly Gln Gly Thr Lys Val Glu Ile Thr
            100                 105

<210> SEQ ID NO 217
<211> LENGTH: 8
<212> TYPE: PRT
<213> ORGANISM: Homo sapiens

<400> SEQUENCE: 217

Gly Phe Thr Phe Ser Ser Tyr Trp
1               5

<210> SEQ ID NO 218
<211> LENGTH: 8
<212> TYPE: PRT
<213> ORGANISM: Homo sapiens

<400> SEQUENCE: 218

Ile Lys Glu Asp Gly Ser Glu Lys
1               5

<210> SEQ ID NO 219
<211> LENGTH: 15
<212> TYPE: PRT
<213> ORGANISM: Homo sapiens

<400> SEQUENCE: 219

Ala Arg Glu Asp Tyr Asp Ser Tyr Tyr Lys Tyr Gly Met Asp Val
1               5                   10                  15

<210> SEQ ID NO 220
<211> LENGTH: 12
<212> TYPE: PRT
<213> ORGANISM: Homo sapiens

```
<400> SEQUENCE: 220

Gln Ser Ile Leu Tyr Ser Ser Asn Asn Lys Asn Tyr
1               5                   10

<210> SEQ ID NO 221
<211> LENGTH: 3
<212> TYPE: PRT
<213> ORGANISM: Homo sapiens

<400> SEQUENCE: 221

Trp Ala Ser
1

<210> SEQ ID NO 222
<211> LENGTH: 9
<212> TYPE: PRT
<213> ORGANISM: Homo sapiens

<400> SEQUENCE: 222

Gln Gln Tyr Tyr Ser Thr Pro Phe Thr
1               5

<210> SEQ ID NO 223
<211> LENGTH: 122
<212> TYPE: PRT
<213> ORGANISM: Homo sapiens

<400> SEQUENCE: 223

Glu Val Gln Leu Val Glu Ser Gly Gly Gly Leu Val Gln Pro Gly Gly
1               5                   10                  15

Ser Leu Arg Leu Ser Cys Ala Val Ser Gly Phe Thr Phe Ser Ser Tyr
            20                  25                  30

Trp Met Ser Trp Val Arg Gln Ala Pro Gly Lys Gly Leu Glu Trp Val
        35                  40                  45

Ala Asn Ile Lys Glu Asp Gly Ser Glu Lys Asn Tyr Val Asp Ser Val
    50                  55                  60

Lys Gly Arg Phe Thr Leu Ser Ser Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Asp Tyr Asp Ser Tyr Tyr Lys Tyr Gly Met Asp Val Trp
            100                 105                 110

Gly Gln Gly Thr Ala Val Ile Val Ser Ser
        115                 120

<210> SEQ ID NO 224
<211> LENGTH: 113
<212> TYPE: PRT
<213> ORGANISM: Homo sapiens

<400> SEQUENCE: 224

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Tyr Ser
            20                  25                  30

Ser Asn Asn Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60
```

Pro Asp Arg Phe Ser Gly Ser Gly Ser Gly Thr Asp Phe Thr Leu Thr
65                  70                  75                  80

Ile Ser Ser Leu Gln Ala Glu Asp Val Ser Val Tyr Tyr Cys Gln Gln
                85                  90                  95

Tyr Tyr Ser Thr Pro Phe Thr Phe Gly Pro Gly Thr Lys Val Asp Ile
            100                 105                 110

Lys

<210> SEQ ID NO 225
<211> LENGTH: 8
<212> TYPE: PRT
<213> ORGANISM: Homo sapiens

<400> SEQUENCE: 225

Gly Gly Ser Phe Thr Gly Phe Tyr
1               5

<210> SEQ ID NO 226
<211> LENGTH: 7
<212> TYPE: PRT
<213> ORGANISM: Homo sapiens

<400> SEQUENCE: 226

Ile Asn His Arg Gly Asn Thr
1               5

<210> SEQ ID NO 227
<211> LENGTH: 13
<212> TYPE: PRT
<213> ORGANISM: Homo sapiens

<400> SEQUENCE: 227

Ala Ser Pro Phe Tyr Asp Phe Trp Ser Gly Ser Asp Tyr
1               5                   10

<210> SEQ ID NO 228
<211> LENGTH: 11
<212> TYPE: PRT
<213> ORGANISM: Homo sapiens

<400> SEQUENCE: 228

Gln Ser Leu Val His Ser Asp Gly Asn Thr Tyr
1               5                   10

<210> SEQ ID NO 229
<211> LENGTH: 3
<212> TYPE: PRT
<213> ORGANISM: Homo sapiens

<400> SEQUENCE: 229

Lys Ile Ser
1

<210> SEQ ID NO 230
<211> LENGTH: 9
<212> TYPE: PRT
<213> ORGANISM: Homo sapiens

<400> SEQUENCE: 230

Met Gln Ala Thr Gln Phe Pro Leu Thr
1               5

-continued

```
<210> SEQ ID NO 231
<211> LENGTH: 119
<212> TYPE: PRT
<213> ORGANISM: Homo sapiens

<400> SEQUENCE: 231
```

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Thr Gly Phe
            20                  25                  30

Tyr Trp Ser Trp Ile Arg Gln Pro Pro Gly Lys Gly Leu Glu Trp Ile
        35                  40                  45

Gly Glu Ile Asn His Arg Gly Asn Thr Asn Tyr Asn Pro Ser Leu Lys
50                  55                  60

Ser Arg Val Thr Met Ser Val Asp Thr Ser Lys Asn Gln Phe Ser Leu
65                  70                  75                  80

Asn Met Ile Ser Val Thr Ala Ala Asp Thr Ala Met Tyr Phe Cys Ala
                85                  90                  95

Ser Pro Phe Tyr Asp Phe Trp Ser Gly Ser Asp Tyr Trp Gly Gln Gly
            100                 105                 110

Thr Leu Val Thr Val Ser Ser
        115

```
<210> SEQ ID NO 232
<211> LENGTH: 112
<212> TYPE: PRT
<213> ORGANISM: Homo sapiens

<400> SEQUENCE: 232
```

Asp Ile Met Leu Thr Gln Thr Pro Leu Thr Ser Pro Val Thr Leu Gly
1               5                   10                  15

Gln Pro Ala Ser Ile Ser Cys Lys Ser Ser Gln Ser Leu Val His Ser
            20                  25                  30

Asp Gly Asn Thr Tyr Leu Ser Trp Leu Gln Gln Arg Pro Gly Gln Pro
        35                  40                  45

Pro Arg Leu Leu Phe Tyr Lys Ile Ser Asn Arg Phe Ser Gly Val Pro
50                  55                  60

Asp Arg Phe Ser Gly Ser Gly Ala Gly Thr Asp Phe Thr Leu Lys Ile
65                  70                  75                  80

Ser Arg Val Glu Ala Glu Asp Val Gly Val Tyr Tyr Cys Met Gln Ala
                85                  90                  95

Thr Gln Phe Pro Leu Thr Phe Gly Gly Gly Thr Lys Val Glu Ile Lys
            100                 105                 110

```
<210> SEQ ID NO 233
<211> LENGTH: 10
<212> TYPE: PRT
<213> ORGANISM: Homo sapiens
<220> FEATURE:
<221> NAME/KEY: MOD_RES
<222> LOCATION: (3)..(3)
<223> OTHER INFORMATION: Pro, Ser, Asp, Gln or Asn
<220> FEATURE:
<221> NAME/KEY: MOD_RES
<222> LOCATION: (5)..(5)
<223> OTHER INFORMATION: Thr or Arg
<220> FEATURE:
<221> NAME/KEY: MOD_RES
<222> LOCATION: (6)..(6)
<223> OTHER INFORMATION: Asn, Thr, Tyr or His

<400> SEQUENCE: 233
```

```
Gly Tyr Xaa Phe Xaa Xaa Tyr Gly Ile Ser
1               5                   10

<210> SEQ ID NO 234
<211> LENGTH: 17
<212> TYPE: PRT
<213> ORGANISM: Homo sapiens
<220> FEATURE:
<221> NAME/KEY: MOD_RES
<222> LOCATION: (4)..(4)
<223> OTHER INFORMATION: Thr, Pro, Ser or Ala
<220> FEATURE:
<221> NAME/KEY: MOD_RES
<222> LOCATION: (8)..(8)
<223> OTHER INFORMATION: Asn, Gly, Val, Lys or Ala
<220> FEATURE:
<221> NAME/KEY: MOD_RES
<222> LOCATION: (9)..(9)
<223> OTHER INFORMATION: Thr or Lys
<220> FEATURE:
<221> NAME/KEY: MOD_RES
<222> LOCATION: (10)..(10)
<223> OTHER INFORMATION: His or Asn
<220> FEATURE:
<221> NAME/KEY: MOD_RES
<222> LOCATION: (13)..(13)
<223> OTHER INFORMATION: Gln or Arg
<220> FEATURE:
<221> NAME/KEY: MOD_RES
<222> LOCATION: (14)..(14)
<223> OTHER INFORMATION: Lys or Met
<220> FEATURE:
<221> NAME/KEY: MOD_RES
<222> LOCATION: (15)..(15)
<223> OTHER INFORMATION: Leu or His

<400> SEQUENCE: 234

Trp Ile Ser Xaa Tyr Asn Gly Xaa Xaa Xaa Tyr Ala Xaa Xaa Xaa Gln
1               5                   10                  15

Gly

<210> SEQ ID NO 235
<211> LENGTH: 15
<212> TYPE: PRT
<213> ORGANISM: Homo sapiens
<220> FEATURE:
<221> NAME/KEY: MOD_RES
<222> LOCATION: (8)..(8)
<223> OTHER INFORMATION: Ser or Ala
<220> FEATURE:
<221> NAME/KEY: MOD_RES
<222> LOCATION: (9)..(9)
<223> OTHER INFORMATION: Tyr or Pro
<220> FEATURE:
<221> NAME/KEY: MOD_RES
<222> LOCATION: (15)..(15)
<223> OTHER INFORMATION: Val, Ala or Gly

<400> SEQUENCE: 235

Glu Asn Tyr Tyr Gly Ser Gly Xaa Xaa Arg Gly Gly Met Asp Xaa
1               5                   10                  15

<210> SEQ ID NO 236
<211> LENGTH: 10
<212> TYPE: PRT
<213> ORGANISM: Homo sapiens

<400> SEQUENCE: 236

Gly Tyr Asp Phe Thr Tyr Tyr Gly Ile Ser
1               5                   10
```

<210> SEQ ID NO 237
<211> LENGTH: 17
<212> TYPE: PRT
<213> ORGANISM: Homo sapiens

<400> SEQUENCE: 237

Trp Ile Ser Thr Tyr Asn Gly Asn Thr His Tyr Ala Arg Met Leu Gln
1               5                   10                  15

Gly

<210> SEQ ID NO 238
<211> LENGTH: 15
<212> TYPE: PRT
<213> ORGANISM: Homo sapiens

<400> SEQUENCE: 238

Glu Asn Tyr Tyr Gly Ser Gly Ala Tyr Arg Gly Gly Met Asp Val
1               5                   10                  15

<210> SEQ ID NO 239
<211> LENGTH: 11
<212> TYPE: PRT
<213> ORGANISM: Homo sapiens

<400> SEQUENCE: 239

Arg Ala Ser Gln Ser Val Ser Ser Tyr Leu Ala
1               5                   10

<210> SEQ ID NO 240
<211> LENGTH: 7
<212> TYPE: PRT
<213> ORGANISM: Homo sapiens

<400> SEQUENCE: 240

Asp Ala Ser Asn Arg Ala Thr
1               5

<210> SEQ ID NO 241
<211> LENGTH: 9
<212> TYPE: PRT
<213> ORGANISM: Homo sapiens

<400> SEQUENCE: 241

Gln Gln Arg Ser Asn Trp Pro Trp Thr
1               5

<210> SEQ ID NO 242
<211> LENGTH: 124
<212> TYPE: PRT
<213> ORGANISM: Homo sapiens

<400> SEQUENCE: 242

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Asp Phe Thr Tyr Tyr
                20                  25                  30

Gly Ile Ser Trp Val Arg Gln Ala Pro Gly Gln Gly Leu Glu Trp Met
            35                  40                  45

Gly Trp Ile Ser Thr Tyr Asn Gly Asn Thr His Tyr Ala Arg Met Leu
        50                  55                  60

Gln Gly Arg Val Thr Met Thr Thr Asp Thr Ser Thr Arg Thr Ala Tyr
65                  70                  75                  80

```
Met Glu Leu Arg Ser Leu Arg Ser Asp Asp Thr Ala Val Tyr Tyr Cys
            85                  90                  95

Ala Arg Glu Asn Tyr Tyr Gly Ser Gly Ala Tyr Arg Gly Gly Met Asp
        100                 105                 110

Val Trp Gly Gln Gly Thr Thr Val Thr Val Ser Ser
        115                 120

<210> SEQ ID NO 243
<211> LENGTH: 107
<212> TYPE: PRT
<213> ORGANISM: Homo sapiens

<400> SEQUENCE: 243

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
 50                 55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Trp
                85                  90                  95

Thr Phe Gly Gln Gly Thr Lys Val Glu Ile Lys
            100                 105

<210> SEQ ID NO 244
<211> LENGTH: 453
<212> TYPE: PRT
<213> ORGANISM: Homo sapiens

<400> SEQUENCE: 244

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Asp Phe Thr Tyr Tyr
            20                  25                  30

Gly Ile Ser Trp Val Arg Gln Ala Pro Gly Gln Gly Leu Glu Trp Met
        35                  40                  45

Gly Trp Ile Ser Thr Tyr Asn Gly Asn Thr His Tyr Ala Arg Met Leu
 50                 55                  60

Gln Gly Arg Val Thr Met Thr Thr Asp Thr Ser Thr Arg Thr Ala Tyr
65                  70                  75                  80

Met Glu Leu Arg Ser Leu Arg Ser Asp Asp Thr Ala Val Tyr Tyr Cys
                85                  90                  95

Ala Arg Glu Asn Tyr Tyr Gly Ser Gly Ala Tyr Arg Gly Gly Met Asp
            100                 105                 110

Val Trp Gly Gln Gly Thr Thr Val Thr Val Ser Ser Ala Ser Thr Lys
        115                 120                 125

Gly Pro Ser Val Phe Pro Leu Ala Pro Ser Ser Lys Ser Thr Ser Gly
    130                 135                 140

Gly Thr Ala Ala Leu Gly Cys Leu Val Lys Asp Tyr Phe Pro Glu Pro
145                 150                 155                 160

Val Thr Val Ser Trp Asn Ser Gly Ala Leu Thr Ser Gly Val His Thr
                165                 170                 175
```

Phe Pro Ala Val Leu Gln Ser Ser Gly Leu Tyr Ser Leu Ser Ser Val
                180                 185                 190

Val Thr Val Pro Ser Ser Ser Leu Gly Thr Gln Thr Tyr Ile Cys Asn
            195                 200                 205

Val Asn His Lys Pro Ser Asn Thr Lys Val Asp Lys Lys Val Glu Pro
    210                 215                 220

Lys Ser Cys Asp Lys Thr His Thr Cys Pro Pro Cys Pro Ala Pro Glu
225                 230                 235                 240

Ala Ala Gly Ala Pro Ser Val Phe Leu Phe Pro Pro Lys Pro Lys Asp
                245                 250                 255

Thr Leu Met Ile Ser Arg Thr Pro Glu Val Thr Cys Val Val Val Asp
            260                 265                 270

Val Ser His Glu Asp Pro Glu Val Lys Phe Asn Trp Tyr Val Asp Gly
        275                 280                 285

Val Glu Val His Asn Ala Lys Thr Lys Pro Arg Glu Glu Gln Tyr Asn
    290                 295                 300

Ser Thr Tyr Arg Val Val Ser Val Leu Thr Val Leu His Gln Asp Trp
305                 310                 315                 320

Leu Asn Gly Lys Glu Tyr Lys Cys Lys Val Ser Asn Lys Ala Leu Pro
                325                 330                 335

Ala Pro Ile Glu Lys Thr Ile Ser Lys Ala Lys Gly Gln Pro Arg Glu
            340                 345                 350

Pro Gln Val Tyr Thr Leu Pro Pro Ser Arg Glu Glu Met Thr Lys Asn
        355                 360                 365

Gln Val Ser Leu Thr Cys Leu Val Lys Gly Phe Tyr Pro Ser Asp Ile
    370                 375                 380

Ala Val Glu Trp Glu Ser Asn Gly Gln Pro Glu Asn Asn Tyr Lys Thr
385                 390                 395                 400

Thr Pro Pro Val Leu Asp Ser Asp Gly Ser Phe Phe Leu Tyr Ser Lys
                405                 410                 415

Leu Thr Val Asp Lys Ser Arg Trp Gln Gln Gly Asn Val Phe Ser Cys
            420                 425                 430

Ser Val Met His Glu Ala Leu His Asn His Tyr Thr Gln Lys Ser Leu
        435                 440                 445

Ser Leu Ser Pro Gly
    450

<210> SEQ ID NO 245
<211> LENGTH: 214
<212> TYPE: PRT
<213> ORGANISM: Homo sapiens

<400> SEQUENCE: 245

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Trp

```
                        85                  90                  95

Thr Phe Gly Gln Gly Thr Lys Val Glu Ile Lys Arg Thr Val Ala Ala
                100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
        130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 246
<211> LENGTH: 7
<212> TYPE: PRT
<213> ORGANISM: Homo sapiens

<400> SEQUENCE: 246

Ser Arg Ser Tyr Tyr Trp Gly
1               5

<210> SEQ ID NO 247
<211> LENGTH: 16
<212> TYPE: PRT
<213> ORGANISM: Homo sapiens

<400> SEQUENCE: 247

Ser Ile Tyr Tyr Asn Gly Arg Thr Tyr Tyr Asn Pro Ser Leu Lys Ser
1               5                   10                  15

<210> SEQ ID NO 248
<211> LENGTH: 11
<212> TYPE: PRT
<213> ORGANISM: Homo sapiens

<400> SEQUENCE: 248

Glu Asp Tyr Gly Asp Tyr Gly Ala Phe Asp Ile
1               5                   10

<210> SEQ ID NO 249
<211> LENGTH: 11
<212> TYPE: PRT
<213> ORGANISM: Homo sapiens

<400> SEQUENCE: 249

Arg Ala Ser Gln Gly Ile Ser Ser Ala Leu Ala
1               5                   10

<210> SEQ ID NO 250
<211> LENGTH: 7
<212> TYPE: PRT
<213> ORGANISM: Homo sapiens

<400> SEQUENCE: 250

Asp Ala Ser Ser Leu Glu Ser
```

```
<210> SEQ ID NO 251
<211> LENGTH: 9
<212> TYPE: PRT
<213> ORGANISM: Homo sapiens

<400> SEQUENCE: 251

Gln Gln Phe Asn Ser Tyr Pro Leu Thr
1               5

<210> SEQ ID NO 252
<211> LENGTH: 121
<212> TYPE: PRT
<213> ORGANISM: Homo sapiens

<400> SEQUENCE: 252

Gln Leu Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Ser Ser Arg
            20                  25                  30

Ser Tyr Tyr Trp Gly Trp Ile Arg Gln Pro Pro Gly Lys Gly Leu Glu
        35                  40                  45

Trp Ile Gly Ser Ile Tyr Tyr Asn Gly Arg Thr Tyr Tyr Asn Pro Ser
50                  55                  60

Leu Lys Ser Arg Val Thr Ile Ser Val Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95

Cys Ala Arg Glu Asp Tyr Gly Asp Tyr Gly Ala Phe Asp Ile Trp Gly
            100                 105                 110

Gln Gly Thr Met Val Thr Val Ser Ser
        115                 120

<210> SEQ ID NO 253
<211> LENGTH: 107
<212> TYPE: PRT
<213> ORGANISM: Homo sapiens

<400> SEQUENCE: 253

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Ala
            20                  25                  30

Leu Ala Trp Tyr Gln Gln Lys Pro Gly Lys Ala Pro Lys Leu Leu Ile
        35                  40                  45

Tyr Asp Ala Ser Ser Leu Glu Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Phe Asn Ser Tyr Pro Leu
                85                  90                  95

Thr Phe Gly Gly Gly Thr Lys Val Glu Ile Lys
            100                 105

<210> SEQ ID NO 254
<211> LENGTH: 7
<212> TYPE: PRT
<213> ORGANISM: Homo sapiens
```

-continued

<400> SEQUENCE: 254

Thr Ser Asn Met Gly Val Val
1               5

<210> SEQ ID NO 255
<211> LENGTH: 16
<212> TYPE: PRT
<213> ORGANISM: Homo sapiens

<400> SEQUENCE: 255

His Ile Leu Trp Asp Asp Arg Glu Tyr Ser Asn Pro Ala Leu Lys Ser
1               5                   10                  15

<210> SEQ ID NO 256
<211> LENGTH: 14
<212> TYPE: PRT
<213> ORGANISM: Homo sapiens

<400> SEQUENCE: 256

Met Ser Arg Asn Tyr Tyr Gly Ser Ser Tyr Val Met Asp Tyr
1               5                   10

<210> SEQ ID NO 257
<211> LENGTH: 10
<212> TYPE: PRT
<213> ORGANISM: Homo sapiens

<400> SEQUENCE: 257

Ser Ala Ser Ser Ser Val Asn Tyr Met His
1               5                   10

<210> SEQ ID NO 258
<211> LENGTH: 7
<212> TYPE: PRT
<213> ORGANISM: Homo sapiens

<400> SEQUENCE: 258

Ser Thr Ser Asn Leu Ala Ser
1               5

<210> SEQ ID NO 259
<211> LENGTH: 8
<212> TYPE: PRT
<213> ORGANISM: Homo sapiens

<400> SEQUENCE: 259

His Gln Trp Asn Asn Tyr Gly Thr
1               5

<210> SEQ ID NO 260
<211> LENGTH: 124
<212> TYPE: PRT
<213> ORGANISM: Homo sapiens

<400> SEQUENCE: 260

Gln Val Thr Leu Lys Glu Ser Gly Pro Ala Leu Val Lys Pro Thr Gln
1               5                   10                  15

Thr Leu Thr Leu Thr Cys Thr Phe Ser Gly Phe Ser Leu Ser Thr Ser
            20                  25                  30

Asn Met Gly Val Val Trp Ile Arg Gln Pro Pro Gly Lys Ala Leu Glu
        35                  40                  45

Trp Leu Ala His Ile Leu Trp Asp Asp Arg Glu Tyr Ser Asn Pro Ala

```
                50                  55                  60
Leu Lys Ser Arg Leu Thr Ile Ser Lys Asp Thr Ser Lys Asn Gln Val
 65                  70                  75                  80

Val Leu Thr Met Thr Asn Met Asp Pro Val Asp Thr Ala Thr Tyr Tyr
                 85                  90                  95

Cys Ala Arg Met Ser Arg Asn Tyr Tyr Gly Ser Ser Tyr Val Met Asp
                100                 105                 110

Tyr Trp Gly Gln Gly Thr Leu Val Thr Val Ser Ser
                115                 120
```

<210> SEQ ID NO 261
<211> LENGTH: 106
<212> TYPE: PRT
<213> ORGANISM: Homo sapiens

<400> SEQUENCE: 261

```
Asp Ile Gln Leu Thr Gln Ser Pro Ser Phe Leu Ser Ala Ser Val Gly
 1               5                  10                  15

Asp Arg Val Thr Ile Thr Cys Ser Ala Ser Ser Ser Val Asn Tyr Met
                 20                  25                  30

His Trp Tyr Gln Gln Lys Pro Gly Lys Ala Pro Lys Leu Leu Ile Tyr
                 35                  40                  45

Ser Thr Ser Asn Leu Ala Ser Gly Val Pro Ser Arg Phe Ser Gly Ser
     50                  55                  60

Gly Ser Gly Thr Glu Phe Thr Leu Thr Ile Ser Ser Leu Gln Pro Glu
 65                  70                  75                  80

Asp Phe Ala Thr Tyr Tyr Cys His Gln Trp Asn Asn Tyr Gly Thr Phe
                 85                  90                  95

Gly Gln Gly Thr Lys Val Glu Ile Lys Arg
                100                 105
```

<210> SEQ ID NO 262
<211> LENGTH: 5
<212> TYPE: PRT
<213> ORGANISM: Homo sapiens

<400> SEQUENCE: 262

```
Leu Tyr Gly Met Asn
 1               5
```

<210> SEQ ID NO 263
<211> LENGTH: 5
<212> TYPE: PRT
<213> ORGANISM: Homo sapiens

<400> SEQUENCE: 263

```
Asn Tyr Gly Met Asn
 1               5
```

<210> SEQ ID NO 264
<211> LENGTH: 17
<212> TYPE: PRT
<213> ORGANISM: Homo sapiens

<400> SEQUENCE: 264

```
Trp Ile Asn Thr Tyr Thr Gly Glu Pro Thr Tyr Ala Asp Asp Phe Lys
 1               5                  10                  15

Gly
```

```
<210> SEQ ID NO 265
<211> LENGTH: 10
<212> TYPE: PRT
<213> ORGANISM: Homo sapiens

<400> SEQUENCE: 265

Asp Thr Ala Met Asp Tyr Ala Met Ala Tyr
1               5                   10

<210> SEQ ID NO 266
<211> LENGTH: 13
<212> TYPE: PRT
<213> ORGANISM: Homo sapiens

<400> SEQUENCE: 266

Asp Tyr Gly Lys Tyr Gly Asp Tyr Tyr Ala Met Asp Tyr
1               5                   10

<210> SEQ ID NO 267
<211> LENGTH: 16
<212> TYPE: PRT
<213> ORGANISM: Homo sapiens

<400> SEQUENCE: 267

Lys Ser Ser Gln Asn Ile Val His Ser Asp Gly Asn Thr Tyr Leu Glu
1               5                   10                  15

<210> SEQ ID NO 268
<211> LENGTH: 16
<212> TYPE: PRT
<213> ORGANISM: Homo sapiens

<400> SEQUENCE: 268

Arg Ser Ser Gln Ser Ile Val His Ser Asn Gly Asn Thr Tyr Leu Asp
1               5                   10                  15

<210> SEQ ID NO 269
<211> LENGTH: 7
<212> TYPE: PRT
<213> ORGANISM: Homo sapiens

<400> SEQUENCE: 269

Lys Val Ser Asn Arg Phe Ser
1               5

<210> SEQ ID NO 270
<211> LENGTH: 9
<212> TYPE: PRT
<213> ORGANISM: Homo sapiens

<400> SEQUENCE: 270

Phe Gln Gly Ser His Val Pro Leu Thr
1               5

<210> SEQ ID NO 271
<211> LENGTH: 119
<212> TYPE: PRT
<213> ORGANISM: Homo sapiens

<400> SEQUENCE: 271

Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Leu Tyr
            20                  25                  30
```

Gly Met Asn Trp Val Arg Gln Ala Pro Gly Gln Gly Leu Glu Trp Met
         35                  40                  45

Gly Trp Ile Asn Thr Tyr Thr Gly Glu Pro Thr Tyr Ala Asp Asp Phe
 50                  55                  60

Lys Gly Arg Phe Val Phe Ser Leu Asp Thr Ser Val Ser Thr Ala Tyr
 65                  70                  75                  80

Leu Gln Ile Ser Ser Leu Lys Ala Glu Asp Thr Ala Val Tyr Tyr Cys
                 85                  90                  95

Ala Arg Asp Thr Ala Met Asp Tyr Ala Met Ala Tyr Trp Gly Gln Gly
             100                 105                 110

Thr Leu Val Thr Val Ser Ser
         115

<210> SEQ ID NO 272
<211> LENGTH: 119
<212> TYPE: PRT
<213> ORGANISM: Homo sapiens

<400> SEQUENCE: 272

Gln Val Gln Leu Val Gln Ser Gly Ser Glu Leu Lys Lys Pro Gly Ala
 1               5                  10                  15

Ser Val Lys Val Ser Cys Lys Ala Ser Gly Tyr Thr Phe Thr Leu Tyr
                 20                  25                  30

Gly Met Asn Trp Val Lys Gln Ala Pro Gly Lys Gly Leu Lys Trp Met
         35                  40                  45

Gly Trp Ile Asn Thr Tyr Thr Gly Glu Pro Thr Tyr Ala Asp Asp Phe
 50                  55                  60

Lys Gly Arg Phe Val Phe Ser Leu Asp Thr Ser Val Ser Thr Ala Tyr
 65                  70                  75                  80

Leu Gln Ile Ser Ser Leu Lys Ala Glu Asp Thr Ala Val Tyr Phe Cys
                 85                  90                  95

Ala Arg Asp Thr Ala Met Asp Tyr Ala Met Ala Tyr Trp Gly Gln Gly
             100                 105                 110

Thr Leu Val Thr Val Ser Ser
         115

<210> SEQ ID NO 273
<211> LENGTH: 122
<212> TYPE: PRT
<213> ORGANISM: Homo sapiens

<400> SEQUENCE: 273

Gln Val Gln Leu Val Gln Ser Gly Ser Glu Leu Lys Lys Pro Gly Ala
 1               5                  10                  15

Ser Val Lys Val Ser Cys Lys Ala Ser Gly Tyr Thr Phe Thr Asn Tyr
                 20                  25                  30

Gly Met Asn Trp Val Arg Gln Ala Pro Gly Gln Gly Leu Glu Trp Met
         35                  40                  45

Gly Trp Ile Asn Thr Tyr Thr Gly Glu Pro Thr Tyr Ala Asp Asp Phe
 50                  55                  60

Lys Gly Arg Phe Val Phe Ser Leu Asp Thr Ser Val Ser Thr Ala Tyr
 65                  70                  75                  80

Leu Gln Ile Ser Ser Leu Lys Ala Glu Asp Thr Ala Val Tyr Tyr Cys
                 85                  90                  95

Ala Arg Asp Tyr Gly Lys Tyr Gly Asp Tyr Tyr Ala Met Asp Tyr Trp
             100                 105                 110

Gly Gln Gly Thr Leu Val Thr Val Ser Ser
            115                 120

<210> SEQ ID NO 274
<211> LENGTH: 122
<212> TYPE: PRT
<213> ORGANISM: Homo sapiens

<400> SEQUENCE: 274

Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Asn Tyr
            20                  25                  30

Gly Met Asn Trp Val Arg Gln Ala Pro Gly Lys Gly Leu Lys Trp Met
        35                  40                  45

Gly Trp Ile Asn Thr Tyr Thr Gly Glu Pro Thr Tyr Ala Asp Asp Phe
    50                  55                  60

Lys Gly Arg Phe Val Phe Ser Leu Asp Thr Ser Val Ser Thr Ala Tyr
65                  70                  75                  80

Leu Gln Ile Ser Ser Leu Lys Ala Glu Asp Thr Ala Val Tyr Phe Cys
                85                  90                  95

Ala Arg Asp Tyr Gly Lys Tyr Gly Asp Tyr Tyr Ala Met Asp Tyr Trp
            100                 105                 110

Gly Gln Gly Thr Leu Val Thr Val Ser Ser
            115                 120

<210> SEQ ID NO 275
<211> LENGTH: 113
<212> TYPE: PRT
<213> ORGANISM: Homo sapiens

<400> SEQUENCE: 275

Asp Val Val Met Thr Gln Ser Pro Leu Ser Leu Pro Val Thr Leu Gly
1               5                   10                  15

Gln Pro Ala Ser Ile Ser Cys Lys Ser Ser Gln Asn Ile Val His Ser
            20                  25                  30

Asp Gly Asn Thr Tyr Leu Glu Trp Phe Gln Gln Arg Pro Gly Gln Ser
        35                  40                  45

Pro Arg Arg Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Phe Gln Gly
                85                  90                  95

Ser His Val Pro Leu Thr Phe Gly Gly Gly Thr Lys Val Glu Ile Lys
            100                 105                 110

Arg

<210> SEQ ID NO 276
<211> LENGTH: 113
<212> TYPE: PRT
<213> ORGANISM: Homo sapiens

<400> SEQUENCE: 276

Asp Val Val Met Thr Gln Ser Pro Leu Ser Leu Pro Val Thr Leu Gly
1               5                   10                  15

Gln Pro Ala Ser Ile Ser Cys Lys Ser Ser Gln Asn Ile Val His Ser
            20                  25                  30

```
Asp Gly Asn Thr Tyr Leu Glu Trp Phe Gln Gln Arg Pro Gly Gln Ser
        35                  40                  45

Pro Arg Arg Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Val Gly Val Tyr Tyr Cys Phe Gln Gly
                 85                  90                  95

Ser His Val Pro Leu Thr Phe Gly Gln Gly Thr Lys Val Glu Ile Lys
                100                 105                 110

Arg

<210> SEQ ID NO 277
<211> LENGTH: 113
<212> TYPE: PRT
<213> ORGANISM: Homo sapiens

<400> SEQUENCE: 277

Asp Val Val Met Thr Gln Thr Pro Leu Ser Leu Pro Val Thr Pro Gly
1                5                  10                  15

Glu Pro Ala Ser Ile Ser Cys Lys Ser Ser Gln Asn Ile Val His Ser
                 20                  25                  30

Asp Gly Asn Thr Tyr Leu Glu Trp Tyr Leu Gln Lys Pro Gly Gln Ser
        35                  40                  45

Pro Gln Leu Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Phe Gln Gly
                 85                  90                  95

Ser His Val Pro Leu Thr Phe Gly Gly Gly Thr Lys Val Glu Ile Lys
                100                 105                 110

Arg

<210> SEQ ID NO 278
<211> LENGTH: 113
<212> TYPE: PRT
<213> ORGANISM: Homo sapiens

<400> SEQUENCE: 278

Asp Val Val Met Thr Gln Thr Pro Leu Ser Leu Pro Val Ser Leu Gly
1                5                  10                  15

Asp Gln Ala Ser Ile Ser Cys Lys Ser Ser Gln Asn Ile Val His Ser
                 20                  25                  30

Asp Gly Asn Thr Tyr Leu Glu Trp Tyr Leu Gln Lys Pro Gly Gln Ser
        35                  40                  45

Pro Lys Val Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Phe Gln Gly
                 85                  90                  95

Ser His Val Pro Leu Thr Phe Gly Gly Gly Thr Lys Val Glu Ile Lys
                100                 105                 110

Arg
```

<210> SEQ ID NO 279
<211> LENGTH: 113
<212> TYPE: PRT
<213> ORGANISM: Homo sapiens

<400> SEQUENCE: 279

```
Asp Val Val Met Thr Gln Ser Pro Leu Ser Leu Pro Val Thr Leu Gly
1               5                   10                  15

Gln Pro Ala Ser Ile Ser Cys Arg Ser Ser Gln Ser Ile Val His Ser
            20                  25                  30

Asn Gly Asn Thr Tyr Leu Asp Trp Phe Gln Gln Arg Pro Gly Gln Ser
        35                  40                  45

Pro Arg Arg Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Phe Gln Gly
                85                  90                  95

Ser His Val Pro Leu Thr Phe Gly Gly Gly Thr Lys Val Glu Ile Lys
            100                 105                 110

Arg
```

<210> SEQ ID NO 280
<211> LENGTH: 113
<212> TYPE: PRT
<213> ORGANISM: Homo sapiens

<400> SEQUENCE: 280

```
Asp Val Val Met Thr Gln Ser Pro Leu Ser Leu Pro Val Thr Leu Gly
1               5                   10                  15

Gln Pro Ala Ser Ile Ser Cys Arg Ser Ser Gln Ser Ile Val His Ser
            20                  25                  30

Asn Gly Asn Thr Tyr Leu Asp Trp Phe Gln Gln Arg Pro Gly Gln Ser
        35                  40                  45

Pro Arg Arg Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Phe Gln Gly
                85                  90                  95

Ser His Val Pro Leu Thr Phe Gly Gln Gly Thr Lys Val Glu Ile Lys
            100                 105                 110

Arg
```

<210> SEQ ID NO 281
<211> LENGTH: 113
<212> TYPE: PRT
<213> ORGANISM: Homo sapiens

<400> SEQUENCE: 281

```
Asp Val Val Met Thr Gln Thr Pro Leu Ser Leu Pro Val Thr Pro Gly
1               5                   10                  15

Glu Pro Ala Ser Ile Ser Cys Arg Ser Ser Gln Ser Ile Val His Ser
            20                  25                  30

Asn Gly Asn Thr Tyr Leu Asp Trp Tyr Leu Gln Lys Pro Gly Gln Ser
        35                  40                  45
```

```
Pro Gln Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser His Val Pro Leu Thr Phe Gly Gly Gly Thr Lys Val Glu Ile Lys
                100                 105                 110

Arg

<210> SEQ ID NO 282
<211> LENGTH: 113
<212> TYPE: PRT
<213> ORGANISM: Homo sapiens

<400> SEQUENCE: 282

Asp Val Val Met Thr Gln Thr Pro Leu Ser Leu Pro Val Ser Leu Gly
1               5                   10                  15

Asp Gln Ala Ser Ile Ser Cys Arg Ser Ser Gln Ser Ile Val His Ser
                20                  25                  30

Asn Gly Asn Thr Tyr Leu Asp Trp Tyr Leu Gln Lys Pro Gly Gln Ser
            35                  40                  45

Pro Lys Val Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Asn Arg Val Glu Ala Glu Asp Leu Gly Val Tyr Phe Cys Phe Gln Gly
                85                  90                  95

Ser His Val Pro Leu Thr Phe Gly Gly Gly Thr Lys Leu Glu Ile Lys
                100                 105                 110

Arg

<210> SEQ ID NO 283
<211> LENGTH: 10
<212> TYPE: PRT
<213> ORGANISM: Homo sapiens

<400> SEQUENCE: 283

Gly Tyr Thr Phe Thr Ser Ser Trp Met His
1               5                   10

<210> SEQ ID NO 284
<211> LENGTH: 8
<212> TYPE: PRT
<213> ORGANISM: Homo sapiens

<400> SEQUENCE: 284

Ile His Pro Asn Ser Gly Gly Thr
1               5

<210> SEQ ID NO 285
<211> LENGTH: 14
<212> TYPE: PRT
<213> ORGANISM: Homo sapiens

<400> SEQUENCE: 285

Ala Arg Gly Asp Tyr Tyr Gly Tyr Val Ser Trp Phe Ala Tyr
1               5                   10
```

```
<210> SEQ ID NO 286
<211> LENGTH: 6
<212> TYPE: PRT
<213> ORGANISM: Homo sapiens

<400> SEQUENCE: 286

Gln Asn Ile Asn Val Leu
1               5

<210> SEQ ID NO 287
<211> LENGTH: 3
<212> TYPE: PRT
<213> ORGANISM: Homo sapiens

<400> SEQUENCE: 287

Lys Ala Ser
1

<210> SEQ ID NO 288
<211> LENGTH: 9
<212> TYPE: PRT
<213> ORGANISM: Homo sapiens

<400> SEQUENCE: 288

Gln Gln Gly Gln Ser Tyr Pro Tyr Thr
1               5

<210> SEQ ID NO 289
<211> LENGTH: 119
<212> TYPE: PRT
<213> ORGANISM: Homo sapiens

<400> SEQUENCE: 289

Gln Val Gln Leu Gln Gln Pro Gly Ser Val Leu Val Arg Pro Gly Ala
1               5                   10                  15

Ser Val Lys Val Ser Cys Lys Ala Ser Gly Tyr Thr Phe Thr Ser Ser
            20                  25                  30

Trp Met His Trp Ala Lys Gln Arg Pro Gly Gln Gly Leu Glu Trp Ile
        35                  40                  45

Gly Glu Ile His Pro Asn Ser Gly Gly Thr Asn Tyr Asn Glu Lys Phe
    50                  55                  60

Lys Gly Lys Ala Thr Val Asp Thr Ser Ser Ser Thr Ala Tyr Val Asp
65                  70                  75                  80

Leu Ser Ser Leu Thr Ser Glu Asp Ser Ala Val Tyr Tyr Cys Ala Arg
                85                  90                  95

Gly Asp Tyr Tyr Gly Tyr Val Ser Trp Phe Ala Tyr Trp Gly Gln Gly
            100                 105                 110

Thr Leu Val Thr Val Ser Ser
        115

<210> SEQ ID NO 290
<211> LENGTH: 121
<212> TYPE: PRT
<213> ORGANISM: Homo sapiens

<400> SEQUENCE: 290

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Ser
            20                  25                  30
```

Trp Met His Trp Ala Arg Gln Ala Pro Gly Gln Gly Leu Glu Trp Ile
            35                  40                  45

Gly Glu Ile His Pro Asn Ser Gly Gly Thr Asn Tyr Ala Gln Lys Phe
 50                  55                  60

Gln Gly Arg Ala Thr Leu Thr Val Asp Thr Ser Ser Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Asp Tyr Tyr Gly Tyr Val Ser Trp Phe Ala Tyr Trp Gly
                100                 105                 110

Gln Gly Thr Leu Val Thr Val Ser Ser
            115                 120

<210> SEQ ID NO 291
<211> LENGTH: 121
<212> TYPE: PRT
<213> ORGANISM: Homo sapiens

<400> SEQUENCE: 291

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Ser
                20                  25                  30

Trp Met His Trp Ala Arg Gln Ala Pro Gly Gln Gly Leu Glu Trp Ile
            35                  40                  45

Gly Glu Ile His Pro Asn Ser Gly Gly Thr Asn Tyr Ala Gln Lys Phe
 50                  55                  60

Gln Gly Arg Ala Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Asp Tyr Tyr Gly Tyr Val Ser Trp Phe Ala Tyr Trp Gly
                100                 105                 110

Gln Gly Thr Leu Val Thr Val Ser Ser
            115                 120

<210> SEQ ID NO 292
<211> LENGTH: 121
<212> TYPE: PRT
<213> ORGANISM: Homo sapiens

<400> SEQUENCE: 292

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Ser
                20                  25                  30

Trp Met His Trp Ala Arg Gln Ala Pro Gly Gln Gly Leu Glu Trp Ile
            35                  40                  45

Gly Glu Ile His Pro Asn Ser Gly Gly Thr Asn Tyr Ala Gln Lys Phe
 50                  55                  60

Gln Gly Arg Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Asp Tyr Tyr Gly Tyr Val Ser Trp Phe Ala Tyr Trp Gly
                100                 105                 110

```
Gln Gly Thr Leu Val Thr Val Ser Ser
        115                 120
```

<210> SEQ ID NO 293
<211> LENGTH: 121
<212> TYPE: PRT
<213> ORGANISM: Homo sapiens

<400> SEQUENCE: 293

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Ser
            20                  25                  30

Trp Met His Trp Ala Arg Gln Ala Pro Gly Gln Gly Leu Glu Trp Met
        35                  40                  45

Gly Glu Ile His Pro Asn Ser Gly Gly Thr Asn Tyr Ala Gln Lys Phe
    50                  55                  60

Gln Gly Arg Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Asp Tyr Tyr Gly Tyr Val Ser Trp Phe Ala Tyr Trp Gly
            100                 105                 110

Gln Gly Thr Leu Val Thr Val Ser Ser
        115                 120
```

<210> SEQ ID NO 294
<211> LENGTH: 107
<212> TYPE: PRT
<213> ORGANISM: Homo sapiens

<400> SEQUENCE: 294

```
Asp Ile Gln Met Asn Gln Ser Pro Ser Ser Leu Ser Ala Ser Leu Gly
1               5                   10                  15

Asp Thr Ile Thr Ile Thr Cys His Ala Ser Gln Asn Ile Asn Val Leu
            20                  25                  30

Leu Ser Trp Tyr Gln Gln Lys Pro Gly Asn Ile Pro Lys Leu Leu Ile
        35                  40                  45

Tyr Lys Ala Ser Asn Leu His Thr Gly Val Pro Ser Arg Phe Ser Gly
    50                  55                  60

Ser Gly Ser Gly Thr Gly Phe Thr Phe Thr Ile Ser Ser Leu Gln Pro
65                  70                  75                  80

Glu Asp Ile Ala Thr Tyr Tyr Cys Gln Gln Gly Gln Ser Tyr Pro Tyr
                85                  90                  95

Thr Phe Gly Gly Gly Thr Lys Leu Glu Ile Lys
            100                 105
```

<210> SEQ ID NO 295
<211> LENGTH: 107
<212> TYPE: PRT
<213> ORGANISM: Homo sapiens

<400> SEQUENCE: 295

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
            20                  25                  30

Leu Asn Trp Tyr Gln Gln Lys Pro Gly Lys Ala Pro Lys Leu Leu Ile
```

```
                35                  40                  45
Tyr Asp Ala Ser Asn Leu Glu Thr Gly Val Pro Ser Arg Phe Ser Gly
 50                  55                  60

Ser Gly Ser Gly Thr Asp Phe Thr Phe Thr Ile Ser Ser Leu Gln Pro
 65                  70                  75                  80

Glu Asp Ile Ala Thr Tyr Tyr Cys Gln Gln Tyr Asp Asn Leu Pro Tyr
                 85                  90                  95

Thr Phe Gly Gln Gly Thr Lys Leu Glu Ile Lys
                100                 105
```

<210> SEQ ID NO 296
<211> LENGTH: 107
<212> TYPE: PRT
<213> ORGANISM: Homo sapiens

<400> SEQUENCE: 296

```
Asp Ile Gln Met Thr Gln Ser Pro Ser Ser Leu Ser Ala Ser Val Gly
 1               5                  10                  15

Asp Arg Val Thr Ile Thr Cys Gln Ala Ser Gln Asn Ile Asn Val Leu
                20                  25                  30

Leu Asn Trp Tyr Gln Gln Lys Pro Gly Lys Ala Pro Lys Leu Leu Ile
                35                  40                  45

Tyr Lys Ala Ser Asn Leu His Thr Gly Val Pro Ser Arg Phe Ser Gly
 50                  55                  60

Ser Gly Ser Gly Thr Asp Phe Thr Phe Thr Ile Ser Ser Leu Gln Pro
 65                  70                  75                  80

Glu Asp Ile Ala Thr Tyr Tyr Cys Gln Gln Gly Gln Ser Tyr Pro Tyr
                 85                  90                  95

Thr Phe Gly Gln Gly Thr Lys Leu Glu Ile Lys
                100                 105
```

<210> SEQ ID NO 297
<211> LENGTH: 107
<212> TYPE: PRT
<213> ORGANISM: Homo sapiens

<400> SEQUENCE: 297

```
Asp Ile Gln Met Asn Gln Ser Pro Ser Ser Leu Ser Ala Ser Val Gly
 1               5                  10                  15

Asp Arg Val Thr Ile Thr Cys Gln Ala Ser Gln Asn Ile Asn Val Leu
                20                  25                  30

Leu Ser Trp Tyr Gln Gln Lys Pro Gly Lys Ala Pro Lys Leu Leu Ile
                35                  40                  45

Tyr Lys Ala Ser Asn Leu His Thr Gly Val Pro Ser Arg Phe Ser Gly
 50                  55                  60

Ser Gly Ser Gly Thr Asp Phe Thr Phe Thr Ile Ser Ser Leu Gln Pro
 65                  70                  75                  80

Glu Asp Ile Ala Thr Tyr Tyr Cys Gln Gln Gly Gln Ser Tyr Pro Tyr
                 85                  90                  95

Thr Phe Gly Gln Gly Thr Lys Leu Glu Ile Lys
                100                 105
```

<210> SEQ ID NO 298
<211> LENGTH: 10
<212> TYPE: PRT
<213> ORGANISM: Homo sapiens

<400> SEQUENCE: 298

Gly Tyr Thr Phe Thr Ser Tyr Asp Ile Asn
1               5                   10

<210> SEQ ID NO 299
<211> LENGTH: 10
<212> TYPE: PRT
<213> ORGANISM: Homo sapiens
<220> FEATURE:
<221> NAME/KEY: MOD_RES
<222> LOCATION: (8)..(8)
<223> OTHER INFORMATION: Asn or Tyr

<400> SEQUENCE: 299

Trp Leu Asn Pro Asn Ser Gly Xaa Thr Gly
1               5                   10

<210> SEQ ID NO 300
<211> LENGTH: 10
<212> TYPE: PRT
<213> ORGANISM: Homo sapiens

<400> SEQUENCE: 300

Glu Val Pro Glu Thr Ala Ala Phe Glu Tyr
1               5                   10

<210> SEQ ID NO 301
<211> LENGTH: 14
<212> TYPE: PRT
<213> ORGANISM: Homo sapiens
<220> FEATURE:
<221> NAME/KEY: MOD_RES
<222> LOCATION: (10)..(10)
<223> OTHER INFORMATION: Gly or Ala
<220> FEATURE:
<221> NAME/KEY: MOD_RES
<222> LOCATION: (11)..(11)
<223> OTHER INFORMATION: Leu, Ser or Gln
<220> FEATURE:
<221> NAME/KEY: MOD_RES
<222> LOCATION: (14)..(14)
<223> OTHER INFORMATION: His or Leu

<400> SEQUENCE: 301

Thr Ser Ser Ser Ser Asp Ile Gly Ala Xaa Xaa Gly Val Xaa
1               5                   10

<210> SEQ ID NO 302
<211> LENGTH: 7
<212> TYPE: PRT
<213> ORGANISM: Homo sapiens

<400> SEQUENCE: 302

Gly Tyr Tyr Asn Arg Pro Ser
1               5

<210> SEQ ID NO 303
<211> LENGTH: 10
<212> TYPE: PRT
<213> ORGANISM: Homo sapiens
<220> FEATURE:
<221> NAME/KEY: MOD_RES
<222> LOCATION: (3)..(3)
<223> OTHER INFORMATION: Tyr, Trp or Phe

<400> SEQUENCE: 303

Gln Ser Xaa Asp Gly Thr Leu Ser Ala Leu
1               5                   10

<210> SEQ ID NO 304
<211> LENGTH: 119
<212> TYPE: PRT
<213> ORGANISM: Homo sapiens

<400> SEQUENCE: 304

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Asp Ile Asn Trp Val Arg Gln Ala Pro Gly Gln Gly Leu Glu Trp Met
        35                  40                  45

Gly Trp Leu Asn Pro Asn Ser Gly Asn Thr Gly Tyr Ala Gln Lys Phe
    50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu Val Pro Glu Thr Ala Ala Phe Glu Tyr Trp Gly Gln Gly
            100                 105                 110

Thr Leu Val Thr Val Ser Ser
        115

<210> SEQ ID NO 305
<211> LENGTH: 111
<212> TYPE: PRT
<213> ORGANISM: Homo sapiens
<220> FEATURE:
<221> NAME/KEY: MOD_RES
<222> LOCATION: (32)..(32)
<223> OTHER INFORMATION: Any amino acid
<220> FEATURE:
<221> NAME/KEY: MOD_RES
<222> LOCATION: (33)..(33)
<223> OTHER INFORMATION: Any amino acid
<220> FEATURE:
<221> NAME/KEY: MOD_RES
<222> LOCATION: (36)..(36)
<223> OTHER INFORMATION: Any amino acid
<220> FEATURE:
<221> NAME/KEY: MOD_RES
<222> LOCATION: (93)..(93)
<223> OTHER INFORMATION: Any amino acid

<400> SEQUENCE: 305

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Xaa
            20                  25                  30

Xaa Gly Val Xaa Trp Tyr Gln Gln Leu Pro Gly Thr Ala Pro Lys Leu
        35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Xaa Asp Gly Thr
                85                  90                  95

Leu Ser Ala Leu Phe Gly Gly Gly Thr Lys Leu Thr Val Leu Gly
            100                 105                 110

<210> SEQ ID NO 306

```
<211> LENGTH: 119
<212> TYPE: PRT
<213> ORGANISM: Homo sapiens

<400> SEQUENCE: 306

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                20                  25                  30

Asp Ile Asn Trp Val Arg Gln Ala Pro Gly Gln Gly Leu Glu Trp Met
            35                  40                  45

Gly Trp Leu Asn Pro Asn Ser Gly Asn Thr Gly Tyr Ala Gln Lys Phe
    50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu Val Pro Glu Thr Ala Ala Phe Glu Tyr Trp Gly Gln Gly
            100                 105                 110

Thr Leu Val Thr Val Ser Ser
        115

<210> SEQ ID NO 307
<211> LENGTH: 111
<212> TYPE: PRT
<213> ORGANISM: Homo sapiens

<400> SEQUENCE: 307

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Gly Gly
                20                  25                  30

Leu Gly Val His Trp Tyr Gln Gln Leu Pro Gly Thr Ala Pro Lys Leu
            35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Trp Asp Gly Thr
                85                  90                  95

Leu Ser Ala Leu Phe Gly Gly Gly Thr Lys Leu Thr Val Leu Gly
            100                 105                 110

<210> SEQ ID NO 308
<211> LENGTH: 119
<212> TYPE: PRT
<213> ORGANISM: Homo sapiens

<400> SEQUENCE: 308

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                20                  25                  30

Asp Ile Asn Trp Val Arg Gln Ala Pro Gly Gln Gly Leu Glu Trp Met
            35                  40                  45

Gly Trp Leu Asn Pro Asn Ser Gly Tyr Thr Gly Tyr Ala Gln Lys Phe
    50                  55                  60
```

-continued

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
            85                  90                  95

Ala Arg Glu Val Pro Glu Thr Ala Ala Phe Glu Tyr Trp Gly Gln Gly
        100                 105                 110

Thr Leu Val Thr Val Ser Ser
        115

<210> SEQ ID NO 309
<211> LENGTH: 111
<212> TYPE: PRT
<213> ORGANISM: Homo sapiens

<400> SEQUENCE: 309

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Gly
            20                  25                  30

Leu Gly Val His Trp Tyr Gln Gln Leu Pro Gly Thr Ala Pro Lys Leu
        35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Tyr Asp Gly Thr
            85                  90                  95

Leu Ser Ala Leu Phe Gly Gly Gly Thr Lys Leu Thr Val Leu Gly
        100                 105                 110

<210> SEQ ID NO 310
<211> LENGTH: 119
<212> TYPE: PRT
<213> ORGANISM: Homo sapiens

<400> SEQUENCE: 310

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Asp Ile Asn Trp Val Arg Gln Ala Pro Gly Gln Gly Leu Glu Trp Met
        35                  40                  45

Gly Trp Leu Asn Pro Asn Ser Gly Asn Thr Gly Tyr Ala Gln Lys Phe
    50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
            85                  90                  95

Ala Arg Glu Val Pro Glu Thr Ala Ala Phe Glu Tyr Trp Gly Gln Gly
        100                 105                 110

Thr Leu Val Thr Val Ser Ser
        115

<210> SEQ ID NO 311
<211> LENGTH: 111
<212> TYPE: PRT
<213> ORGANISM: Homo sapiens -continued

<400> SEQUENCE: 311

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Ala
            20                  25                  30

Leu Gly Val His Trp Tyr Gln Gln Leu Pro Gly Thr Ala Pro Lys Leu
        35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Trp Asp Gly Thr
                85                  90                  95

Leu Ser Ala Leu Phe Gly Gly Gly Thr Lys Leu Thr Val Leu Gly
            100                 105                 110

<210> SEQ ID NO 312
<211> LENGTH: 119
<212> TYPE: PRT
<213> ORGANISM: Homo sapiens

<400> SEQUENCE: 312

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Asp Ile Asn Trp Val Arg Gln Ala Pro Gly Gln Gly Leu Glu Trp Met
        35                  40                  45

Gly Trp Leu Asn Pro Asn Ser Gly Asn Thr Gly Tyr Ala Gln Lys Phe
    50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu Val Pro Glu Thr Ala Ala Phe Glu Tyr Trp Gly Gln Gly
            100                 105                 110

Thr Leu Val Thr Val Ser Ser
        115

<210> SEQ ID NO 313
<211> LENGTH: 111
<212> TYPE: PRT
<213> ORGANISM: Homo sapiens

<400> SEQUENCE: 313

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Gly
            20                  25                  30

Ser Gly Val His Trp Tyr Gln Gln Leu Pro Gly Thr Ala Pro Lys Leu
        35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Trp Asp Gly Thr

```
                    85                  90                  95

Leu Ser Ala Leu Phe Gly Gly Gly Thr Lys Leu Thr Val Leu Gly
            100                 105                 110

<210> SEQ ID NO 314
<211> LENGTH: 119
<212> TYPE: PRT
<213> ORGANISM: Homo sapiens

<400> SEQUENCE: 314

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                20                  25                  30

Asp Ile Asn Trp Val Arg Gln Ala Pro Gly Gln Gly Leu Glu Trp Met
            35                  40                  45

Gly Trp Leu Asn Pro Asn Ser Gly Asn Thr Gly Tyr Ala Gln Lys Phe
    50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu Val Pro Glu Thr Ala Ala Phe Glu Tyr Trp Gly Gln Gly
            100                 105                 110

Thr Leu Val Thr Val Ser Ser
        115

<210> SEQ ID NO 315
<211> LENGTH: 111
<212> TYPE: PRT
<213> ORGANISM: Homo sapiens

<400> SEQUENCE: 315

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Gly
                20                  25                  30

Gln Gly Val His Trp Tyr Gln Gln Leu Pro Gly Thr Ala Pro Lys Leu
            35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Trp Asp Gly Thr
                85                  90                  95

Leu Ser Ala Leu Phe Gly Gly Gly Thr Lys Leu Thr Val Leu Gly
            100                 105                 110

<210> SEQ ID NO 316
<211> LENGTH: 119
<212> TYPE: PRT
<213> ORGANISM: Homo sapiens

<400> SEQUENCE: 316

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                20                  25                  30
```

Asp Ile Asn Trp Val Arg Gln Ala Pro Gly Gln Gly Leu Glu Trp Met
            35                  40                  45

Gly Trp Leu Asn Pro Asn Ser Gly Asn Thr Gly Tyr Ala Gln Lys Phe
    50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu Val Pro Glu Thr Ala Ala Phe Glu Tyr Trp Gly Gln Gly
            100                 105                 110

Thr Leu Val Thr Val Ser Ser
            115

<210> SEQ ID NO 317
<211> LENGTH: 111
<212> TYPE: PRT
<213> ORGANISM: Homo sapiens

<400> SEQUENCE: 317

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Gly Gly
            20                  25                  30

Leu Gly Val Leu Trp Tyr Gln Gln Leu Pro Gly Thr Ala Pro Lys Leu
            35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Trp Asp Gly Thr
                85                  90                  95

Leu Ser Ala Leu Phe Gly Gly Gly Thr Lys Leu Thr Val Leu Gly
            100                 105                 110

<210> SEQ ID NO 318
<211> LENGTH: 119
<212> TYPE: PRT
<213> ORGANISM: Homo sapiens

<400> SEQUENCE: 318

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Asp Ile Asn Trp Val Arg Gln Ala Pro Gly Gln Gly Leu Glu Trp Met
            35                  40                  45

Gly Trp Leu Asn Pro Asn Ser Gly Tyr Thr Gly Tyr Ala Gln Lys Phe
    50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu Val Pro Glu Thr Ala Ala Phe Glu Tyr Trp Gly Gln Gly
            100                 105                 110

Thr Leu Val Thr Val Ser Ser
            115

<210> SEQ ID NO 319
<211> LENGTH: 111
<212> TYPE: PRT
<213> ORGANISM: Homo sapiens

<400> SEQUENCE: 319

Gln Ser Val Leu Thr Gln Pro Pro Ser Val Ser Gly Ala Pro Gly Gln
1               5                   10                  15
Arg Val Thr Ile Ser Cys Thr Ser Ser Ser Asp Ile Gly Ala Gly
            20                  25                  30
Leu Gly Val His Trp Tyr Gln Gln Leu Pro Gly Thr Ala Pro Lys Leu
        35                  40                  45
Leu Ile Glu Gly Tyr Tyr Asn Arg Pro Ser Gly Val Pro Asp Arg Phe
    50                  55                  60
Ser Gly Ser Lys Ser Gly Thr Ser Ala Ser Leu Thr Ile Thr Gly Leu
65                  70                  75                  80
Leu Pro Glu Asp Glu Gly Asp Tyr Tyr Cys Gln Ser Trp Asp Gly Thr
                85                  90                  95
Leu Ser Ala Leu Phe Gly Gly Gly Thr Lys Leu Thr Val Leu Gly
            100                 105                 110

<210> SEQ ID NO 320
<211> LENGTH: 119
<212> TYPE: PRT
<213> ORGANISM: Homo sapiens

<400> SEQUENCE: 320

Gln Val Gln Leu Val Gln Ser Gly Ala Glu Val Lys Lys Pro Gly Ala
1               5                   10                  15
Ser Val Lys Val Ser Cys Lys Ala Ser Gly Tyr Thr Phe Thr Ser Tyr
            20                  25                  30
Asp Ile Asn Trp Val Arg Gln Ala Pro Gly Gln Gly Leu Glu Trp Met
        35                  40                  45
Gly Trp Leu Asn Pro Asn Ser Gly Tyr Thr Gly Tyr Ala Gln Lys Phe
    50                  55                  60
Gln Gly Arg Val Thr Met Thr Ala Asp Arg Ser Thr Ser Thr Ala Tyr
65                  70                  75                  80
Met Glu Leu Ser Ser Leu Arg Ser Glu Asp Thr Ala Val Tyr Tyr Cys
                85                  90                  95
Ala Arg Glu Val Pro Glu Thr Ala Ala Phe Glu Tyr Trp Gly Gln Gly
            100                 105                 110
Thr Leu Val Thr Val Ser Ser
        115

<210> SEQ ID NO 321
<211> LENGTH: 111
<212> TYPE: PRT
<213> ORGANISM: Homo sapiens

<400> SEQUENCE: 321

Gln Ser Val Leu Thr Gln Pro Pro Ser Val Ser Gly Ala Pro Gly Gln
1               5                   10                  15
Arg Val Thr Ile Ser Cys Thr Ser Ser Ser Asp Ile Gly Ala Gly
            20                  25                  30
Ser Gly Val His Trp Tyr Gln Gln Leu Pro Gly Thr Ala Pro Lys Leu
        35                  40                  45

```
Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Trp Asp Gly Thr
                85                  90                  95

Leu Ser Ala Leu Phe Gly Gly Gly Thr Lys Leu Thr Val Leu Gly
            100                 105                 110

<210> SEQ ID NO 322
<211> LENGTH: 119
<212> TYPE: PRT
<213> ORGANISM: Homo sapiens

<400> SEQUENCE: 322

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
                20                  25                  30

Asp Ile Asn Trp Val Arg Gln Ala Pro Gly Gln Gly Leu Glu Trp Met
            35                  40                  45

Gly Trp Leu Asn Pro Asn Ser Gly Tyr Thr Gly Tyr Ala Gln Lys Phe
50                  55                  60

Gln Gly Arg Val Thr Met Thr Ala Asp Arg Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu Val Pro Glu Thr Ala Ala Phe Glu Tyr Trp Gly Gln Gly
                100                 105                 110

Thr Leu Val Thr Val Ser Ser
            115

<210> SEQ ID NO 323
<211> LENGTH: 111
<212> TYPE: PRT
<213> ORGANISM: Homo sapiens

<400> SEQUENCE: 323

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Gly
                20                  25                  30

Gln Gly Val His Trp Tyr Gln Gln Leu Pro Gly Thr Ala Pro Lys Leu
            35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Trp Asp Gly Thr
                85                  90                  95

Leu Ser Ala Leu Phe Gly Gly Gly Thr Lys Leu Thr Val Leu Gly
            100                 105                 110

<210> SEQ ID NO 324
<211> LENGTH: 119
<212> TYPE: PRT
<213> ORGANISM: Homo sapiens
```

<400> SEQUENCE: 324

Gln Val Gln Leu Val Gln Ser Gly Ala Glu Val Lys Lys Pro Gly Ala
1               5                   10                  15
Ser Val Lys Val Ser Cys Lys Ala Ser Gly Tyr Thr Phe Thr Ser Tyr
            20                  25                  30
Asp Ile Asn Trp Val Arg Gln Ala Pro Gly Gln Gly Leu Glu Trp Met
        35                  40                  45
Gly Trp Leu Asn Pro Asn Ser Gly Tyr Thr Gly Tyr Ala Gln Lys Phe
50                  55                  60
Gln Gly Arg Val Thr Met Thr Ala Asp Arg Ser Thr Ser Thr Ala Tyr
65                  70                  75                  80
Met Glu Leu Ser Ser Leu Arg Ser Glu Asp Thr Ala Val Tyr Tyr Cys
                85                  90                  95
Ala Arg Glu Val Pro Glu Thr Ala Ala Phe Glu Tyr Trp Gly Gln Gly
            100                 105                 110
Thr Leu Val Thr Val Ser Ser
        115

<210> SEQ ID NO 325
<211> LENGTH: 111
<212> TYPE: PRT
<213> ORGANISM: Homo sapiens

<400> SEQUENCE: 325

Gln Ser Val Leu Thr Gln Pro Pro Ser Val Ser Gly Ala Pro Gly Gln
1               5                   10                  15
Arg Val Thr Ile Ser Cys Thr Ser Ser Ser Asp Ile Gly Ala Gly Tyr
            20                  25                  30
Leu Gly Val Leu Trp Tyr Gln Gln Leu Pro Gly Thr Ala Pro Lys Leu
        35                  40                  45
Leu Ile Glu Gly Tyr Tyr Asn Arg Pro Ser Gly Val Pro Asp Arg Phe
50                  55                  60
Ser Gly Ser Lys Ser Gly Thr Ser Ala Ser Leu Thr Ile Thr Gly Leu
65                  70                  75                  80
Leu Pro Glu Asp Glu Gly Asp Tyr Tyr Cys Gln Ser Trp Asp Gly Thr
                85                  90                  95
Leu Ser Ala Leu Phe Gly Gly Gly Thr Lys Leu Thr Val Leu Gly
            100                 105                 110

<210> SEQ ID NO 326
<211> LENGTH: 119
<212> TYPE: PRT
<213> ORGANISM: Homo sapiens

<400> SEQUENCE: 326

Gln Val Gln Leu Val Gln Ser Gly Ala Glu Val Lys Lys Pro Gly Ala
1               5                   10                  15
Ser Val Lys Val Ser Cys Lys Ala Ser Gly Tyr Thr Phe Thr Ser Tyr
            20                  25                  30
Asp Ile Asn Trp Val Arg Gln Ala Pro Gly Gln Gly Leu Glu Trp Met
        35                  40                  45
Gly Trp Leu Asn Pro Asn Ser Gly Tyr Thr Gly Tyr Ala Gln Lys Phe
50                  55                  60
Gln Gly Arg Val Thr Met Thr Ala Asp Arg Ser Thr Ser Thr Ala Tyr
65                  70                  75                  80
Met Glu Leu Ser Ser Leu Arg Ser Glu Asp Thr Ala Val Tyr Tyr Cys 85                  90                  95

Ala Arg Glu Val Pro Glu Thr Ala Ala Phe Glu Tyr Trp Gly Gln Gly
            100                 105                 110

Thr Leu Val Thr Val Ser Ser
        115

<210> SEQ ID NO 327
<211> LENGTH: 111
<212> TYPE: PRT
<213> ORGANISM: Homo sapiens

<400> SEQUENCE: 327

Gln Ser Val Leu Thr Gln Pro Pro Ser Val Ser Gly Ala Pro Gly Gln
1               5                   10                  15

Arg Val Thr Ile Ser Cys Thr Ser Ser Ser Asp Ile Gly Ala Gly
            20                  25                  30

Leu Gly Val His Trp Tyr Gln Gln Leu Pro Gly Thr Ala Pro Lys Leu
        35                  40                  45

Leu Ile Glu Gly Tyr Tyr Asn Arg Pro Ser Gly Val Pro Asp Arg Phe
    50                  55                  60

Ser Gly Ser Lys Ser Gly Thr Ser Ala Ser Leu Thr Ile Thr Gly Leu
65                  70                  75                  80

Leu Pro Glu Asp Glu Gly Asp Tyr Tyr Cys Gln Ser Phe Asp Gly Thr
                85                  90                  95

Leu Ser Ala Leu Phe Gly Gly Gly Thr Lys Leu Thr Val Leu Gly
            100                 105                 110

<210> SEQ ID NO 328
<211> LENGTH: 5
<212> TYPE: PRT
<213> ORGANISM: Homo sapiens

<400> SEQUENCE: 328

Ser Tyr Phe Trp Ser
1               5

<210> SEQ ID NO 329
<211> LENGTH: 16
<212> TYPE: PRT
<213> ORGANISM: Homo sapiens

<400> SEQUENCE: 329

Tyr Ile Tyr Tyr Ser Gly Asn Thr Lys Tyr Asn Pro Ser Leu Lys Ser
1               5                   10                  15

<210> SEQ ID NO 330
<211> LENGTH: 10
<212> TYPE: PRT
<213> ORGANISM: Homo sapiens

<400> SEQUENCE: 330

Glu Thr Gly Ser Tyr Tyr Gly Phe Asp Tyr
1               5                   10

<210> SEQ ID NO 331
<211> LENGTH: 11
<212> TYPE: PRT
<213> ORGANISM: Homo sapiens

<400> SEQUENCE: 331

Arg Ala Ser Gln Ser Ile Asn Asn Tyr Leu Asn

```
                1               5                         10

<210> SEQ ID NO 332
<211> LENGTH: 7
<212> TYPE: PRT
<213> ORGANISM: Homo sapiens

<400> SEQUENCE: 332

Ala Ala Ser Ser Leu Gln Ser
1               5

<210> SEQ ID NO 333
<211> LENGTH: 9
<212> TYPE: PRT
<213> ORGANISM: Homo sapiens

<400> SEQUENCE: 333

Gln Gln Ser Tyr Ser Thr Pro Arg Thr
1               5

<210> SEQ ID NO 334
<211> LENGTH: 118
<212> TYPE: PRT
<213> ORGANISM: Homo sapiens

<400> SEQUENCE: 334

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Ser Ser Tyr
            20                  25                  30

Phe Trp Ser Trp Ile Arg Gln Pro Pro Gly Lys Gly Leu Glu Trp Ile
        35                  40                  45

Gly Tyr Ile Tyr Tyr Ser Gly Asn Thr Lys Tyr Asn Pro Ser Leu Lys
    50                  55                  60

Ser Arg Val Thr Ile Ser Ile Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Glu Thr Gly Ser Tyr Tyr Gly Phe Asp Tyr Trp Gly Gln Gly Thr
            100                 105                 110

Leu Val Thr Val Ser Ser
        115

<210> SEQ ID NO 335
<211> LENGTH: 107
<212> TYPE: PRT
<213> ORGANISM: Homo sapiens

<400> SEQUENCE: 335

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Asn Asn Tyr
            20                  25                  30

Leu Asn Trp Tyr Gln Gln Arg Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80
```

Gly Asp Phe Ala Thr Tyr Tyr Cys Gln Gln Ser Tyr Ser Thr Pro Arg
            85                  90                  95

Thr Phe Gly Gln Gly Thr Lys Leu Glu Ile Lys
            100                 105

<210> SEQ ID NO 336
<211> LENGTH: 5
<212> TYPE: PRT
<213> ORGANISM: Homo sapiens

<400> SEQUENCE: 336

Gly Tyr Tyr Trp Asn
1               5

<210> SEQ ID NO 337
<211> LENGTH: 16
<212> TYPE: PRT
<213> ORGANISM: Homo sapiens

<400> SEQUENCE: 337

Glu Ile Asn His Ala Gly Asn Thr Asn Tyr Asn Pro Ser Leu Lys Ser
1               5                   10                  15

<210> SEQ ID NO 338
<211> LENGTH: 12
<212> TYPE: PRT
<213> ORGANISM: Homo sapiens

<400> SEQUENCE: 338

Gly Tyr Cys Arg Ser Thr Thr Cys Tyr Phe Asp Tyr
1               5                   10

<210> SEQ ID NO 339
<211> LENGTH: 12
<212> TYPE: PRT
<213> ORGANISM: Homo sapiens

<400> SEQUENCE: 339

Arg Ala Ser Gln Ser Val Arg Ser Ser Tyr Leu Ala
1               5                   10

<210> SEQ ID NO 340
<211> LENGTH: 7
<212> TYPE: PRT
<213> ORGANISM: Homo sapiens

<400> SEQUENCE: 340

Gly Ala Ser Ser Arg Ala Thr
1               5

<210> SEQ ID NO 341
<211> LENGTH: 8
<212> TYPE: PRT
<213> ORGANISM: Homo sapiens

<400> SEQUENCE: 341

Gln Gln Tyr Gly Ser Ser Pro Thr
1               5

<210> SEQ ID NO 342
<211> LENGTH: 120
<212> TYPE: PRT
<213> ORGANISM: Homo sapiens

<400> SEQUENCE: 342

Gln Val Gln Leu Gln Gln Trp Gly Ala Gly Leu Leu Lys Pro Ser Glu
1               5                   10                  15

Thr Leu Ser Leu Thr Cys Ala Val His Gly Gly Ser Phe Ser Gly Tyr
            20                  25                  30

Tyr Trp Asn Trp Ile Arg Gln Pro Pro Gly Lys Gly Leu Glu Trp Ile
        35                  40                  45

Gly Glu Ile Asn His Ala Gly Asn Thr Asn Tyr Asn Pro Ser Leu Lys
50                  55                  60

Ser Arg Val Thr Ile Ser Leu Asp Thr Ser Lys Asn Gln Phe Ser Leu
65                  70                  75                  80

Thr Leu Thr Ser Val Thr Ala Ala Asp Thr Ala Val Tyr Tyr Cys Ala
            85                  90                  95

Arg Gly Tyr Cys Arg Ser Thr Thr Cys Tyr Phe Asp Tyr Trp Gly Gln
            100                 105                 110

Gly Thr Leu Val Thr Val Ser Ser
            115                 120

<210> SEQ ID NO 343
<211> LENGTH: 107
<212> TYPE: PRT
<213> ORGANISM: Homo sapiens

<400> SEQUENCE: 343

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Arg Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
            85                  90                  95

Thr Phe Gly Gln Gly Thr Arg Leu Glu Ile Lys
            100                 105

<210> SEQ ID NO 344
<211> LENGTH: 116
<212> TYPE: PRT
<213> ORGANISM: Homo sapiens

<400> SEQUENCE: 344

Glu Val Gln Leu Gln Gln Ser Gly Ala Glu Leu Val Lys Pro Gly Ala
1               5                   10                  15

Ser Val Lys Leu Ser Cys Thr Ala Ser Gly Phe Asp Ile Gln Asp Thr
            20                  25                  30

Tyr Met His Trp Val Lys Gln Arg Pro Glu Gln Gly Leu Glu Trp Ile
        35                  40                  45

Gly Arg Ile Asp Pro Ala Ser Gly His Thr Lys Tyr Asp Pro Lys Phe
50                  55                  60

Gln Val Lys Ala Thr Ile Thr Thr Asp Thr Ser Ser Asn Thr Ala Tyr
65                  70                  75                  80

Leu Gln Leu Ser Ser Leu Thr Ser Glu Asp Thr Ala Val Tyr Tyr Cys
            85                  90                  95

Ser Arg Ser Gly Gly Leu Pro Asp Val Trp Gly Ala Gly Thr Thr Val
            100                 105                 110

Thr Val Ser Ser
        115

<210> SEQ ID NO 345
<211> LENGTH: 106
<212> TYPE: PRT
<213> ORGANISM: Homo sapiens

<400> SEQUENCE: 345

Gln Ile Val Leu Ser Gln Ser Pro Ala Ile Leu Ser Ala Ser Pro Gly
1               5                   10                  15

Glu Lys Val Thr Met Thr Cys Arg Ala Ser Ser Ser Val Ser Tyr Met
            20                  25                  30

Tyr Trp Tyr Gln Gln Lys Pro Gly Ser Ser Pro Lys Pro Trp Ile Tyr
        35                  40                  45

Ala Thr Ser Asn Leu Ala Ser Gly Val Pro Asp Arg Phe Ser Gly Ser
    50                  55                  60

Gly Ser Gly Thr Ser Tyr Ser Leu Thr Ile Ser Arg Val Glu Ala Glu
65                  70                  75                  80

Asp Ala Ala Thr Tyr Tyr Cys Gln Gln Trp Ser Gly Asn Pro Arg Thr
                85                  90                  95

Phe Gly Gly Gly Thr Lys Leu Glu Ile Lys
            100                 105

<210> SEQ ID NO 346
<211> LENGTH: 10
<212> TYPE: PRT
<213> ORGANISM: Homo sapiens

<400> SEQUENCE: 346

Gly Phe Asp Ile Gln Asp Thr Tyr Met His
1               5                   10

<210> SEQ ID NO 347
<211> LENGTH: 17
<212> TYPE: PRT
<213> ORGANISM: Homo sapiens

<400> SEQUENCE: 347

Arg Ile Asp Pro Ala Ser Gly His Thr Lys Tyr Asp Pro Lys Phe Gln
1               5                   10                  15

Val

<210> SEQ ID NO 348
<211> LENGTH: 7
<212> TYPE: PRT
<213> ORGANISM: Homo sapiens

<400> SEQUENCE: 348

Ser Gly Gly Leu Pro Asp Val
1               5

<210> SEQ ID NO 349
<211> LENGTH: 10
<212> TYPE: PRT
<213> ORGANISM: Homo sapiens

<400> SEQUENCE: 349

-continued

Arg Ala Ser Ser Ser Val Ser Tyr Met Tyr
1               5                   10

<210> SEQ ID NO 350
<211> LENGTH: 7
<212> TYPE: PRT
<213> ORGANISM: Homo sapiens

<400> SEQUENCE: 350

Ala Thr Ser Asn Leu Ala Ser
1               5

<210> SEQ ID NO 351
<211> LENGTH: 9
<212> TYPE: PRT
<213> ORGANISM: Homo sapiens

<400> SEQUENCE: 351

Gln Gln Trp Ser Gly Asn Pro Arg Thr
1               5

<210> SEQ ID NO 352
<211> LENGTH: 116
<212> TYPE: PRT
<213> ORGANISM: Homo sapiens

<400> SEQUENCE: 352

Gln Val Gln Leu Val Gln Ser Gly Ala Glu Val Lys Lys Pro Gly Ala
1               5                   10                  15

Ser Val Lys Leu Ser Cys Lys Ala Ser Gly Phe Asp Ile Gln Asp Thr
            20                  25                  30

Tyr Met His Trp Val Arg Gln Ala Pro Gly Gln Gly Leu Glu Trp Met
        35                  40                  45

Gly Arg Ile Asp Pro Ala Ser Gly His Thr Lys Tyr Asp Pro Lys Phe
    50                  55                  60

Gln Val Arg Val Thr Met Thr Thr Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ser Arg Ser Gly Gly Leu Pro Asp Val Trp Gly Gln Gly Thr Thr Val
            100                 105                 110

Thr Val Ser Ser
        115

<210> SEQ ID NO 353
<211> LENGTH: 106
<212> TYPE: PRT
<213> ORGANISM: Homo sapiens

<400> SEQUENCE: 353

Glu Ile Val Leu Thr Gln Ser Pro Gly Thr Leu Ser Leu Ser Pro Gly
1               5                   10                  15

Glu Arg Val Thr Met Ser Cys Arg Ala Ser Ser Ser Val Ser Tyr Met
            20                  25                  30

Tyr Trp Tyr Gln Gln Lys Pro Gly Gln Ala Pro Arg Pro Trp Ile Tyr
        35                  40                  45

Ala Thr Ser Asn Leu Ala Ser Gly Val Pro Asp Arg Phe Ser Gly Ser
    50                  55                  60

Gly Ser Gly Thr Asp Tyr Thr Leu Thr Ile Ser Arg Leu Glu Pro Glu
65                  70                  75                  80

```
Asp Phe Ala Val Tyr Tyr Cys Gln Gln Trp Ser Gly Asn Pro Arg Thr
                85                  90                  95

Phe Gly Gly Gly Thr Lys Leu Glu Ile Lys
            100                 105
```

<210> SEQ ID NO 354
<211> LENGTH: 116
<212> TYPE: PRT
<213> ORGANISM: Homo sapiens

<400> SEQUENCE: 354

```
Gln Val Gln Leu Val Gln Ser Gly Ala Glu Val Lys Lys Pro Gly Ala
1               5                   10                  15

Ser Val Lys Leu Ser Cys Lys Ala Ser Gly Phe Asp Ile Gln Asp Thr
            20                  25                  30

Tyr Met His Trp Val Arg Gln Ala Pro Gly Gln Gly Leu Glu Trp Met
        35                  40                  45

Gly Arg Ile Asp Pro Ala Ser Gly His Thr Lys Tyr Asp Pro Lys Phe
    50                  55                  60

Gln Val Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ser Arg Ser Gly Gly Leu Pro Asp Val Trp Gly Gln Gly Thr Thr Val
            100                 105                 110

Thr Val Ser Ser
        115
```

<210> SEQ ID NO 355
<211> LENGTH: 106
<212> TYPE: PRT
<213> ORGANISM: Homo sapiens

<400> SEQUENCE: 355

```
Glu Ile Val Leu Thr Gln Ser Pro Gly Thr Leu Ser Leu Ser Pro Gly
1               5                   10                  15

Glu Arg Ala Thr Leu Ser Cys Arg Ala Ser Ser Ser Val Ser Tyr Met
            20                  25                  30

Tyr Trp Tyr Gln Gln Lys Pro Gly Gln Ala Pro Arg Leu Leu Ile Tyr
        35                  40                  45

Ala Thr Ser Asn Leu Ala Ser Gly Ile Pro Asp Arg Phe Ser Gly Ser
    50                  55                  60

Gly Ser Gly Thr Asp Phe Thr Leu Thr Ile Ser Arg Leu Glu Pro Glu
65                  70                  75                  80

Asp Phe Ala Val Tyr Tyr Cys Gln Gln Trp Ser Gly Asn Pro Arg Thr
                85                  90                  95

Phe Gly Gly Gly Thr Lys Leu Glu Ile Lys
            100                 105
```

<210> SEQ ID NO 356
<211> LENGTH: 116
<212> TYPE: PRT
<213> ORGANISM: Homo sapiens

<400> SEQUENCE: 356

```
Gln Val Gln Leu Val Gln Ser Gly Ala Glu Val Lys Lys Pro Gly Ala
1               5                   10                  15
```

Ser Val Lys Val Ser Cys Lys Ala Ser Gly Phe Asp Ile Gln Asp Thr
            20                  25                  30

Tyr Met His Trp Val Arg Gln Ala Pro Gly Gln Gly Leu Glu Trp Met
        35                  40                  45

Gly Arg Ile Asp Pro Ala Ser Gly His Thr Lys Tyr Asp Pro Lys Phe
    50                  55                  60

Gln Val Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Ser Gly Gly Leu Pro Asp Val Trp Gly Gln Gly Thr Thr Val
            100                 105                 110

Thr Val Ser Ser
        115

<210> SEQ ID NO 357
<211> LENGTH: 106
<212> TYPE: PRT
<213> ORGANISM: Homo sapiens

<400> SEQUENCE: 357

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Ser Ser Val Ser Tyr Met
            20                  25                  30

Tyr Trp Tyr Gln Gln Lys Pro Gly Gln Ala Pro Arg Leu Leu Ile Tyr
        35                  40                  45

Ala Thr Ser Asn Leu Ala Ser Gly Val Pro Asp Arg Phe Ser Gly Ser
    50                  55                  60

Gly Ser Gly Thr Asp Tyr Thr Leu Thr Ile Ser Arg Leu Glu Pro Glu
65                  70                  75                  80

Asp Phe Ala Val Tyr Tyr Cys Gln Gln Trp Ser Gly Asn Pro Arg Thr
                85                  90                  95

Phe Gly Gly Gly Thr Lys Leu Glu Ile Lys
            100                 105

<210> SEQ ID NO 358
<211> LENGTH: 121
<212> TYPE: PRT
<213> ORGANISM: Homo sapiens

<400> SEQUENCE: 358

Glu Val Met Leu Val Glu Ser Gly Gly Gly Leu Val Lys Pro Gly Gly
1               5                   10                  15

Ser Leu Lys Leu Ser Cys Ala Ala Ser Gly Phe Thr Phe Thr Asn Tyr
            20                  25                  30

Ala Met Ser Trp Val Arg Gln Thr Pro Glu Lys Arg Leu Glu Trp Val
        35                  40                  45

Ala Thr Ile Thr Ser Gly Gly Ser Tyr Ile Tyr Tyr Leu Asp Ser Val
    50                  55                  60

Lys Gly Arg Phe Thr Ile Ser Arg Asp Asn Ala Lys Ser Thr Leu Tyr
65                  70                  75                  80

Leu Gln Met Ser Ser Leu Arg Ser Glu Asp Thr Ala Ile Tyr Asn Cys
                85                  90                  95

Ala Arg Arg Lys Asp Gly Asn Tyr Tyr Ala Met Asp Tyr Trp Gly
            100                 105                 110

```
Gln Gly Thr Ser Val Thr Val Ser Ser
        115                 120
```

<210> SEQ ID NO 359
<211> LENGTH: 121
<212> TYPE: PRT
<213> ORGANISM: Homo sapiens

<400> SEQUENCE: 359

```
Glu Val Met Leu Val Glu Ser Gly Gly Gly Leu Val Lys Pro Gly Gly
1               5                   10                  15

Ser Leu Lys Leu Ser Cys Ala Ala Ser Gly Phe Thr Phe Thr Asn Tyr
            20                  25                  30

Ala Met Ser Trp Val Arg Gln Thr Pro Glu Lys Arg Leu Glu Trp Val
        35                  40                  45

Ala Thr Ile Thr Ser Gly Gly Ser Tyr Ile Tyr Tyr Leu Asp Ser Val
    50                  55                  60

Lys Gly Arg Phe Thr Ile Ser Arg Asp Asn Ala Lys Ser Thr Leu Tyr
65                  70                  75                  80

Leu Gln Met Ser Ser Leu Arg Ser Glu Asp Thr Ala Ile Tyr Tyr Cys
                85                  90                  95

Ala Arg Arg Lys Asp Gly Asn Tyr Tyr Tyr Ala Met Asp Tyr Trp Gly
            100                 105                 110

Gln Gly Thr Ser Val Thr Val Ser Ser
        115                 120
```

<210> SEQ ID NO 360
<211> LENGTH: 121
<212> TYPE: PRT
<213> ORGANISM: Homo sapiens

<400> SEQUENCE: 360

```
Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Thr Asn Tyr
            20                  25                  30

Ala Met Ser Trp Val Arg Gln Ala Pro Gly Gln Arg Leu Glu Trp Val
        35                  40                  45

Ser Thr Ile Thr Ser Gly Gly Ser Tyr Ile Tyr Tyr Leu Asp Ser Val
    50                  55                  60

Lys Gly Arg Phe Thr Ile Ser Arg Asp Asn Ala Lys Ser Thr Leu Tyr
65                  70                  75                  80

Leu Gln Met Asn Ser Leu Arg Ala Glu Asp Thr Ala Val Tyr Asn Cys
                85                  90                  95

Ala Arg Arg Lys Asp Gly Asn Tyr Tyr Tyr Ala Met Asp Tyr Trp Gly
            100                 105                 110

Gln Gly Thr Thr Val Thr Val Ser Ser
        115                 120
```

<210> SEQ ID NO 361
<211> LENGTH: 121
<212> TYPE: PRT
<213> ORGANISM: Homo sapiens

<400> SEQUENCE: 361

```
Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Thr Asn Tyr
```

```
            20                  25                  30
Ala Met Ser Trp Val Arg Gln Ala Pro Gly Gln Arg Leu Glu Trp Val
            35                  40                  45

Ser Thr Ile Thr Ser Gly Gly Ser Tyr Ile Tyr Tyr Leu Asp Ser Val
        50                  55                  60

Lys Gly Arg Phe Thr Ile Ser Arg Asp Asn Ala Lys Ser Thr Leu Tyr
65                  70                  75                  80

Leu Gln Met Asn Ser Leu Arg Ala Glu Asp Thr Ala Val Tyr Tyr Cys
                85                  90                  95

Ala Arg Arg Lys Asp Gly Asn Tyr Tyr Tyr Ala Met Asp Tyr Trp Gly
            100                 105                 110

Gln Gly Thr Thr Val Thr Val Ser Ser
            115                 120

<210> SEQ ID NO 362
<211> LENGTH: 121
<212> TYPE: PRT
<213> ORGANISM: Homo sapiens

<400> SEQUENCE: 362

Glu Val Gln Leu Leu Glu Ser Gly Gly Gly Leu Val Gln Pro Gly Arg
1               5                   10                  15

Ser Leu Arg Leu Ser Cys Ala Ala Ser Gly Phe Thr Phe Thr Asn Tyr
            20                  25                  30

Ala Met Ser Trp Val Arg Gln Ala Pro Gly Gln Arg Leu Glu Trp Leu
            35                  40                  45

Ala Thr Ile Thr Ser Gly Gly Ser Tyr Ile Tyr Tyr Leu Asp Ser Val
        50                  55                  60

Lys Gly Arg Phe Thr Ile Ser Arg Asp Asn Ser Lys Ser Thr Leu Tyr
65                  70                  75                  80

Leu Gln Met Gly Ser Leu Arg Ala Glu Asp Met Ala Val Tyr Asn Cys
                85                  90                  95

Ala Arg Arg Lys Asp Gly Asn Tyr Tyr Tyr Ala Met Asp Tyr Trp Gly
            100                 105                 110

Gln Gly Thr Thr Val Thr Val Ser Ser
            115                 120

<210> SEQ ID NO 363
<211> LENGTH: 121
<212> TYPE: PRT
<213> ORGANISM: Homo sapiens

<400> SEQUENCE: 363

Glu Val Gln Leu Leu Glu Ser Gly Gly Gly Leu Val Gln Pro Gly Arg
1               5                   10                  15

Ser Leu Arg Leu Ser Cys Ala Ala Ser Gly Phe Thr Phe Thr Asn Tyr
            20                  25                  30

Ala Met Ser Trp Val Arg Gln Ala Pro Gly Gln Arg Leu Glu Trp Leu
            35                  40                  45

Ala Thr Ile Thr Ser Gly Gly Ser Tyr Ile Tyr Tyr Leu Asp Ser Val
        50                  55                  60

Lys Gly Arg Phe Thr Ile Ser Arg Asp Asn Ser Lys Ser Thr Leu Tyr
65                  70                  75                  80

Leu Gln Met Gly Ser Leu Arg Ala Glu Asp Met Ala Val Tyr Tyr Cys
                85                  90                  95

Ala Arg Arg Lys Asp Gly Asn Tyr Tyr Tyr Ala Met Asp Tyr Trp Gly
```

```
                    100                 105                 110
Gln Gly Thr Thr Val Thr Val Ser Ser
            115                 120

<210> SEQ ID NO 364
<211> LENGTH: 121
<212> TYPE: PRT
<213> ORGANISM: Homo sapiens

<400> SEQUENCE: 364

Gln Val Gln Leu Val Glu Ser Gly Gly Gly Leu Ile Gln Pro Gly Gly
1               5                   10                  15

Ser Leu Arg Leu Ser Cys Ala Ala Ser Gly Phe Thr Phe Thr Asn Tyr
            20                  25                  30

Ala Met Ser Trp Val Arg Gln Ala Arg Gly Gln Arg Leu Glu Trp Val
        35                  40                  45

Ser Thr Ile Thr Ser Gly Gly Ser Tyr Ile Tyr Tyr Leu Asp Ser Val
    50                  55                  60

Lys Gly Arg Phe Thr Ile Ser Arg Asp Asn Ser Lys Ser Thr Leu Tyr
65                  70                  75                  80

Met Glu Leu Ser Ser Leu Arg Ser Glu Asp Thr Ala Val Tyr Asn Cys
                85                  90                  95

Ala Arg Arg Lys Asp Gly Asn Tyr Tyr Tyr Ala Met Asp Tyr Trp Gly
            100                 105                 110

Gln Gly Thr Thr Val Thr Val Ser Ser
            115                 120

<210> SEQ ID NO 365
<211> LENGTH: 121
<212> TYPE: PRT
<213> ORGANISM: Homo sapiens

<400> SEQUENCE: 365

Gln Val Gln Leu Val Glu Ser Gly Gly Gly Leu Ile Gln Pro Gly Gly
1               5                   10                  15

Ser Leu Arg Leu Ser Cys Ala Ala Ser Gly Phe Thr Phe Thr Asn Tyr
            20                  25                  30

Ala Met Ser Trp Val Arg Gln Ala Arg Gly Gln Arg Leu Glu Trp Val
        35                  40                  45

Ser Thr Ile Thr Ser Gly Gly Ser Tyr Ile Tyr Tyr Leu Asp Ser Val
    50                  55                  60

Lys Gly Arg Phe Thr Ile Ser Arg Asp Asn Ser Lys Ser Thr Leu Tyr
65                  70                  75                  80

Met Glu Leu Ser Ser Leu Arg Ser Glu Asp Thr Ala Val Tyr Tyr Cys
                85                  90                  95

Ala Arg Arg Lys Asp Gly Asn Tyr Tyr Tyr Ala Met Asp Tyr Trp Gly
            100                 105                 110

Gln Gly Thr Thr Val Thr Val Ser Ser
            115                 120

<210> SEQ ID NO 366
<211> LENGTH: 121
<212> TYPE: PRT
<213> ORGANISM: Homo sapiens

<400> SEQUENCE: 366

Gln Val Gln Leu Val Gln Ser Gly Ser Glu Leu Lys Lys Pro Gly Ala
1               5                   10                  15
```

Ser Val Lys Val Ser Cys Lys Ala Ser Gly Phe Thr Phe Thr Asn Tyr
            20                  25                  30

Ala Met Ser Trp Val Arg Gln Ala Pro Gly Lys Arg Leu Glu Trp Val
        35                  40                  45

Ser Thr Ile Thr Ser Gly Gly Ser Tyr Ile Tyr Tyr Leu Asp Ser Val
    50                  55                  60

Lys Gly Arg Phe Thr Ile Ser Arg Glu Asn Ala Lys Ser Thr Leu Tyr
65                  70                  75                  80

Leu Gln Met Asn Ser Leu Arg Thr Glu Asp Thr Ala Leu Tyr Asn Cys
                85                  90                  95

Ala Arg Arg Lys Asp Gly Asn Tyr Tyr Tyr Ala Met Asp Tyr Trp Gly
            100                 105                 110

Gln Gly Thr Thr Val Thr Val Ser Ser
            115                 120

<210> SEQ ID NO 367
<211> LENGTH: 121
<212> TYPE: PRT
<213> ORGANISM: Homo sapiens

<400> SEQUENCE: 367

Gln Val Gln Leu Val Gln Ser Gly Ser Glu Leu Lys Lys Pro Gly Ala
1               5                   10                  15

Ser Val Lys Val Ser Cys Lys Ala Ser Gly Phe Thr Phe Thr Asn Tyr
            20                  25                  30

Ala Met Ser Trp Val Arg Gln Ala Pro Gly Lys Arg Leu Glu Trp Val
        35                  40                  45

Ala Thr Ile Thr Ser Gly Gly Ser Tyr Ile Tyr Tyr Leu Asp Ser Val
    50                  55                  60

Lys Gly Arg Phe Thr Ile Ser Arg Glu Asn Ala Lys Ser Thr Leu Tyr
65                  70                  75                  80

Leu Gln Met Asn Ser Leu Arg Thr Glu Asp Thr Ala Leu Tyr Tyr Cys
                85                  90                  95

Ala Arg Arg Lys Asp Gly Asn Tyr Tyr Tyr Ala Met Asp Tyr Trp Gly
            100                 105                 110

Gln Gly Thr Thr Val Thr Val Ser Ser
            115                 120

<210> SEQ ID NO 368
<211> LENGTH: 121
<212> TYPE: PRT
<213> ORGANISM: Homo sapiens

<400> SEQUENCE: 368

Glu Val Gln Leu Leu Gln Ser Gly Ala Glu Val Lys Lys Pro Gly Ala
1               5                   10                  15

Ser Val Lys Val Ser Cys Lys Ala Ser Gly Phe Thr Phe Thr Asn Tyr
            20                  25                  30

Ala Met Ser Trp Val Arg Gln Ala Pro Gly Gln Arg Leu Glu Trp Val
        35                  40                  45

Ala Thr Ile Thr Ser Gly Gly Ser Tyr Ile Tyr Tyr Leu Asp Ser Val
    50                  55                  60

Lys Gly Arg Phe Thr Ile Ser Arg Asp Asn Ala Lys Ser Thr Leu His
65                  70                  75                  80

Leu Gln Met Asn Ser Leu Arg Ala Glu Asp Thr Ala Val Tyr Asn Cys
                85                  90                  95

Ala Arg Arg Lys Asp Gly Asn Tyr Tyr Tyr Ala Met Asp Tyr Trp Gly
                100                 105                 110

Gln Gly Thr Thr Val Thr Val Ser Ser
        115                 120

<210> SEQ ID NO 369
<211> LENGTH: 121
<212> TYPE: PRT
<213> ORGANISM: Homo sapiens

<400> SEQUENCE: 369

Glu Val Gln Leu Leu Gln Ser Gly Ala Glu Val Lys Lys Pro Gly Ala
1               5                   10                  15

Ser Val Lys Val Ser Cys Lys Ala Ser Gly Phe Thr Phe Thr Asn Tyr
            20                  25                  30

Ala Met Ser Trp Val Arg Gln Ala Pro Gly Gln Arg Leu Glu Trp Val
        35                  40                  45

Ala Thr Ile Thr Ser Gly Gly Ser Tyr Ile Tyr Tyr Leu Asp Ser Val
    50                  55                  60

Lys Gly Arg Phe Thr Ile Ser Arg Asp Asn Ala Lys Ser Thr Leu His
65                  70                  75                  80

Leu Gln Met Asn Ser Leu Arg Ala Glu Asp Thr Ala Ile Tyr Tyr Cys
                85                  90                  95

Ala Arg Arg Lys Asp Gly Asn Tyr Tyr Tyr Ala Met Asp Tyr Trp Gly
                100                 105                 110

Gln Gly Thr Thr Val Thr Val Ser Ser
        115                 120

<210> SEQ ID NO 370
<211> LENGTH: 121
<212> TYPE: PRT
<213> ORGANISM: Homo sapiens

<400> SEQUENCE: 370

Glu Val Met Leu Leu Gln Ser Gly Ala Glu Val Lys Lys Pro Gly Ala
1               5                   10                  15

Ser Val Lys Val Ser Cys Lys Ala Ser Gly Phe Thr Phe Thr Asn Tyr
            20                  25                  30

Ala Met Ser Trp Val Arg Gln Ala Pro Gly Gln Arg Leu Glu Trp Val
        35                  40                  45

Ala Thr Ile Thr Ser Gly Gly Ser Tyr Ile Tyr Tyr Leu Asp Ser Val
    50                  55                  60

Lys Gly Arg Phe Thr Ile Ser Arg Asp Asn Ala Lys Ser Thr Leu His
65                  70                  75                  80

Leu Gln Met Asn Ser Leu Arg Ala Glu Asp Thr Ala Val Tyr Tyr Cys
                85                  90                  95

Ala Arg Arg Lys Asp Gly Asn Tyr Tyr Tyr Ala Met Asp Tyr Trp Gly
                100                 105                 110

Gln Gly Thr Thr Val Thr Val Ser Ser
        115                 120

<210> SEQ ID NO 371
<211> LENGTH: 111
<212> TYPE: PRT
<213> ORGANISM: Homo sapiens

<400> SEQUENCE: 371

-continued

```
Asp Ile Val Leu Thr Gln Ser Pro Ala Ser Leu Ala Val Ser Leu Gly
1               5                   10                  15

Gln Arg Ala Thr Ile Ser Cys Arg Ala Ser Glu Ser Val Asp Ser Tyr
            20                  25                  30

Gly Asn Ser Phe Ile His Trp Tyr Gln Gln Lys Ala Gly Gln Pro Pro
        35                  40                  45

Lys Leu Leu Ile Tyr Arg Ala Ser Asn Leu Glu Ser Gly Ile Pro Ala
    50                  55                  60

Arg Phe Ser Gly Ser Gly Ser Arg Thr Asp Phe Thr Leu Thr Ile Asn
65                  70                  75                  80

Pro Val Glu Ala Asp Asp Val Ala Thr Tyr Tyr Cys Gln Gln Ser Tyr
                85                  90                  95

Glu Asp Pro Trp Thr Phe Gly Gly Gly Thr Lys Leu Glu Ile Lys
            100                 105                 110
```

<210> SEQ ID NO 372
<211> LENGTH: 111
<212> TYPE: PRT
<213> ORGANISM: Homo sapiens
<220> FEATURE:
<221> NAME/KEY: MOD_RES
<222> LOCATION: (108)..(108)
<223> OTHER INFORMATION: Any amino acid

<400> SEQUENCE: 372

```
Asp Ile Val Leu Thr Gln Ser Pro Ala Thr Leu Ser Leu Ser Pro Gly
1               5                   10                  15

Glu Arg Ala Thr Leu Ser Cys Arg Ala Ser Glu Ser Val Asp Ser Tyr
            20                  25                  30

Gly Asn Ser Phe Ile His Trp Tyr Gln Gln Lys Pro Gly Gln Pro Pro
        35                  40                  45

Lys Leu Leu Ile Tyr Arg Ala Ser Asn Leu Glu Ser Gly Ile Pro Ala
    50                  55                  60

Arg Phe Ser Gly Ser Gly Ser Arg Thr Asp Phe Thr Leu Thr Ile Ser
65                  70                  75                  80

Ser Leu Glu Pro Glu Asp Phe Ala Val Tyr Tyr Cys Gln Gln Ser Tyr
                85                  90                  95

Glu Asp Pro Trp Thr Phe Gly Gly Gly Thr Lys Xaa Glu Ile Lys
            100                 105                 110
```

<210> SEQ ID NO 373
<211> LENGTH: 111
<212> TYPE: PRT
<213> ORGANISM: Homo sapiens
<220> FEATURE:
<221> NAME/KEY: MOD_RES
<222> LOCATION: (108)..(108)
<223> OTHER INFORMATION: Any amino acid

<400> SEQUENCE: 373

```
Asp Ile Val Leu Thr Gln Ser Pro Ser Ser Leu Ser Ala Ser Val Gly
1               5                   10                  15

Asp Arg Val Thr Ile Thr Cys Arg Ala Ser Glu Ser Val Asp Ser Tyr
            20                  25                  30

Gly Asn Ser Phe Ile His Trp Tyr Gln Gln Lys Pro Gly Gln Pro Pro
        35                  40                  45

Lys Leu Leu Ile Tyr Arg Ala Ser Asn Leu Glu Ser Gly Ile Pro Ala
    50                  55                  60

Arg Phe Ser Gly Ser Gly Ser Arg Thr Asp Phe Thr Leu Thr Ile Ser
```

```
                65                  70                  75                  80
Ser Leu Gln Pro Glu Asp Phe Ala Thr Tyr Tyr Cys Gln Gln Ser Tyr
                    85                  90                  95
Glu Asp Pro Trp Thr Phe Gly Gly Gly Thr Lys Xaa Glu Ile Lys
                100                 105                 110

<210> SEQ ID NO 374
<211> LENGTH: 111
<212> TYPE: PRT
<213> ORGANISM: Homo sapiens
<220> FEATURE:
<221> NAME/KEY: MOD_RES
<222> LOCATION: (108)..(108)
<223> OTHER INFORMATION: Any amino acid

<400> SEQUENCE: 374

Asp Ile Val Leu Thr Gln Ser Pro Asp Phe Gln Ser Val Thr Pro Lys
1               5                   10                  15
Glu Lys Val Thr Ile Thr Cys Arg Ala Ser Glu Ser Val Asp Ser Tyr
                20                  25                  30
Gly Asn Ser Phe Ile His Trp Tyr Gln Gln Lys Pro Gly Gln Pro Pro
            35                  40                  45
Lys Leu Leu Ile Tyr Arg Ala Ser Asn Leu Glu Ser Gly Ile Pro Ala
        50                  55                  60
Arg Phe Ser Gly Ser Gly Ser Arg Thr Asp Phe Thr Leu Thr Ile Ser
65                  70                  75                  80
Ser Leu Glu Ala Glu Asp Ala Ala Thr Tyr Tyr Cys Gln Gln Ser Tyr
                    85                  90                  95
Glu Asp Pro Trp Thr Phe Gly Gly Gly Thr Lys Xaa Glu Ile Lys
                100                 105                 110

<210> SEQ ID NO 375
<211> LENGTH: 111
<212> TYPE: PRT
<213> ORGANISM: Homo sapiens
<220> FEATURE:
<221> NAME/KEY: MOD_RES
<222> LOCATION: (108)..(108)
<223> OTHER INFORMATION: Any amino acid

<400> SEQUENCE: 375

Asp Ile Val Leu Thr Gln Thr Pro Leu Ser Leu Ser Val Thr Pro Gly
1               5                   10                  15
Gln Pro Ala Ser Ile Ser Cys Arg Ala Ser Glu Ser Val Asp Ser Tyr
                20                  25                  30
Gly Asn Ser Phe Ile His Trp Tyr Gln Gln Lys Pro Gly Gln Pro Pro
            35                  40                  45
Lys Leu Leu Ile Tyr Arg Ala Ser Asn Leu Glu Ser Gly Ile Pro Ala
        50                  55                  60
Arg Phe Ser Gly Ser Gly Ser Arg Thr Asp Phe Thr Leu Lys Ile Ser
65                  70                  75                  80
Arg Val Glu Ala Glu Asp Val Gly Val Tyr Tyr Cys Gln Gln Ser Tyr
                    85                  90                  95
Glu Asp Pro Trp Thr Phe Gly Gly Gly Thr Lys Xaa Glu Ile Lys
                100                 105                 110

<210> SEQ ID NO 376
<211> LENGTH: 5
<212> TYPE: PRT
<213> ORGANISM: Homo sapiens
```

```
<400> SEQUENCE: 376

Thr Tyr Gly Met Ser
1               5

<210> SEQ ID NO 377
<211> LENGTH: 17
<212> TYPE: PRT
<213> ORGANISM: Homo sapiens

<400> SEQUENCE: 377

Trp Met Asn Thr Tyr Ser Gly Val Thr Thr Tyr Ala Asp Asp Phe Lys
1               5                   10                  15

Gly

<210> SEQ ID NO 378
<211> LENGTH: 13
<212> TYPE: PRT
<213> ORGANISM: Homo sapiens

<400> SEQUENCE: 378

Glu Gly Tyr Val Phe Asp Asp Tyr Tyr Ala Thr Asp Tyr
1               5                   10

<210> SEQ ID NO 379
<211> LENGTH: 16
<212> TYPE: PRT
<213> ORGANISM: Homo sapiens

<400> SEQUENCE: 379

Arg Ser Ser Gln Asn Ile Val His Ser Asp Gly Asn Thr Tyr Leu Glu
1               5                   10                  15

<210> SEQ ID NO 380
<211> LENGTH: 7
<212> TYPE: PRT
<213> ORGANISM: Homo sapiens

<400> SEQUENCE: 380

Lys Val Ser Asn Arg Phe Ser
1               5

<210> SEQ ID NO 381
<211> LENGTH: 9
<212> TYPE: PRT
<213> ORGANISM: Homo sapiens

<400> SEQUENCE: 381

Phe Gln Gly Ser His Val Pro Leu Thr
1               5

<210> SEQ ID NO 382
<211> LENGTH: 122
<212> TYPE: PRT
<213> ORGANISM: Homo sapiens

<400> SEQUENCE: 382

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Thr Tyr
                20                  25                  30

Gly Met Ser Trp Val Lys Gln Ala Pro Gly Lys Gly Leu Lys Trp Met
            35                  40                  45
```

```
Gly Trp Met Asn Thr Tyr Ser Gly Val Thr Thr Tyr Ala Asp Asp Phe
            50                  55                  60

Lys Gly Arg Phe Ala Phe Ser Leu Glu Thr Ser Ala Ser Thr Ala Tyr
 65                  70                  75                  80

Met Gln Ile Asp Asn Leu Lys Asn Glu Asp Thr Ala Thr Tyr Phe Cys
                 85                  90                  95

Ala Arg Glu Gly Tyr Val Phe Asp Asp Tyr Ala Thr Asp Tyr Trp
            100                 105                 110

Gly Gln Gly Thr Ser Val Thr Val Ser Ser
            115                 120
```

<210> SEQ ID NO 383
<211> LENGTH: 112
<212> TYPE: PRT
<213> ORGANISM: Homo sapiens

<400> SEQUENCE: 383

```
Asp Val Leu Met Thr Gln Thr Pro Leu Ser Leu Pro Val Ser Leu Gly
 1               5                  10                  15

Asp Gln Ala Ser Ile Ser Cys Arg Ser Ser Gln Asn Ile Val His Ser
             20                  25                  30

Asp Gly Asn Thr Tyr Leu Glu Trp Tyr Leu Gln Lys Pro Gly Gln Ser
         35                  40                  45

Pro Lys Leu Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Leu Gly Ile Tyr Tyr Cys Phe Gln Gly
                 85                  90                  95

Ser His Val Pro Leu Thr Phe Gly Ala Gly Thr Lys Leu Glu Leu Lys
            100                 105                 110
```

<210> SEQ ID NO 384
<211> LENGTH: 5
<212> TYPE: PRT
<213> ORGANISM: Homo sapiens

<400> SEQUENCE: 384

```
Lys Tyr Asp Ile Asn
 1               5
```

<210> SEQ ID NO 385
<211> LENGTH: 17
<212> TYPE: PRT
<213> ORGANISM: Homo sapiens

<400> SEQUENCE: 385

```
Trp Ile Phe Pro Gly Asp Gly Arg Thr Asp Tyr Asn Glu Lys Phe Lys
 1               5                  10                  15

Gly
```

<210> SEQ ID NO 386
<211> LENGTH: 7
<212> TYPE: PRT
<213> ORGANISM: Homo sapiens

<400> SEQUENCE: 386

```
Tyr Gly Pro Ala Met Asp Tyr
 1               5
```

```
<210> SEQ ID NO 387
<211> LENGTH: 16
<212> TYPE: PRT
<213> ORGANISM: Homo sapiens

<400> SEQUENCE: 387

Arg Ser Ser Gln Thr Ile Val His Ser Asn Gly Asp Thr Tyr Leu Asp
1               5                   10                  15

<210> SEQ ID NO 388
<211> LENGTH: 7
<212> TYPE: PRT
<213> ORGANISM: Homo sapiens

<400> SEQUENCE: 388

Lys Val Ser Asn Arg Phe Ser
1               5

<210> SEQ ID NO 389
<211> LENGTH: 9
<212> TYPE: PRT
<213> ORGANISM: Homo sapiens

<400> SEQUENCE: 389

Phe Gln Gly Ser His Val Pro Tyr Thr
1               5

<210> SEQ ID NO 390
<211> LENGTH: 135
<212> TYPE: PRT
<213> ORGANISM: Homo sapiens

<400> SEQUENCE: 390

Met Gly Trp Ser Trp Val Phe Leu Phe Leu Leu Ser Val Thr Ala Gly
1               5                   10                  15

Val His Ser Gln Val His Leu Gln Gln Ser Gly Pro Glu Leu Val Lys
            20                  25                  30

Pro Gly Ala Ser Val Lys Leu Ser Cys Lys Ala Ser Gly Tyr Thr Phe
        35                  40                  45

Thr Lys Tyr Asp Ile Asn Trp Val Arg Gln Arg Pro Glu Gln Gly Leu
    50                  55                  60

Glu Trp Ile Gly Trp Ile Phe Pro Gly Asp Gly Arg Thr Asp Tyr Asn
65                  70                  75                  80

Glu Lys Phe Lys Gly Lys Ala Thr Leu Thr Thr Asp Lys Ser Ser Ser
                85                  90                  95

Thr Ala Tyr Met Glu Val Ser Arg Leu Thr Ser Glu Asp Ser Ala Val
            100                 105                 110

Tyr Phe Cys Ala Arg Tyr Gly Pro Ala Met Asp Tyr Trp Gly Gln Gly
        115                 120                 125

Thr Ser Val Thr Val Ala Ser
    130                 135

<210> SEQ ID NO 391
<211> LENGTH: 131
<212> TYPE: PRT
<213> ORGANISM: Homo sapiens

<400> SEQUENCE: 391

Met Lys Leu Pro Val Arg Leu Leu Val Leu Met Phe Trp Ile Pro Ala
1               5                   10                  15
```

```
Ser Ser Ser Asp Val Leu Met Thr Gln Thr Pro Leu Ser Leu Pro Val
            20                  25                  30

Ser Leu Gly Asp Gln Ala Ser Ile Ser Cys Arg Ser Ser Gln Thr Ile
        35                  40                  45

Val His Ser Asn Gly Asp Thr Tyr Leu Asp Trp Phe Leu Gln Lys Pro
    50                  55                  60

Gly Gln Ser Pro Lys Leu Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Lys Ile Ser Arg Val Glu Ala Glu Asp Leu Gly Val Tyr Tyr Cys
                100                 105                 110

Phe Gln Gly Ser His Val Pro Tyr Thr Phe Gly Gly Gly Thr Lys Leu
            115                 120                 125

Glu Ile Lys
    130

<210> SEQ ID NO 392
<211> LENGTH: 21
<212> TYPE: DNA
<213> ORGANISM: Homo sapiens

<400> SEQUENCE: 392
ttgtcacttc ctcctgtact g                                       21

<210> SEQ ID NO 393
<211> LENGTH: 21
<212> TYPE: DNA
<213> ORGANISM: Homo sapiens

<400> SEQUENCE: 393
ttgtcacttc ttcctgtact g                                       21

<210> SEQ ID NO 394
<211> LENGTH: 20
<212> TYPE: DNA
<213> ORGANISM: Homo sapiens

<400> SEQUENCE: 394
gtgaggcccc ttctaggaat                                         20
```

RNASET2 COMPOSITIONS AND METHODS OF TREATMENT THEREWITH

CROSS-REFERENCE

This application is continuation of International Application No. PCT/US19/63429, filed Nov. 26, 2019, which claims the benefit of U.S. Provisional Application Ser. No. 62/772,988, filed Nov. 29, 2018, and U.S. Provisional Application No. 62/795,430, filed Jan. 22, 2019, each of which is hereby incorporated by reference herein in its entirety.

In compliance with 37 C.F.R. § 1.71(g)(1), disclosure is herein made that according to 35 U.S.C. 102(c) the claimed invention was made pursuant to a Joint Research Agreement that was in effect on or before the effective filing date of claimed invention, and as a result of activities undertaken within the scope of the Joint Research Agreement by or on behalf of Cedars-Sinai Medical Center and Prometheus Biosciences, Inc.

STATEMENT REGARDING FEDERALLY-SPONSORED RESEARCH OR DEVELOPMENT

This invention was made with government support under Grant Nos. DK043211, DK056328, DK046763, RR033176-01, and DK062413-18 awarded by National Institutes of Health. The government has certain rights in the invention.

SEQUENCE LISTING

This instant application incorporates by reference in its entirety the Computer Readable Form (CRF) of a Sequence Listing in ASCII text format submitted via Patent Center. The Sequence Listing text file submitted via Patent Center is entitled "14463-551-999_SUB_SL.txt," was created on Aug. 17, 2025, and is 132,593 bytes in size.

SUMMARY

Inflammatory bowel disease (IBD) is a chronic, relapsing inflammatory disorder of the gastrointestinal tract. IBD has two common forms, Crohn's disease (CD) and ulcerative colitis (UC). IBDs are clinically heterogeneous with profoundly complex genetics, suggesting the underlying biological pathways differ in subgroups of patients. Thus, the development of targeted therapeutics hinges on subgroup stratification and identification of predictive biomarkers that can be used to predict natural history and therapeutic response. The suboptimal drug development landscape over the two decades highlights the need for elucidation of the unique molecular mechanisms underlying phenotypic expression of disease in order to identify appropriate therapeutic targets for patient-specific drug development strategies. Ribonuclease T2 (RNASET2) is characterized as a secreted protein with ectopic expression linked to tumorigenesis and identified as a potential IBD risk gene.

Provided here, in some embodiments are genetic risk variants at the Ribonuclease T2 (RNASET2) gene or gene locus that are associated in CD patients with more complicated or resistant disease. RNASET2 is the only known human member of the Rh/T2/S family of ribonucleases and has been identified in genome wide association studies (GWAS) as a potential IBD risk gene. However, the functional role of RNASET2 in IBD pathogenesis remains unknown. Genetic variations in the tumor necrosis factor superfamily member 15 gene (TNFSF15, also called TL1A) have been associated with CD and TL1A is a mediator of mucosal inflammation. In IBD patients, elevated TL1A levels correlate with TNFSF15 genotype and disease severity. Patients with elevated expression of TL1A have an increased risk of developing stricturing disease behavior. Murine colitis models have demonstrated that TL1A blocking antibodies effectively attenuate inflammation and reverse fibrosis. The genetic association of TNFSF15 with disease and downstream functional outcomes justifies efforts to identify additional specific therapeutic targets in these pathways. TL1A potentiates marked enhancement of several pro-inflammatory cytokines including IFNγ In T cells, a functional and biological relationship between three IBD susceptibility genes, TNFSF15, RNASET2 and intracellular adhesion molecule (ICAM) have been shown, all of which are implicated in TL1A-mediated enhancement of IFNγ production. In addition, down-modulation of RNASET2 expression occurs following TL1A stimulation. RNASET2 disease risk variants are functionally associated with a decrease in its expression in peripheral and mucosal tissues and DNA hypermethylation in CD patients requiring surgical intervention for disease management. Furthermore, RNASET2 disease risk variants are associated in CD patients with a more complicated/resistant disease phenotype defined in part by therapeutic drug failure, increase in length of intestinal resection, a shorter time to reoperation and post-operative endoscopy with a high (>2) Rutgeerts score. RNASET2 disease risk variants are also associated with decreased expression in peripheral and mucosal tissues and DNA hypermethylation. Motif screening of RNASET2 disease risk variants and preliminary electrophoretic mobility shift assay (EMSA) and promoter-reporter analysis, identified potential regulatory single nucleotide polymorphism (SNP) 1 and Indel 1 as disrupting ETS-transcription factor (TF) binding sites within an enhancer region. Expression of RNASET2 correlates with that of multiple ETS-transcription factors. RNASET2 knockdown in T cells enhanced IFNγ secretion and accompanies an increase in ICAM1 expression and concomitant T cell aggregation while disruption of the lymphocyte function-associated antigen (LFA-1)-ICAM1 interaction, suppresses T cell aggregation and IFNγ, secretion. Conversely, preliminary data demonstrated both recombinant Rnaset2-FC and protein overexpression inhibited IFNγ secretion.

These findings establish a mechanistic relationship between decreased RNASET2 expression, enhanced ICAM1 expression and TNFSF15/TL1A mediated production of IFNγ, three genes which have been implicated by GWAS as potentially involved in IBD pathogenesis. Without being bound by any particular theory, these findings suggest that identifying the regulatory mechanisms and molecular components comprising TL1A-mediated down-regulation of RNASET2 expression, and the molecular events contributing to enhancement of pro-inflammatory cytokine expression/secretion related to decreased levels of RNASET2 and subsequent enhanced ICAM1 expression, will yield a more precisely defined molecular signature of a severe form of CD as well as potential targets, that may then be used alone or in combination to optimally mitigate severe disease development in a defined subset of patients with CD.

RNASET2 disease risk SNPs are also associated with decreased expression in T cells compared to monocytes or lymphoblastoid cell lines, reinforcing the significance of the findings disclosed herein. The findings disclosed herein altogether suggest that T cell mediated inflammation resulting in a decrease of RNASET2 expression underlie the complicated disease pathology triggered by TL1A and its downstream pathways.

Disclosed herein, in some embodiments, are therapeutic agents modulating RNASET2 activity or expression. Altered expression of RNASET2 is associated with cancers and autoimmune diseases, suggesting a role for RNASET2 in host immune responses, making it a promising target for the treatment of IBDs. In addition, RNASET2 is believed to contribute to cytoskeletal reorganization and caspase activation in response to oxidative stress.

Aspects disclosed herein provide methods of treating or preventing a disease or condition in a subject, the method comprising administering a therapeutic agent to the subject, provided a genotype comprising Indel 1 is detected in a sample obtained from the subject. In some embodiments, the genotype comprises an insertion at Indel 1. In some embodiments, the insertion comprises "CCAGGGCTGGGTGAGGG" (SEQ ID NO:14). In some embodiments, the genotype further comprises a "C" at SNP 1. In some embodiments, the genotype comprises an allele at SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof. In some embodiments, the allele is provided in Table 3. In some embodiments, the therapeutic agent is a modulator of Ribonuclease T2 (RNASET2) activity. In some embodiments, the agonist or partial agonist is effective to treat or prevent the disease or condition. In some embodiments, the disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is human.

Aspects disclosed herein provide methods of increasing or enhancing activity or expression of Ribonuclease T2 (RNASET2) in a subject, the method comprising administering a modulator of RNASET2 activity or expression to the subject, provided a genotype comprising Indel 1 is detected in a sample obtained from the subject. In some embodiments, the genotype comprises an insertion at Indel 1. In some embodiments, the insertion comprises "CCAGGGCTGGGTGAGGG" (SEQ ID NO:14). In some embodiments, the genotype further comprises a "C" allele at SNP 1. In some embodiments, the genotype comprises an allele at SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof. In some embodiments, the allele is provided in Table 3. In some embodiments, the modulator of RNASET2 activity or expression comprises an agonist or a partial agonist of RNASET2 comprising an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the modulator of RNASET2 is effective to increase expression or activity of RNASET2 in the subject. In some embodiments, the subject has a disease or condition comprising inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises a whole blood, plasma, serum, or biopsy tissue. In some embodiments, the subject is human.

Aspects disclosed herein provide methods of decreasing activity or expression of tumor necrosis factor-like protein 1 (TL1A) in a subject, the method comprising administering an inhibitor of TL1A activity or expression to the subject, provided a genotype comprising Indel 1 is detected in a sample obtained from the subject. In some embodiments, the genotype comprises an insertion at Indel 1. In some embodiments, the insertion comprises "CCAGGGCTGGGTGAGGG" (SEQ ID NO:14). In some embodiments, the genotype further comprises a "C" allele at SNP 1. In some embodiments, the genotype comprises an allele at SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof. In some embodiments, the allele is provided in Table 3. In some embodiments, the inhibitor of TL1A activity or expression comprises an antibody provided in Table 1. In some embodiments, the inhibitor of TL1A is effective to effective to decrease expression of TL1A in the subject. In some embodiments, the subject has a disease or condition comprising inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises a whole blood, plasma, serum, or biopsy tissue. In some embodiments, the subject is human.

Aspects disclosed herein provide methods of treating or preventing a disease or condition in a subject, the method comprising administering a modulator of Ribonuclease T2 (RNASET2) activity and/or expression and/or an inhibitor of TNF Superfamily Member 15 (TL1A) activity or expression to the subject, provided a genotype is detected in a sample obtained from the subject. In some embodiments, the genotype is detected with an assay comprising polymerase chain reaction (PCR), quantitative reverse-transcription PCR (qPCR), automated sequencing, genotype array, or a combination thereof. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNA- SET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IN Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene Ribonuclease T2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$, about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the genotype is associated with a risk that the subject has, or will develop, a subclinical phenotype of the disease or condition as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$, about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods of increasing or enhancing activity or expression of Ribonuclease T2 (RNASET2) in a subject, the method comprising administering a modulator of RNASET2 activity or expression and/or an inhibitor of TNF Superfamily Member 15 (TL1A) activity or expression to the subject, provided a genotype is detected in a sample obtained from the subject. In some embodiments, the genotype is detected with an assay comprising polymerase chain reaction (PCR), quantitative reverse-transcription PCR (qPCR), automated sequencing, genotype array, or a combination thereof. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IN Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14) In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene Ribonuclease T2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$, about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the genotype is associated with a risk that the subject has, or will develop, a subclinical phenotype of the disease or condition as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$ about $1.0\times10^{-30}$, about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods of treating or preventing a disease or condition in a subject, the method comprising: a) obtaining a sample from a subject; b) detecting a presence or an absence of a genotype in the sample obtained from the subject; and c) administering to the subject a modulator of Ribonuclease T2 (RNASET2) activity or expression and/or an inhibitor of TNF Superfamily Member 15 (TL1A) activity or expression, provided the presence of the genotype is detected in the sample obtained from the subject. In some embodiments, the genotype is detected with an assay comprising polymerase chain reaction (PCR), quantitative reverse-transcription PCR (qPCR), automated sequencing, genotype array, or a combination thereof. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14) In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene Ribonuclease T2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$, about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the genotype is associated with a risk that the subject has, or will develop, a subclinical phenotype of the disease or condition as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$, about $1.0\times10^{-40}$, about $1.0\times10^{-50}$, about $1.0\times10^{60}$, about $1.0\times10^{-70}$, about $1.0\times10^{-80}$, about $1.0\times10^{-90}$, or about $1.0\times10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods of increasing or enhancing activity or expression of Ribonuclease T2 (RNASET2) in a subject, the method comprising: a) obtaining a sample from a subject; b) detecting a presence or an absence of a genotype in the sample obtained from the subject; and c) administering to the subject a modulator of RNASET2 activity or expression and/or an inhibitor of TNF Superfamily Member 15 (TL1A) activity or expression, provided the presence of the genotype is detected in the sample obtained from the subject. In some embodiments, the genotype is detected with an assay comprising polymerase chain reaction (PCR), quantitative reverse-transcription PCR (qPCR), automated sequencing, genotype array, or a combination thereof. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene RibonucleaseT2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the genotype is associated with a risk that the subject has, or will develop, a subclinical phenotype of the disease or condition as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods of diagnosing a disease or condition in a subject, the method comprising: a) obtaining a sample from a subject; b) detecting a presence or an absence of a genotype in the sample obtained from the subject; and c) diagnosing the disease or condition in the subject, provided the presence of the genotype is detected in the sample obtained from the subject. In some embodiments, the genotype is detected with an assay comprising polymerase chain reaction (PCR), quantitative reverse-transcription PCR (qPCR), automated sequencing, genotype array, or a combination thereof. In some embodiments, the methods further comprise administering to the subject a modulator or RNASET2 activity or expression, and/or an inhibitor of TNF Superfamily Member 15 (TL1A) activity or expression. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IN Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene RibonucleaseT2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$, about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the genotype is associated with a risk that the subject has, or will develop, a subclinical phenotype of the disease or condition as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$, about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods of determining whether a subject is at risk for developing a disease or condition, in a subject, the method comprising: a) obtaining a sample from a subject; b) detecting a presence or an absence of a genotype in the sample obtained from the subject; and c) determining the subject is at risk for developing the disease or condition, provided the presence of the genotype is detected in the sample obtained from the subject. In some embodiments, the genotype is detected with an assay comprising polymerase chain reaction (PCR), quantitative reverse-transcription PCR (qPCR), automated sequencing, genotype array, or a combination thereof. In some embodiments, the methods further comprise administering to the subject a modulator or RNASET2 activity or expression, and/or an inhibitor of TNF Superfamily Member 15 (TL1A) activity or expression. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IN Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene RibonucleaseT2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0\times10^{-20}$, about $1.0\times10^{-30}$ about $1.0\times10^{-40}$, about $1.0\times10^{-50}$, about $1.0\times10^{-60}$, about $1.0\times10^{-70}$, about $1.0\times10^{-80}$, about $1.0\times10^{-90}$, or about $1.0\times10^{-100}$. In some embodiments, the genotype is associated with a risk that the subject has, or will develop, a subclinical phenotype of the disease or condition as determined by a P value of at most about $1.0\times10^{-6}$, about $1.0\times10^{-7}$, about $1.0\times10^{-8}$, about $1.0\times10^{-9}$, about $1.0\times10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods of determining whether a subject is suitable for treatment of a disease or condition with a modulator of Ribonuclease T2 (RNASET2) activity or expression and/or an inhibitor of TNF Superfamily Member 15 (TL1A) activity or expression, the method comprising: a) obtaining a sample from a subject; b) detecting a presence or an absence of a genotype in the sample obtained from the subject; and c) determining the subject is suitable for treatment of the disease or condition with a modulator of RNASET2 activity or expression and/or an inhibitor of TNF Superfamily Member 15 (TL1A) activity or expression, provided the presence of the genotype is detected in the sample obtained from the subject. In some embodiments, the genotype is detected with an assay comprising polymerase chain reaction (PCR), quantitative reverse-transcription PCR (qPCR), automated sequencing, genotype array, or a combination thereof. In some embodiments, the methods further comprise administering to the subject a modulator or RNASET2 activity or expression, and/or an inhibitor of TNF Superfamily Member 15 (TL1A) activity or expression. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene RibonucleaseT2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the genotype is associated with a risk that the subject has, or will develop, a subclinical phenotype of the disease or condition as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods for processing or analyzing a sample obtained from a subject, the method comprising: a) obtaining a sample from a subject; b) subjecting the sample to an assay by sequencing, genotype array, and/or nucleic acid amplification, to yield a data set comprising data corresponding to a presence or an absence of a genotype; c) in a programmed computer, inputting said data from (b) to a trained algorithm to determine whether the subject is at risk of developing, a disease or disorder, wherein the trained algorithm is trained with a plurality of training samples, and wherein said sample is independent of said plurality of training samples; and d) electronically outputting a report comprising the determination for the subject. In some embodiments, (c) comprises calculating a polygenic risk score (PRS), and the PRS comprises a normalized weighted sum of a number of risk alleles within the genotype present in the subject with weights proportional to a beta value of association between the genotype with the disease or condition. In some embodiments, the data set of (b) further comprises data corresponding to a presence or an absence of a surrogate genotype, provided an absence of a genotype is detected. In some embodiments, the surrogate genotype is in linkage disequilibrium with the absent genotype as determined by an $r^2$ value of at least about, 0.8, about 0.85, about 0.90, about 0.95, or about 1.0. In some embodiments, the report is configured to display the determination of the subject on a user interface of an electronic device. In some embodiments, the electronic device comprises a personal electronic device belonging to the subject. In some embodiments, the methods further comprise administering to the subject a modulator or RNASET2 activity or expression and/or an inhibitor of TNF Superfamily Member 15 (TL1A) activity or expression, provided the subject is determined to be at risk of having, or developing, the disease or condition. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene Ribonuclease T2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the genotype is associated with a risk that the subject has, or will develop, a subclinical phenotype of the disease or condition as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the genotype comprises at least about 1 single nucleotide polymorphism (SNP), about 2 SNPs, about 3 SNPs, about 4 SNPs, about 5 SNPs, about 6 SNPs, about 7 SNPs, about 8 SNPs, about 9 SNPs, about 10 SNPs, about 11 SNPs, or more. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods for processing or analyzing a sample obtained from a subject, the method comprising: a) obtaining a sample from a subject; b) subjecting the sample to an assay by sequencing, genotype array, and/or nucleic acid amplification, to yield a data set comprising data corresponding to a presence or an absence of a genotype; c) in a programmed computer, inputting said data from (b) to a trained algorithm to determine a likelihood that the subject is suitable for treatment of a disease or disorder with an agonist of RNASET2, wherein the trained algorithm is trained with a plurality of training samples, and wherein said sample is independent of said plurality of training samples; and d) electronically outputting a report comprising the determination for the subject. In some embodiments, (c) comprises calculating a polygenic risk score (PRS), and the PRS comprises a normalized weighted sum of a number of risk alleles within the genotype present in the subject with weights proportional to a beta value of association between the genotype with the disease or condition. In some embodiments, the data set of (b) further comprises data corresponding to a presence or an absence of a surrogate genotype, provided an absence of a genotype is detected. In some embodiments, the surrogate genotype is in linkage disequilibrium with the absent genotype as determined by an $r^2$ value of at least about, 0.8, about 0.85, about 0.90, about 0.95, or about 1.0. In some embodiments, the report is configured to display the determination of the subject on a user interface of an electronic device. In some embodiments, the electronic device comprises a personal electronic device belonging to the subject. In some embodiments, the methods further comprise administering to the subject a modulator or RNASET2 activity or expression and/or an inhibitor of TNF Superfamily Member 15 (TL1A) activity or expression, provided the subject is determined to be at risk of having, or developing, the disease or condition. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IN Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene Ribonuclease T2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$ about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the genotype is associated with a risk that the subject has, or will develop, a subclinical phenotype of the disease or condition as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the genotype comprises at least about 1 single nucleotide polymorphism (SNP), about 2 SNPs, about 3 SNPs, about 4 SNPs, about 5 SNPs, about 6 SNPs, about 7 SNPs, about 8 SNPs, about 9 SNPs, about 10 SNPs, about 11 SNPs, or more. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

Aspects disclosed herein provide methods for detecting a genotype in a subject comprising a disease or condition, the method comprising: a) contacting genetic material obtained from the subject with a composition sufficiently complementary to and capable of hybridizing to the genotype, the composition comprising: i) a detectably labeled oligonucleotide probe comprising SEQ ID NO: 6, ii) a detectably labeled oligonucleotide probe comprising SEQ ID NO: 7, iii) a detectably labeled oligonucleotide probe comprising SEQ ID NO: 8, iv) a detectably labeled oligonucleotide probe comprising SEQ ID NO: 9, v) a detectably labeled oligonucleotide probe comprising SEQ ID NO: 10, vi) a detectably labeled oligonucleotide probe comprising a nucleic acid sequence that differs from a probe selected from the group consisting of (i)-(v) by up to three nucleobases, provided the detectably labeled oligonucleotide probe of (vi) hybridizes to the genotype of interest, vii) a detectably labeled oligonucleotide probe comprising a nucleic acid sequence complementary to a probe selected from the group consisting of (i)-(vi), or viii) a combination of probes selected from the group consisting of (i)-(vii), b) detecting the presence or absence of hybridization of the genetic material with the composition using the detectably labeled probe, whereby hybridization of the genetic material with the composition is indicative of the presence of the genotype in the subject. Aspects disclosed herein provide methods comprising treating the subject described herein with a modulator of Ribonuclease T2 (RNASET2) activity or expression and/or an inhibitor of TNF Superfamily Member 15 (TL1A) activity or expression, provided that the subject comprises the genotype. In some embodiments, the modulator of RNASET2 activity or expression comprises an agonist or a partial agonist of RNASET2. In some embodiments, the agonist or partial agonist comprises an antibody or antigen-binding fragment, small molecule, or a recombinant protein. In some embodiments, the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11. In some embodiments, the amino acid sequence comprises one or more deletions, substitutions, and/or mutations. In some embodiments, the one or more deletions, substitutions, and/or mutations is at the N-terminus or C-terminus of the RNASET2 polypeptide. In some embodiments, the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide. In some embodiments, the one or more deletions, substitutions, and/or mutations is internal. In some embodiments, the agonist or partial agonist comprises a fusion protein, conjugate, or both. In some embodiments, the fusion protein comprises an amino acid sequence of a plasma long half-life polypeptide. In some embodiments, the conjugate comprises an RNASET2 polypeptide comprising at least one amino acid bound to a conjugating moiety. In some embodiments, the conjugating moiety comprises polyethylene glycol (PEG). In some embodiments, the long plasma half-life polypeptide comprises an antibody, or antibody fragment, comprising IgG1, IgG2, IgG4, IgG3, or IgE. In some embodiments, the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin. In some embodiments, the agonist or partial agonist is effective to increase expression of RNASET2 in the subject. In some embodiments, the agonist or partial agonist is effective to activate RNASET2 activity in the subject. In some embodiments, a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein. In some embodiments, the genotype is homozygous or heterozygous. In some embodiments, the disease or condition comprises and inflammatory, fibrostenotic, and/or fibrotic disease or condition. In some embodiments, the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis. In some embodiments, the sample comprises whole blood, plasma, serum, or biopsy tissue. In some embodiments, the subject is mammal. In some embodiments, the subject is human. In some embodiments, the subject is non-responsive to an induction of anti-Tumor Necrosis Factor (TNF) therapy, or lost response to the anti-TNF therapy after a period of time during treatment. In some embodiments, the inflammatory, fibrostenotic, and/or fibrotic disease is refractory. In some embodiments, the genotype comprises one or more single nucleotide polymorphisms (SNPs) or indels at Indel 1, SNP 1, SNP 2, SNP 3, SNP 4, a SNP in linkage disequilibrium (LD) therewith, or any combination thereof. In some embodiments, the indel at Indel 1 comprises "CCAGGGCTGGGTGAGGG" (SEQ ID NO: 14). In some embodiments, the SNP at SNP 1 comprises a "C" allele. In some embodiments, the SNP at SNP 2 comprises a "T" allele. In some embodiments, the SNP at SNP 3 comprises a "G" allele. In some embodiments, the SNP at SNP 4 comprises a "G" allele. In some embodiments, the indel at Indel 1 is within SEQ ID NO: 1. In some embodiments, the SNP at SNP 1 is within SEQ ID NO: 2. In some embodiments, the SNP at SNP 2 is within SEQ ID NO: 3. In some embodiments, the SNP at SNP 3 is within SEQ ID NO: 4. In some embodiments, the SNP at SNP 4 is within SEQ ID NO: 5. In some embodiments, LD is defined by an $r^2$ value of at least 0.80, 0.85, 0.90, 0.95, or 1.0. In some embodiments, the genotype comprises one or more single nucleotide polymorphisms (SNPs) or indels located at a gene RibonucleaseT2 (RNASET2). In some embodiments, the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the genotype is associated with a risk that the subject has, or will develop, a subclinical phenotype of the disease or condition as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$ about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$. In some embodiments, the subclinical phenotype comprises stricturing, penetrating, stricturing and penetrating, disease phenotypes. In some embodiments, the genotype comprises one or more SNPs in linkage disequilibrium with SNP 2 as determined by an $r^2$ value of at least about 0.80, about 0.85, about 0.90, about 0.95, or about 1.0. In some embodiments, the inhibitor of TL1A activity or expression comprises an anti-TL1A antibody. In some embodiments, the anti-TL1A antibody comprises an inhibitor of TL1A-Death Receptor 3 (DR3) binding, signaling, or both.

BRIEF DESCRIPTION OF THE DRAWINGS

FIG. 1A-FIG. 1E illustrate E26 transformation-specific (ETS) transcription factor binding sites (TFBS) associated with RNASET2 disease variants. FIG. 1A illustrates EMSA analysis with no CD4+ nuclear extract binding to probes targeting SNP2; and provides the sequences of SNP 2, in which there is no TFBS. FIG. 1B illustrates EMSA analysis with CD4+ nuclear extract binding to probes targeting SNP 1 C/T; and provides the sequences of SNP1, in which the TFBS is underlined. FIG. 1C illustrates EMSA analysis with CD4+ nuclear extract binding to probes targeting Indel 1 (representative of 5 experiments); and provides the sequences of Indel 1, in which the TFBS is underlined FIG. 1D illustrates ETS1 Chip-seq data from human purified T cells (FANTOM project). FIG. 1E illustrates SNP 1 super shifted complexes in the presence of ETS1-specific antibody (representative of 2 experiments). Unlabeled oligo competitors (comp): Indel 1 non-risk (nr) or 17 bp insertion (22), SNP 1 C or T SNP, excess 50 or 200 fold oligo mutated at ETS TFBS (mut-ETS).

FIG. 4A-4B show results from intracellular IFNγ staining and cellular aggregation, representative of three (3) similar experiments. FIG. 4C illustrates blocking of IFNγ secretion and is representative of fifteen (15) similar experiments. The overall p value=0.005.

FIG. 5B illustrates IFN-g secretion (in nanograms per milliliter) in cells obtained from 12 donors transfected 24 hr prior to activation with RNASET2 over-expression versus empty vector. Cells were maximally stimulated for 24 hours with TL1A+IL12/18/15.

FIG. 6B illustrates expression of ICAM1, RNASET2, and IFNγ secreting versus non-secreting cells. FIG. 6C illustrates ChIP sequencing for H3K9 demethylase binding to ICAM1 promoter.

FIG. 11A-11B shows a luciferase promotor constructs transfected into primary T cells untreated with TL1A (FIG. 11A), as well as cells treated with TL1A as compared to cells untreated with TL1A (FIG. 11B).

FIG. 15A illustrates an experimental outline using a DSS mouse model. FIG. 15B illustrates an experimental outline using a T cell transfer model.

FIG. 17A illustrates results from donors 2-4. FIG. 17B illustrates results from donors 5-6 "UT" refers to "untreated."

FIG. 18A shows that RNASET2 mRNA expression decreases in cells in the presence of TL1A (left), PMA/ionomycin (middle), and TCR (right), as compared to untreated. FIG.

18B illustrates that IFNγ secretion increases in the presence of TL1A (left), PMA/ionomycin (middle), and TCR (right), as compared to untreated.

Figure 19:
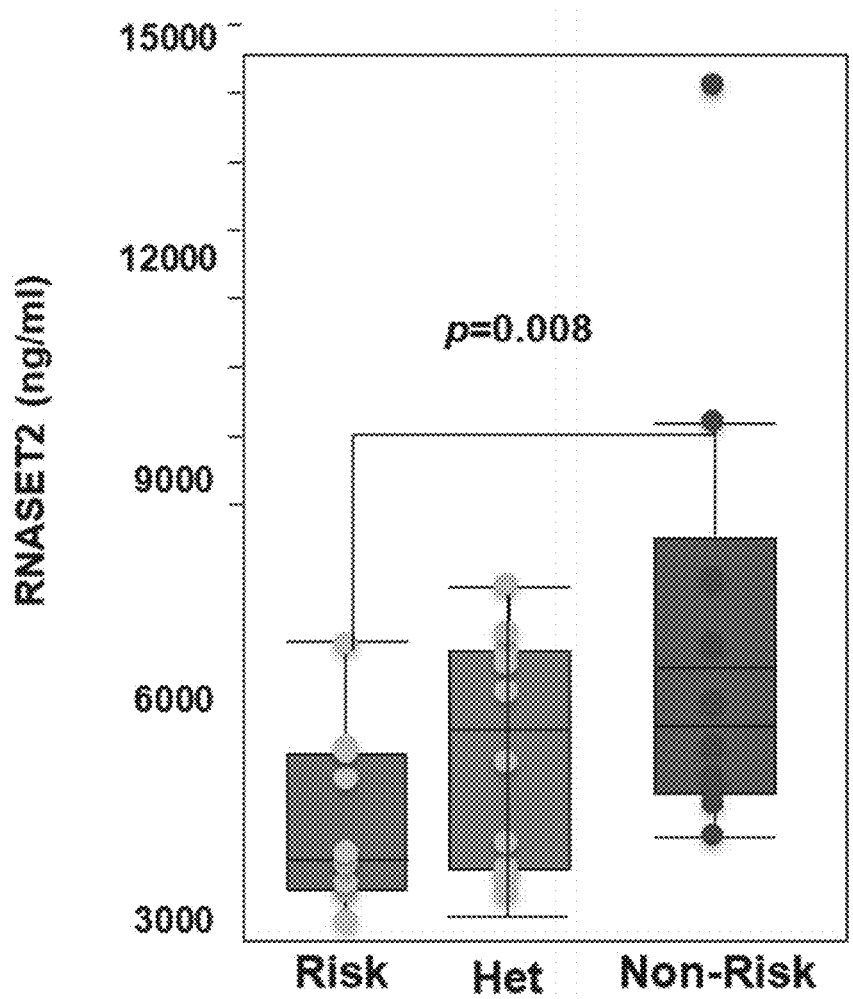

FIG. 19 illustrates that presence of SNP 1 in normal (non-diseased) donors show decreased plasma RNASET2 protein expression levels.

Figure 20A:
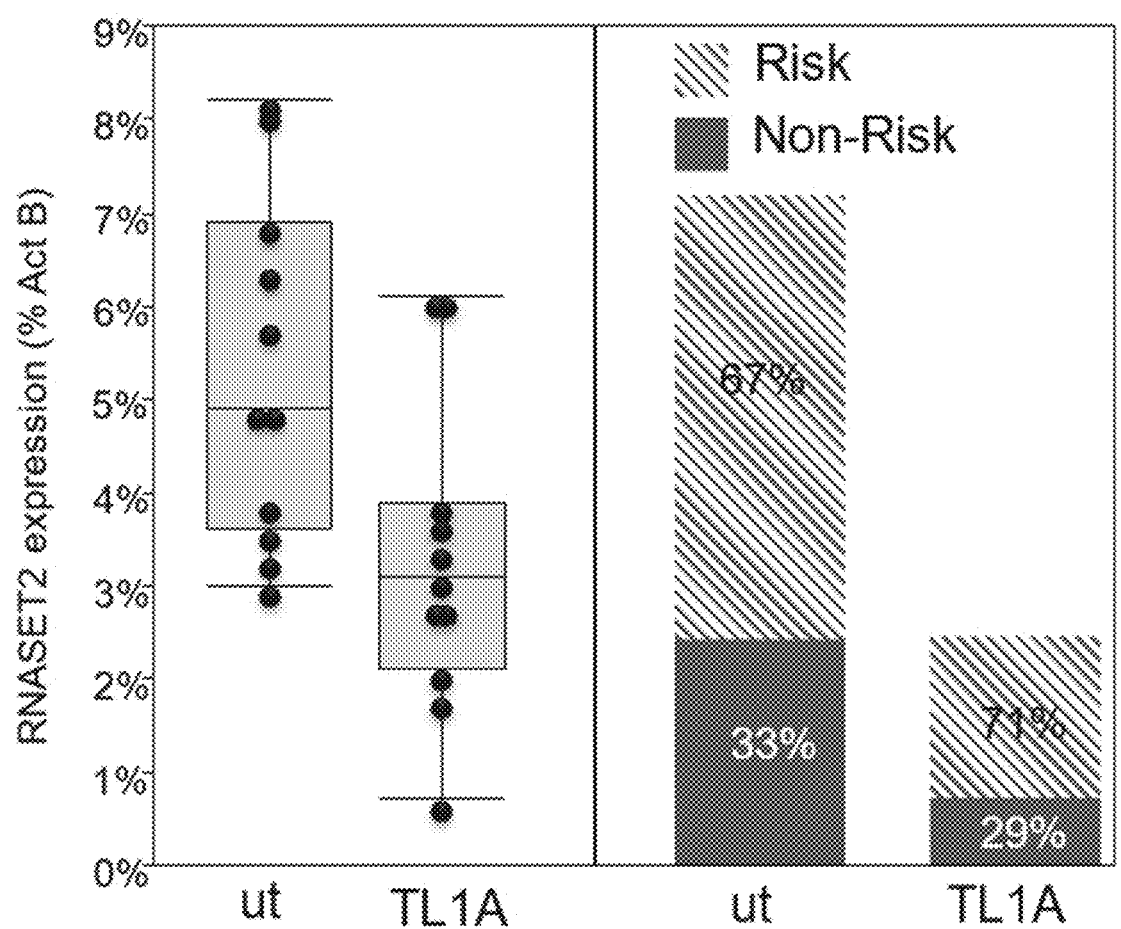
Figure 20B:
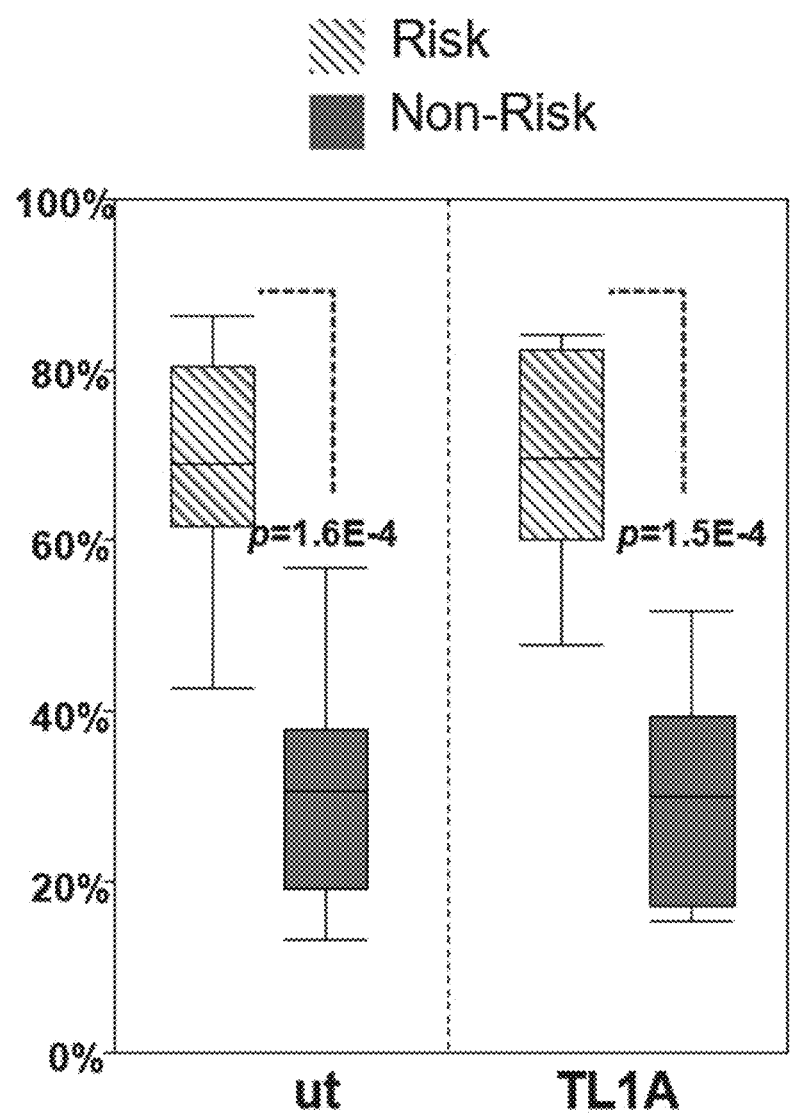

FIG. 20A-20B illustrates that SNP1 drives expression in resting or TL1A stimulated CD4+ T cells. FIG. 20A shows that the disease risk allele in SNP1 drives expression of RNASET2 in 67% of cells untreated, and 71% of cells in the presence of TL1A. FIG. 20B shows that the disease risk allele in SNP1 drives expression of RNASET2 in multiple donors (n=11), independent of TL1A presence.

DETAILED DESCRIPTION OF THE DISCLOSURE

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

Methods
Disease or Condition

Aspects disclosed herein provide methods of treating, diagnosing, prognosing, or monitoring, a disease or condition. In some cases, the disease or condition comprises an inflammatory disease, fibrostenotic disease, and/or fibrotic disease. Non-limiting examples of inflammatory diseases include diseases of the gastrointestinal (GI) tract, liver, gallbladder, and joints. In some cases, the inflammatory disease inflammatory bowel disease (IBD), Crohn's disease (CD), or ulcerative colitis, systemic lupus erythematosus (SLE), or rheumatoid arthritis. A subject may suffer from fibrosis, fibrostenosis, or a fibrotic disease, either isolated or in combination with an inflammatory disease.

An exemplary fibrotic disease is primary sclerosing cholangitis (PSC). In some instances, the disease or condition is refractory, which refers a quality of the disease or condition such that there is an observed failure of a standard treatment to induce remission of a disease or condition. Non-limiting examples of refractory inflammatory disease include refractory Crohn's disease, and medically refractory ulcerative colitis (e.g., mrUC). Non-limiting examples of standard treatment include glucocorticosteriods, anti-TNF therapy, anti-a4-b7 therapy (vedolizumab), anti-IL12p40 therapy (ustekinumab), Thalidomide, and Cytoxin. In some instances, the refractory disease or condition is characterized by an increase in colitis, inflammation, fibrosis, fibrostenosis, stricturing, penetrating, obstructive, or otherwise complicated, disease of the GI tract.

Subject

Disclosed herein, in some embodiments, are methods of treating diagnosing prognosing, or monitoring, a disease or condition in a subject. In some instances, the subject is a mammal. In some embodiments, the subject comprises a mouse, rat, guinea pig, rabbit, chimpanzee, or farm animal. In some instances, the subject is human. In some instances, the subject is diagnosed with the disease or condition disclosed herein. Non-limiting methods for diagnosis using existing indices and scoring systems include Crohn's Disease Activity Index (CDAI), Ulcerative Colitis Disease Activity Index (UCDAI), guidelines from American College of Gastroenterology (ACG) and European Crohn's and Colitis Organization (ECCO), patient-reported outcomes (PRO-2), Harvey-Bradshaw Index, Van Hess Index, Perianal Disease Activity Index (PDAI), Rachmilewitz score, Mayo score, Powell-Tuck index, Patient Simple Clinical Colitis Activity Index (P-SCCAI), Lichtiger index, Seo index, Inflammatory Bowel Disease Questionnaire (IBDQ), Manitoba IBD Index, Crohn's Disease Endoscopic Index of Severity (CDEIS), Simple Endoscopic Score for Crohn Disease (SES-CD), Lewis score (capsule endoscopy), Rutgeert's Score, and the Montreal Classification, and IBD questionnaire. In some instances, the subject is not diagnosed with the disease or condition. In some instances, the subject is suffering from a symptom related to a disease or condition disclosed herein (e.g., abdominal pain, cramping diarrhea, rectal bleeding, fever, weight loss, fatigue, loss of appetite, dehydration, and malnutrition, anemia, or ulcers).

In some embodiments, the subject is susceptible to, or is inflicted with, thiopurine toxicity, or a disease caused by thiopurine toxicity (such as pancreatitis or leukopenia). In further embodiments provided, the subject is, or is suspected of being, non-responsive to a standard treatment (e.g., anti-TNF alpha therapy, anti-a4-b7 therapy (vedolizumab), anti-IL12p40 therapy (ustekinumab), Thalidomide, or Cytoxin). In some cases, the subject is not responsive to the induction of said therapy. In some cases, the subject loses response to said standard treatment after a period of time during treatment.

Ribonuclease T2 (RNASET2) Risk Genotype

Ribonuclease T2, encoded by the gene RNASET2 (Entrez gene ID No. 8635 (*Homo sapiens*)) is a member of the Rh/T2/S-glycoprotein class of extracellular ribonucleases. RNASET2 is a single copy gene that maps to 6p27 human genomic position, a region associated with various human malignancies and chromosomal rearrangement. Disclosed herein, in some embodiments, are genotypes comprising one or more single nucleotide polymorphisms (SNPs) and/or indels at, or near, the RNASET2 gene locus. In some embodiments, the one or more SNPs and/or indels comprise rs16900967 (Indel 1), rs2149092 (SNP 1), rs1819333 (SNP 2), rs9355610 (SNP 3), and rs1044059 (SNP 4). In some embodiments, reference to "Indel 1" refers to the indel at rs16900967. In some embodiments, reference to "SNP 1" refers to the SNP at rs2149092. In some embodiments, reference to "SNP 2" refers to the SNP at rs1819333. In some embodiments, reference to "SNP 3" refers to the SNP at rs9355610. In some embodiments, reference to "SNP 4" refers to the SNP at rs1044059. In some embodiments, the genotypes described herein comprise one or more of Indel 1I (where, for example, I is an insertion comprising or consisting of CCAGGGCTGGGTGAGGG (SEQ ID NO: 14)), SNP 1C, SNP 2T, SNP 3G, SNP 4G.

In some embodiments, SNP1 (rs2149092) is located at chr6:166959490 (GRCh38.p12), which means nucleotide position 166959490 within human chromosome 6 of the human genome according to build 38. In some embodiments, SNP1 is located at nucleic acid position 51 within SEQ ID NO: 2. In some embodiments, Indel 1 is located at chr6:166957199-166957220 (GRCh38.p12). In some embodiments, Indel 1 is located at nucleic acid position 51 within SEQ ID NO: 1. In some embodiments, SNP 2 is located at chir6:166960059(GRCh38.p12). In some embodiments, SNP 2 is located at nucleic acid position 51 within SEQ ID NO: 3. In some embodiments, SNP 3 is located at chr6:166969587 (GRCh38.p12). In some embodiments, SNP 3 is located at nucleic acid position 51 within SEQ ID NO: 4. In some embodiments, SNP 4 is located at chr6:166956409 (GRCh38.p12). In some embodiments, SNP 4 is located at nucleic acid position 51 within SEQ ID NO: 5.

In some embodiments, the genotype is associated with a decrease in RNASET2 activity or expression. In some embodiments, the genotype is associated with an increase in RNASET2 activity or expression. In some embodiments, the genotypes are associated with a risk that a subject carrying one or more of the genotypes has, or is at risk of developing, a disease or conditions described herein (e.g., inflammatory bowel disease, Crohn's disease, ulcerative colitis). In some embodiments, the genotypes disclosed herein are useful for the selection of a patient for treatment with a therapeutic agent effective to increase or activate RNASET2 activity or expression. In some embodiments, the genotypes disclosed herein are useful for the selection of a patient for treatment with a therapeutic agent effective to decrease or reduce RNASET2 activity or expression. In some embodiments, the RNASET2 risk genotype comprises Indel1 (rs16900967). In some embodiments, the RNASET2 risk genotype comprises SNP1 (rs2149092). In some embodiments, the RNASET2 risk genotype comprises SNP2 (rs1819333). In some embodiments, the RNASET2 risk genotype comprises SNP3 (rs9355610). In some embodiments, the RNASET2 risk genotype comprises SNP4 (rs1044059). In some embodiments, the RNASET2 risk genotype comprises SNP5 (rs408080). In some embodiments, the RNASET2 risk genotype comprises SNP6 (rs64561430). In some embodiments, the RNASET2 risk genotype comprises SNP7 (rs34560498). In some embodiments, the RNASET2 risk genotype comprises SNP8 (rs12525855). In some embodiments, the RNASET2 risk genotype comprises SNP9 (rs2769346). In some embodiments, the RNASET2 risk genotype comprises SNP10 (rs12213683). In some embodiments, the RNASET2 risk genotype comprises SNP11 (rs12208359). In some embodiments, the RNASET2 risk genotype comprises SNP12 (rs405553). In some embodiments, the RNASET2 risk genotype comprises SNP13 (rs444988). In some embodiments, the RNASET2 risk genotype comprises SNP14 (rs3752520). In some embodiments, the RNASET2 risk genotype comprises SNP15 (rs12203510). In some embodiments, the RNASET2 risk genotype comprises SNP16 (rs9295384). In some embodiments, the RNASET2 risk genotype comprises SNP17 (rs9457260). In some embodiments, the RNASET2 risk genotype comprises SNP18 (rs424185). In some embodiments, the RNASET2 risk genotype comprises SNP19 (rs2757042). In some embodiments, the RNASET2 risk genotype comprises SNP20 (rs4710171). In some embodiments, the RNASET2 risk genotype comprises SNP21 (rs398278). In some embodiments, the RNASET2 risk genotype comprises SNP22 (rs9459849). In some embodiments, the RNASET2 risk genotype comprises SNP23 (rs2757050). In some embodiments, the RNASET2 risk genotype comprises SNP24 (rs6456151). In some embodiments, the RNASET2 risk genotype comprises SNP25 (rs365189). In some embodiments, the RNASET2 risk genotype comprises SNP26 (rs7748224). In some embodiments, the RNASET2 risk genotype comprises SNP27 (rs239934). In some embodiments, the RNASET2 risk genotype comprises SNP28 (rs4060951). In some embodiments, the RNASET2 risk genotype comprises SNP29 (rs2757046). In some embodiments, the RNASET2 risk genotype comprises SNP30 (rs364283). In some embodiments, the RNASET2 risk genotype comprises SNP31 (rs12527827). In some embodiments, the RNASET2 risk genotype comprises SNP32 (rs439553). In some embodiments, the RNASET2 risk genotype comprises SNP33 (rs2149091). In some embodiments, the RNASET2 risk genotype comprises SNP34 (rs2038580). In some embodiments, the RNASET2 risk genotype comprises SNP35 (rs385113). In some embodiments, the RNASET2 risk genotype comprises SNP36 (rs1060404). In some embodiments, the RNASET2 risk genotype comprises one or more of SNP1-SNP36, and Indel 1. In some embodiments, the RNASET2 risk genotype comprises two or more of SNP1-SNP36, and Indel 1. In some embodiments, the RNASET2 risk genotype comprises three or more of SNP1-SNP36, and Indel 1. In some embodiments, the RNASET2 risk genotype comprises four or more of SNP1-SNP36, and Indel 1. In some embodiments, the RNASET2 risk genotype comprises five or more of SNP1-SNP36, and Indel 1. In some embodiments, the RNASET2 risk genotype comprises six or more of SNP1-SNP36, and Indel 1. In some embodiments, the RNASET2 risk genotype comprises seven or more of SNP1-SNP36, and Indel 1. In some embodiments, the RNASET2 risk genotype comprises eight or more of SNP1-SNP36, and Indel 1. In some embodiments, the RNASET2 risk genotype comprises nine or more of SNP1-SNP36, and Indel 1. In some embodiments, the RNASET2 risk genotype comprises ten or more of SNP1-SNP36, and Indel 1.

In some embodiments, RNASET2 risk genotype (the "genotype") comprises Indel 1. In some embodiments, the genotype comprises SNP 1. In some embodiments, the genotype comprises SNP 2. In some embodiments, the genotype comprises SNP 3. In some embodiments, the genotype comprises SNP 4. In some embodiments, the genotype comprises Indel 1 and SNP 1. In some embodiments, the genotype comprises Indel 1 and SNP 2. In some embodiments, the genotype comprises Indel 1 and SNP 3. In some embodiments, the genotype comprises Indel 1 and SNP 4. In some embodiments, the genotype comprises SNP 1 and SNP 2. In some embodiments, the genotype comprises SNP 1 and SNP 3. In some embodiments, the genotype comprises SNP 1 and SNP 4. In some embodiments, the genotype comprises SNP 2 and SNP 3. In some embodiments, the genotype comprises SNP 2 and SNP 4. In some embodiments, the genotype comprises SNP 3 and SNP 4. In some embodiments, the genotype comprises Indel 1, SNP 1, and SNP 2. In some embodiments, the genotype comprises Indel 1, SNP 1, and SNP 3. In some embodiments, the genotype comprises Indel 1, SNP 1, and SNP 4. In some embodiments, the genotype comprises Indel 1, SNP 2, and SNP 3. In some embodiments, the genotype comprises Indel 1, SNP 2, and SNP 4. In some embodiments, the genotype comprises Indel 1, SNP 3, and SNP 4. In some embodiments, the genotype comprises SNP 1, SNP 2, and SNP 3. In some embodiments, the genotype comprises SNP 1, SNP 2, and SNP 4. In some embodiments, the genotype comprises SNP 1, SNP 3, and SNP 4. In some embodiments, the genotype comprises SNP 2, SNP 3, and SNP 4. In some embodiments, the genotype comprises Indel 1, SNP 1, SNP 2, and SNP 3. In some embodiments, the genotype comprises Indel 1, SNP 1, SNP 2, and SNP 4. In some embodiments, the genotype comprises Indel 1, SNP 1, SNP 3, and SNP 4. In some embodiments, the genotype comprises Indel 1, SNP 2, and SNP 3, and SNP 4. In some embodiments, the genotype comprises SNP 1, SNP 2, SNP 3, and SNP 4. In some embodiments, the genotype comprises Indel 1, SNP 1, SNP 2, SNP 3, and SNP 4.

In some instances, the genotype comprises one SNP, two SNPs, three SNPs, four SNPs, or five SNPs. Disclosed herein, in some embodiments are methods, kits, systems, and compositions comprising detecting at least two SNPs and/or indels in a gene encoding RNASET2. In some instances, methods, kits, systems, and compositions comprise administering a therapeutic agent disclosed herein to a subject having at least two SNPs and/or indels in a gene encoding RNASET2. The two SNPs and/or indels may be Indel 1 and SNP 1. The two SNPs and/or indels may be Indel 1 and SNP 2. The two SNPs and/or indels may be Indel 1 and SNP 3. The two SNPs and/or indels may be Indel 1 and SNP 4.

In some instances, methods, kits, systems, and compositions comprise detecting at least two SNPs and/or indels in a gene encoding RNASET2. In some instances, methods, kits, systems, and compositions comprise administering a therapeutic agent disclosed herein to a subject having at least two SNPs and/or indels in a gene encoding RNASET2. The two SNPs and/or indels may be SNP 1 and Indel 1. The two SNPs and/or indels may be SNP 1 and SNP 2. The two SNPs and/or indels may be SNP 1 and SNP 3. The two SNPs and/or indels may be SNP 1 and SNP 4.

In some instances, methods, kits, systems, and compositions comprise detecting at least two SNPs and/or indels in a gene encoding RNASET2. In some instances, methods, kits, systems, and compositions comprise administering a therapeutic agent disclosed herein to a subject having at least two SNPs and/or indels in a gene encoding RNASET2. The two SNPs and/or indels may be r SNP 2 and Indel 1. The two SNPs and/or indels may be SNP 1 and SNP 2. The two SNPs and/or indels may be SNP 2 and SNP 3. The two SNPs and/or indels may be SNP 2 and SNP 4.

In some instances, methods, kits, systems, and compositions comprise detecting at least two SNPs and/or indels in a gene encoding RNASET2. In some instances, methods, kits, systems, and compositions comprise administering a therapeutic agent disclosed herein to a subject having at least three SNPs and/or indels in a gene encoding RNASET2. The three SNPs and/or indels may be SNP 2, Indel 1, and SNP 1. The three SNPs and/or indels may be SNP 2, Indel 1, and SNP 3. The three SNPs and/or indels may be SNP 2, Indel 1, and SNP 4. The three SNPs and/or indels may be Indel 1, SNP 4, and SNP 1. The three SNPs and/or indels may be Indel 1, SNP 4, and SNP 3. The three SNPs and/or indels may be Indel 1, SNP 4, and SNP 2. The three SNPs and/or indels may be SNP 3, SNP 4, and SNP 2. The three SNPs and/or indels may be SNP 3, SNP 4, and Indel 1. The three SNPs and/or indels may be SNP 3, SNP 1, and SNP 2.

Method of Detection

Disclosed herein, in some embodiments, are methods of detecting a presence, absence, or level, of a genotype or biomarker in a sample obtained from a subject. In some instances, the methods of detection disclosed herein are useful for the diagnosis, prognosis, monitoring of disease progression, selection for treatment, monitoring of treatment, and/or treatment of inflammatory bowel disease (e.g., Crohn's disease, ulcerative colitis, and the like) disclosed herein.

In some embodiments, methods of detecting a presence, absence, or level of a genotype or biomarker in the sample obtained from the subject involve detecting a nucleic acid sequence. In some cases, the nucleic acid sequence comprises deoxyribonucleic acid (DNA). In some instances, the nucleic acid sequence comprises a denatured DNA molecule or fragment thereof. In some instances, the nucleic acid sequence comprises DNA selected from: genomic DNA, viral DNA, mitochondrial DNA, plasmid DNA, amplified DNA, circular DNA, circulating DNA, cell-free DNA, or exosomal DNA. In some instances, the DNA is single-stranded DNA (ssDNA), double-stranded DNA, denaturing double-stranded DNA, synthetic DNA, and combinations thereof. The circular DNA may be cleaved or fragmented. In some instances, the nucleic acid sequence comprises ribonucleic acid (RNA). In some instances, the nucleic acid sequence comprises fragmented RNA In some instances, the nucleic acid sequence comprises partially degraded RNA In some instances, the nucleic acid sequence comprises a microRNA or portion thereof. In some instances, the nucleic acid sequence comprises an RNA molecule or a fragmented RNA molecule (RNA fragments) selected from: a microRNA (miRNA), a pre-miRNA, a pri-miRNA, a mRNA, a pre-mRNA, a viral RNA, a viroid RNA, a virusoid RNA, circular RNA (circRNA), a ribosomal RNA (rRNA), a transfer RNA (tRNA), a pre-tRNA, a long non-coding RNA (lncRNA), a small nuclear RNA (snRNA), a circulating RNA, a cell-free RNA, an exosomal RNA, a vector-expressed RNA, an RNA transcript, a synthetic RNA, and combinations thereof.

Disclosed herein, in some embodiments, the genotype or biomarker is detected by subjecting a sample obtained from the subject to a nucleic acid-based detection assay. In some instances, the nucleic acid-based detection assay comprises quantitative polymerase chain reaction (qPCR), gel electrophoresis (including for e.g, Northern or Southern blot), immunochemistry, in situ hybridization such as fluorescent in situ hybridization (FISH), cytochemistiy, or sequencing. In some embodiments, the sequencing technique comprises next generation sequencing. In some embodiments, the methods involve a hybridization assay such as fluorogenic qPCR (e.g., TaqMan™, SYBR green, SYBR green I, SYBR green II, SYBR gold, ethidium bromide, methylene blue, Pyronin Y, DAPI, acridine orange, Blue View or phycoerythrin), which involves a nucleic acid amplification reaction with a specific primer pair, and hybridization of the amplified nucleic acid probes comprising a detectable moiety or molecule that is specific to a target nucleic acid sequence. In some instances, a number of amplification cycles for detecting a target nucleic acid in a qPCR assay is about 5 to about 30 cycles. In some instances, the number of amplification cycles for detecting a target nucleic acid is at least about 5 cycles. In some instances, the number of amplification cycles for detecting a target nucleic acid is at most about 30 cycles. In some instances, the number of amplification cycles for detecting a target nucleic acid is about 5 to about 10, about 5 to about 15, about 5 to about 20, about 5 to about 25, about 5 to about 30, about 10 to about 15, about 10 to about 20, about 10 to about 25, about 10 to about 30, about 15 to about 20, about 15 to about 25, about 15 to about 30, about 20 to about 25, about 20 to about 30, or about 25 to about 30 cycles. For TaqMan™ methods, the probe may be a hydrolysable probe comprising a fluorophore and quencher that is hydrolyzed by DNA polymerase when hybridized to a target nucleic acid. In some cases, the presence of a target nucleic acid is determined when the number of amplification cycles to reach a threshold value is less than 30, 29, 28, 27, 26, 25, 24, 23, 22, 21, or 20 cycles. In some instances, hybridization may occur at standard hybridization temperatures, e.g., between about 35° C. and about 65° C. in a standard PCR buffer.

An additional exemplary nucleic acid-based detection assay comprises the use of nucleic acid probes conjugated or otherwise immobilized on a bead, multi-well plate, or other substrate, wherein the nucleic acid probes are configured to hybridize with a target nucleic acid sequence. In some instances, the nucleic acid probe is specific to one or more genetic variants disclosed herein is used. In some instances, the nucleic acid probe specific to a SNP or SNV comprises a nucleic acid probe sequence sufficiently complementary to a risk or protective allele of interest, such that hybridization is specific to the risk or protective allele. In some instances, the nucleic acid probe specific to an indel comprises a nucleic acid probe sequence sufficiently complementary to an insertion of a nucleobase within a polynucleotide sequence flanking the insertion, such that hybridization is specific to the indel. In some instances, the nucleic acid probe specific to an indel comprises a probe sequence sufficiently complementary to a polynucleotide sequence flanking a deletion of a nucleobase within the polynucleotide sequence, such that hybridization is specific to the indel. In some instances, the nucleic acid probe specific to a biomarker comprises a nucleic acid probe sequence sufficiently complementary to the polynucleotide sequence of the biomarker. In some instances, the biomarker comprises a transcribed polynucleotide sequence (e.g., RNA, cDNA). In some embodiments, the nucleic acid probe can be, for example, a full-length cDNA, or a portion thereof, such as an oligonucleotide of at least about 7, 8, 9, 10, 11, 12, 13, 14, 15, 20, 25, 30, 35, 40, 45, or 50 nucleotides in length and sufficient to specifically hybridize under standard hybridization conditions to the target nucleic acid sequence. In some embodiments, the target nucleic acid sequence is immobilized on a solid surface and contacted with a probe, for example by running the isolated target nucleic acid sequence on an agarose gel and transferring the target nucleic acid sequence from the gel to a membrane, such as nitrocellulose. In some embodiments, the probe(s) are immobilized on a solid surface, for example, in an Affymetrix gene chip array, and the probe(s) are contacted with the target nucleic acid sequence. The present disclosure provides exemplary probes that are hybridizable to a target nucleic acid sequence comprising a risk allele at Indel 1, SNP 1, SNP 2, SNP 3, and SNP 4. In some embodiments, the exemplary probes are hybridizable to target Indel 1I (where, for example, I is an insertion comprising or consisting of CCAGGGCTGGGTGAGGG (SEQ ID NO: 14)), SNP 1C, SNP 2T, SNP 3G, SNP 4G, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof. The present disclosure provides exemplary probes provided in SEQ ID NOS: 6-10, or 29-48, respectively. In some embodiments, the allele for SEQ ID NOS: 29-28 are provided in Table 3.

In some embodiments, the term "probe" with regards to nucleic acids, refers to any nucleic acid molecule that is capable of selectively binding to a specifically intended target nucleic acid sequence. In some instances, probes are specifically designed to be labeled, for example, with a radioactive label, a fluorescent label, an enzyme, a chemiluminescent tag, a colorimetric tag, or other labels or tags that are known in the art. In some instances, the fluorescent label comprises a fluorophore. In some instances, the fluorophore is an aromatic or heteroaromatic compound. In some instances, the fluorophore is a pyrene, anthracene, naphthalene, acridine, stilbene, benzoxazole, indole, benzoindole, oxazole, thiazole, benzothiazole, canine, carbocyanine, salicylate, anthranilate, xanthenes dye, coumarin. Exemplary xanthene dyes include, e.g., fluorescein and rhodamine dyes. Fluorescein and rhodamine dyes include, but are not limited to 6-carboxyfluorescein (FAM), 2'7'-dimethoxy-4'5'-dichloro-6-carboxyfluorescein (JOE), tetrachlorofluorescein (TET), 6-carboxyrhodamine (R6G), N,N,N; N'-tetramethyl-6-carboxyrhodamine (TAMRA), 6-carboxy-X-rhodamine (ROX). Suitable fluorescent probes also include the naphthylamine dyes that have an amino group in the alpha or beta position. For example, naphthylamino compounds include 1-dimethylaminonaphthyl-5-sulfonate, 1-anilino-8-naphthalene sulfonate and 2-p-toluidinyl-6-naphthalene sulfonate, 5-(2'-aminoethyl) aminonaphthalene-1-sulfonic acid (EDANS). Exemplary coumarins include, e.g., 3-phenyl-7-isocyanatocoumarin; acridines, such as 9-isothiocyanatoacridine and acridine orange; N-(p-(2-benzoxazolyl)phenyl) maleimide; cyanines, such as, e.g., indodicarbocyanine 3 (Cy3), indodicarbocyanine 5 (Cy5), indodicarbocyanine 5.5 (Cy5.5), 3-(-carboxypentyl)-3'-ethyl-5,5'-dimethyloxacarbocyanine (CyA); 1H, 5H, 11H, 15H-Xantheno[2,3, 4-ij: 5,6, 7-i'j']diquinolizin-18-ium, 9-[2 (or 4)-[[[6-[2,5-dioxo-1-pyrrolidinyl)oxy]-6-oxohexyl]amino]sulfonyl]-4 (or 2)-sulfophenyl]-2,3, 6,7, 12,13, 16,17-octahydro-inner salt (TR or Texas Red); or BODIPY™ dyes. In some cases, the probe comprises FAM as the dye label.

Disclosed herein, in some embodiments, a genotype or biomarker is detected by subjecting a sample obtained from the subject to a nucleic acid amplification assay. In some instances, the amplification assay comprises polymerase chain reaction (PCR), qPCR, self-sustained sequence replication, transcriptional amplification system, Q-Beta Replicase, rolling circle replication, or any suitable other nucleic acid amplification technique. A suitable nucleic acid amplification technique is configured to amplify a region of a nucleic acid sequence comprising one or more genetic risk variants disclosed herein. In some instances, the amplification assays requires primers. The nucleic acid sequence for the genetic risk variants and/or genes known or provided herein is sufficient to enable one of skill in the art to select primers to amplify any portion of the gene or genetic variants. A DNA sample suitable as a primer may be obtained, e.g, by polymerase chain reaction (PCR) amplification of genomic DNA, fragments of genomic DNA, fragments of genomic DNA ligated to adaptor sequences or cloned sequences. A person of skill in the art would utilize computer programs to design of primers with the desired specificity and optimal amplification properties, such as Oligo version 7.0 (National Biosciences). Controlled robotic systems are useful for isolating and amplifying nucleic acids and can be used.

In some embodiments, detecting the biomarker or genotype of the subject comprises sequencing genetic material obtained from a biological sample from the subject. Sequencing can be performed with any appropriate sequencing technology, including but not limited to single-molecule real-time (SMRT) sequencing, Polony sequencing, sequencing by ligation, reversible terminator sequencing, proton detection sequencing, ion semiconductor sequencing, nanopore sequencing, electronic sequencing, pyrosequencing, Maxam-Gilbert sequencing, chain termination (e.g., Sanger) sequencing, +S sequencing, or sequencing by synthesis. Sequencing methods also include next-generation sequencing, e.g., modern sequencing technologies such as Illumina sequencing (e.g., Solexa), Roche 454 sequencing, Ion torrent sequencing, and SOLiD sequencing. In some cases, next-generation sequencing involves high-throughput sequencing methods. Additional sequencing methods available to one of skill in the art may also be employed.

In some instances, a number of nucleotides that are sequenced are at least 5, 10, 15, 20, 25, 30, 35, 40, 45, 50, 100, 150, 200, 300, 400, 500, 2000, 4000, 6000, 8000, 10000, 20000, 50000, 100000, or more than 100000 nucleotides. In some instances, the number of nucleotides sequenced is in a range of about 1 to about 100000 nucleotides, about 1 to about 10000 nucleotides, about 1 to about 1000 nucleotides, about 1 to about 500 nucleotides, about 1 to about 300 nucleotides, about 1 to about 200 nucleotides, about 1 to about 100 nucleotides, about 5 to about 100000 nucleotides, about 5 to about 10000 nucleotides, about 5 to about 1000 nucleotides, about 5 to about 500 nucleotides, about 5 to about 300 nucleotides, about 5 to about 200 nucleotides, about 5 to about 100 nucleotides, about 10 to about 100000 nucleotides, about 10 to about 10000 nucleotides, about 10 to about 1000 nucleotides, about 10 to about 500 nucleotides, about 10 to about 300 nucleotides, about 10 to about 200 nucleotides, about 10 to about 100 nucleotides, about 20 to about 100000 nucleotides, about 20 to about 10000 nucleotides, about 20 to about 1000 nucleotides, about 20 to about 500 nucleotides, about 20 to about 300 nucleotides, about 20 to about 200 nucleotides, about 20 to about 100 nucleotides, about 30 to about 100000 nucleotides, about 30 to about 10000 nucleotides, about 30 to about 1000 nucleotides, about 30 to about 500 nucleotides, about 30 to about 300 nucleotides, about 30 to about 200 nucleotides, about 30 to about 100 nucleotides, about 50 to about 100000 nucleotides, about 50 to about 10000 nucleotides, about 50 to about 1000 nucleotides, about 50 to about 500 nucleotides, about 50 to about 300 nucleotides, about 50 to about 200 nucleotides, or about 50 to about 100 nucleotides.

Disclosed herein, in some embodiments, are methods for detecting a transcriptomic risk signature or transcriptomic risk profile in a sample obtained from the subject. In some embodiments, the presence, level, or activity of two or more biomarkers in a sample is determined by detecting a transcribed or reverse transcribed polynucleotide, or portion thereof (e.g., mRNA, or cDNA), of a target gene making up the transcriptomic risk signature or transcriptomic risk profile. Any suitable method of detecting a biomarker, such as those disclosed herein, may be utilized to detect a transcriptomic risk signature or transcriptomic risk profile, such as those disclosed herein. A transcriptomic risk signature or transcriptomic risk profile can also be detected at the protein level, using a detection reagent that detects the protein product encoded by the mRNA of the biomarker, directly or indirectly, such the detection reagents disclosed herein.

Disclosed herein, in some embodiments, genetic material is extracted from a sample obtained from a subject, e.g., a sample of blood or serum. In certain embodiments where nucleic acids are extracted, the nucleic acids are extracted using any technique that does not interfere with subsequent analysis. In certain embodiments, this technique uses alcohol precipitation using ethanol, methanol or isopropyl alcohol. In certain embodiments, this technique uses phenol, chloroform, or any combination thereof. In certain embodiments, this technique uses cesium chloride. In certain embodiments, this technique uses sodium, potassium or ammonium acetate or any other salt commonly used to precipitate DNA. In certain embodiments, this technique utilizes a column or resin based nucleic acid purification scheme such as those commonly sold commercially, one non-limiting example would be the GenElute Bacterial Genomic DNA Kit available from Sigma Aldrich. In certain embodiments, after extraction the nucleic acid is stored in water, Tris buffer, or Tris-EDTA buffer before subsequent analysis. In an exemplary embodiment, the nucleic acid material is extracted in water. In some cases, extraction does not comprise nucleic acid purification. In certain embodiments, RNA may be extracted from cells using RNA extraction techniques including, for example, using acid phenol/guanidine isothiocyanate extraction (RNAzol B; Biogenesis), RNeasy RNA preparation kits (Qiagen) or PAXgene (PreAnalytix, Switzerland).

In some embodiments, methods of detecting a presence, absence, or level of a target protein (e.g., biomarker) in the sample obtained from the subject involve detecting protein activity or expression. A target protein may be detected by use of an antibody-based assay, where an antibody specific to the target protein is utilized. In some embodiments, antibody-based detection methods utilize an antibody that binds to any region of target protein. An exemplary method of analysis comprises performing an enzyme-linked immunosorbent assay (ELISA). The ELISA assay may be a sandwich ELISA or a direct ELISA Another exemplary method of analysis comprises a single molecule array, e.g., Simoa. Other exemplary methods of detection include immunohistochemistry and lateral flow assay. Additional exemplary methods for detecting target protein include, but are not limited to, gel electrophoresis, capillary electrophoresis, high performance liquid chromatography (HPLC), thin layer chromatography (TLC), hyperdiffusion chromatography, and the like, or various immunological methods such as fluid or gel precipitation reactions, immunodiffusion (single or double), immunoelectrophoresis, radioimmunoassay (RIA), immunofluorescent assays, and Western blotting. In some embodiments, antibodies, or antibody fragments, are used in methods such as Western blots or immunofluorescence techniques to detect the expressed proteins. The antibody or protein can be immobilized on a solid support for Western blots and immunofluorescence techniques. Suitable solid phase supports or carriers include any support capable of binding an antigen or an antibody. Exemplary supports or carriers include glass, polystyrene, polypropylene, polyethylene, dextran, nylon, amylases, natural and modified celluloses, polyacrylamides, gabbros, and magnetite.

In some cases, a target protein may be detected by detecting binding between the target protein and a binding partner of the target protein. In some cases, the target protein comprises Ribonuclease T2 (RNASET2), or another protein involved in the RNASET2 pathway described herein, and/or mediated by TNF Ligand-Related Molecule 1 (TL1A), encoded by the gene TNF Superfamily Member 15 (TNFSF15). Exemplary methods of analysis of protein-protein binding comprise performing an assay in vivo or in vitro, or ex vivo. In some instances, the method of analysis comprises an assay such as a co-immunoprecipitation (co-IP), pull-down, crosslinking protein interaction analysis, labeled transfer protein interaction analysis, or Far-western blot analysis, FRET based assay, including, for example FRET-FLIM, a yeast two-hybrid assay, BiFC, or split luciferase assay.

Disclosed herein, in some embodiments, are methods of detecting a presence or a level of one or more serological markers in a sample obtained from a subject. In some embodiments, the antibodies comprises immunoglobulin A (IgA), immunoglobulin G (IgG), immunoglobulin E (IgE), or immunoglobulin M (IgM), immunoglobulin D (IgD), or a combination thereof. Any suitable method for detecting a target protein or biomarker disclosed herein may be used to detect a presence, absence, or level of a serological marker. In some embodiments, the presence or the level of the one or more serological markers is detected using an enzyme-linked immunosorbent assay (ELISA), a single molecule array (Simoa), immunohistochemistry, internal transcribed spacer (ITS) sequencing, or any combination thereof. In some embodiments, the ELISA is a fixed leukocyte ELISA. In some embodiments, the ELISA is a fixed neutrophil ELISA A fixed leukocyte or neutrophil ELISA may be useful for the detection of certain serological markers, such as those described in Saxon et al., A distinct subset of antineutrophil cytoplasmic antibodies is associated with inflammatory bowel disease, *J. Allergy Clin. Immuno.* 86:2; 202-210 (August 1990). In some embodiments, ELISA units (EU) are used to measure positivity of a presence or level of a serological marker (e.g., seropositivity), which reflects a percentage of a standard or reference value. In some embodiments, the standard comprises pooled sera obtained from well-characterized patient population (e.g., diagnosed with the same disease or condition the subject has, or is suspected of having) reported as being seropositive for the serological marker of interest. In some embodiments, the control or reference value comprises 10, 20, 30, 40, 50, 60, 70, 80, 90, or 100 EU. In some instances, a quartile sum scores are calculated using, for example, the methods reported in Landers C J, Cohavy O, Misra R. et al., Selected loss of tolerance evidenced by Crohn's disease-associated immune responses to auto- and microbial antigens. Gastroenterology (2002) 123:689-699.

Method of Diagnosis and Prognosis

Disclosed herein, in some embodiments, are methods of diagnosing a disease or condition in a subject. In some cases, the disease or condition comprises an inflammatory disease, fibrostenotic disease, and/or fibrotic disease. Non-limiting examples of inflammatory diseases include diseases of the GI tract, liver, gallbladder, and joints. In some cases, the inflammatory disease IBD, CD, UC, systemic lupus erythematosus (SLE), or rheumatoid arthritis. In some embodiments, the disease or condition comprises fibrosis, fibrostenosis, or a fibrotic disease, either isolated or in combination with an inflammatory disease. An exemplary fibrotic disease is PSC. In some embodiments, a subtype of the disease or condition is diagnosed in the subject. Non-limiting examples of subtypes of IBD include, stricturing disease, penetrating disease, stricturing and penetrating disease, obstructive disease, refractory disease, or another complicated form of IBD. In some instances, the subject is diagnosed with, or predicted to develop, one disease or condition, two disease or conditions, three disease or conditions, or more.

Disclosed herein, in some embodiments, are methods of diagnosing a disease a disease or condition in a subject comprising: (a) obtaining a sample from a subject; (b) subjecting the sample to an assay configured to detect a presence, absence, or level, of an RNASET2 risk genotype; (c) diagnosing the subject with the disease or condition, provided the presence, absence, or level of RNASET2 genotype is detected in the sample obtained from the subject. In some embodiments, the RNASET2 genotype is detected using one or more methods of detection, kits and/or compositions disclosed herein. In some embodiments, the subject is treated by administering a therapeutically effective amount of a therapeutic agent and/or additional agent disclosed herein to the subject, provided the subject is diagnosed with the disease or condition. In some embodiments, the RNASET2 risk genotype comprises Indel 1, SNP 1, SNP 2, SNP 3, and SNP 4. In some embodiments, the RNASET2 risk genotype comprises Indel 1I (where, for example, I is an insertion comprising or consisting of CCAGGGCTGGGTGAGGG (SEQ ID NO: 14)), SNP 1C, SNP 2T, SNP 3G, and/or SNP 4G, or any single nucleotide polymorphism (SNP) or indel in linkage disequilibrium (LD) therewith.

Disclosed herein, in some embodiments, are methods of predicting whether a subject will develop a disease a disease or condition, the method comprising: (a) obtaining a sample from a subject; (b) subjecting the sample to an assay configured to detect a presence, absence, or level, of RNASET2 risk genotype; (c) predicting that the subject will developed the disease or condition, provided the presence, absence, or level of RNASET2 risk genotype is detected in the sample obtained from the subject. In some embodiments, the RNASET2 risk genotype is detected using one or more methods of detection, kits and/or compositions disclosed herein. In some embodiments, the subject is treated by administering a therapeutically effective amount of a therapeutic agent and/or additional agent disclosed herein to the subject, provided the subject is predicted to develop the disease or condition. In some embodiments, the RNASET2 risk genotype comprises Indel 1, SNP 1, SNP 2, SNP 3, and SNP 4. In some embodiments, the RNASET2 risk genotype comprises Indel 1I (where, for example, I is an insertion comprising or consisting of CCAGGGCTGGGTGAGGG (SEQ ID NO: 14)), SNP 1C, SNP 2T, SNP 3G, SNP 4G, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

Methods of Characterizing a Subtype of a Disease or Condition

Disclosed herein, in some embodiments, are methods of characterizing a disease or condition, or a subtype of a disease or condition. In some cases, the disease or condition comprises an inflammatory disease, fibrostenotic disease, and/or fibrotic disease. Non-limiting examples of inflammatory diseases include diseases of the GI tract, liver, gallbladder, and joints. In some cases, the inflammatory disease IBD, CD, UC, systemic lupus erythematosus (SLE), or rheumatoid arthritis. In some embodiments, the disease or condition comprises fibrosis, fibrostenosis, or a fibrotic disease, either isolated or in combination with an inflammatory disease. An exemplary fibrotic disease is primary sclerosing cholangitis (PSC). In some cases, the fibrosis comprises pulmonary fibrosis. Non-limiting examples of subtypes of IBD include, stricturing disease, penetrating disease, stricturing and penetrating disease, obstructive disease, refractory disease, or another complicated or severe form of IBD.

Disclosed herein, in some embodiments, are methods of characterizing a disease a disease or condition, or a subtype of a disease or condition comprising: (a) obtaining a sample from a subject; (b) subjecting the sample to an assay configured to detect a presence, absence, or level, of RNASET2 risk genotype; (c) characterizing the disease or condition as being severe, complicated, and/or refractory disease, provided the presence, absence, or level of RNASET2 risk genotype is detected in the sample obtained from the subject. In some embodiments, the is detected using one or more methods of detection, kits and/or compositions disclosed herein. In some embodiments, the subject is treated by administering a therapeutically effective amount of a therapeutic agent and/or additional agent disclosed herein to the subject, provided the subject is disease or condition is characterized as severe, complicated, and/or refractory disease. In some embodiments, the RNASET2 risk genotype comprises Indel 1, SNP 1, SNP 2, SNP 3, and SNP 4. In some embodiments, the RNASET2 risk genotype comprises Indel 1I (where, for example, I is an insertion comprising or consisting of CCAGGGCTGGGTGAGGG (SEQ ID NO:

14)), SNP 1C, SNP 2T, SNP 3G, SNP 4G, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

Method of Treatment

Disclosed herein, in some embodiments, are methods of treating a disease or condition, or a symptom of the disease or condition, in a subject, comprising administrating of therapeutic effective amount of one or more therapeutic agents to the subject. In some embodiments, the one or more therapeutic agents is administered to the subject alone (e.g., standalone therapy). In some embodiments, the one or more therapeutic agents is administered in combination with an additional agent. In some embodiments, the therapeutic agent is a first-line therapy for the disease or condition. In some embodiments, the therapeutic agent is a second-line, third-line, or fourth-line therapy, for the disease or condition.

Therapeutic Agent

Disclosed herein, in some embodiments, are therapeutic agents useful for the treatment of a disease or condition, or symptom of the disease or condition, disclosed herein. In some embodiments, the therapeutic agent comprises a modulator, agonist, or partial agonist of Ribonuclease T2 (RNASET2). In some embodiments, the therapeutic agent comprises an agonist of RNASET2. In some embodiments, the therapeutic agent comprises a modulator and/or antagonist of TNF Superfamily Member 15 (TL1A), or the gene encoding TL1A (TNFSF15). In some embodiments, the therapeutic agent comprises a modulator of TL1A. In some embodiments, the therapeutic agent comprises a modulator, agonist, and/or antagonist of Adenylate Cyclase 7 (ADCY7). In some embodiments, the therapeutic agent comprises a modulator of ADCY7.

RNASET2 Modulators

In some embodiments, the therapeutic agent comprises a modulator, agonist, or partial agonist of Ribonuclease T2 (RNASET2). In some embodiments, the agonist of RNASET2 comprises an RNASET2 polypeptide. In some embodiments, the RNASET2 polypeptide comprises a human RNASET2 protein (huRNASET2). In some embodiments, the RNASET2 polypeptide comprises a recombinant RNASET2 polypeptide. In some embodiments, the recombinant huRNASET2 protein comprises SEQ ID NO: 11, which is the amino acid sequence of human RNASET2 (NCBI Reference Sequence No. NP_003721.2). In some embodiments, the huRNASET2 comprises an amino acid sequence about 99%, 98%, 97%, 96%, 95%, 94%, 93%, 92%, 91%, or 90% homologous to SEQ ID NO: 11.

In some instances, the RNASET2 polypeptide is truncated. In some instances, the truncation is an N-terminal deletion. In other instances, the truncation is a C-terminal deletion. In additional instances, the truncation comprises both N-terminal and C-terminal deletions. For example, the truncation can be a deletion of at least or about 1, 2, 3, 4, 5, 6, 7, 8, 9, 10, 11, 12, 13, 14, 15, 20, or more residues from either the N-terminus or the C-terminus, or both termini. In some cases, the RNASET2 polypeptide comprises an N-terminal deletion of at least or about 1, 2, 3, 4, 5, 6, 7, 8, 9, 10, 11, 12, 13, 14, 15, 20, or more residues. In some cases, the RNASET2 polypeptide comprises an N-terminal deletion of at least or about 1, 2, 3, 4, 5, 6, 7, 8, 9, or 10 residues. In some cases, the RNASET2 polypeptide comprises an N-terminal deletion of at least or about 2 residues. In some cases, the RNASET2 polypeptide comprises an N-terminal deletion of at least or about 3 residues. In some cases, the RNASET2 polypeptide comprises an N-terminal deletion of at least or about 4 residues. In some cases, the RNASET2 polypeptide comprises an N-terminal deletion of at least or about 5 residues. In some cases, the RNASET2 polypeptide comprises an N-terminal deletion of at least or about 6 residues. In some cases, the RNASET2 polypeptide comprises an N-terminal deletion of at least or about 7 residues. In some cases, the RNASET2 polypeptide comprises an N-terminal deletion of at least or about 8 residues. In some cases, the RNASET2 polypeptide comprises an N-terminal deletion of at least or about 9 residues. In some cases, the RNASET2 polypeptide comprises an N-terminal deletion of at least or about 10 residues. In some embodiments, the truncated RNASET2 has reduced or ameliorated ribonucleolytic activity. Non-limiting examples of truncated RNASET2 polypeptides include hrtrRNASE-70 (SEQ ID NO: 13), and hrtrRNASE-50 (SEQ ID NO: 12). In some instances, the truncated RNASET2 has functionally active ribonucleolytic activity. In some instances, the RNASET2 polypeptide has an internal deletion or substitution.

In some embodiments, the RNASET2 polypeptide has an enhanced plasma half-life. In some instances, the plasma half-life comprises at least 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.

In some embodiments, the RNASET2 polypeptide is a conjugate. In some embodiments, the RNASET2 conjugate comprises an RNASET2 polypeptide comprising at least one amino acid and a conjugating moiety bound to the at least one 1 amino acid. In some embodiments, the at least one amino acid is located proximal to the N-terminus (e.g., proximal to the N-terminal residue). For example, the at least one amino acid is located optionally within the first 10, 20, 30, 40, or 50 residues from the N-terminus. In some cases, the at least one amino acid is located at the N-terminus (i.e., the at least one amino acid is the N-terminal residue of the RNASET2 polypeptide). In other embodiments, the at least one amino acid is located proximal to the C-terminus (e.g., proximal to the C-terminal residue). For example, the at least one amino acid is located optionally within the first 10, 20, 30, 40, or 50 residues from the C-terminus. In some cases, the at least one amino acid is located at the C-terminus (i.e., the at least one amino acid is the C-terminal residue of the RNASET2 polypeptide). In some instances, the RNASET2 conjugate has an enhanced plasma half-life, such as the half-lifes described herein. In some embodiments, the RNASET2 conjugate is functionally active (e.g., retains ribonucleolytic activity). In some embodiments, the RNASET2 conjugate is not functionally active (e.g., devoid of ribonucleolytic activity). In some embodiments, the conjugating moiety comprises a polymer comprising Polyethylene glycol (PEG).

In some embodiments, the RNASET2 polypeptide is fused with a second polypeptide. In some embodiments, the second polypeptide comprises a polypeptide with a long plasma half-life relative to the plasma half-life of the RNASET2 polypeptide. In some embodiments, the second polypeptide comprises an antibody or antibody fragment. In some embodiments, the antibody or antibody fragment comprises an IgG1, IgG2, IgG4, IgG3, or IgE. In some embodiments, the IgG is an Fc. In some embodiments, the IgG Fc is human. In some instances, the long plasma half-life polypeptide comprises HSA, transferrin, IgA monomer, Retinol-binding protein, Factor H, Factor XIII, C-reactive protein, Factor IN Fibrinogen, IFN-alpha, Pentameric IgM, IL-2, or Thyroglobulin. In some instances, the RNA-SET2-Fc comprises RSLV-132.

TL1A Modulators

In some embodiments, the therapeutic agent comprises a modulator and/or antagonist of TNF Superfamily Member 15 (TL1A), or the gene encoding TL1A (TNFSF15). In some embodiments, the modulator of TL1A is an antagonist of TL1A. In some embodiments the therapeutic agent or the additional therapeutic agent comprises an inhibitor of TL1A expression or activity. In some embodiments the therapeutic agent comprises an inhibitor of TL1A expression or activity. In some cases, the inhibitor of TL1A expression or activity is effective to inhibit TL1A-DR3 binding. In some embodiments, the inhibitor of TL1A expression or activity comprises an allosteric modulator of TL1A. An allosteric modulator of TL1A may indirectly influence the effects TL1A on DR3, or TR6/DcR3 on TL1A or DR3. The inhibitor of TL1A expression or activity may be a direct inhibitor or indirect inhibitor. Non-limiting examples of an inhibitor of TL1A expression include RNA to protein TL1A translation inhibitors, antisense oligonucleotides targeting the TNFSF15 mRNA (such as miRNAs, or siRNA), epigenetic editing (such as targeting the DNA-binding domain of TNFSF15, or post-translational modifications of histone tails and/or DNA molecules). Non-limiting examples of an inhibitor of TL1A activity include antagonists to the TL1A receptors, (DR3 and TR6/DcR3), antagonists to TL1A antigen, and antagonists to gene expression products involved in TL1A mediated disease. Antagonists as disclosed herein, may include, but are not limited to, an anti-TL1A antibody, an anti-TL1A-binding antibody fragment, or a small molecule. The small molecule may be a small molecule that binds to TL1A or DR3. The anti-TL1A antibody may be monoclonal or polyclonal. The anti-TL1A antibody may be humanized or chimeric. The anti-TL1A antibody may be a fusion protein. The anti-TL1A antibody may be a blocking anti-TL1A antibody. A blocking antibody blocks binding between two proteins, e.g., a ligand and its receptor. Therefore, a TL1A blocking antibody includes an antibody that prevents binding of TL1A to DR3 or TR6/DcR3 receptors. In a non-limiting example, the TL1A blocking antibody binds to DR3. In another example, the TL1A blocking antibody binds to DcR3. In some cases, the anti-TL1A antibody is an anti-TL1A antibody that specifically binds to TL1A.

The anti-TL1A antibody may comprise one or more of the antibody sequences of Table 1. The anti-DR3 antibody may comprise an amino acid sequence that is at least 85% identical to any one of SEQ ID NOS: 358-370 and an amino acid sequence that is at least 85% identical to any one of SEQ ID NOS: 371-375. The anti-DR3 antibody may comprise an amino acid sequence comprising the HCDR1, HCDR2, HCDR3 domains of any one of SEQ ID NOS: 358-370 and the LCDR1, LCDR2, and LCDR3 domains of any one of SEQ ID NOS: 371-375.

In some embodiments, an anti-TL1A antibody comprises a heavy chain comprising three complementarity-determining regions: HCDR1, HCDR2, and HCDR3; and a light chain comprising three complementarity-determining regions: LCDR1, LCDR2, and LCDR3. In some embodiments, the anti-TL1A antibody comprises a HCDR1 comprising SEQ ID NO: 209, a HCDR2 comprising SEQ ID NO: 210, a HCDR3 comprising SEQ ID NO: 211, a LCDR1 comprising SEQ ID NO: 212, a LCDR2 comprising SEQ ID NO: 213, and a LCDR3 comprising SEQ ID NO: 214. In some cases, the anti-TL1A antibody comprises a heavy chain (HC) variable domain comprising SEQ ID NO: 215 and a light chain (LC) variable domain comprising SEQ ID NO: 216.

In some embodiments, the anti-TL1A antibody comprises a HCDR1 comprising SEQ ID NO: 217, a HCDR2 comprising SEQ ID NO: 218, a HCDR3 comprising SEQ ID NO: 219, a LCDR1 comprising SEQ ID NO: 220, a LCDR2 comprising SEQ ID NO: 221, and a LCDR3 comprising SEQ ID NO: 222. In some cases, the anti-TL1A antibody comprises a heavy chain (HC) variable domain comprising SEQ ID NO: 223 and a light chain (LC) variable domain comprising SEQ ID NO: 224.

In some embodiments, the anti-TL1A antibody comprises a HCDR1 comprising SEQ ID NO: 225, a HCDR2 comprising SEQ ID NO: 226, a HCDR3 comprising SEQ ID NO: 227, a LCDR1 comprising SEQ ID NO: 228, a LCDR2 comprising SEQ ID NO: 229, and a LCDR3 comprising SEQ ID NO: 230. In some cases, the anti-TL1A antibody comprises a heavy chain (HC) variable domain comprising SEQ ID NO: 231 and a light chain (LC) variable domain comprising SEQ ID NO: 232.

In some embodiments, the anti-TL1A antibody comprises a HCDR1 comprising SEQ ID NO: 233, a HCDR2 comprising SEQ ID NO: 234, a HCDR3 comprising SEQ ID NO: 235, a LCDR1 comprising SEQ ID NO: 239, a LCDR2 comprising SEQ ID NO: 240, and a LCDR3 comprising SEQ ID NO: 241. In some cases, the anti-TL1A antibody comprises a HCDR1 comprising SEQ ID NO: 236, a HCDR2 comprising SEQ ID NO: 237, a HCDR3 comprising SEQ ID NO: 238, a LCDR1 comprising SEQ ID NO: 239, a LCDR2 comprising SEQ ID NO: 240, and a LCDR3 comprising SEQ ID NO: 241. In some cases, the anti-TL1A antibody comprises a heavy chain (HC) variable domain comprising SEQ ID NO: 242 and a light chain (LC) variable domain comprising SEQ ID NO: 243. In some cases, the anti-TL1A antibody comprises a heavy chain comprising SEQ ID NO: 244. In some cases, the anti-TL1A antibody comprises a light chain comprising SEQ ID NO: 245.

In some embodiments, the anti-TL1A antibody comprises a HCDR1 comprising SEQ ID NO: 246, a HCDR2 comprising SEQ ID NO: 247, a HCDR3 comprising SEQ ID NO: 248, a LCDR1 comprising SEQ ID NO: 249, a LCDR2 comprising SEQ ID NO: 250, and a LCDR3 comprising SEQ ID NO: 251. In some cases, the anti-TL1A antibody comprises a heavy chain (HC) variable domain comprising SEQ ID NO: 252 and a light chain (LC) variable domain comprising SEQ ID NO: 253.

In some embodiments, the anti-TL1A antibody comprises a HCDR1 comprising SEQ ID NO: 254, a HCDR2 comprising SEQ ID NO: 255, a HCDR3 comprising SEQ ID NO: 256, a LCDR1 comprising SEQ ID NO: 257, a LCDR2 comprising SEQ ID NO: 258, and a LCDR3 comprising SEQ ID NO: 259. In some cases, the anti-TL1A antibody comprises a heavy chain (HC) variable domain comprising SEQ ID NO: 260 and a light chain (LC) variable domain comprising SEQ ID NO: 261.

In some embodiments, the anti-TL1A antibody comprises a HCDR1 comprising SEQ ID NO: 262, a HCDR2 comprising SEQ ID NO: 264, a HCDR3 comprising SEQ ID NO: 265, a LCDR1 comprising SEQ ID NO: 267, a LCDR2 comprising SEQ ID NO: 269, and a LCDR3 comprising SEQ ID NO: 270. In some cases, the anti-TL1A antibody comprises a heavy chain (HC) variable domain comprising SEQ ID NO: 271 and a light chain (LC) variable domain comprising SEQ ID NO: 275. In some cases, the anti-TL1A antibody comprises a heavy chain (HC) variable domain comprising SEQ ID NO: 271 and a light chain (LC) variable domain comprising SEQ ID NO: 276. In some cases, the anti-TL1A antibody comprises a heavy chain (HC) variable domain comprising SEQ ID NO: 271 and a light chain (LC) variable domain comprising SEQ ID NO: 277. In some cases, the anti-TL1A antibody comprises a heavy chain (HC) variable domain comprising SEQ ID NO: 271 and a light chain (LC) variable domain comprising SEQ ID NO: 278.

In some embodiments, the anti-TL1A antibody comprises a HCDR1 comprising SEQ ID NO: 262, a HCDR2 comprising SEQ ID NO: 264, a HCDR3 comprising SEQ ID NO: 265, a LCDR1 comprising SEQ ID NO: 268, a LCDR2 comprising SEQ ID NO: 269, and a LCDR3 comprising SEQ ID NO: 270. In some cases, the anti-TL1A antibody comprises a heavy chain (HC) variable domain comprising SEQ ID NO: 271 and a light chain (LC) variable domain comprising SEQ ID NO: 279. In some cases, the anti-TL1A antibody comprises a heavy chain (HC) variable domain comprising SEQ ID NO: 271 and a light chain (LC) variable domain comprising SEQ ID NO: 280. In some cases, the anti-TL1A antibody comprises a heavy chain (HC) variable domain comprising SEQ ID NO: 271 and a light chain (LC) variable domain comprising SEQ ID NO: 281. In some cases, the anti-TL1A antibody comprises a heavy chain (HC) variable domain comprising SEQ ID NO: 271 and a light chain (LC) variable domain comprising SEQ ID NO: 282.

In some embodiments, the anti-TL1A antibody comprises a HCDR1 comprising SEQ ID NO: 262, a HCDR2 comprising SEQ ID NO: 264, a HCDR3 comprising SEQ ID NO: 265, a LCDR1 comprising SEQ ID NO: 267, a LCDR2 comprising SEQ ID NO: 269, and a LCDR3 comprising SEQ ID NO: 270. In some cases, the anti-TL1A antibody comprises a heavy chain (HC) variable domain comprising SEQ ID NO: 272 and a light chain (LC) variable domain comprising SEQ ID NO: 275. In some cases, the anti-TL1A antibody comprises a heavy chain (HC) variable domain comprising SEQ ID NO: 272 and a light chain (LC) variable domain comprising SEQ ID NO: 276. In some cases, the anti-TL1A antibody comprises a heavy chain (HC) variable domain comprising SEQ ID NO: 272 and a light chain (LC) variable domain comprising SEQ ID NO: 277. In some cases, the anti-TL1A antibody comprises a heavy chain (HC) variable domain comprising SEQ ID NO: 272 and a light chain (LC) variable domain comprising SEQ ID NO: 278.

In some embodiments, the anti-TL1A antibody comprises a HCDR1 comprising SEQ ID NO: 262, a HCDR2 comprising SEQ ID NO: 264, a HCDR3 comprising SEQ ID NO: 265, a LCDR1 comprising SEQ ID NO: 268, a LCDR2 comprising SEQ ID NO: 269, and a LCDR3 comprising SEQ ID NO: 270. In some cases, the anti-TL1A antibody comprises a heavy chain (HC) variable domain comprising SEQ ID NO: 272 and a light chain (LC) variable domain comprising SEQ ID NO: 279. In some cases, the anti-TL1A antibody comprises a heavy chain (HC) variable domain comprising SEQ ID NO: 272 and a light chain (LC) variable domain comprising SEQ ID NO: 280. In some cases, the anti-TL1A antibody comprises a heavy chain (HC) variable domain comprising SEQ ID NO: 272 and a light chain (LC) variable domain comprising SEQ ID NO: 281. In some cases, the anti-TL1A antibody comprises a heavy chain (HC) variable domain comprising SEQ ID NO: 272 and a light chain (LC) variable domain comprising SEQ ID NO: 282.

In some embodiments, the anti-TL1A antibody comprises a HCDR1 comprising SEQ ID NO: 263, a HCDR2 comprising SEQ ID NO: 264, a HCDR3 comprising SEQ ID NO: 266, a LCDR1 comprising SEQ ID NO: 267, a LCDR2 comprising SEQ ID NO: 269, and a LCDR3 comprising SEQ ID NO: 270. In some cases, the anti-TL1A antibody comprises a heavy chain (HC) variable domain comprising SEQ ID NO: 273 and a light chain (LC) variable domain comprising SEQ ID NO: 275. In some cases, the anti-TL1A antibody comprises a heavy chain (HC) variable domain comprising SEQ ID NO: 273 and a light chain (LC) variable domain comprising SEQ ID NO: 276. In some cases, the anti-TL1A antibody comprises a heavy chain (HC) variable domain comprising SEQ ID NO: 273 and a light chain (LC) variable domain comprising SEQ ID NO: 277. In some cases, the anti-TL1A antibody comprises a heavy chain (HC) variable domain comprising SEQ ID NO: 273 and a light chain (LC) variable domain comprising SEQ ID NO: 278. In some cases, the anti-TL1A antibody comprises a heavy chain (HC) variable domain comprising SEQ ID NO: 273 and a light chain (LC) variable domain comprising SEQ ID NO: 279. In some cases, the anti-TL1A antibody comprises a heavy chain (HC) variable domain comprising SEQ ID NO: 273 and a light chain (LC) variable domain comprising SEQ ID NO: 280. In some cases, the anti-TL1A antibody comprises a heavy chain (HC) variable domain comprising SEQ ID NO: 273 and a light chain (LC) variable domain comprising SEQ ID NO: 281. In some cases, the anti-TL1A antibody comprises a heavy chain (HC) variable domain comprising SEQ ID NO: 273 and a light chain (LC) variable domain comprising SEQ ID NO: 282.

In some embodiments, the anti-TL1A antibody comprises a HCDR1 comprising SEQ ID NO: 263, a HCDR2 comprising SEQ ID NO: 264, a HCDR3 comprising SEQ ID NO: 266, a LCDR1 comprising SEQ ID NO: 268, a LCDR2 comprising SEQ ID NO: 269, and a LCDR3 comprising SEQ ID NO: 270. In some cases, the anti-TL1A antibody comprises a heavy chain (HC) variable domain comprising SEQ ID NO: 274 and a light chain (LC) variable domain comprising SEQ ID NO: 279. In some cases, the anti-TL1A antibody comprises a heavy chain (HC) variable domain comprising SEQ ID NO: 274 and a light chain (LC) variable domain comprising SEQ ID NO: 280. In some cases, the anti-TL1A antibody comprises a heavy chain (HC) variable domain comprising SEQ ID NO: 274 and a light chain (LC) variable domain comprising SEQ ID NO: 281. In some cases, the anti-TL1A antibody comprises a heavy chain (HC) variable domain comprising SEQ ID NO: 274 and a light chain (LC) variable domain comprising SEQ ID NO: 282. In some cases, the anti-TL1A antibody comprises a heavy chain (HC) variable domain comprising SEQ ID NO: 274 and a light chain (LC) variable domain comprising SEQ ID NO: 275. In some cases, the anti-TL1A antibody comprises a heavy chain (HC) variable domain comprising SEQ ID NO: 274 and a light chain (LC) variable domain comprising SEQ ID NO: 276. In some cases, the anti-TL1A antibody comprises a heavy chain (HC) variable domain comprising SEQ ID NO: 274 and a light chain (LC) variable domain comprising SEQ ID NO: 277. In some cases, the anti-TL1A antibody comprises a heavy chain (HC) variable domain comprising SEQ ID NO: 274 and a light chain (LC) variable domain comprising SEQ ID NO: 278.

In some embodiments, the anti-TL1A antibody comprises a HCDR1 comprising SEQ ID NO: 283, a HCDR2 comprising SEQ ID NO: 284, a HCDR3 comprising SEQ ID NO: 285, a LCDR1 comprising SEQ ID NO: 286, a LCDR2 comprising SEQ ID NO: 287, and a LCDR3 comprising SEQ ID NO: 288. In some cases, the anti-TL1A antibody comprises a heavy chain (HC) variable domain comprising SEQ ID NO: 289 and a light chain (LC) variable domain comprising SEQ ID NO: 294. In some cases, the anti-TL1A antibody comprises a heavy chain (HC) variable domain comprising SEQ ID NO: 289 and a light chain (LC) variable domain comprising SEQ ID NO: 295. In some cases, the anti-TL1A antibody comprises a heavy chain (HC) variable domain comprising SEQ ID NO: 289 and a light chain (LC) variable domain comprising SEQ ID NO: 296. In some cases, the anti-TL1A antibody comprises a heavy chain (HC) variable domain comprising SEQ ID NO: 289 and a light chain (LC) variable domain comprising SEQ ID NO: 297. In some cases, the anti-TL1A antibody comprises a heavy chain (HC) variable domain comprising SEQ ID NO: 290 and a light chain (LC) variable domain comprising SEQ ID NO: 294. In some cases, the anti-TL1A antibody comprises a heavy chain (HC) variable domain comprising SEQ ID NO: 290 and a light chain (LC) variable domain comprising SEQ ID NO: 295. In some cases, the anti-TL1A antibody comprises a heavy chain (HC) variable domain comprising SEQ ID NO: 290 and a light chain (LC) variable domain comprising SEQ ID NO: 2%. In some cases, the anti-TL1A antibody comprises a heavy chain (HC) variable domain comprising SEQ ID NO: 290 and a light chain (LC) variable domain comprising SEQ ID NO: 297. In some cases, the anti-TL1A antibody comprises a heavy chain (HC) variable domain comprising SEQ ID NO: 291 and a light chain (LC) variable domain comprising SEQ ID NO: 294. In some cases, the anti-TL1A antibody comprises a heavy chain (HC) variable domain comprising SEQ ID NO: 291 and a light chain (LC) variable domain comprising SEQ ID NO: 295. In some cases, the anti-TL1A antibody comprises a heavy chain (HC) variable domain comprising SEQ ID NO: 291 and a light chain (LC) variable domain comprising SEQ ID NO: 296. In some cases, the anti-TL1A antibody comprises a heavy chain (HC) variable domain comprising SEQ ID NO: 291 and a light chain (LC) variable domain comprising SEQ ID NO: 297. In some cases, the anti-TL1A antibody comprises a heavy chain (HC) variable domain comprising SEQ ID NO: 292 and a light chain (LC) variable domain comprising SEQ ID NO: 294. In some cases, the anti-TL1A antibody comprises a heavy chain (HC) variable domain comprising SEQ ID NO: 292 and a light chain (LC) variable domain comprising SEQ ID NO: 295. In some cases, the anti-TL1A antibody comprises a heavy chain (HC) variable domain comprising SEQ ID NO: 292 and a light chain (LC) variable domain comprising SEQ ID NO: 296. In some cases, the anti-TL1A antibody comprises a heavy chain (HC) variable domain comprising SEQ ID NO: 292 and a light chain (LC) variable domain comprising SEQ ID NO: 297. In some cases, the anti-TL1A antibody comprises a heavy chain (HC) variable domain comprising SEQ ID NO: 293 and a light chain (LC) variable domain comprising SEQ ID NO: 294. In some cases, the anti-TL1A antibody comprises a heavy chain (HC) variable domain comprising SEQ ID NO: 293 and a light chain (LC) variable domain comprising SEQ ID NO: 295. In some cases, the anti-TL1A antibody comprises a heavy chain (HC) variable domain comprising SEQ ID NO: 293 and a light chain (LC) variable domain comprising SEQ ID NO: 2%. In some cases, the anti-TL1A antibody comprises a heavy chain (HC) variable domain comprising SEQ ID NO: 293 and a light chain (LC) variable domain comprising SEQ ID NO: 297.

In some embodiments, the anti-TL1A antibody comprises a HCDR1 comprising SEQ ID NO: 298, a HCDR2 comprising SEQ ID NO: 299, a HCDR3 comprising SEQ ID NO: 300, a LCDR1 comprising SEQ ID NO: 301, a LCDR2 comprising SEQ ID NO: 302, and a LCDR3 comprising SEQ ID NO: 303. In some cases, the anti-TL1A antibody comprises a heavy chain (HC) variable domain comprising SEQ ID NO: 304 and a light chain (LC) variable domain comprising SEQ ID NO: 305. In some cases, the anti-TL1A antibody comprises a heavy chain (HC) variable domain comprising SEQ ID NO: 306 and a light chain (LC) variable domain comprising SEQ ID NO: 307. In some cases, the anti-TL1A antibody comprises a heavy chain (HC) variable domain comprising SEQ ID NO: 308 and a light chain (LC) variable domain comprising SEQ ID NO: 309. In some cases, the anti-TL1A antibody comprises a heavy chain (HC) variable domain comprising SEQ ID NO: 310 and a light chain (LC) variable domain comprising SEQ ID NO: 311. In some cases, the anti-TL1A antibody comprises a heavy chain (HC) variable domain comprising SEQ ID NO: 312 and a light chain (LC) variable domain comprising SEQ ID NO: 313. In some cases, the anti-TL1A antibody comprises a heavy chain (HC) variable domain comprising SEQ ID NO: 314 and a light chain (LC) variable domain comprising SEQ ID NO: 315. In some cases, the anti-TL1A antibody comprises a heavy chain (HC) variable domain comprising SEQ ID NO: 316 and a light chain (LC) variable domain comprising SEQ ID NO: 317. In some cases, the anti-TL1A antibody comprises a heavy chain (HC) variable domain comprising SEQ ID NO: 318 and a light chain (LC) variable domain comprising SEQ ID NO: 319. In some cases, the anti-TL1A antibody comprises a heavy chain (HC) variable domain comprising SEQ ID NO: 320 and a light chain (LC) variable domain comprising SEQ ID NO: 321. In some cases, the anti-TL1A antibody comprises a heavy chain (HC) variable domain comprising SEQ ID NO: 322 and a light chain (LC) variable domain comprising SEQ ID NO: 323. In some cases, the anti-TL1A antibody comprises a heavy chain (HC) variable domain comprising SEQ ID NO: 324 and a light chain (LC) variable domain comprising SEQ ID NO: 325. In some cases, the anti-TL1A antibody comprises a heavy chain (HC) variable domain comprising SEQ ID NO: 326 and a light chain (LC) variable domain comprising SEQ ID NO: 327.

In some embodiments, the anti-TL1A antibody comprises a HCDR1 comprising SEQ ID NO: 328, a HCDR2 comprising SEQ ID NO: 329, a HCDR3 comprising SEQ ID NO: 330, a LCDR1 comprising SEQ ID NO: 331, a LCDR2 comprising SEQ ID NO: 332, and a LCDR3 comprising SEQ ID NO: 333. In some cases, the anti-TL1A antibody comprises a heavy chain (HC) variable domain comprising SEQ ID NO: 334 and a light chain (LC) variable domain comprising SEQ ID NO: 335.

In some embodiments, the anti-TL1A antibody comprises a HCDR1 comprising SEQ ID NO: 336, a HCDR2 comprising SEQ ID NO: 337, a HCDR3 comprising SEQ ID NO: 338, a LCDR1 comprising SEQ ID NO: 339, a LCDR2 comprising SEQ ID NO: 340, and a LCDR3 comprising SEQ ID NO: 341. In some cases, the anti-TL1A antibody comprises a heavy chain (HC) variable domain comprising SEQ ID NO: 342 and a light chain (LC) variable domain comprising SEQ ID NO: 343.

In some embodiments, the anti-TL1A antibody comprises a HCDR1 comprising SEQ ID NO: 346, a HCDR2 comprising SEQ ID NO: 347, a HCDR3 comprising SEQ ID NO: 348, a LCDR1 comprising SEQ ID NO: 349, a LCDR2 comprising SEQ ID NO: 350, and a LCDR3 comprising SEQ ID NO: 351. In some cases, the anti-TL1A antibody comprises a heavy chain (HC) variable domain comprising SEQ ID NO: 344 and a light chain (LC) variable domain comprising SEQ ID NO: 345. In some cases, the anti-TL1A antibody comprises a heavy chain (HC) variable domain comprising SEQ ID NO: 352 and a light chain (LC) variable domain comprising SEQ ID NO: 353. In some cases, the anti-TL1A antibody comprises a heavy chain (HC) variable domain comprising SEQ ID NO: 354 and a light chain (LC) variable domain comprising SEQ ID NO: 355. In some cases, the anti-TL1A antibody comprises a heavy chain (HC) variable domain comprising SEQ ID NO: 356 and a light chain (LC) variable domain comprising SEQ ID NO: 357.

In some embodiments, the anti-TL1A antibody comprises a HCDR1 comprising SEQ ID NO: 376, a HCDR2 comprising SEQ ID NO: 377, a HCDR3 comprising SEQ ID NO: 378, a LCDR1 comprising SEQ ID NO: 379, a LCDR2 comprising SEQ ID NO: 380, and a LCDR3 comprising SEQ ID NO: 381. In some cases, the anti-TL1A antibody comprises a heavy chain (HC) variable domain comprising SEQ ID NO: 382 and a light chain (LC) variable domain comprising SEQ ID NO: 383.

In some embodiments, the anti-TL1A antibody comprises a HCDR1 comprising SEQ ID NO: 384, a HCDR2 comprising SEQ ID NO: 385, a HCDR3 comprising SEQ ID NO: 386, a LCDR1 comprising SEQ ID NO: 387, a LCDR2 comprising SEQ ID NO: 388, and a LCDR3 comprising SEQ ID NO: 399. In some cases, the anti-TL1A antibody comprises a heavy chain (HC) variable domain comprising SEQ ID NO: 390 and a light chain (LC) variable domain comprising SEQ ID NO: 391.

In some embodiments, the anti-TL1A antibody comprises one or more of A101-A177 of Table 1. In some embodiments, the anti-TL1A antibody is A100. In some embodiments, the anti-TL1A antibody is A101. In some embodiments, the anti-TL1A antibody is A102. In some embodiments, the anti-TL1A antibody is A103. In some embodiments, the anti-TL1A antibody is A104. In some embodiments, the anti-TL1A antibody is A105. In some embodiments, the anti-TL1A antibody is A106. In some embodiments, the anti-TL1A antibody is A107. In some embodiments, the anti-TL1A antibody is A108. In some embodiments, the anti-TL1A antibody is A109. In some embodiments, the anti-TL1A antibody is A110. In some embodiments, the anti-TL1A antibody is A111. In some embodiments, the anti-TL1A antibody is A112. In some embodiments, the anti-TL1A antibody is A113. In some embodiments, the anti-TL1A antibody is A114. In some embodiments, the anti-TL1A antibody is A115. In some embodiments, the anti-TL1A antibody is A116. In some embodiments, the anti-TL1A antibody is A117. In some embodiments, the anti-TL1A antibody is A118. In some embodiments, the anti-TL1A antibody is A119. In some embodiments, the anti-TL1A antibody is A120. In some embodiments, the anti-TL1A antibody is A121. In some embodiments, the anti-TL1A antibody is A122. In some embodiments, the anti-TL1A antibody is A123. In some embodiments, the anti-TL1A antibody is A124. In some embodiments, the anti-TL1A antibody is A125. In some embodiments, the anti-TL1A antibody is A126. In some embodiments, the anti-TL1A antibody is A127. In some embodiments, the anti-TL1A antibody is A128. In some embodiments, the anti-TL1A antibody is A129. In some embodiments, the anti-TL1A antibody is A130. In some embodiments, the anti-TL1A antibody is A131. In some embodiments, the anti-TL1A antibody is A132. In some embodiments, the anti-TL1A antibody is A133. In some embodiments, the anti-TL1A antibody is A134. In some embodiments, the anti-TL1A antibody is A135. In some embodiments, the anti-TL1A antibody is A136. In some embodiments, the anti-TL1A antibody is A137. In some embodiments, the anti-TL1A antibody is A138. In some embodiments, the anti-TL1A antibody is A139. In some embodiments, the anti-TL1A antibody is A140. In some embodiments, the anti-TL1A antibody is A141. In some embodiments, the anti-TL1A antibody is A142. In some embodiments, the anti-TL1A antibody is A143. In some embodiments, the anti-TL1A antibody is A144. In some embodiments, the anti-TL1A antibody is A145. In some embodiments, the anti-TL1A antibody is A146. In some embodiments, the anti-TL1A antibody is A147. In some embodiments, the anti-TL1A antibody is A148. In some embodiments, the anti-TL1A antibody is A149. In some embodiments, the anti-TL1A antibody is A150. In some embodiments, the anti-TL1A antibody is A151. In some embodiments, the anti-TL1A antibody is A152. In some embodiments, the anti-TL1A antibody is A153. In some embodiments, the anti-TL1A antibody is A154. In some embodiments, the anti-TL1A antibody is A155. In some embodiments, the anti-TL1A antibody is A156. In some embodiments, the anti-TL1A antibody is A157. In some embodiments, the anti-TL1A antibody is A158. In some embodiments, the anti-TL1A antibody is A159. In some embodiments, the anti-TL1A antibody is A160. In some embodiments, the anti-TL1A antibody is A161. In some embodiments, the anti-TL1A antibody is A162. In some embodiments, the anti-TL1A antibody is A163. In some embodiments, the anti-TL1A antibody is A164. In some embodiments, the anti-TL1A antibody is A165. In some embodiments, the anti-TL1A antibody is A166. In some embodiments, the anti-TL1A antibody is A167. In some embodiments, the anti-TL1A antibody is A168. In some embodiments, the anti-TL1A antibody is A169. In some embodiments, the anti-TL1A antibody is A170. In some embodiments, the anti-TL1A antibody is A171. In some embodiments, the anti-TL1A antibody is A172. In some embodiments, the anti-TL1A antibody is A173. In some embodiments, the anti-TL1A antibody is A174. In some embodiments, the anti-TL1A antibody is A175. In some embodiments, the anti-TL1A antibody is A176. In some embodiments, the anti-TL1A antibody is A177.

In some embodiments, the anti-DR3 is A178. In some embodiments, the anti-DR3 is A179. In some embodiments, the anti-DR3 is A180. In some embodiments, the anti-DR3 is A181. In some embodiments, the anti-DR3 is A182. In some embodiments, the anti-DR3 is A183. In some embodiments, the anti-DR3 is A184. In some embodiments, the anti-DR3 is A185. In some embodiments, the anti-DR3 is A186. In some embodiments, the anti-DR3 is A187. In some embodiments, the anti-DR3 is A188. In some embodiments, the anti-DR3 is A189. In some embodiments, the anti-DR3 is A190. In some embodiments, the anti-DR3 is A191. In some embodiments, the anti-DR3 is A192. In some embodiments, the anti-DR3 is A193. In some embodiments, the anti-DR3 is A194. In some embodiments, the anti-DR3 is A195. In some embodiments, the anti-DR3 is A196. In some embodiments, the anti-DR3 is A197. In some embodiments, the anti-DR3 is A198. In some embodiments, the anti-DR3 is A199. In some embodiments, the anti-DR3 is A200. In some embodiments, the anti-DR3 is A201. In some embodiments, the anti-DR3 is A202. In some embodiments, the anti-DR3 is A203. In some embodiments, the anti-DR3 is A204. In some embodiments, the anti-DR3 is A205. In some embodiments, the anti-DR3 is A206. In some embodiments, the anti-DR3 is A207. In some embodiments, the anti-DR3 is A208. In some embodiments, the anti-DR3 is A209. In some embodiments, the anti-DR3 is A210. In some embodiments, the anti-DR3 is A211. In some embodiments, the anti-DR3 is A212. In some embodiments, the anti-DR3 is A213. In some embodiments, the anti-DR3 is A214. In some embodiments, the anti-DR3 is A215. In some embodiments, the anti-DR3 is A216. In some embodiments, the anti-DR3 is A217. In some embodiments, the anti-DR3 is A218. In some embodiments, the anti-DR3 is A219. In some embodiments, the anti-DR3 is A220. In some embodiments, the anti-DR3 is A221. In some embodiments, the anti-DR3 is A222. In some embodiments, the anti-DR3 is A223. In some embodiments, the anti-DR3 is A224. In some embodiments, the anti-DR3 is A225. In some embodiments, the anti-DR3 is A226. In some embodiments, the anti-DR3 is A227. In some embodiments, the anti-DR3 is A228. In some embodiments, the anti-DR3 is A229. In some embodiments, the anti-DR3 is A230. In some embodiments, the anti-DR3 is A231. In some embodiments, the anti-DR3 is A232. In some embodiments, the anti-DR3 is A233. In some embodiments, the anti-DR3 is A234. In some embodiments, the anti-DR3 is A235. In some embodiments, the anti-DR3 is A236. In some embodiments, the anti-DR3 is A237. In some embodiments, the anti-DR3 is A238. In some embodiments, the anti-DR3 is A239. In some embodiments, the anti-DR3 is A240. In some embodiments, the anti-DR3 is A241. In some embodiments, the anti-DR3 is A242.

TABLE 1

Non-Limiting Examples of anti-TL1A and anti-DR3 Antibodies

| Antibody Name | HC Variable Domain (SEQ ID NO) | LC Variable Domain (SEQ ID NO) |
| --- | --- | --- |
| A100 | 215 | 216 |
| A101 | 223 | 224 |
| A102 | 231 | 232 |
| A103 | 242 | 243 |
| A104 | 252 | 253 |
| A105 | 260 | 261 |
| A106 | 271 | 275 |
| A107 | 271 | 276 |
| A108 | 271 | 277 |
| A109 | 271 | 278 |
| A110 | 271 | 279 |
| A111 | 271 | 280 |
| A112 | 271 | 281 |
| A113 | 271 | 282 |
| A114 | 272 | 275 |
| A115 | 272 | 276 |
| A116 | 272 | 277 |
| A117 | 272 | 278 |
| A118 | 272 | 279 |
| A119 | 272 | 280 |
| A120 | 272 | 281 |
| A121 | 272 | 282 |
| A122 | 273 | 275 |
| A123 | 273 | 276 |
| A124 | 273 | 277 |

ADCY7 Modulators

In some embodiments, the therapeutic agent comprises a modulator, agonist, and/or antagonist of Adenylate Cyclase 7 (ADCY7). Disclosed herein, in some embodiments are methods of treating a disease or condition in a subject by administering a therapeutically effective amount of an agonist of ADCY7 to the subject, thereby increasing ADCY7 expression or activity. The agonist of ADCY7 expression or activity may be a direct agonist or indirect agonist. In some embodiments, the agonist of ADCY7 expression or activity comprises a complete agonist or a partial agonist. Non-limiting examples of an agonist of ADCY7 expression include RNA to protein ADCY7 translation agonists, antisense oligonucleotides targeting the ADCY7C, or homolog thereof, mRNA (such as miRNAs, or siRNA), epigenetic editing (such as post-translational modifications of histone tails and/or DNA molecules). Non-limiting examples of an agonist of ADCY7 activity include antagonists to the ADCY7 antigen, and antagonists to gene expression products involved in ADCY7 mediated disease. Agonists as disclosed herein, may include, but are not limited to, an ADCY7 antibody, an ADCY7-binding antibody fragment, recombinant polypeptide, or a small molecule. The small molecule may be a small molecule that binds to ADCY7 or binding partners to ADCY7. The ADCY7 antibody may be monoclonal or polyclonal. The ADCY7 antibody may be humanized or chimeric. The ADCY7 antibody may be a fusion protein. The ADCY7 antibody may be a blocking ADCY7 antibody. A blocking antibody blocks binding between two proteins, e.g., a ligand and its receptor. In a non-limiting example, the ADCY7 blocking antibody binds to a binding partner of ADCY7. In some cases, the ADCY7 antibody is an ADCY7 antibody that specifically binds to ADCY7. In some cases, the ADCY7 is naturally occurring. In some embodiments, the ADCY7 agonists comprise one or more small molecule compounds that are pan-activators of adenylyl cyclases (ACs). Non-limiting examples of ADCY7 agonists that are pan-activators of ACs include forskolin, colforsin daropate, and analogs thereof.

Disclosed herein, in some embodiments are methods of treating a disease or condition in a subject by administering a therapeutically effective amount of an antagonist of ADCY7 to the subject, thereby decreasing ADCY7 expression or activity. The antagonist of ADCY7 expression or activity may be a direct antagonist or indirect antagonist. In some embodiments, the antagonist of ADCY & expression or activity comprises a complete antagonist or a partial antagonist. Non-limiting examples of an antagonist of ADCY7 expression include RNA to protein ADCY7 translation antagonists, antisense oligonucleotides targeting the ADCY7C, or homolog thereof, mRNA (such as miRNAs, or siRNA), epigenetic editing (such as post-translational modifications of histone tails and/or DNA molecules). Non-limiting examples of an antagonist of ADCY7 activity include antagonists to the ADCY7 antigen, and antagonists to gene expression products involved in ADCY7 mediated disease. Antagonists as disclosed herein, may include, but are not limited to, an ADCY7 antibody, an ADCY7-binding antibody fragment, recombinant polypeptide, or a small molecule. The small molecule may be a small molecule that binds to ADCY7 or binding partners to ADCY7. The ADCY7 antibody may be monoclonal or polyclonal. The ADCY7 antibody may be humanized or chimeric. The ADCY7 antibody may be a fusion protein. The ADCY7 antibody may be a blocking ADCY7 antibody. A blocking antibody blocks binding between two proteins, e.g., a ligand and its receptor. In a non-limiting example, the ADCY7 blocking antibody binds to a binding partner of ADCY7. In some cases, the ADCY7 antibody is an ADCY7 antibody that specifically binds to ADCY7. In some cases, the ADCY7 is naturally occurring. In some embodiments, the ADCY7 antagonists comprise one or more small molecule compounds. In some embodiments, the small molecule comprises antagonist that are inverse agonists.

Disclosed herein, in some embodiments are methods of treating a disease or condition in a subject by administering a therapeutically effective amount of an allosteric modulator of ADCY7 activity or expression to the subject, thereby decreasing or increasing ADCY7 expression or activity. In some embodiments, the allosteric modulator of ADCY7 is a positive allosteric modulator (PAM) effective to enhance or potentiate a ligand of ADCY7. In some embodiments, the allosteric modulator of ADCY7 is a negative allosteric modulator (NAM) effective to reduce the effect of a primary ligand of ADCY7. In some embodiments, the allosteric modulator binds to a non-orthosteric binding site of ADCY7. In some embodiments, the modulator of ADCY7 affects a conformation of the orthosteric binding site of ADCY7 effective decrease or increase activity of ADCY7. In some embodiments, the modulator of ADCY7 is effective to increase or decrease a rate of catalysis of cyclic adenosine monophosphate (cAMP) from adenosine triphosphate (ATP) by ADCY7. In some embodiments, the modulator of ADCY7 is effective to reduce or enhance the inhibition of ADCY7 activity by calcium. Non-limiting examples of ligands that activate ADCY7 include G protein alpha subunit, G protein beta and gamma subunit complex, G Protein Subunit Alpha 13 (GNA13), G Protein Subunit Alpha 12 (GNA12), and ethanol. A non-limiting example of a ligand that inhibits ADCY7 includes lithium.

Dosage and Route of Administration

In general, methods disclosed herein comprise administering a therapeutic agent by oral administration. However, in some instances, methods comprise administering a therapeutic agent by intraperitoneal injection. In some instances, methods comprise administering a therapeutic agent in the form of an anal suppository. In some instances, methods comprise administering a therapeutic agent by intravenous ("i.v.") administration. It is conceivable that one may also administer therapeutic agents disclosed herein by other routes, such as subcutaneous injection, intramuscular injection, intradermal injection, transdermal injection percutaneous administration, intranasal administration, intralymphatic injection, rectal administration intragastric administration, or any other suitable parenteral administration. In some embodiments, routes for local delivery closer to site of injury or inflammation are preferred over systemic routes. Routes, dosage, time points, and duration of administrating therapeutics may be adjusted. In some embodiments, administration of therapeutics is prior to, or after, onset of either, or both, acute and chronic symptoms of the disease or condition.

An effective dose and dosage of therapeutics to prevent or treat the disease or condition disclosed herein is defined by an observed beneficial response related to the disease or condition, or symptom of the disease or condition. Beneficial response comprises preventing, alleviating, arresting, or curing the disease or condition, or symptom of the disease or condition (e.g., reduced instances of diarrhea, rectal bleeding, weight loss, and size or number of intestinal lesions or strictures, reduced fibrosis or fibrogenesis, reduced fibrostenosis, reduced inflammation). In some embodiments, the beneficial response may be measured by detecting a measurable improvement in the presence, level, or activity, of biomarkers, transcriptomic risk profile, or intestinal microbiome in the subject. An "improvement," as used herein refers to shift in the presence, level, or activity towards a presence, level, or activity, observed in normal individuals (e.g. individuals who do not suffer from the disease or condition). In instances wherein the therapeutic agent is not therapeutically effective or is not providing a sufficient alleviation of the disease or condition, or symptom of the disease or condition, then the dosage amount and/or route of administration may be changed, or an additional agent may be administered to the subject along with the therapeutic agent. In some embodiments, as a patient is started on a regimen of a therapeutic agent, the patient is also weaned off (e.g., step-wise decrease in dose) a second treatment regimen.

Suitable dose and dosage administrated to a subject is determined by factors including, but no limited to, the particular therapeutic agent, disease condition and its severity, the identity (e.g., weight, sex, age) of the subject in need of treatment, and can be determined according to the particular circumstances surrounding the case, including, e.g., the specific agent being administered, the route of administration, the condition being treated, and the subject or host being treated. In general, however, doses employed for adult human treatment are typically in the range of 0.01 mg-5000 mg per day. In one aspect, doses employed for adult human treatment are from about 1 mg to about 1000 mg per day. In one embodiment, the desired dose is conveniently presented in a single dose or in divided doses administered simultaneously (or over a short period of time) or at appropriate intervals, for example as two, three, four or more sub-doses per day. Non-limiting examples of effective dosages of for oral delivery of a therapeutic agent include between about 0.1 mg/kg and about 100 mg/kg of body weight per day, and preferably between about 0.5 mg/kg and about 50 mg/kg of body weight per day. In other instances, the oral delivery dosage of effective amount is about 1 mg/kg and about 10 mg/kg of body weight per day of active material. Non-limiting examples of effective dosages for intravenous administration of the therapeutic agent include at a rate between about 0.01 to 100 pmol/kg body weight/min. In some embodiments, the daily dosage or the amount of active in the dosage form are lower or higher than the ranges indicated herein, based on a number of variables in regard to an individual treatment regime. In various embodiments, the daily and unit dosages are altered depending on a number of variables including, but not limited to, the activity of the therapeutic agent used, the disease or condition to be treated, the mode of administration, the requirements of the individual subject, the severity of the disease or condition being treated, and the judgment of the practitioner.

In some embodiments, the administration of the therapeutic agent is hourly, once every 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours 22 hours, 23 hours, 1 day, 2 days, 3 days, 4 days, 5 days, 6 days, 7 days, 8 days, 9 days, 10 days, 11 days, 12 days, 13 days, 14 days, 15 days, 1 month, 2 months, 3 months, 4 months, 5 months, 6 months, 7 months, 8 months, 9 months, 10 months, 11 months, 1 year, 2 years, 3 years, 4 years, or 5 years, or 10 years. The effective dosage ranges may be adjusted based on subject's response to the treatment. Some routes of administration will require higher concentrations of effective amount of therapeutics than other routes.

In certain embodiments wherein the patient's condition does not improve, upon the doctor's discretion the administration of therapeutic agent is administered chronically, that is, for an extended period of time, including throughout the duration of the patient's life in order to ameliorate or otherwise control or limit the symptoms of the patient's disease or condition. In certain embodiments wherein a patient's status does improve, the dose of therapeutic agent being administered may be temporarily reduced or temporarily suspended for a certain length of time (i.e., a "drug holiday"). In specific embodiments, the length of the drug holiday is between 2 days and 1 year, including by way of example only, 2 days, 3 days, 4 days, 5 days, 6 days, 7 days, 10 days, 12 days, 15 days, 20 days, 28 days, or more than 28 days. The dose reduction during a drug holiday is, by way of example only, by 10%-100%, including by way of example only 10%, 15%, 20%, 25%, 30%, 35%, 40%, 45%, 50%, 55%, 60%, 65%, 70%, 75%, 80%, 85%, 90%, 95%, and 100%. In certain embodiments, the dose of drug being administered may be temporarily reduced or temporarily suspended for a certain length of time (i.e., a "drug diversion"). In specific embodiments, the length of the drug diversion is between 2 days and 1 year, including by way of example only, 2 days, 3 days, 4 days, 5 days, 6 days, 7 days, 10 days, 12 days, 15 days, 20 days, 28 days, or more than 28 days. The dose reduction during a drug diversion is, by way of example only, by 10%-100%, including by way of example only 10%, 15%, 20%, 25%, 30%, 35%, 40%, 45%, 50%, 55%, 60%, 65%, 70%, 75%, 80%, 85%, 90%, 95%, and 100%. After a suitable length of time, the normal dosing schedule is optionally reinstated.

In some embodiments, once improvement of the patient's conditions has occurred, a maintenance dose is administered if necessary. Subsequently, in specific embodiments, the dosage or the frequency of administration, or both, is reduced, as a function of the symptoms, to a level at which the improved disease, disorder or condition is retained. In certain embodiments, however, the patient requires intermittent treatment on a long-term basis upon any recurrence of symptoms.

Toxicity and therapeutic efficacy of such therapeutic regimens are determined by standard pharmaceutical procedures in cell cultures or experimental animals, including, but not limited to, the determination of the LD50 and the ED50. The dose ratio between the toxic and therapeutic effects is the therapeutic index and it is expressed as the ratio between LD50 and ED50. In certain embodiments, the data obtained from cell culture assays and animal studies are used in formulating the therapeutically effective daily dosage range and/or the therapeutically effective unit dosage amount for use in mammals, including humans. In some embodiments, the daily dosage amount of the therapeutic agent described herein lies within a range of circulating concentrations that include the ED50 with minimal toxicity. In certain embodiments, the daily dosage range and/or the unit dosage amount varies within this range depending upon the dosage form employed and the route of administration utilized.

Additional Therapeutic

A therapeutic agent may be used alone or in combination with an additional therapeutic agent. In some cases, an "additional therapeutic agent" as used herein is administered alone. In some embodiments, the "additional therapeutic agent" is one of the therapeutic agents described herein (e.g., anti-TL1A antibody, RNASET2 agonist). The therapeutic agents may be administered together or sequentially. The combination therapies may be administered within the same day, or may be administered one or more days, weeks, months, or years apart. In some cases, a therapeutic agent provided herein is administered if the subject is determined to be non-responsive to a first line of therapy, e.g., such as TNF inhibitor. Such determination may be made by treatment with the first line therapy and monitoring of disease state and/or diagnostic determination that the subject would be non-responsive to the first line therapy.

In some embodiments, the additional therapeutic agent comprises an anti-TNF therapy, e.g., an anti-TNFα therapy. In some embodiments, the additional therapeutic agent comprises a second-line treatment to an anti-TNF therapy. In some embodiments, the additional therapeutic agent comprises an immunosuppressant, or a class of drugs that suppress, or reduce, the strength of the immune system. In some embodiments, the immunosuppressant is an antibody. Non-limiting examples of immunosuppressant therapeutic agents include STELARA® (ustekinumab) azathioprine (AZA), 6-mercaptopurine (6-MP), methotrexate, cyclosporin A. (CsA).

In some embodiments, the additional therapeutic agent comprises a selective anti-inflammatory drug, or a class of drugs that specifically target pro-inflammatory molecules in the body. In some embodiments, the anti-inflammatory drug comprises an antibody. In some embodiments, the anti-inflammatory drug comprises a small molecule. Non-limiting examples of anti-inflammatory drugs include ENTYVIO (vedolizumab), corticosteroids, aminosalicylates, mesalamine, balsalazide (Colazal) and olsalazine (Dipentum).

In some embodiments, the additional therapeutic agent comprises a stem cell therapy. The stem cell therapy may be embryonic or somatic stem cells. The stem cells may be isolated from a donor (allogeneic) or isolated from the subject (autologous). The stem cells may be expanded adipose-derived stem cells (eASCs), hematopoietic stem cells (HSCs), mesenchymal stem (stromal) cells (MSCs), or induced pluripotent stem cells (iPSCs) derived from the cells of the subject. In some embodiments, the therapeutic agent comprises Cx601/Alofisel® (darvadstrocel).

In some embodiments, the additional therapeutic agent comprises a small molecule. The small molecule may be used to treat inflammatory diseases or conditions, or fibrostenonic or fibrotic disease. Non-limiting examples of small molecules include Otezla® (apremilast), alicaforsen, or ozanimod (RPC-1063).

In some embodiments, the additional therapeutic agent comprises an agonist or antagonist of Janus Kinase 1 (JAK1) (Entrez Gene ID: 3716). Non-limiting examples of JAK1 inhibitors include Ruxolitinib (INCB018424), S-Ruxolitinib (INCB018424), Baricitinib (LY3009104, INCB028050), Filgotinib (GLPG0634), Momelotinib (CYT387), Cerdulatinib (PRT062070, PRT2070), LY2784544, NVP-BSK805, 2HCl, Tofacitinib (CP-690550, Tasocitinib), XL019, Pacritinib (SB1518), or ZM 39923 HCl.

In some instances, the additional therapeutic agent comprises administering to the subject an antimycotic agent. In some instances, the antimycotic agent comprises an active agent that inhibits growth of a fungus. In some instances, the antimycotic agent comprises an active agent that kills a fungus. In some embodiments, the antimycotic agent comprises polyene, an azole, an echinocandin, an flucytosine, an allylamine, a tolnaftate, or griseofulvin, or a combination thereof. In other embodiments, the azole comprises triazole, imidazole, clotrimazole, ketoconazole, itraconazole, terconazole, oxiconazole, miconazole, econazole, tioconazole, voriconazole, fluconazole, isavuconazole, itraconazole, pramiconazole, ravuconazole, or posaconazole. In some other embodiments, the polyene comprises amphotericin B, nystatin, or natamycin. In yet other embodiments, the echinocandin comprises caspofungin, anidulafungin, or micafungin. In various other embodiments, the allylamine comprises naftifine or terbinafine.

Pharmaceutical Composition

A pharmaceutical composition, as used herein, refers to a mixture of a therapeutic agent, with other chemical components (i.e. pharmaceutically acceptable inactive ingredients), such as carriers, excipients, binders, filling agents, suspending agents, flavoring agents, sweetening agents, disintegrating agents, dispersing agents, surfactants, lubricants, colorants, diluents, solubilizers, moistening agents, plasticizers, stabilizers, penetration enhancers, wetting agents, antifoaming agents, antioxidants, preservatives, or one or more combination thereof. Optionally, the compositions include two or more therapeutic agent (e.g., one or more therapeutic agents and one or more additional agents) as discussed herein. In practicing the methods of treatment or use provided herein, therapeutically effective amounts of therapeutic agents described herein are administered in a pharmaceutical composition to a mammal having a disease, disorder, or condition to be treated, e.g., an inflammatory disease, fibrostenotic disease, and/or fibrotic disease. In some embodiments, the mammal is a human. A therapeutically effective amount can vary widely depending on the severity of the disease, the age and relative health of the subject, the potency of the therapeutic agent used and other factors. The therapeutic agents can be used singly or in combination with one or more therapeutic agents as components of mixtures.

The pharmaceutical formulations described herein are administered to a subject by appropriate administration routes, including but not limited to, intravenous, intraarterial, oral, parenteral, buccal, topical, transdermal, rectal, intramuscular, subcutaneous, intraosseous, transmucosal, inhalation, or intraperitoneal administration routes. The pharmaceutical formulations described herein include, but are not limited to, aqueous liquid dispersions, self-emulsifying dispersions, solid solutions, liposomal dispersions, aerosols, solid dosage forms, powders, immediate release formulations, controlled release formulations, fast melt formulations, tablets, capsules, pills, delayed release formulations, extended release formulations, pulsatile release formulations, multiparticulate formulations, and mixed immediate and controlled release formulations.

Pharmaceutical compositions including a therapeutic agent are manufactured in a conventional manner, such as, by way of example only, by means of conventional mixing, dissolving, granulating, dragee-making, levigating, emulsifying, encapsulating, entrapping or compression processes.

The pharmaceutical compositions may include at least a therapeutic agent as an active ingredient in free-acid or free-base form, or in a pharmaceutically acceptable salt form. In addition, the methods and pharmaceutical compositions described herein include the use of N-oxides (if appropriate), crystalline forms, amorphous phases, as well as active metabolites of these compounds having the same type of activity. In some embodiments, therapeutic agents exist in unsolvated form or in solvated forms with pharmaceutically acceptable solvents such as water, ethanol, and the like. The solvated forms of the therapeutic agents are also considered to be disclosed herein.

In some embodiments, a therapeutic agent exists as a tautomer. All tautomers are included within the scope of the agents presented herein. As such, it is to be understood that a therapeutic agent or a salt thereof may exhibit the phenomenon of tautomerism whereby two chemical compounds that are capable of facile interconversion by exchanging a hydrogen atom between two atoms, to either of which it forms a covalent bond Since the tautomeric compounds exist in mobile equilibrium with each other they may be regarded as different isomeric forms of the same compound.

In some embodiments, a therapeutic agent exists as an enantiomer, diastereomer, or other stereoisomeric form. The agents disclosed herein include all enantiomeric, diastereomeric, and epimeric forms as well as mixtures thereof.

In some embodiments, therapeutic agents described herein may be prepared as prodrugs. A "prodrug" refers to an agent that is converted into the parent drug in vivo. Prodrugs are often useful because, in some situations, they may be easier to administer than the parent drug. They may, for instance, be bioavailable by oral administration whereas the parent is not. The prodrug may also have improved solubility in pharmaceutical compositions over the parent drug. An example, without limitation, of a prodrug would be a therapeutic agent described herein, which is administered as an ester (the "prodrug") to facilitate transmittal across a cell membrane where water solubility is detrimental to mobility but which then is metabolically hydrolyzed to the carboxylic acid, the active entity, once inside the cell where water-solubility is beneficial. A further example of a prodrug might be a short peptide (polyaminoacid) bonded to an acid group where the peptide is metabolized to reveal the active moiety. In certain embodiments, upon in vivo administration, a prodrug is chemically converted to the biologically, pharmaceutically or therapeutically active form of the therapeutic agent. In certain embodiments, a prodrug is enzymatically metabolized by one or more steps or processes to the biologically, pharmaceutically or therapeutically active form of the therapeutic agent.

Prodrug forms of the therapeutic agents, wherein the prodrug is metabolized in vivo to produce an agent as set forth herein are included within the scope of the claims. Prodrug forms of the herein described therapeutic agents, wherein the prodrug is metabolized in vivo to produce an agent as set forth herein are included within the scope of the claims. In some cases, some of the therapeutic agents described herein may be a prodrug for another derivative or active compound. In some embodiments described herein, hydrazones are metabolized in vivo to produce a therapeutic agent.

In certain embodiments, compositions provided herein include one or more preservatives to inhibit microbial activity. Suitable preservatives include mercury-containing substances such as merfen and thiomersal; stabilized chlorine dioxide; and quaternary ammonium compounds such as benzalkonium chloride, cetyltrimethylammonium bromide and cetylpyridinium chloride.

In some embodiments, formulations described herein benefit from antioxidants, metal chelating agents, thiol containing compounds and other general stabilizing agents. Examples of such stabilizing agents, include, but are not limited to: (a) about 0.5% to about 2% w/v glycerol, (b) about 0.1% to about 1% w/v methionine, (c) about 0.1% to about 2% w/v monothioglycerol, (d) about 1 mM to about 10 mM EDTA, (e) about 0.01% to about 2% w/v ascorbic acid, (f) 0.003% to about 0.02% w/v polysorbate 80, (g) 0.001% to about 0.05% w/v. polysorbate 20, (h) arginine, (i) heparin, (j) dextran sulfate, (k) cyclodextrins, (l) pentosan polysulfate and other heparinoids, (m) divalent cations such as magnesium and zinc; or (n) combinations thereof.

The pharmaceutical compositions described herein are formulated into any suitable dosage form, including but not limited to, aqueous oral dispersions, liquids, gels, syrups, elixirs, slurries, suspensions, solid oral dosage forms, aerosols, controlled release formulations, fast melt formulations, effervescent formulations, lyophilized formulations, tablets, powders, pills, dragees, capsules, delayed release formulations, extended release formulations, pulsatile release formulations, multiparticulate formulations, and mixed immediate release and controlled release formulations. In one aspect, a therapeutic agent as discussed herein, e.g., therapeutic agent is formulated into a pharmaceutical composition suitable for intramuscular, subcutaneous, or intravenous injection. In one aspect, formulations suitable for intramuscular, subcutaneous, or intravenous injection include physiologically acceptable sterile aqueous or non-aqueous solutions, dispersions, suspensions or emulsions, and sterile powders for reconstitution into sterile injectable solutions or dispersions. Examples of suitable aqueous and non-aqueous carriers, diluents, solvents, or vehicles include water, ethanol, polyols (propyleneglycol, polyethylene-glycol, glycerol, cremophor and the like), suitable mixtures thereof, vegetable oils (such as olive oil) and injectable organic esters such as ethyl oleate. Proper fluidity can be maintained, for example, by the use of a coating such as lecithin, by the maintenance of the required particle size in the case of dispersions, and by the use of surfactants. In some embodiments, formulations suitable for subcutaneous injection also contain additives such as preserving, wetting, emulsifying, and dispensing agents. Prevention of the growth of microorganisms can be ensured by various antibacterial and antifungal agents, such as parabens, chlorobutanol, phenol, sorbic acid, and the like. In some cases it is desirable to include isotonic agents, such as sugars, sodium chloride, and the like. Prolonged absorption of the injectable pharmaceutical form can be brought about by the use of agents delaying absorption, such as aluminum monostearate and gelatin.

For intravenous injections or drips or infusions, a therapeutic agent described herein is formulated in aqueous solutions, preferably in physiologically compatible buffers such as Hank's solution, Ringer's solution, or physiological saline buffer. For transmucosal administration, penetrants appropriate to the barrier to be permeated are used in the formulation. Such penetrants are generally known in the art. For other parenteral injections, appropriate formulations include aqueous or nonaqueous solutions, preferably with physiologically compatible buffers or excipients. Such excipients are known.

Parenteral injections may involve bolus injection or continuous infusion. Formulations for injection may be presented in unit dosage form, e.g., in ampoules or in multi-dose containers, with an added preservative. The pharmaceutical composition described herein may be in a form suitable for parenteral injection as a sterile suspensions, solutions or emulsions in oily or aqueous vehicles, and may contain formulatory agents such as suspending, stabilizing and/or dispersing agents. In one aspect, the active ingredient is in powder form for constitution with a suitable vehicle, e.g., sterile pyrogen-free water, before use.

For administration by inhalation, a therapeutic agent is formulated for use as an aerosol, a mist or a powder. Pharmaceutical compositions described herein are conveniently delivered in the form of an aerosol spray presentation from pressurized packs or a nebuliser, with the use of a suitable propellant, e.g., dichlorodifluoromethane, trichlorofluoromethane, dichlorotetrafluoroethane, carbon dioxide or other suitable gas. In the case of a pressurized aerosol, the dosage unit may be determined by providing a valve to deliver a metered amount. Capsules and cartridges of, such as, by way of example only, gelatin for use in an inhaler or insufflator may be formulated containing a powder mix of the therapeutic agent described herein and a suitable powder base such as lactose or starch.

Representative intranasal formulations are described in, for example, U.S. Pat. Nos. 4,476,116, 5,116,817 and 6,391,452, which are incorporated by reference. Formulations that include a therapeutic agent are prepared as solutions in saline, employing benzyl alcohol or other suitable preservatives, fluorocarbons, and/or other solubilizing or dispersing agents known in the art. See, for example, Ansel, H. C. et al., Pharmaceutical Dosage Forms and Drug Delivery Systems, Sixth Ed (1995). Preferably these compositions and formulations are prepared with suitable nontoxic pharmaceutically acceptable ingredients. These ingredients are known to those skilled in the preparation of nasal dosage forms and some of these can be found in REMINGTON: THE SCIENCE AND PRACTICE OF PHARMACY, 21st edition, 2005. The choice of suitable carriers is dependent upon the exact nature of the nasal dosage form desired, e.g., solutions, suspensions, ointments, or gels. Nasal dosage forms generally contain large amounts of water in addition to the active ingredient. Minor amounts of other ingredients such as pH adjusters, emulsifiers or dispersing agents, preservatives, surfactants, gelling agents, or buffering and other stabilizing and solubilizing agents are optionally present. Preferably, the nasal dosage form should be isotonic with nasal secretions.

Pharmaceutical preparations for oral use are obtained by mixing one or more solid excipient with one or more of the therapeutic agents described herein, optionally grinding the resulting mixture, and processing the mixture of granules, after adding suitable auxiliaries, if desired, to obtain tablets or dragee cores. Suitable excipients include, for example, fillers such as sugars, including lactose, sucrose, mannitol, or sorbitol; cellulose preparations such as, for example, maize starch, wheat starch, rice starch, potato starch, gelatin, gum tragacanth, methylcellulose, microcrystalline cellulose, hydroxypropylmethylcellulose, sodium carboxymethylcellulose; or others such as: polyvinylpyrrolidone (PVP or povidone) or calcium phosphate. If desired, disintegrating agents are added, such as the cross-linked croscarmellose sodium, polyvinylpyrrolidone, agar, or alginic acid or a salt thereof such as sodium alginate. In some embodiments, dyestuffs or pigments are added to the tablets or dragee coatings for identification or to characterize different combinations of active therapeutic agent doses.

In some embodiments, pharmaceutical formulations of a therapeutic agent are in the form of a capsules, including push-fit capsules made of gelatin, as well as soft, sealed capsules made of gelatin and a plasticizer, such as glycerol or sorbitol. The push-fit capsules contain the active ingredients in admixture with filler such as lactose, binders such as starches, and/or lubricants such as talc or magnesium stearate and, optionally, stabilizers. In soft capsules, the active therapeutic agent is dissolved or suspended in suitable liquids, such as fatty oils, liquid paraffin, or liquid polyethylene glycols. In some embodiments, stabilizers are added A capsule may be prepared, for example, by placing the bulk blend of the formulation of the therapeutic agent inside of a capsule. In some embodiments, the formulations (non-aqueous suspensions and solutions) are placed in a soft gelatin capsule. In other embodiments, the formulations are placed in standard gelatin capsules or non-gelatin capsules such as capsules comprising HPMC. In other embodiments, the formulation is placed in a sprinkle capsule, wherein the capsule is swallowed whole or the capsule is opened and the contents sprinkled on food prior to eating.

All formulations for oral administration are in dosages suitable for such administration. In one aspect, solid oral dosage forms are prepared by mixing a therapeutic agent with one or more of the following: antioxidants, flavoring agents, and carrier materials such as binders, suspending agents, disintegration agents, filling agents, surfactants, solubilizers, stabilizers, lubricants, wetting agents, and diluents. In some embodiments, the solid dosage forms disclosed herein are in the form of a tablet, (including a suspension tablet, a fast-melt tablet, a bite-disintegration tablet, a rapid-disintegration tablet, an effervescent tablet, or a caplet), a pill, a powder, a capsule, solid dispersion, solid solution, bioerodible dosage form, controlled release formulations, pulsatile release dosage forms, multiparticulate dosage forms, beads, pellets, granules. In other embodiments, the pharmaceutical formulation is in the form of a powder. Compressed tablets are solid dosage forms prepared by compacting the bulk blend of the formulations described above. In various embodiments, tablets will include one or more flavoring agents. In other embodiments, the tablets will include a film surrounding the final compressed tablet. In some embodiments, the film coating can provide a delayed release of a therapeutic agent from the formulation. In other embodiments, the film coating aids in patient compliance (e.g., Opadry® coatings or sugar coating). Film coatings including Opadry® typically range from about 1% to about 3% of the tablet weight. In some embodiments, solid dosage forms, e.g., tablets, effervescent tablets, and capsules, are prepared by mixing particles of a therapeutic agent with one or more pharmaceutical excipients to form a bulk blend composition. The bulk blend is readily subdivided into equally effective unit dosage forms, such as tablets, pills, and capsules. In some embodiments, the individual unit dosages include film coatings. These formulations are manufactured by conventional formulation techniques.

In another aspect, dosage forms include microencapsulated formulations. In some embodiments, one or more other compatible materials are present in the microencapsulation material. Exemplary materials include, but are not limited to, pH modifiers, erosion facilitators, anti-foaming agents, antioxidants, flavoring agents, and carrier materials such as binders, suspending agents, disintegration agents, filling agents, surfactants, solubilizers, stabilizers, lubricants, wetting agents, and diluents. Exemplary useful microencapsulation materials include, but are not limited to, hydroxypropyl cellulose ethers (HPC) such as Klucel® or Nisso HPC, low-substituted hydroxypropyl cellulose ethers (L-HPC), hydroxypropyl methyl cellulose ethers (HPMC) such as Seppifilm-LC, Pharmacoat®, Metolose SR, Methocel®-E, Opadry YS, PrimaFlo, Benecel MP824, and Benecel MP843, methylcellulose polymers such as Methocel®-A, hydroxypropylmethylcellulose acetate stearate Aqoat (HF-LS, HF-LG, HF-MS) and Metolose®, Ethylcelluloses (EC) and mixtures thereof such as E461, Ethocel®, Aqualon®-EC, Surelease®, Polyvinyl alcohol (PVA) such as Opadry AMB, hydroxyethylcelluloses such as Natrosol®, carboxymethylcelluloses and salts of carboxymethylcelluloses (CMC) such as Aqualon®-CMC, polyvinyl alcohol and polyethylene glycol co-polymers such as Kollicoat IR®, monoglycerides (Myverol), triglycerides (KLX), polyethylene glycols, modified food starch, acrylic polymers and mixtures of acrylic polymers with cellulose ethers such as Eudragit® EPO, Eudragit® L30D-55, Eudragit® FS 30D Eudragit® L100-55, Eudragit® L100, Eudragit® S100, Eudragit® RD100, Eudragit® E100, Eudragit® L12.5, Eudragit® S12.5, Eudragit® NE30D, and Eudragit® NE 40D, cellulose acetate phthalate, sepifilms such as mixtures of HPMC and stearic acid, cyclodextrins, and mixtures of these materials.

Liquid formulation dosage forms for oral administration are optionally aqueous suspensions selected from the group including, but not limited to, pharmaceutically acceptable aqueous oral dispersions, emulsions, solutions, elixirs, gels, and syrups. See, e.g., Singh et al., Encyclopedia of Pharmaceutical Technology, 2nd Ed., pp. 754-757 (2002). In addition to therapeutic agent the liquid dosage forms optionally include additives, such as: (a) disintegrating agents; (b) dispersing agents; (c) wetting agents; (d) at least one preservative, (e) viscosity enhancing agents, (f) at least one sweetening agent, and (g) at least one flavoring agent. In some embodiments, the aqueous dispersions further includes a crystal-forming inhibitor.

In some embodiments, the pharmaceutical formulations described herein are self-emulsifying drug delivery systems (SEDDS). Emulsions are dispersions of one immiscible phase in another, usually in the form of droplets. Generally, emulsions are created by vigorous mechanical dispersion. SEDDS, as opposed to emulsions or microemulsions, spontaneously form emulsions when added to an excess of water without any external mechanical dispersion or agitation. An advantage of SEDDS is that only gentle mixing is required to distribute the droplets throughout the solution. Additionally, water or the aqueous phase is optionally added just prior to administration, which ensures stability of an unstable or hydrophobic active ingredient. Thus, the SEDDS provides an effective delivery system for oral and parenteral delivery of hydrophobic active ingredients. In some embodiments, SEDDS provides improvements in the bioavailability of hydrophobic active ingredients. Methods of producing self-emulsifying dosage forms include, but are not limited to, for example, U.S. Pat. Nos. 5,858,401, 6,667,048, and 6,960,563.

Buccal formulations that include a therapeutic agent are administered using a variety of formulations known in the art. For example, such formulations include, but are not limited to, U.S. Pat. Nos. 4,229,447, 4,596,795, 4,755,386, and 5,739,136. In addition, the buccal dosage forms described herein can further include a bioerodible (hydrolysable) polymeric carrier that also serves to adhere the dosage form to the buccal mucosa. For buccal or sublingual administration, the compositions may take the form of tablets, lozenges, or gels formulated in a conventional manner.

For intravenous injections, a therapeutic agent is optionally formulated in aqueous solutions, preferably in physiologically compatible buffers such as Hank's solution, Ringer's solution, or physiological saline buffer. For transmucosal administration, penetrants appropriate to the barrier to be permeated are used in the formulation. For other parenteral injections, appropriate formulations include aqueous or nonaqueous solutions, preferably with physiologically compatible buffers or excipients.

Parenteral injections optionally involve bolus injection or continuous infusion. Formulations for injection are optionally presented in unit dosage form, e.g., in ampoules or in multi dose containers, with an added preservative. In some embodiments, a pharmaceutical composition described herein is in a form suitable for parenteral injection as a sterile suspensions, solutions or emulsions in oily or aqueous vehicles, and contain formulatory agents such as suspending, stabilizing and/or dispersing agents. Pharmaceutical formulations for parenteral administration include aqueous solutions of an agent that modulates the activity of a carotid body in water soluble form. Additionally, suspensions of an agent that modulates the activity of a carotid body are optionally prepared as appropriate, e.g., oily injection suspensions.

Conventional formulation techniques include, e.g., one or a combination of methods: (1) dry mixing (2) direct compression, (3) milling (4) dry or non-aqueous granulation, (5) wet granulation, or (6) fusion. Other methods include, e.g., spray drying, pan coating, melt granulation, granulation, fluidized bed spray drying or coating (e.g., wurster coating), tangential coating, top spraying, tableting, extruding and the like.

Suitable carriers for use in the solid dosage forms described herein include, but are not limited to, acacia, gelatin, colloidal silicon dioxide, calcium glycerophosphate, calcium lactate, maltodextrin, glycerine, magnesium silicate, sodium caseinate, soy lecithin, sodium chloride, tricalcium phosphate, dipotassium phosphate, sodium stearoyl lactylate, carrageenan, monoglyceride, diglyceride, pregelatinized starch, hydroxypropylmethylcellulose, hydroxypropylmethylcellulose acetate stearate, sucrose, microcrystalline cellulose, lactose, mannitol and the like.

Suitable filling agents for use in the solid dosage forms described herein include, but are not limited to, lactose, calcium carbonate, calcium phosphate, dibasic calcium phosphate, calcium sulfate, microcrystalline cellulose, cellulose powder, dextrose, dextrates, dextran, starches, pregelatinized starch, hydroxypropylmethylcellulose (HPMC), hydroxypropylmethycellulose phthalate, hydroxypropylmethylcellulose acetate stearate (HPMCAS), sucrose, xylitol, lactitol, mannitol, sorbitol, sodium chloride, polyethylene glycol, and the like.

Suitable disintegrants for use in the solid dosage forms described herein include, but are not limited to, natural starch such as corn starch or potato starch, a pregelatinized starch, or sodium starch glycolate, a cellulose such as methylcrystalline cellulose, methylcellulose, microcrystalline cellulose, croscarmellose, or a cross-linked cellulose, such as cross-linked sodium carboxymethylcellulose, cross-linked carboxymethylcellulose, or cross-linked croscarmellose, a cross-linked starch such as sodium starch glycolate, a cross-linked polymer such as crospovidone, a cross-linked polyvinylpyrrolidone, alginate such as alginic acid or a salt of alginic acid such as sodium alginate, a gum such as agar, guar, locust bean, Karaya, pectin, or tragacanth, sodium starch glycolate, bentonite, sodium lauryl sulfate, sodium lauryl sulfate in combination starch, and the like.

Binders impart cohesiveness to solid oral dosage form formulations: for powder filled capsule formulation, they aid in plug formation that can be filled into soft or hard shell capsules and for tablet formulation, they ensure the tablet remaining intact after compression and help assure blend uniformity prior to a compression or fill step. Materials suitable for use as binders in the solid dosage forms described herein include, but are not limited to, carboxymethylcellulose, methylcellulose, hydroxypropylmethylcellulose, hydroxypropylmethylcellulose acetate stearate, hydroxyethylcellulose, hydroxypropylcellulose, ethylcellulose, and microcrystalline cellulose, microcrystalline dextrose, amylose, magnesium aluminum silicate, polysaccharide acids, bentonites, gelatin, polyvinylpyrrolidone/vinyl acetate copolymer, crospovidone, povidone, starch, pregelatinized starch, tragacanth, dextrin, a sugar, such as sucrose, glucose, dextrose, molasses, mannitol, sorbitol, xylitol, lactose, a natural or synthetic gum such as acacia, tragacanth, ghatti gum, mucilage of isapol husks, starch, polyvinylpyrrolidone, larch arabogalactan, polyethylene glycol, waxes, sodium alginate, and the like.

In general, binder levels of 20-70% are used in powder-filled gelatin capsule formulations. Binder usage level in tablet formulations vanes whether direct compression, wet granulation, roller compaction, or usage of other excipients such as fillers which itself can act as moderate binder. Binder levels of up to 70% in tablet formulations is common.

Suitable lubricants or glidants for use in the solid dosage forms described herein include, but are not limited to, stearic acid, calcium hydroxide, talc, corn starch, sodium stearyl fumerate, alkali-metal and alkaline earth metal salts, such as aluminum, calcium, magnesium, zinc, stearic acid, sodium stearates, magnesium stearate, zinc stearate, waxes, Stearowet®, boric acid, sodium benzoate, sodium acetate, sodium chloride, leucine, a polyethylene glycol or a methoxypolyethylene glycol such as Carbowax™, PEG 4000, PEG 5000, PEG 6000, propylene glycol, sodium oleate, glyceryl behenate, glyceryl palmitostearate, glyceryl benzoate, magnesium or sodium lauryl sulfate, and the like.

Suitable diluents for use in the solid dosage forms described herein include, but are not limited to, sugars (including lactose, sucrose, and dextrose), polysaccharides (including dextrates and maltodextrin), polyols (including mannitol, xylitol, and sorbitol), cyclodextrins and the like.

Suitable wetting agents for use in the solid dosage forms described herein include, for example, oleic acid, glyceryl monostearate, sorbitan monooleate, sorbitan monolaurate, triethanolamine oleate, polyoxyethylene sorbitan monooleate, polyoxyethylene sorbitan monolaurate, quaternary ammonium compounds (e.g., Polyquat 10®), sodium oleate, sodium lauryl sulfate, magnesium stearate, sodium docusate, triacetin, vitamin E TPGS and the like.

Suitable surfactants for use in the solid dosage forms described herein include, for example, sodium lauryl sulfate, sorbitan monooleate, polyoxyethylene sorbitan monooleate, polysorbates, polaxomers, bile salts, glyceryl monostearate, copolymers of ethylene oxide and propylene oxide, e.g., Pluronic® (BASF), and the like.

Suitable suspending agents for use in the solid dosage forms described here include, but are not limited to, polyvinylpyrrolidone, e.g., polyvinylpyrrolidone K12, polyvinylpyrrolidone K17, polyvinylpyrrolidone K25, or polyvinylpyrrolidone K30, polyethylene glycol, e.g., the polyethylene glycol can have a molecular weight of about 300 to about 6000, or about 3350 to about 4000, or about 7000 to about 5400, vinyl pyrrolidone/vinyl acetate copolymer (S630), sodium carboxymethylcellulose, methylcellulose, hydroxy-propylmethylcellulose, polysorbate-80, hydroxyethylcellulose, sodium alginate, gums, such as, e.g., gum tragacanth and gum acacia, guar gum, xanthans, including xanthan gum, sugars, cellulosics, such as, e.g., sodium carboxymethylcellulose, methylcellulose, sodium carboxymethylcellulose, hydroxypropylmethylcellulose, hydroxyethylcellulose, polysorbate-80, sodium alginate, polyethoxylated sorbitan monolaurate, polyethoxylated sorbitan monolaurate, povidone and the like.

Suitable antioxidants for use in the solid dosage forms described herein include, for example, e.g., butylated hydroxytoluene (BHT), sodium ascorbate, and tocopherol.

It should be appreciated that there is considerable overlap between additives used in the solid dosage forms described herein. Thus, the above-listed additives should be taken as merely exemplary, and not limiting, of the types of additives that can be included in solid dosage forms of the pharmaceutical compositions described herein. The amounts of such additives can be readily determined by one skilled in the art, according to the particular properties desired.

In various embodiments, the particles of a therapeutic agents and one or more excipients are dry blended and compressed into a mass, such as a tablet, having a hardness sufficient to provide a pharmaceutical composition that substantially disintegrates within less than about 30 minutes, less than about 35 minutes, less than about 40 minutes, less than about 45 minutes, less than about 50 minutes, less than about 55 minutes, or less than about 60 minutes, after oral administration, thereby releasing the formulation into the gastrointestinal fluid.

In other embodiments, a powder including a therapeutic agent is formulated to include one or more pharmaceutical excipients and flavors. Such a powder is prepared, for example, by mixing the therapeutic agent and optional pharmaceutical excipients to form a bulk blend composition. Additional embodiments also include a suspending agent and/or a wetting agent. This bulk blend is uniformly subdivided into unit dosage packaging or multi-dosage packaging units.

In still other embodiments, effervescent powders are also prepared Effervescent salts have been used to disperse medicines in water for oral administration.

In some embodiments, the pharmaceutical dosage forms are formulated to provide a controlled release of a therapeutic agent. Controlled release refers to the release of the therapeutic agent from a dosage form in which it is incorporated according to a desired profile over an extended period of time. Controlled release profiles include, for example, sustained release, prolonged release, pulsatile release, and delayed release profiles. In contrast to immediate release compositions, controlled release compositions allow delivery of an agent to a subject over an extended period of time according to a predetermined profile. Such release rates can provide therapeutically effective levels of agent for an extended period of time and thereby provide a longer period of pharmacologic response while minimizing side effects as compared to conventional rapid release dosage forms. Such longer periods of response provide for many inherent benefits that are not achieved with the corresponding short acting, immediate release preparations.

In some embodiments, the solid dosage forms described herein are formulated as enteric coated delayed release oral dosage forms, i.e., as an oral dosage form of a pharmaceutical composition as described herein which utilizes an enteric coating to affect release in the small intestine or large intestine. In one aspect, the enteric coated dosage form is a compressed or molded or extruded tablet/mold (coated or uncoated) containing granules, powder, pellets, beads or particles of the active ingredient and/or other composition components, which are themselves coated or uncoated. In one aspect, the enteric coated oral dosage form is in the form of a capsule containing pellets, beads or granules, which include a therapeutic agent that are coated or uncoated.

Any coatings of some embodiments should be applied to a sufficient thickness such that the entire coating does not dissolve in the gastrointestinal fluids at pH below about 5, but does dissolve at pH about 5 and above. Coatings are typically selected from any of the following. Shellac—this coating dissolves in media of pH>7; Acrylic polymers—examples of suitable acrylic polymers include methacrylic acid copolymers and ammonium methacrylate copolymers. The Eudragit series E, L, S, RL, RS and NE (Rohm Pharma) are available as solubilized in organic solvent, aqueous dispersion, or dry powders. The Eudragit series RL, NE, and RS are insoluble in the gastrointestinal tract but are permeable and are used primarily for colonic targeting. The Eudragit series E dissolve in the stomach. The Eudragit series L, L-30D and S are insoluble in stomach and dissolve in the intestine; Poly Vinyl Acetate Phthalate (PVAP)—PVAP dissolves in pH>5, and it is much less permeable to water vapor and gastric fluids. Conventional coating techniques such as spray or pan coating are employed to apply coatings. The coating thickness of some embodiments must be sufficient to ensure that the oral dosage form remains intact until the desired site of topical delivery in the intestinal tract is reached.

In other embodiments, the formulations described herein are delivered using a pulsatile dosage form. A pulsatile dosage form is capable of providing one or more immediate release pulses at predetermined time points after a controlled lag time or at specific sites. Exemplary pulsatile dosage forms and methods of their manufacture are disclosed in U.S. Pat. Nos. 5,011,692, 5,017,381, 5,229,135, 5,840,329 and 5,837,284. In one embodiment, the pulsatile dosage form includes at least two groups of particles, (i.e. multiparticulate) each containing the formulation described herein. The first group of particles provides a substantially immediate dose of a therapeutic agent upon ingestion by a mammal. The first group of particles can be either uncoated or include a coating and/or sealant. In one aspect, the second group of particles comprises coated particles. The coating on the second group of particles provides a delay of from about 2 hours to about 7 hours following ingestion before release of the second dose. Suitable coatings for pharmaceutical compositions are described herein or known in the art.

In some embodiments, pharmaceutical formulations are provided that include particles of a therapeutic agent and at least one dispersing agent or suspending agent for oral administration to a subject. The formulations may be a powder and/or granules for suspension, and upon admixture with water, a substantially uniform suspension is obtained.

In some embodiments, particles formulated for controlled release are incorporated in a gel or a patch or a wound dressing.

In one aspect, liquid formulation dosage forms for oral administration and/or for topical administration as a wash are in the form of aqueous suspensions selected from the group including, but not limited to, pharmaceutically acceptable aqueous oral dispersions, emulsions, solutions, elixirs, gels, and syrups. See, e.g., Singh et al., Encyclopedia of Pharmaceutical Technology, 2nd Ed., pp. 754-757 (2002). In addition to the particles of a therapeutic agent, the liquid dosage forms include additives, such as: (a) disintegrating agents; (b) dispersing agents; (c) wetting agents; (d) at least one preservative, (e) viscosity enhancing agents, (f) at least one sweetening agent, and (g) at least one flavoring agent. In some embodiments, the aqueous dispersions can further include a crystalline inhibitor.

In some embodiments, the liquid formulations also include inert diluents commonly used in the art, such as water or other solvents, solubilizing agents, and emulsifiers. Exemplary emulsifiers are ethyl alcohol, isopropyl alcohol, ethyl carbonate, ethyl acetate, benzyl alcohol, benzyl benzoate, propyleneglycol, 1,3-butyleneglycol, dimethylformamide, sodium lauryl sulfate, sodium doccusate, cholesterol, cholesterol esters, taurocholic acid, phosphotidylcholine, oils, such as cottonseed oil, groundnut oil, corn germ oil, olive oil, castor oil, and sesame oil, glycerol, tetrahydrofurfuryl alcohol, polyethylene glycols, fatty acid esters of sorbitan, or mixtures of these substances, and the like.

Furthermore, pharmaceutical compositions optionally include one or more pH adjusting agents or buffering agents, including acids such as acetic, boric, citric, lactic, phosphoric and hydrochloric acids; bases such as sodium hydroxide, sodium phosphate, sodium borate, sodium citrate, sodium acetate, sodium lactate and tris-hydroxymethylaminomethane; and buffers such as citrate/dextrose, sodium bicarbonate and ammonium chloride. Such acids, bases and buffers are included in an amount required to maintain pH of the composition in an acceptable range.

Additionally, pharmaceutical compositions optionally include one or more salts in an amount required to bring osmolality of the composition into an acceptable range. Such salts include those having sodium, potassium or ammonium cations and chloride, citrate, ascorbate, borate, phosphate, bicarbonate, sulfate, thiosulfate or bisulfite anions; suitable salts include sodium chloride, potassium chloride, sodium thiosulfate, sodium bisulfite and ammonium sulfate.

Other pharmaceutical compositions optionally include one or more preservatives to inhibit microbial activity. Suitable preservatives include mercury-containing substances such as merfen and thiomersal; stabilized chlorine dioxide; and quaternary ammonium compounds such as benzalkonium chloride, cetyltrimethylammonium bromide and cetylpyridinium chloride.

In one embodiment, the aqueous suspensions and dispersions described herein remain in a homogenous state, as defined in The USP Pharmacists' Pharmacopeia (2005 edition, chapter 905), for at least 4 hours. In one embodiment, an aqueous suspension is re-suspended into a homogenous suspension by physical agitation lasting less than 1 minute. In still another embodiment, no agitation is necessary to maintain a homogeneous aqueous dispersion.

Examples of disintegrating agents for use in the aqueous suspensions and dispersions include, but are not limited to, a starch, e.g., a natural starch such as corn starch or potato starch, a pregelatinized starch, or sodium starch glycolate; a cellulose such as methylcrystalline cellulose, methylcellulose, croscarmellose, or a cross-linked cellulose, such as cross-linked sodium carboxymethylcellulose, cross-linked carboxymethylcellulose, or cross-linked croscarmellose; a cross-linked starch such as sodium starch glycolate; a cross-linked polymer such as crospovidone; a cross-linked polyvinylpyrrolidone; alginate such as alginic acid or a salt of alginic acid such as sodium alginate; a gum such as agar, guar, locust bean, Karaya, pectin, or tragacanth; sodium starch glycolate; bentonite; a natural sponge; a surfactant; a resin such as a cation-exchange resin; citrus pulp; sodium lauryl sulfate; sodium lauryl sulfate in combination starch; and the like.

In some embodiments, the dispersing agents suitable for the aqueous suspensions and dispersions described herein include, for example, hydrophilic polymers, electrolytes, Tween® 60 or 80, PEG, polyvinylpyrrolidone, and the carbohydrate-based dispersing agents such as, for example, hydroxypropylcellulose and hydroxypropyl cellulose ethers, hydroxypropyl methylcellulose and hydroxypropyl methylcellulose ethers, carboxymethylcellulose sodium, methylcellulose, hydroxyethylcellulose, hydroxypropylmethyl-cellulose phthalate, hydroxypropylmethyl-cellulose acetate stearate, noncrystalline cellulose, magnesium aluminum silicate, triethanolamine, polyvinyl alcohol (PVA), polyvinylpyrrolidone/vinyl acetate copolymer, 4-(1,1,3,3-tetramethylbutyl)-phenol polymer with ethylene oxide and formaldehyde (also known as tyloxapol), poloxamers; and poloxamines. In other embodiments, the dispersing agent is selected from a group not comprising one of the following agents: hydrophilic polymers; electrolytes; Tween® 60 or 80; PEG; polyvinylpyrrolidone (PVP); hydroxypropylcellulose and hydroxypropyl cellulose ethers; hydroxypropyl methylcellulose and hydroxypropyl methylcellulose ethers; carboxymethylcellulose sodium; methylcellulose; hydroxyethylcellulose; hydroxypropylmethyl-cellulose phthalate; hydroxypropylmethyl-cellulose acetate stearate; non-crystalline cellulose; magnesium aluminum silicate; triethanolamine; polyvinyl alcohol (PVA); 4-(1,1,3,3-tetramethylbutyl)-phenol polymer with ethylene oxide and formaldehyde; poloxamers; or poloxamines.

Wetting agents suitable for the aqueous suspensions and dispersions described herein include, but are not limited to, cetyl alcohol, glycerol monostearate, polyoxyethylene sorbitan fatty acid esters (e.g., the commercially available Tweens® such as e.g., Tween 20® and Tween 80®, and polyethylene glycols, oleic acid, glyceryl monostearate, sorbitan monooleate, sorbitan monolaurate, triethanolamine oleate, polyoxyethylene sorbitan monooleate, polyoxyethylene sorbitan monolaurate, sodium oleate, sodium lauryl sulfate, sodium docusate, triacetin, vitamin E TPGS, sodium taurocholate, simethicone, phosphotidylcholine and the like.

Suitable preservatives for the aqueous suspensions or dispersions described herein include, for example, potassium sorbate, parabens (e.g., methylparaben and propylparaben), benzoic acid and its salts, other esters of parahydroxybenzoic acid such as butylparaben, alcohols such as ethyl alcohol or benzyl alcohol, phenolic compounds such as phenol, or quaternary compounds such as benzalkonium chloride. Preservatives, as used herein, are incorporated into the dosage form at a concentration sufficient to inhibit microbial growth.

Suitable viscosity enhancing agents for the aqueous suspensions or dispersions described herein include, but are not limited to, methyl cellulose, xanthan gum, carboxymethyl cellulose, hydroxypropyl cellulose, hydroxypropylmethyl cellulose, Plasdon® S-630, carbomer, polyvinyl alcohol, alginates, acacia, chitosans and combinations thereof. The concentration of the viscosity enhancing agent will depend upon the agent selected and the viscosity desired.

Examples of sweetening agents suitable for the aqueous suspensions or dispersions described herein include, for example, acacia syrup, acesulfame K, alitame, aspartame, chocolate, cinnamon, citrus, cocoa, cyclamate, dextrose, fructose, ginger, glycyrrhetinate, glycyrrhiza (licorice) syrup, monoammonium glyrrhizinate (MagnaSweet®), malitol, mannitol, menthol, neohesperidine DC, neotame, Prosweet® Powder, saccharin, sorbitol, stevia, sucralose, sucrose, sodium saccharin, saccharin, aspartame, acesulfame potassium, mannitol, sucralose, tagatose, thaumatin, vanilla, xylitol, or any combination thereof.

In some embodiments, a therapeutic agent is prepared as transdermal dosage form. In some embodiments, the transdermal formulations described herein include at least three components: (1) a therapeutic agent; (2) a penetration enhancer; and (3) an optional aqueous adjuvant. In some embodiments the transdermal formulations include additional components such as, but not limited to, gelling agents, creams and ointment bases, and the like. In some embodiments, the transdermal formulation is presented as a patch or a wound dressing. In some embodiments, the transdermal formulation further include a woven or non-woven backing material to enhance absorption and prevent the removal of the transdermal formulation from the skin. In other embodiments, the transdermal formulations described herein can maintain a saturated or supersaturated state to promote diffusion into the skin.

In one aspect, formulations suitable for transdermal administration of a therapeutic agent described herein employ transdermal delivery devices and transdermal delivery patches and can be lipophilic emulsions or buffered, aqueous solutions, dissolved and/or dispersed in a polymer or an adhesive. In one aspect, such patches are constructed for continuous, pulsatile, or on demand delivery of pharmaceutical agents. Still further, transdermal delivery of the therapeutic agents described herein can be accomplished by means of iontophoretic patches and the like. In one aspect, transdermal patches provide controlled delivery of a therapeutic agent. In one aspect, transdermal devices are in the form of a bandage comprising a backing member, a reservoir containing the therapeutic agent optionally with carriers, optionally a rate controlling barrier to deliver the therapeutic agent to the skin of the host at a controlled and predetermined rate over a prolonged period of time, and means to secure the device to the skin.

In further embodiments, topical formulations include gel formulations (e.g., gel patches which adhere to the skin). In some of such embodiments, a gel composition includes any polymer that forms a gel upon contact with the body (e.g., gel formulations comprising hyaluronic acid, pluronic polymers, poly(lactic-co-glycolic acid (PLGA)-based polymers or the like). In some forms of the compositions, the formulation comprises a low-melting wax such as, but not limited to, a mixture of fatty acid glycerides, optionally in combination with cocoa butter which is first melted. Optionally, the formulations further comprise a moisturizing agent.

In certain embodiments, delivery systems for pharmaceutical therapeutic agents may be employed, such as, for example, liposomes and emulsions. In certain embodiments, compositions provided herein can also include an mucoadhesive polymer, selected from among, for example, carboxymethylcellulose, carbomer (acrylic acid polymer), poly(methylmethaciylate), polyacrylamide, polycarbophil, acrylic acid/butyl acrylate copolymer, sodium alginate and dextran.

In some embodiments, a therapeutic agent described herein may be administered topically and can be formulated into a variety of topically administrable compositions, such as solutions, suspensions, lotions, gels, pastes, medicated sticks, balms, creams or ointments. Such pharmaceutical therapeutic agents can contain solubilizers, stabilizers, tonicity enhancing agents, buffers and preservatives.

Disclosed herein, in some embodiments, are the following embodiments:

1. A method of treating or preventing a disease or condition in a subject, the method comprising administering a modulator of Ribonuclease T2 (RNASET2) activity and/or expression and/or an inhibitor of TNF Superfamily Member 15 (TL1A) activity or expression to the subject, provided a genotype is detected in a sample obtained from the subject.
2. A method of increasing or enhancing activity or expression of Ribonuclease T2 (RNASET2) in a subject, the method comprising administering a modulator of RNASET2 activity or expression and/or an inhibitor of TNF Superfamily Member 15 (TL1A) activity or expression to the subject, provided a genotype is detected in a sample obtained from the subject.
3. A method of treating or preventing a disease or condition in a subject, the method comprising:
    a) obtaining a sample from a subject;
    b) detecting a presence or an absence of a genotype in the sample obtained from the subject; and
    c) administering to the subject a modulator of Ribonuclease T2 (RNASET2) activity or expression and/or an inhibitor of TNF Superfamily Member 15 (TL1A) activity or expression, provided the presence of the genotype is detected in the sample obtained from the subject.
4. A method of increasing or enhancing activity or expression of Ribonuclease T2 (RNASET2) in a subject, the method comprising:
    a) obtaining a sample from a subject;
    b) detecting a presence or an absence of a genotype in the sample obtained from the subject; and
    c) administering to the subject a modulator of RNASET2 activity or expression and/or an inhibitor of TNF Superfamily Member 15 (TL1A) activity or expression, provided the presence of the genotype is detected in the sample obtained from the subject.
5. The method of any one of embodiments 1-4, wherein the genotype is detected with an assay comprising polymerase chain reaction (PCR), quantitative reverse-transcription PCR (qPCR), automated sequencing, genotype array, or a combination thereof.
6. The method of any one of embodiments 1-5, wherein the modulator of RNASET2 activity or expression comprises an agonist or a partial agonist of RNASET2.
7. The method of embodiment 6, wherein the agonist or partial agonist comprises an antibody or antigen-binding fragment, small molecule, or a recombinant protein.
8. The method of any one of embodiments 6-7, wherein the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11.
9. The method of embodiment 8, wherein the amino acid sequence comprises one or more deletions, substitutions, and/or mutations.
10. The method of any one of embodiments 9, wherein the one or more deletions, substitutions, and/or mutations is at the N-terminus or C-terminus of the RNASET2 polypeptide.
11. The method of any one of embodiments 9, wherein the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide.
12. The method of any one of embodiments 9, wherein the one or more deletions, substitutions, and/or mutations is internal.
13. The method of any one of embodiments 6-12, wherein the agonist or partial agonist comprises a fusion protein, conjugate, or both.
14. The method of any one of embodiments 13, wherein the fusion protein comprises an amino acid sequence of a plasma long half-life polypeptide.
15. The method of any one of embodiments 13, wherein the conjugate comprises an RNASET2 polypeptide comprising at least one amino acid bound to a conjugating moiety.
16. The method of any one of embodiments 15, wherein the conjugating moiety comprises Polyethylene glycol (PEG).
17. The method of any one of embodiments 14, wherein the long plasma half-life polypeptide comprises an antibody, or antibody fragment, comprising IgG1, IgG2, IgG4, IgG3, or IgE.
18. The method of any one of embodiments 14, wherein the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin.
19. The method of any one of embodiments 6-7, wherein the agonist or partial agonist is effective to increase expression of RNASET2 in the subject.
20. The method of any one of embodiments 6-7, wherein the agonist or partial agonist is effective to activate RNASET2 activity in the subject.
21. The method of any one of embodiments 8-20, wherein a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.

22. The method of any one of embodiments 1-21, wherein the genotype is homozygous or heterozygous.

23. The method of any one of embodiments 1-22, wherein the disease or condition comprises and inflammatory, fibrostenotic, and/or fibrotic disease or condition.

24. The method of embodiment 23, wherein the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis.

25. The method of any one of embodiments 1-24, wherein the sample comprises whole blood, plasma, serum, or biopsy tissue.

26. The method of any one of embodiments 1-25, wherein the subject is mammal.

27. The method of any one of embodiments 1-26, wherein the subject is human.

28. The method of any one of embodiments 1-27 wherein the subject is non-responsive to an induction of anti-Tumor Necrosis Factor (TNF) therapy, or lost response to the anti-TNF therapy after a period of time during treatment.

29. The method of any one of embodiments 23-24, wherein the inflammatory, fibrostenotic, and/or fibrotic disease is refractory.

30. The method of any one of embodiments 1-29, wherein the genotype comprises one or more single nucleotide polymorphisms (SNPs) or indels at Indel 1, SNP1, SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

31. The method of embodiment 30, wherein the indel at Indel 1 comprises "CCAGGGCTGGGTGAGGG" (SEQ ID NO:14).

32. The method of embodiment 30, wherein the SNP at SNP 1 comprises a "C" allele.

33. The method of embodiment 30, wherein the SNP at SNP 2 comprises a "T" allele.

34. The method of embodiment 30, wherein the SNP at SNP 3 comprises a "G" allele.

35. The method of embodiment 30, wherein the SNP at SNP 4 comprises a "G" allele.

36. The method of embodiment 30 or 31, wherein the indel at Indel 1 is within SEQ ID NO: 1.

37. The method of embodiment 30 or 32, wherein the SNP at SNP 1 is within SEQ ID NO: 2.

38. The method of embodiment 30 or 33, wherein the SNP at SNP 2 is within SEQ ID NO: 3.

39. The method of embodiment 30 or 34, wherein the SNP at SNP 3 is within SEQ ID NO: 4.

40. The method of embodiment 30 or 35, wherein the SNP at SNP 4 is within SEQ ID NO: 5.

41. The method of any one of embodiments 30-40, where LD is defined by an r2 value of at least 0.80, 0.85, 0.90, 0.95, or 1.0.

42. The method of any one of embodiments 1-41, wherein the genotype comprises one or more single nucleotide polymorphisms (SNPs) or indels located at a gene RibonucleaseT2 (RNASET2).

43. The method of any one of embodiments 1-42, wherein the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.

44. The method of any one of embodiments 1-43, wherein the genotype is associated with a risk that the subject has, or will develop, a subclinical phenotype of the disease or condition as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.

45. The method of embodiment 44, wherein the subclinical phenotype comprises stricturing, penetrating, stricturing and penetrating, disease phenotypes.

46. The method of any one of embodiments 1-45, wherein the genotype comprises one or more SNPs in linkage disequilibrium with SNP 2 as determined by an r2 value of at least about 0.80, about 0.85, about 0.90, about 0.95, or about 1.0.

47. A method of diagnosing a disease or condition in a subject, the method comprising:
  a) obtaining a sample from a subject;
  b) detecting a presence or an absence of a genotype in the sample obtained from the subject; and
  c) diagnosing the disease or condition in the subject, provided the presence of the genotype is detected in the sample obtained from the subject.

48. A method of determining whether a subject is at risk for developing a disease or condition, in a subject, the method comprising:
  a) obtaining a sample from a subject;
  b) detecting a presence or an absence of a genotype in the sample obtained from the subject; and
  c) determining the subject is at risk for developing the disease or condition, provided the presence of the genotype is detected in the sample obtained from the subject.

49. A method of determining whether a subject is suitable for treatment of a disease or condition with a modulator of Ribonuclease T2 (RNASET2) activity or expression and/or an inhibitor of TNF Superfamily Member 15 (TL1A) activity or expression, the method comprising:
  a) obtaining a sample from a subject;
  b) detecting a presence or an absence of a genotype in the sample obtained from the subject; and
  c) determining the subject is suitable for treatment of the disease or condition with a modulator of RNASET2 activity or expression and/or an inhibitor of TNF Superfamily Member 15 (TL1A) activity or expression, provided the presence of the genotype is detected in the sample obtained from the subject.

50. The method of any one of embodiments 47-49, wherein the genotype is detected with an assay comprising polymerase chain reaction (PCR), quantitative reverse-transcription PCR (qPCR), automated sequencing, genotype array, or a combination thereof.

51. The method of any one of embodiments 47-50, further comprising administering to the subject a modulator or RNASET2 activity or expression, and/or an inhibitor of TNF Superfamily Member 15 (TL1A) activity or expression.

52. The method of embodiment 51, wherein the modulator of RNASET2 activity or expression comprises an agonist or a partial agonist of RNASET2.

53. The method of embodiment 51, wherein the agonist or partial agonist comprises an antibody or antigen-binding fragment, small molecule, or a recombinant protein.

54. The method of any one of embodiments 52-53, wherein the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11.

55. The method of embodiment 54, wherein the amino acid sequence comprises one or more deletions, substitutions, and/or mutations.

56. The method of any one of embodiments 55, wherein the one or more deletions, substitutions, and/or mutations is at the N-terminus or C-terminus of the RNASET2 polypeptide.

57. The method of any one of embodiments 55, wherein the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide.

58. The method of any one of embodiments 55, wherein the one or more deletions, substitutions, and/or mutations is internal.

59. The method of any one of embodiments 52-58, wherein the agonist or partial agonist comprises a fusion protein, conjugate, or both.

60. The method of embodiment 59, wherein the fusion protein comprises an amino acid sequence of a plasma long half-life polypeptide.

61. The method of any one of embodiments 59-60, wherein the conjugate comprises an RNASET2 polypeptide comprising at least one amino acid bound to a conjugating moiety.

62. The method of any one of embodiments 61, wherein the conjugating moiety comprises Polyethylene glycol (PEG).

63. The method of any one of embodiments 60, wherein the long plasma half-life polypeptide comprises an antibody, or antibody fragment, comprising IgG1, IgG2, IgG4, IgG3, or IgE.

64. The method of any one of embodiments 60, wherein the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin.

65. The method of any one of embodiments 52-64, wherein the agonist or partial agonist is effective to increase expression of RNASET2 in the subject.

66. The method of any one of embodiments 52-64, wherein the agonist or partial agonist is effective to activate RNASET2 activity in the subject.

67. The method of any one of embodiments 54-66, wherein a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.

68. The method of any one of embodiments 47-67, wherein the genotype is homozygous or heterozygous.

69. The method of any one of embodiments 47-54, wherein the disease or condition comprises and inflammatory, fibrostenotic, and/or fibrotic disease or condition.

70. The method of embodiment 69, wherein the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis.

71. The method of any one of embodiments 47-70, wherein the sample comprises whole blood, plasma, serum, or biopsy tissue.

72. The method of any one of embodiments 47-71, wherein the subject is mammal.

73. The method of any one of embodiments 47-72, wherein the subject is human.

74. The method of any one of embodiments 47-73, wherein the subject is non-responsive to an induction of anti-Tumor Necrosis Factor (TNF) therapy, or lost response to the anti-TNF therapy after a period of time during treatment.

75. The method of any one of embodiments 69, wherein the inflammatory, fibrostenotic, and/or fibrotic disease is refractory.

76. The method of any one of embodiments 47-75, wherein the genotype comprises one or more single nucleotide polymorphisms (SNPs) or indels at Indel 1, SNP 1, SNP 2, SNP 3, SNP 4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

77. The method of embodiment 76, wherein the indel at Indel 1 comprises CCAGGGCTGGGTGAGGG" (SEQ ID NO:14).

78. The method of embodiment 76, wherein the SNP at SNP 1 comprises a "C" allele.

79. The method of embodiment 76, wherein the SNP at SNP 2 comprises a "T" allele.

80. The method of embodiment 76, wherein the SNP at SNP 3 comprises a "G" allele.

81. The method of embodiment 76, wherein the SNP at SNP 4 comprises a "G" allele.

82. The method of embodiment 76 or 77, wherein the indel at Indel 1 is within SEQ ID NO: 1.

83. The method of embodiment 76 or 78, wherein the SNP at SNP 1 is within SEQ ID NO: 2.

84. The method of embodiment 76 or 79, wherein the SNP at SNP 2 is within SEQ ID NO: 3.

85. The method of embodiment 76 or 80, wherein the SNP at SNP 3 is within SEQ ID NO: 4.

86. The method of embodiment 76 or 81, wherein the SNP at SNP 4 is within SEQ ID NO: 5.

87. The method of any one of embodiments 76-86, where LD is defined by an r2 value of at least 0.80, 0.85, 0.90, 0.95, or 1.0.

88. The method of any one of embodiments 47-87, wherein the genotype comprises one or more single nucleotide polymorphisms (SNPs) or indels located at a gene RibonucleaseT2 (RNASET2).

89. The method of any one of embodiments 47-88, wherein the genotype is associated with a risk that a subject has, or will develop, inflammatory bowel disease (IBD), Crohn's disease (CD), or ulcerative colitis (UC), as determined by a P value of at most about $1.0\times10$-6, about $1.0\times10$-7, about $1.0\times10$-8, about $1.0\times10$-9, about $1.0\times10$-10, about $1.0\times10$-20, about $1.0\times10$-30, about $1.0\times10$-40, about $1.0\times10$-50, about $1.0\times10$-60, about $1.0\times10$-70, about $1.0\times10$-80, about $1.0\times10$-90, or about $1.0\times10$-100.

90. The method of any one of embodiments 47-89, wherein the genotype is associated with a risk that the subject has, or will develop, a subclinical phenotype of the disease or condition as determined by a P value of at most about $1.0\times10$-6, about $1.0\times10$-7, about $1.0\times10$-8, about $1.0\times10$-9, about $1.0\times10$-10, about $1.0\times10$-20, about $1.0\times10$-30, about $1.0\times10$-40, about $1.0\times10$-50, about $1.0\times10$-60, about $1.0\times10$-70, about $1.0\times10$-80, about $1.0\times10$-90, or about $1.0\times10$-100.

91. The method of embodiment 90, wherein the subclinical phenotype comprises stricturing, penetrating, stricturing and penetrating, disease phenotypes.

92. The method of any one of embodiments 47-91, wherein the genotype comprises one or more SNPs in linkage disequilibrium with r SNP 2 as determined by an r2 value of at least about 0.80, about 0.85, about 0.90, about 0.95, or about 1.0.

93. A method for processing or analyzing a sample obtained from a subject, the method comprising:
a) obtaining a sample from a subject;
b) subjecting the sample to an assay by sequencing, genotype array, and/or nucleic acid amplification, to yield a data set comprising data corresponding to a presence or an absence of a genotype;
c) in a programmed computer, inputting said data from (b) to a trained algorithm to determine whether the subject is at risk of developing, a disease or disorder, wherein the trained algorithm is trained with a plurality of training samples, and wherein said sample is independent of said plurality of training samples; and
d) electronically outputting a report comprising the determination for the subject.

94. A method for processing or analyzing a sample obtained from a subject, the method comprising:
a) obtaining a sample from a subject;
b) subjecting the sample to an assay by sequencing, genotype array, and/or nucleic acid amplification, to yield a data set comprising data corresponding to a presence or an absence of a genotype;
c) in a programmed computer, inputting said data from (b) to a trained algorithm to determine a likelihood that the subject is suitable for treatment of a disease or disorder with an agonist of RNASET2, wherein the trained algorithm is trained with a plurality of training samples, and wherein said sample is independent of said plurality of training samples; and
d) electronically outputting a report comprising the determination for the subject.

95. The method of any one of embodiments 93-94, wherein (c) comprises calculating a polygenic risk score (PRS), and the PRS comprises a normalized weighted sum of a number of risk alleles within the genotype present in the subject with weights proportional to a beta value of association between the genotype with the disease or condition.

96. The method of any one of any one of embodiments 93-95, wherein the data set of (b) further comprises data corresponding to a presence or an absence of a surrogate genotype, provided an absence of a genotype is detected.

97. The method of embodiment 96, wherein the surrogate genotype is in linkage disequilibrium with the absent genotype as determined by an r2 value of at least about, 0.8, about 0.85, about 0.90, about 0.95, or about 1.0.

98. The method of any one of embodiments 93-97, wherein the report is configured to display the determination of the subject on a user interface of an electronic device.

99. The method of embodiment 98, wherein the electronic device comprises a personal electronic device belonging to the subject.

100. The method of any one of embodiments 94-99, further comprising administering to the subject a modulator or RNASET2 activity or expression and/or an inhibitor of TNF Superfamily Member 15 (TL1A) activity or expression, provided the subject is determined to be at risk of having or developing, the disease or condition.

101. The method of embodiment 100, wherein the modulator of RNASET2 activity or expression comprises an agonist or a partial agonist of RNASET2.

102. The method of embodiment 101, wherein the agonist or partial agonist comprises an antibody or antigen-binding fragment, small molecule, or recombinant protein.

103. The method of any one of embodiments 101, wherein the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11.

104. The method of embodiment 103, wherein the amino acid sequence comprises one or more deletions, substitutions, and/or mutations.

105. The method of any one of embodiments 103, wherein the one or more deletions, substitutions, and/or mutations is at the N-terminus or C-terminus of the RNASET2 polypeptide.

106. The method of any one of embodiments 103, wherein the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide.

107. The method of any one of embodiments 103, wherein the one or more deletions, substitutions, and/or mutations is internal.

108. The method of any one of embodiments 101-107, wherein the agonist or partial agonist comprises a fusion protein, conjugate, or both.

109. The method of embodiment 108, wherein the fusion protein comprises an amino acid sequence of a plasma long half-life polypeptide.

110. The method of embodiment 108, wherein the conjugate comprises an RNASET2 polypeptide comprising at least one amino acid bound to a conjugating moiety.

111. The method of embodiment 110, wherein the conjugating moiety comprises Polyethylene glycol (PEG).

112. The method of any one of embodiments 109-111, wherein the long plasma half-life polypeptide comprises an antibody, or antibody fragment, comprising IgG1, IgG2, IgG4, IgG3, or IgE.

113. The method of any one of embodiments 109-111, wherein the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin.

114. The method of any one of embodiments 101-113, wherein the agonist or partial agonist is effective to increase expression of RNASET2 in the subject.

115. The method of any one of embodiments 101-113, wherein the agonist or partial agonist is effective to activate RNASET2 activity in the subject.

116. The method of any one of embodiments 103-115, wherein a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.

117. The method of any one of embodiments 93-116, wherein the genotype is homozygous or heterozygous.

118. The method of any one of embodiments 93-103, wherein the disease or condition comprises and inflammatory, fibrostenotic, and/or fibrotic disease or condition.

119. The method of embodiment 118, wherein the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis.

120. The method of any one of embodiments 93-119, wherein the sample comprises whole blood, plasma, serum, or biopsy tissue.

121. The method of any one of embodiments 93-120, wherein the subject is mammal.

122. The method of any one of embodiments 93-121, wherein the subject is human.

123. The method of any one of embodiments 93-122, wherein the subject is non-responsive to an induction of anti-Tumor Necrosis Factor (TNF) therapy, or lost response to the anti-TNF therapy after a period of time during treatment.

124. The method of any one of embodiments 118-119, wherein the inflammatory, fibrostenotic, and/or fibrotic disease is refractory.

125. The method of any one of embodiments 93-124, wherein the genotype comprises one or more single nucleotide polymorphisms (SNPs) or indels at Indel1, SNP1, SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

126. The method of embodiment 125, wherein the indel at Indel 1 comprises CCAGGGCTGGGTGAGGG (SEQ ID NO:14).

127. The method of embodiment 125, wherein the SNP at SNP 1 comprises a "C" allele.

128. The method of embodiment 125, wherein the SNP at SNP 2 comprises a "T" allele.

129. The method of embodiment 125, wherein the SNP at SNP 3 comprises a "G" allele.

130. The method of embodiment 125, wherein the SNP at SNP 4 comprises a "G" allele.

131. The method of embodiment 125 or 126, wherein the indel at Indel 1 is within SEQ ID NO: 1.

132. The method of embodiment 125 or 127, wherein the SNP at SNP 1 is within SEQ ID NO: 2.

133. The method of embodiment 125 or 128, wherein the SNP at SNP 2 is within SEQ ID NO: 3.

134. The method of embodiment 125 or 129, wherein the SNP at SNP 3 is within SEQ ID NO: 4.

135. The method of embodiment 125 or 130, wherein the SNP at SNP 4 is within SEQ ID NO: 5.

136. The method of any one of embodiments 125-135, where LD is defined by an r2 value of at least 0.80, 0.85, 0.90, 0.95, r 1.0.

137. The method of any one of embodiments 93-136, wherein the genotype comprises one or more single nucleotide polymorphisms (SNPs) or indels located at a gene RibonucleaseT2 (RNASET2).

138. The method of any one of embodiments 93-137, wherein the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.

139. The method of any one of embodiments 93-138, wherein the genotype is associated with a risk that the subject has, or will develop, a subclinical phenotype of the disease or condition as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.

140. The method of embodiment 139, wherein the subclinical phenotype comprises stricturing, penetrating, stricturing and penetrating, disease phenotypes.

141. The method of any one of embodiments 93-140, wherein the genotype comprises one or more SNPs in linkage disequilibrium with r SNP 2 as determined by an r2 value of at least about 0.80, about 0.85, about 0.90, about 0.95, or about 1.0.

142. The method of any one of embodiments 93-141, wherein the genotype comprises at least about 1 single nucleotide polymorphism (SNP), about 2 SNPs, about 3 SNPs, about 4 SNPs, about 5 SNPs, about 6 SNPs, about 7 SNPs, about 8 SNPs, about 9 SNPs, about 10 SNPs, about 11 SNPs, or more.

143. A method for detecting a genotype in a subject comprising a disease or condition, the method comprising:
a) contacting genetic material obtained from the subject with a composition sufficiently complementary to and capable of hybridizing to the genotype, the composition comprising:
i) a detectably labeled oligonucleotide probe comprising SEQ ID NO: 6,
ii) a detectably labeled oligonucleotide probe comprising SEQ ID NO: 7, iii) a detectably labeled oligonucleotide probe comprising SEQ ID NO: 8,
iv) a detectably labeled oligonucleotide probe comprising SEQ ID NO: 9,
v) a detectably labeled oligonucleotide probe comprising SEQ ID NO: 10,
vi) a detectably labeled oligonucleotide probe comprising a nucleic acid sequence that differs from a probe selected from the group consisting of (i)-(v) by up to three nucleobases, provided the detectably labeled oligonucleotide probe of (vi) hybridizes to the genotype of interest,
vii) a detectably labeled oligonucleotide probe comprising a nucleic acid sequence complementary to a probe selected from the group consisting of (i)-(vi), or
viii) a combination of probes selected from the group consisting of (i)-(vii); and
b) detecting the presence or absence of hybridization of the genetic material with the composition using the detectably labeled probe, whereby hybridization of the genetic material with the composition is indicative of the presence of the genotype in the subject.

144. A method comprising treating the subject of embodiment 143 with a modulator of Ribonuclease T2 (RNASET2) activity or expression and/or an inhibitor of TNF Superfamily Member 15 (TL1A) activity or expression, provided that the subject comprises the genotype.

145. The method of embodiment 144, wherein the modulator of RNASET2 activity or expression comprises an agonist or a partial agonist of RNASET2.

146. The method of embodiment 145, wherein the agonist or partial agonist comprises an antibody or antigen-binding fragment, small molecule, or recombinant protein.

147. The method of any one of embodiments 145-146, wherein the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11.

148. The method of embodiment 147, wherein the amino acid sequence comprises one or more deletions, substitutions, and/or mutations.

149. The method of embodiment 148, wherein the one or more deletions, substitutions, and/or mutations is at the N-terminus or C-terminus of the RNASET2 polypeptide.

150. The method of embodiment 148, wherein the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide.

151. The method of embodiment 148, wherein the one or more deletions, substitutions, and/or mutations is internal.

152. The method of any one of embodiments 147-150, wherein the agonist or partial agonist comprises a fusion protein, conjugate, or both.

153. The method of embodiment 152, wherein the fusion protein comprises an amino acid sequence of a plasma long half-life polypeptide.

154. The method of embodiment 152, wherein the conjugate comprises an RNASET2 polypeptide comprising at least one amino acid bound to a conjugating moiety.

155. The method of embodiment 154, wherein the conjugating moiety comprises Polyethylene glycol (PEG).

156. The method of any one of embodiments 153-155, wherein the long plasma half-life polypeptide comprises an antibody, or antibody fragment, comprising IgG1, IgG2, IgG4, IgG3, or IgE.

157. The method of any one of embodiments 153-155, wherein the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin.

158. The method of any one of embodiments 145-157, wherein the agonist or partial agonist is effective to increase expression of RNASET2 in the subject.

159. The method of any one of embodiments 145-157, wherein the agonist or partial agonist is effective to activate RNASET2 activity in the subject.

160. The method of any one of embodiments 147-159, wherein a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.

161. The method of any one of embodiments 144-160, wherein the genotype is homozygous or heterozygous.

162. The method of any one of embodiments 145-147, wherein the disease or condition comprises and inflammatory, fibrostenotic, and/or fibrotic disease or condition.

163. The method of embodiment 162, wherein the inflammatory, fibrostenotic, and/or fibrotic disease or condition comprises inflammatory bowel disease (IBD), Crohn's disease (CD), perianal CD, ulcerative colitis (UC), intestinal fibrosis, pulmonary fibrosis, or intestinal fibrostenosis.

164. The method of any one of embodiments 143-163, wherein the genetic material was isolated from a sample obtained from the subject, comprising whole blood, plasma, serum, or biopsy tissue.

165. The method of any one of embodiments 143-164, wherein the subject is mammal.

166. The method of any one of embodiments 143-165, wherein the subject is human.

167. The method of any one of embodiments 143-166, wherein the subject is non-responsive to an induction of anti-Tumor Necrosis Factor (TNF) therapy, or lost response to the anti-TNF therapy after a period of time during treatment.

168. The method of any one of embodiments 162-163, wherein the inflammatory, fibrostenotic, and/or fibrotic disease is refractory.

169. The method of any one of embodiments 143-168, wherein the genotype comprises one or more single nucleotide polymorphisms (SNPs) or indels at Indel1, SNP1, SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

170. The method of embodiment 169, wherein the indel at Indel 1 comprises CCAGGGCTGGGTGAGGG (SEQ ID NO:14).
171. The method of embodiment 169, wherein the SNP at SNP 1 comprises a "C" allele.
172. The method of embodiment 169, wherein the SNP at SNP 2 comprises a "T" allele.
173. The method of embodiment 169, wherein the SNP at SNP 3 comprises a "G" allele.
174. The method of embodiment 169, wherein the SNP at SNP 4 comprises a "G" allele.
175. The method of embodiment 169 or 170, wherein the indel at Indel 1 is within SEQ ID NO: 1.
176. The method of embodiment 169 or 171, wherein the SNP at SNP 1 is within SEQ ID NO: 2.
177. The method of embodiment 169 or 172, wherein the SNP at SNP 2 is within SEQ ID NO: 3.
178. The method of embodiment 169 or 173, wherein the SNP at SNP 3 is within SEQ ID NO: 4.
179. The method of embodiment 169 or 174, wherein the SNP at SNP 4 is within SEQ ID NO: 5.
180. The method of any one of embodiments 169-179, where LD is defined by an r2 value of at least 0.80, 0.85, 0.90, 0.95, r 1.0.
181. The method of any one of embodiments 143-180, wherein the genotype comprises one or more single nucleotide polymorphisms (SNPs) or indels located at a gene Ribonuclease T2 (RNASET2).
182. The method of any one of embodiments 143-181, wherein the genotype is associated with a risk that a subject has, or will develop, inflammatory bowel disease (IBD), Crohn's disease (CD), or ulcerative colitis (UC), as determined by a P value of at most about $1.0 \times 10-6$, about $1.0 \times 10-7$, about $1.0 \times 10-8$, about $1.0 \times 10-9$, about $1.0 \times 10-10$, about $1.0 \times 10-20$, about $1.0 \times 10-30$, about $1.0 \times 10-40$, about $1.0 \times 10-50$, about $1.0 \times 10-60$, about $1.0 \times 10-70$, about $1.0 \times 10-80$, about $1.0 \times 10-90$, or about $1.0 \times 10-100$.
183. The method of any one of embodiments 143-182, wherein the genotype is associated with a risk that the subject has, or will develop, a subclinical phenotype of the disease or condition as determined by a P value of at most about $1.0 \times 10-6$, about $1.0 \times 10-7$, about $1.0 \times 10-8$, about $1.0 \times 10-9$, about $1.0 \times 10-10$, about $1.0 \times 10-20$, about $1.0 \times 10-30$, about $1.0 \times 10-40$, about $1.0 \times 10-50$, about $1.0 \times 10-60$, about $1.0 \times 10-70$, about $1.0 \times 10-80$, about $1.0 \times 10-90$, or about $1.0 \times 10-100$.
184. The method of embodiment 183, wherein the subclinical phenotype comprises stricturing, penetrating, stricturing and penetrating, disease phenotypes.
185. The method of any one of embodiments 143-184, wherein the genotype comprises one or more SNPs in linkage disequilibrium with r SNP 2 as determined by an r2 value of at least about 0.80, about 0.85, about 0.90, about 0.95, or about 1.0.
186. The methods of any one of embodiments 1-46, 51-92, 100-142, 144-185, wherein the inhibitor of TL1A activity or expression comprises an anti-TL1A antibody.
187. The method of embodiment 186, wherein the anti-TL1A antibody comprises an inhibitor of TL1A-Death Receptor 3 (DR3) binding, signaling, or both.
188. The method of any one of the previous embodiments, wherein the genotype comprises Indel 1.
189. The method of any one of the previous embodiments, wherein the genotype comprises SNP 1.
190. The method of any one of the previous embodiments, wherein the genotype comprises SNP 2.
191. The method of any one of the previous embodiments, wherein the genotype comprises SNP 3.
192. The method of any one of the previous embodiments, wherein the genotype comprises SNP 4.
193. The method of any one of the previous embodiments, wherein the genotype comprises Indel 1 and SNP 1.
194. The method of any one of the previous embodiments, wherein the genotype comprises Indel 1 and SNP 2.
195. The method of any one of the previous embodiments, wherein the genotype comprises Indel 1 and SNP 3.
196. The method of any one of the previous embodiments, wherein the genotype comprises Indel 1 and SNP 4.
197. The method of any one of the previous embodiments, wherein the genotype comprises SNP 1 and SNP 2.
198. The method of any one of the previous embodiments, wherein the genotype comprises SNP 1 and SNP 3.
199. The method of any one of the previous embodiments, wherein the genotype comprises SNP 1 and SNP 4.
200. The method of any one of the previous embodiments, wherein the genotype comprises SNP 2 and SNP 3.
201. The method of any one of the previous embodiments, wherein the genotype comprises SNP 2 and SNP 4.
202. The method of any one of the previous embodiments, wherein the genotype comprises SNP 3 and SNP 4.
203. The method of any one of the previous embodiments, wherein the genotype comprises Indel 1, SNP 1, and SNP 2.
204. The method of any one of the previous embodiments, wherein the genotype comprises Indel 1, SNP 1, and SNP 3.
205. The method of any one of the previous embodiments, wherein the genotype comprises Indel 1, SNP 1, and SNP 4.
206. The method of any one of the previous embodiments, wherein the genotype comprises Indel 1, SNP 2, and SNP 3.
207. The method of any one of the previous embodiments, wherein the genotype comprises Indel 1, SNP 2, and SNP 4.
208. The method of any one of the previous embodiments, wherein the genotype comprises Indel 1, SNP 3, and SNP 4.
209. The method of any one of the previous embodiments, wherein the genotype comprises SNP 1, SNP 2, and SNP 3.
210. The method of any one of the previous embodiments, wherein the genotype comprises SNP 1, SNP 2, and SNP 4.
211. The method of any one of the previous embodiments, wherein the genotype comprises SNP 1, SNP 3, and SNP 4.
212. The method of any one of the previous embodiments, wherein the genotype comprises SNP 2, SNP 3, and SNP 4.
213. The method of any one of the previous embodiments, wherein the genotype comprises Indel 1, SNP 1, SNP 2, and SNP 3.
214. The method of any one of the previous embodiments, wherein the genotype comprises Indel 1, SNP 1, SNP 2, and SNP 4.
215. The method of any one of the previous embodiments, wherein the genotype comprises Indel 1, SNP 1, SNP 3, and SNP 4.

216. The method of any one of the previous embodiments, wherein the genotype comprises Indel 1, SNP 2, and SNP 3, and SNP 4.
217. The method of any one of the previous embodiments, wherein the genotype comprises SNP 1, SNP 2, SNP 3, and SNP 4.
218. The method of any one of the previous embodiments, wherein the genotype comprises Indel 1, SNP 1, SNP 2, SNP 3, and SNP 4.

Kits and Compositions
Composition

Disclosed herein, in some embodiments, are compositions useful for the detection of a genotype or biomarker in a sample obtained from a subject according to the methods described herein. Aspects disclosed herein provide compositions comprises a polynucleotide sequence comprising at least 10 but less than 50 contiguous nucleotides of any one of SEQ ID NOS: 6-10, or 15-48, or reverse complements thereof, wherein the contiguous polynucleotide sequence comprises a detectable molecule. In various embodiments, the detectable molecule comprises a fluorophore. In other embodiments, the polynucleotide sequences further comprise a quencher.

Also disclosed herein are compositions comprising an antibody or antigen-binding fragment that specifically binds to RNASET2, wherein the antibody or antigen-binding fragment comprises a detectable molecule. In various embodiments, the antibody comprises a monoclonal antibody, a chimeric antibody, a CDR-grafted antibody, a Fab, a Fab', a F(ab')2, a Fv, a disulfide linked Fv, a scFv, a single domain antibody, a diabody, a multispecific antibody, a dual specific antibody, an anti-idiotypic antibody, or a bispecific antibody. In some embodiments, the antibody or antigen-binding fragment comprises an IgG antibody, an IgM antibody, and/or an IgE antibody. In some embodiments, the detectable molecule comprises a fluorophore. In some embodiments, the antibody or antigen-binding fragment is conjugated to a paramagnetic particle (e.g., bead).

Kit

Disclosed herein, in some embodiments, are kits useful for to detect the genotypes and/or biomarkers disclosed herein. In some embodiments, the kits disclosed herein may be used to diagnose and/or treat a disease or condition in a subject; or select a patient for treatment and/or monitor a treatment disclosed herein. In some embodiments, the kit comprises the compositions described herein, which can be used to perform the methods described herein. Kits comprise an assemblage of materials or components, including at least one of the compositions. Thus, in some embodiments the kit contains a composition including of the pharmaceutical composition, for the treatment of IBD. In other embodiments, the kits contains all of the components necessary and/or sufficient to perform an assay for detecting and measuring IBD markers, including all controls, directions for performing assays, and any necessary software for analysis and presentation of results.

In some instances, the kits described herein comprise components for detecting the presence, absence, and/or quantity of a target nucleic acid and/or protein described herein. In some embodiments, the kit comprises the compositions described herein. In some embodiments, the kit further comprises components for detecting the presence, absence, and/or quantity of a serological marker described herein. In some embodiments, the kit comprises the compositions (e.g., primers, probes, antibodies) described herein. The disclosure provides kits suitable for assays such as enzyme-linked immunosorbent assay (ELISA), single-molecular array (Simoa), PCR, and qPCR. The exact nature of the components configured in the kit depends on its intended purpose. For example, some embodiments are configured for the purpose of treating a disease or condition disclosed herein (e.g., IBD, CD, UC) in a subject. In some embodiments, the kit is configured particularly for the purpose of treating mammalian subjects. In some embodiments, the kit is configured particularly for the purpose of treating human subjects. In further embodiments, the kit is configured for veterinary applications, treating subjects such as, but not limited to, farm animals, domestic animals, and laboratory animals. In some embodiments, the kit is configured to select a subject for a therapeutic agent, such as those disclosed herein. In some embodiments, the kit is configured to select a subject for treatment with a modulator of RNASET2 activity or expression (e.g., recombinant RNASET2 polypeptide).

Instructions for use may be included in the kit. Optionally, the kit also contains other useful components, such as, diluents, buffers, pharmaceutically acceptable carriers, syringes, catheters, applicators, pipetting or measuring tools, bandaging materials or other useful paraphernalia. The materials or components assembled in the kit can be provided to the practitioner stored in any convenient and suitable ways that preserve their operability and utility. For example, the components can be in dissolved, dehydrated, or lyophilized form; they can be provided at room, refrigerated or frozen temperatures. The components are typically contained in suitable packaging material(s). As employed herein, the phrase "packaging material" refers to one or more physical structures used to house the contents of the kit, such as compositions and the like. The packaging material is constructed by suitable methods, preferably to provide a sterile, contaminant-free environment. The packaging materials employed in the kit are those customarily utilized in gene expression assays and in the administration of treatments. As used herein, the term "package" refers to a suitable solid matrix or material such as glass, plastic, paper, foil, and the like, capable of holding the individual kit components. Thus, for example, a package can be a glass vial or prefilled syringes used to contain suitable quantities of the pharmaceutical composition. The packaging material has an external label which indicates the contents and/or purpose of the kit and its components.

Systems

Disclosed herein, in some embodiments, is a system for detecting a particular RNASET2 risk genotype in a subject. The system is configured to implement the methods described in this disclosure, including, but not limited to, detecting the presence of a particular CD subtype to determine whether the subject is suitable for treatment with a particular therapy. In some embodiments, disclosed herein the RNASET2 risk genotype comprises Indel 1, SNP1, SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, or SNP36, or any combination thereof. In some embodiments, the RNASET2 risk genotype comprises Indel 1I (where, for example, I is an insertion comprising or consisting of CCAGGGCTGGGT-GAGGG (SEQ ID NO: 14)), SNP 1C, SNP 2T, SNP 3G, and/or SNP 4G, or any single nucleotide polymorphism (SNP) or indel in linkage disequilibrium (LD) therewith.

Disclosed herein, in some embodiment, are systems for detecting Indel 1I (where, for example, I is an insertion comprising or consisting of CCAGGGCTGGGTGAGGG (SEQ ID NO: 14)), SNP 1C, SNP 2T, SNP 3G, and/or SNP 4G in a subject, comprising: (a) a computer processing device, optionally connected to a computer network; and (b) a software module executed by the computer processing device to analyze a target nucleic acid sequence comprising Indel 1I (where, for example, I is an insertion comprising or consisting of CCAGGGCTGGGTGAGGG (SEQ ID NO: 14)), SNP 1C, SNP 2T, SNP 3G, and/or SNP 4G in a sample from a subject. In some instances, the system comprises a central processing unit (CPU), memory (e.g., random access memory, flash memory), electronic storage unit, computer program, communication interface to communicate with one or more other systems, and any combination thereof. In some instances, the system is coupled to a computer network, for example, the Internet, intranet, and/or extranet that is in communication with the Internet, a telecommunication, or data network. In some embodiments, the system comprises a storage unit to store data and information regarding any aspect of the methods described in this disclosure. Various aspects of the system are a product or article or manufacture.

One feature of a computer program includes a sequence of instructions, executable in the digital processing device's CPU, written to perform a specified task. In some embodiments, computer readable instructions are implemented as program modules, such as functions, features, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions are combined or distributed as desired in various environments. In some instances, a computer program comprises one sequence of instructions or a plurality of sequences of instructions. A computer program may be provided from one location. A computer program may be provided from a plurality of locations. In some embodiment, a computer program includes one or more software modules. In some embodiments, a computer program includes, in part or in whole, one or more web applications, one or more mobile applications, one or more standalone applications, one or more web browser plug-ins, extensions, add-ins, or add-ons, or combinations thereof Web Application In some embodiments, a computer program includes a web application. In light of the disclosure provided herein, those of skill in the art will recognize that a web application may utilize one or more software frameworks and one or more database systems. A web application, for example, is created upon a software framework such as Microsoft) .NET or Ruby on Rails (RoR). A web application, in some instances, utilizes one or more database systems including, by way of non-limiting examples, relational, non-relational, feature oriented, associative, and XML database systems. Suitable relational database systems include, by way of non-limiting examples, Microsofl® SQL Server, mySQL™, and Oracle®. Those of skill in the art will also recognize that a web application may be written in one or more versions of one or more languages. In some embodiments, a web application is written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). A web application may integrate enterprise server products such as IBM® Lotus Domino®. A web application may include a media player element. A media player element may utilize one or more of many suitable multimedia technologies including, by way of non-limiting examples, Adobe® Flash®, HTML 5, Apple® QuickTime®, Microsoft® Silverlight®, Java™, and Unity®.

Mobile Application

In some instances, a computer program includes a mobile application provided to a mobile digital processing device. The mobile application may be provided to a mobile digital processing device at the time it is manufactured. The mobile application may be provided to a mobile digital processing device via the computer network described herein.

A mobile application is created by techniques known to those of skill in the art using hardware, languages, and development environments known to the art. Those of skill in the art will recognize that mobile applications may be written in several languages. Suitable programming languages include, by way of non-limiting examples, C, C++, C#, Featureive-C, Java™, Javascript, Pascal, Feature Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments may be available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBeriy® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that may be run as an independent computer process, not an add-on to an existing process, e.g., not a plug-in. Those of skill in the art will recognize that standalone applications are sometimes compiled. In some instances, a compiler is a computer program(s) that transforms source code written in a programming language into binary feature code such as assembly language or machine code. Suitable compiled programming languages include, by way of non-limiting examples, C, C++, Featureive-C, COBOL, Delphi, Eiffel, Java™, Lisp, Python™, Visual Basic, and VB .NET, or combinations thereof. Compilation may be often performed, at least in part, to create an executable program. In some instances, a computer program includes one or more executable complied applications.

Web Browser Plug-In

A computer program, in some aspects, includes a web browser plug-in. In computing a plug-in, in some instances, is one or more software components that add specific functionality to a larger software application. Makers of software applications may support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including Adobe® Flash® Player, Microsoft® Silverlight®, and Apple® QuickTime®. The toolbar may comprise one or more web browser extensions, add-ins, or add-ons. The toolbar may comprise one or more explorer bars, tool bands, or desk bands.

In view of the disclosure provided herein, those of skill in the art will recognize that several plug-in frameworks are available that enable development of plug-ins in various programming languages, including by way of non-limiting examples, C++, Delphi, Java™, PHP, Python™, and VB NET, or combinations thereof.

In some embodiments, Web browsers (also called Internet browsers) are software applications, designed for use with network-connected digital processing devices, for retrieving, presenting and traversing information resources on the World Wide Web. Suitable web browsers include, by way of non-limiting examples, Microsoft® Internet Explorer®, Mozilla® Firefox®, Google® Chrome, Apple® Safari®, Opera Software) Opera®, and KDE Konqueror. The web browser, in some instances, is a mobile web browser. Mobile web browsers (also called mircrobrowsers, mini-browsers, and wireless browsers) may be designed for use on mobile digital processing devices including by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia®) Browser, Opera Software® Opera® Mobile, and Sony® PSP™ browser.

Software Module

The medium, method, and system disclosed herein comprise one or more softwares, servers, and database modules, or use of the same. In view of the disclosure provided herein, software modules may be created by techniques known to those of skill in the art using machines, software, and languages known to the art. The software modules disclosed herein may be implemented in a multitude of ways. In some embodiments, a software module comprises a file, a section of code, a programming feature, a programming structure, or combinations thereof. A software module may comprise a plurality of files, a plurality of sections of code, a plurality of programming features, a plurality of programming structures, or combinations thereof. By way of non-limiting examples, the one or more software modules comprise a web application, a mobile application, and/or a standalone application. Software modules may be in one computer program or application. Software modules may be in more than one computer program or application. Software modules may be hosted on one machine. Software modules may be hosted on more than one machine. Software modules may be hosted on cloud computing platforms. Software modules may be hosted on one or more machines in one location. Software modules may be hosted on one or more machines in more than one location.

Database

The medium, method, and system disclosed herein comprise one or more databases, or use of the same. In view of the disclosure provided herein, those of skill in the art will recognize that many databases are suitable for storage and retrieval of geologic profile, operator activities, division of interest, and/or contact information of royalty owners. Suitable databases include, by way of non-limiting examples, relational databases, non-relational databases, feature oriented databases, feature databases, entity-relationship model databases, associative databases, and XML databases. In some embodiments, a database is internet-based. In some embodiments, a database is web-based. In some embodiments, a database is cloud computing-based. A database may be based on one or more local computer storage devices.

Data Transmission

The subject matter described herein, including methods for detecting a particular CD subtype, are configured to be performed in one or more facilities at one or more locations. Facility locations are not limited by country and include any country or territory. In some instances, one or more steps are performed in a different country than another step of the method. In some instances, one or more steps for obtaining a sample are performed in a different country than one or more steps for detecting the presence or absence of a particular CD subtype from a sample. In some embodiments, one or more method steps involving a computer system are performed in a different country than another step of the methods provided herein. In some embodiments, data processing and analyses are performed in a different country or location than one or more steps of the methods described herein. In some embodiments, one or more articles, products, or data are transferred from one or more of the facilities to one or more different facilities for analysis or further analysis. An article includes, but is not limited to, one or more components obtained from a subject, e.g., processed cellular material. Processed cellular material includes, but is not limited to, cDNA reverse transcribed from RNA, amplified RNA, amplified cDNA, sequenced DNA, isolated and/or purified RNA, isolated and/or purified DNA, and isolated and/or purified polypeptide. Data includes, but is not limited to, information regarding the stratification of a subject, and any data produced by the methods disclosed herein. In some embodiments of the methods and systems described herein, the analysis is performed and a subsequent data transmission step will convey or transmit the results of the analysis.

In some embodiments, any step of any method described herein is performed by a software program or module on a computer. In additional or further embodiments, data from any step of any method described herein is transferred to and from facilities located within the same or different countries, including analysis performed in one facility in a particular location and the data shipped to another location or directly to an individual in the same or a different country. In additional or further embodiments, data from any step of any method described herein is transferred to and/or received from a facility located within the same or different countries, including analysis of a data input, such as genetic or processed cellular material, performed in one facility in a particular location and corresponding data transmitted to another location, or directly to an individual, such as data related to the diagnosis, prognosis, responsiveness to therapy, or the like, in the same or different location or country.

Business Method Utilizing a Computer

The methods described herein may utilize one or more computers. The computer may be used for managing customer and sample information such as sample or customer tracking, database management, analyzing molecular profiling data, analyzing cytological data, storing data, billing, marketing, reporting results, storing results, or a combination thereof. The computer may include a monitor or other graphical interface for displaying data, results, billing information, marketing information (e.g. demographics), customer information, or sample information. The computer may also include means for data or information input. The computer may include a processing unit and fixed or removable media or a combination thereof. The computer may be accessed by a user in physical proximity to the computer, for example via a keyboard and/or mouse, or by a user that does not necessarily have access to the physical computer through a communication medium such as a modem, an internet connection, a telephone connection, or a wired or wireless communication signal carrier wave. In some cases, the computer may be connected to a server or other communication device for relaying information from a user to the computer or from the computer to a user. In some cases, the user may store data or information obtained from the computer through a communication medium on media, such as removable media. It is envisioned that data relating to the methods can be transmitted over such networks or connections for reception and/or review by a party. The receiving party can be but is not limited to an individual, a health care provider or a health care manager. In one embodiment, a computer-readable medium includes a medium suitable for transmission of a result of an analysis of a biological sample, such as exosome bio-signatures. The medium can include a result regarding an exosome bio-signature of a subject, wherein such a result is derived using the methods described herein.

The entity obtaining a RNASET2 risk genotype may enter sample information into a database for the purpose of one or more of the following: inventory tracking, assay result tracking, order tracking, customer management, customer service, billing, and sales. Sample information may include, but is not limited to: customer name, unique customer identification, customer associated medical professional, indicated assay or assays, assay results, adequacy status, indicated adequacy tests, medical history of the individual, preliminary diagnosis, suspected diagnosis, sample history, insurance provider, medical provider, third party testing center or any information suitable for storage in a database. Sample history may include but is not limited to: age of the sample, type of sample, method of acquisition, method of storage, or method of transport.

The database may be accessible by a customer, medical professional, insurance provider, or other third party. Database access may take the form of electronic communication such as a computer or telephone. The database may be accessed through an intermediary such as a customer service representative, business representative, consultant, independent testing center, or medical professional. The availability or degree of database access or sample information, such as assay results, may change upon payment of a fee for products and services rendered or to be rendered. The degree of database access or sample information may be restricted to comply with generally accepted or legal requirements for patient or customer confidentiality.

Disclosed herein, in some embodiments, are the following:

1. Use of a modulator of Ribonuclease T2 (RNASET2) activity and/or expression and/or an inhibitor of TNF Superfamily Member 15 (TL1A) activity or expression in the manufacture of a medicament for the treatment of a disease or condition in a subject, provided a genotype is detected in a sample obtained from the subject.
2. Use of a modulator of Ribonuclease T2 (RNASET2) activity and/or expression and/or an inhibitor of TNF Superfamily Member 15 (TL1A) activity or expression in the manufacture of a medicament for increasing or enhancing activity or expression of Ribonuclease T2 (RNASET2) in a subject, provided a genotype is detected in a sample obtained from the subject.
3. A computer system for evaluating a sample from a subject, the system comprising:
   a) a central computing environment;
   b) an input device operatively connected to said central computing environment, wherein said input device is configured to receive a presence or absence of a genotype that correlates with a disease state in the sample;
   c) a trained algorithm executed by said central computing environment, wherein the trained algorithm is configured to use the presence or absence of the genotype to classify said sample as a disease or normal sample;
   d) an output device operatively connected to said central computing environment, wherein said output device is configured to provide information on the classification to a user, wherein the output device provides a report summarizing said information on said classification, and wherein the report comprises a recommendation for administering a modulator of Ribonuclease T2 (RNASET2) activity or expression and/or an inhibitor of TNF Superfamily Member 15 (TL1A) activity or expression to the subject optionally to treat or prevent the disease, provided the presence of the genotype is used classify said sample as a disease sample.
4. A computer system for evaluating a sample from a subject, the system comprising:
   a) a central computing environment;
   b) an input device operatively connected to said central computing environment, wherein said input device is configured to receive a presence or absence of a genotype that correlates with a disease state in the sample;
   c) a trained algorithm executed by said central computing environment, wherein the trained algorithm is configured to use the presence or absence of the genotype to classify said sample as a disease or normal sample;
   d) an output device operatively connected to said central computing environment, wherein said output device is configured to provide information on the classification to a user, wherein the output device provides a report summarizing said information on said classification, and wherein the report comprises a recommendation for administering a modulator of Ribonuclease T2 (RNASET2) activity or expression and/or an inhibitor of TNF Superfamily Member 15 (TL1A) activity or expression to the subject optionally to increase or enhance activity or expression of RNASET2, provided the presence of the genotype is used classify said sample as a disease sample.

5. The computer system or use of any one of embodiments 1-4, wherein the genotype is detected with an assay comprising polymerase chain reaction (PCR), quantitative reverse-transcription PCR (qPCR), automated sequencing, genotype array, or a combination thereof.

6. The computer system or use of any one of embodiments 1-5, wherein the modulator of RNASET2 activity or expression comprises an agonist or a partial agonist of RNASET2.

7. The computer system or use of embodiment 6, wherein the agonist or partial agonist comprises an antibody or antigen-binding fragment, small molecule, or a recombinant protein.

8. The computer system or use of any one of embodiments 6-7, wherein the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11.

9. The computer system or use of embodiment 8, wherein the amino acid sequence comprises one or more deletions, substitutions, and/or mutations.

10. The computer system or use of any one of embodiments 9, wherein the one or more deletions, substitutions, and/or mutations is at the N-terminus or C-terminus of the RNASET2 polypeptide.

11. The computer system or use of any one of embodiments 9, wherein the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide.

12. The computer system or use of any one of embodiments 9, wherein the one or more deletions, substitutions, and/or mutations is internal.

13. The computer system or use of any one of embodiments 6-12, wherein the agonist or partial agonist comprises a fusion protein, conjugate, or both.

14. The computer system or use of any one of embodiments 13, wherein the fusion protein comprises an amino acid sequence of a plasma long half-life polypeptide.

15. The computer system or use of any one of embodiments 13, wherein the conjugate comprises an RNASET2 polypeptide comprising at least one amino acid bound to a conjugating moiety.

16. The computer system or use of any one of embodiments 15, wherein the conjugating moiety comprises Polyethylene glycol (PEG).

17. The computer system or use of any one of embodiments 14, wherein the long plasma half-life polypeptide comprises an antibody, or antibody fragment, comprising IgG1, IgG2, IgG4, IgG3, or IgE.

18. The computer system or use of any one of embodiments 14, wherein the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin.

19. The computer system or use of any one of embodiments 6-7, wherein the agonist or partial agonist is effective to increase expression of RNASET2 in the subject.

20. The computer system or use of any one of embodiments 6-7, wherein the agonist or partial agonist is effective to activate RNASET2 activity in the subject.

21. The computer system or use of any one of embodiments 8-20, wherein a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.

22. The computer system or use of any one of embodiments 1-21, wherein the genotype is homozygous or heterozygous.

23. The computer system or use of any one of embodiments 1-22, wherein the disease comprises and inflammatory, fibrostenotic, and/or fibrotic disease.

24. The computer system or use of embodiment 23, wherein the inflammatory, fibrostenotic, and/or fibrotic disease comprises inflammatory bowel disease (IBD), Crohn's disease (CD), perianal CD, ulcerative colitis (UC), intestinal fibrosis, pulmonary fibrosis, or intestinal fibrostenosis.

25. The computer system or use of any one of embodiments 1-24, wherein the sample comprises whole blood, plasma, serum, or biopsy tissue.

26. The computer system or use of any one of embodiments 1-25, wherein the subject is mammal.

27. The computer system or use of any one of embodiments 1-26, wherein the subject is human.

28. The computer system or use of any one of embodiments 1-27 wherein the subject is non-responsive to an induction of anti-Tumor Necrosis Factor (TNF) therapy, or lost response to the anti-TNF therapy after a period of time during treatment.

29. The computer system or use of any one of embodiments 23-24, wherein the inflammatory, fibrostenotic, and/or fibrotic disease is refractory.

30. The computer system or use of any one of embodiments 1-29, wherein the genotype comprises one or more single nucleotide polymorphisms (SNPs) or indels at Indel1, SNP1, SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

31. The computer system or use of embodiment 30, wherein the indel at Indel 1 comprises "CCAGGGCTGGGTGAGGG" (SEQ ID NO:14).

32. The computer system or use of embodiment 30, wherein the SNP at SNP 1 comprises a "C" allele.

33. The computer system or use of embodiment 30, wherein the SNP at SNP 2 comprises a "T" allele.

34. The computer system or use of embodiment 30, wherein the SNP at SNP 3 comprises a "G" allele.

35. The computer system or use of embodiment 30, wherein the SNP at SNP 4 comprises a "G" allele.

36. The computer system or use of embodiment 30 or 31, wherein the indel at Indel 1 is within SEQ ID NO: 1.
37. The computer system or use of embodiment 30 or 32, wherein the SNP at SNP 1 is within SEQ ID NO: 2.
38. The computer system or use of embodiment 30 or 33, wherein the SNP at SNP 2 is within SEQ ID NO: 3.
39. The computer system or use of embodiment 30 or 34, wherein the SNP at SNP 3 is within SEQ ID NO: 4.
40. The computer system or use of embodiment 30 or 35, wherein the SNP at SNP 4 is within SEQ ID NO: 5.
41. The computer system or use of any one of embodiments 30-40, where LD is defined by an r2 value of at least 0.80, 0.85, 0.90, 0.95, or 1.0.
42. The computer system or use of any one of embodiments 1-41, wherein the genotype comprises one or more single nucleotide polymorphisms (SNPs) or indels located at a gene RibonucleaseT2 (RNASET2).
43. The computer system or use of any one of embodiments 1-42, wherein the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.
44. The computer system or use of any one of embodiments 1-43, wherein the genotype is associated with a risk that the subject has, or will develop, a subclinical phenotype of the disease as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.
45. The computer system or use of embodiment 44, wherein the subclinical phenotype comprises stricturing, penetrating, stricturing and penetrating, disease phenotypes.
46. The computer system or use of any one of embodiments 1-45, wherein the genotype comprises one or more SNPs in linkage disequilibrium with SNP 2 as determined by an r2 value of at least about 0.80, about 0.85, about 0.90, about 0.95, or about 1.0.
47. A computer system for evaluating a sample from a subject, the system comprising:
    a) a central computing environment;
    b) an input device operatively connected to said central computing environment, wherein said input device is configured to receive a presence or absence of a genotype that correlates with a disease state in the sample;
    c) a trained algorithm executed by said central computing environment, wherein the trained algorithm is configured to use the presence or absence of the genotype to classify said sample as a disease or normal sample;
    d) an output device operatively connected to said central computing environment, wherein said output device is configured to provide information on the classification to a user, wherein the information optionally comprises a diagnosis of the disease in the subject.
48. A computer system for evaluating a sample from a subject, the system comprising:
    a) a central computing environment;
    b) an input device operatively connected to said central computing environment, wherein said input device is configured to receive a presence or absence of a genotype that correlates with a disease state in the sample;
    c) a trained algorithm executed by said central computing environment, wherein the trained algorithm is configured to use the presence or absence of the genotype to classify said sample as a disease or normal sample;
    d) an output device operatively connected to said central computing environment, wherein said output device is configured to provide information on the classification to a user, wherein the information optionally comprises a risk of the subject developing the disease.
49. A computer system for evaluating a sample from a subject, the system comprising:
    a) a central computing environment;
    b) an input device operatively connected to said central computing environment, wherein said input device is configured to receive a presence or absence of a genotype that correlates with a disease state in the sample;
    c) a trained algorithm executed by said central computing environment, wherein the trained algorithm is configured to use the presence or absence of the genotype to classify said sample as a disease or normal sample;
    d) an output device operatively connected to said central computing environment, wherein said output device is configured to provide information on the classification to a user, wherein the information optionally comprises a determination that the subject is suitable for treatment of the disease with a modulator of RNASET2 activity or expression and/or an inhibitor of TNF Superfamily Member 15 (TL1A) activity or expression.
50. The computer system of any one of embodiments 47-49, wherein the genotype is detected with an assay comprising polymerase chain reaction (PCR), quantitative reverse-transcription PCR (qPCR), automated sequencing, genotype array, or a combination thereof.
51. The computer system of any one of embodiments 47-50, wherein said output device provides a report summarizing said information on said classification, and wherein said report comprises a recommendation for treatment of said disease comprising administering to the subject a modulator or RNASET2 activity or expression, and/or an inhibitor of TNF Superfamily Member 15 (TL1A) activity or expression.
52. The computer system of embodiment 51, wherein the modulator of RNASET2 activity or expression comprises an agonist or a partial agonist of RNASET2.
53. The computer system of embodiment 51, wherein the agonist or partial agonist comprises an antibody or antigen-binding fragment, small molecule, or a recombinant protein.
54. The computer system of any one of embodiments 52-53, wherein the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11.

55. The computer system of embodiment 54, wherein the amino acid sequence comprises one or more deletions, substitutions, and/or mutations.
56. The computer system of any one of embodiments 55, wherein the one or more deletions, substitutions, and/or mutations is at the N-terminus or C-terminus of the RNASET2 polypeptide.
57. The computer system of any one of embodiments 55, wherein the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide.
58. The computer system of any one of embodiments 55, wherein the one or more deletions, substitutions, and/or mutations is internal.
59. The computer system of any one of embodiments 52-58, wherein the agonist or partial agonist comprises a fusion protein, conjugate, or both.
60. The computer system of embodiment 59, wherein the fusion protein comprises an amino acid sequence of a plasma long half-life polypeptide.
61. The computer system of any one of embodiments 59-60, wherein the conjugate comprises an RNASET2 polypeptide comprising at least one amino acid bound to a conjugating moiety.
62. The computer system of any one of embodiments 61, wherein the conjugating moiety comprises Polyethylene glycol (PEG).
63. The computer system of any one of embodiments 60, wherein the long plasma half-life polypeptide comprises an antibody, or antibody fragment, comprising IgG1, IgG2, IgG4, IgG3, or IgE.
64. The computer system of any one of embodiments 60, wherein the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin.
65. The computer system of any one of embodiments 52-64, wherein the agonist or partial agonist is effective to increase expression of RNASET2 in the subject.
66. The computer system of any one of embodiments 52-64, wherein the agonist or partial agonist is effective to activate RNASET2 activity in the subject.
67. The computer system of any one of embodiments 54-66, wherein a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.
68. The computer system of any one of embodiments 47-67, wherein the genotype is homozygous or heterozygous.
69. The computer system of any one of embodiments 47-54, wherein the disease comprises and inflammatory, fibrostenotic, and/or fibrotic disease.
70. The computer system of embodiment 69, wherein the inflammatory, fibrostenotic, and/or fibrotic disease comprises inflammatory bowel disease (IBD), Crohn's disease (CD), perianal CD, ulcerative colitis (UC), intestinal fibrosis, pulmonary fibrosis, or intestinal fibrostenosis.
71. The computer system of any one of embodiments 47-70, wherein the sample comprises whole blood, plasma, serum, or biopsy tissue.
72. The computer system of any one of embodiments 47-71, wherein the subject is mammal.
73. The computer system of any one of embodiments 47-72, wherein the subject is human.
74. The computer system of any one of embodiments 47-73, wherein the subject is non-responsive to an induction of anti-Tumor Necrosis Factor (TNF) therapy, or lost response to the anti-TNF therapy after a period of time during treatment.
75. The computer system of any one of embodiments 69, wherein the inflammatory, fibrostenotic, and/or fibrotic disease is refractory.
76. The computer system of any one of embodiments 47-75, wherein the genotype comprises one or more single nucleotide polymorphisms (SNPs) or indels at Indel1, SNP1, SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.
77. The computer system of embodiment 76, wherein the indel at Indel 1 comprises CCAGGGCTGGGTGAGGG (SEQ ID NO:14).
78. The computer system of embodiment 76, wherein the SNP at SNP 1 comprises a "C" allele.
79. The computer system of embodiment 76, wherein the SNP at SNP 2 comprises a "T" allele.
80. The computer system of embodiment 76, wherein the SNP at SNP 3 comprises a "G" allele.
81. The computer system of embodiment 76, wherein the SNP at SNP 4 comprises a "G" allele.
82. The computer system of embodiment 76 or 77, wherein the indel at Indel 1 is within SEQ ID NO: 1.
83. The computer system of embodiment 76 or 78, wherein the SNP at SNP 1 is within SEQ ID NO: 2.
84. The computer system of embodiment 76 or 79, wherein the SNP at SNP 2 is within SEQ ID NO: 3.
85. The computer system of embodiment 76 or 80, wherein the SNP at SNP 3 is within SEQ ID NO: 4.
86. The computer system of embodiment 76 or 81, wherein the SNP at SNP 4 is within SEQ ID NO: 5.
87. The computer system of any one of embodiments 76-86, where LD is defined by an $r^2$ value of at least 0.80, 0.85, 0.90, 0.95, or 1.0.
88. The computer system of any one of embodiments 47-87, wherein the genotype comprises one or more single nucleotide polymorphisms (SNPs) or indels located at a gene RibonucleaseT2 (RNASET2).
89. The computer system of any one of embodiments 47-88, wherein the genotype is associated with a risk that a subject has, or will develop, inflammatory bowel disease (IBD), Crohn's disease (CD), or ulcerative colitis (UC), as determined by a P value of at most about $1.0\times10-6$, about $1.0\times10-7$, about $1.0\times10-8$, about $1.0\times10-9$, about $1.0\times10-10$, about $1.0\times10-20$, about $1.0\times10-30$, about $1.0\times10-40$, about $1.0\times10-50$, about $1.0\times10-60$, about $1.0\times10-70$, about $1.0\times10-80$, about $1.0\times10-90$, or about $1.0\times10-100$.
90. The computer system of any one of embodiments 47-89, wherein the genotype is associated with a risk that the subject has, or will develop, a subclinical phenotype of the disease as determined by a P value of at most about 1.0×10-6, about 1.0×10-7, about 1.0×10-8, about 1.0×10-9, about 1.0×10-10, about 1.0×10-20, about 1.0×10-30, about 1.0×10-40, about 1.0×10-50, about 1.0×10-60, about 1.0×10-70, about 1.0×10-80, about 1.0×10-90, or about 1.0×10-100.

91. The computer system of embodiment 90, wherein the subclinical phenotype comprises stricturing, penetrating, stricturing and penetrating, disease phenotypes.

92. The computer system of any one of embodiments 47-91, wherein the genotype comprises one or more SNPs in linkage disequilibrium with r SNP 2 as determined by an r2 value of at least about 0.80, about 0.85, about 0.90, about 0.95, or about 1.0.

143. Use of a composition comprising one or more binding agents for generating a genotype report that classifies genetic material from a subject as disease or non-disease of a disease state, wherein the one or more binding agents are sufficiently complementary to and capable of hybridizing to a genotype, the composition comprising:
   i) a detectably labeled oligonucleotide probe comprising SEQ ID NO: 6,
   ii) a detectably labeled oligonucleotide probe comprising SEQ ID NO: 7,
   iii) a detectably labeled oligonucleotide probe comprising SEQ ID NO: 8,
   iv) a detectably labeled oligonucleotide probe comprising SEQ ID NO: 9,
   v) a detectably labeled oligonucleotide probe comprising SEQ ID NO: 10,
   vi) a detectably labeled oligonucleotide probe comprising a nucleic acid sequence that differs from a probe selected from the group consisting of (i)-(v) by up to three nucleobases, provided the detectably labeled oligonucleotide probe of (vi) hybridizes to the genotype of interest,
   vii) a detectably labeled oligonucleotide probe comprising a nucleic acid sequence complementary to a probe selected from the group consisting of (i)-(vi), or
   viii) a combination of probes selected from the group consisting of (i)-(vii).

144. The use of embodiment 143, wherein the report comprises a recommendation to treat the subject with a modulator of Ribonuclease T2 (RNASET2) activity or expression and/or an inhibitor of TNF Superfamily Member 15 (TL1A) activity or expression, provided that the subject comprises the genotype.

145. The use of embodiment 144, wherein the modulator of RNASET2 activity or expression comprises an agonist or a partial agonist of RNASET2.

146. The use of embodiment 145, wherein the agonist or partial agonist comprises an antibody or antigen-binding fragment, small molecule, or recombinant protein.

147. The use of any one of embodiments 145-146, wherein the agonist or partial agonist comprises an amino acid sequence of a RNASET2 polypeptide that is 99%, 98%, 97%, 96%, 95%, 94%, 93%, 92%, 91%, or 90% homologous to at least 50 contiguous amino acids provided in SEQ ID NO: 11.

148. The use of embodiment 147, wherein the amino acid sequence comprises one or more deletions, substitutions, and/or mutations.

149. The use of embodiment 148, wherein the one or more deletions, substitutions, and/or mutations is at the N-terminus or C-terminus of the RNASET2 polypeptide.

150. The use of embodiment 148, wherein the one or more deletions, substitutions, and/or mutations is 1, 2, 3, 4, 5, 6, 7, 8, 9, 10, 11, 12, 13, 14, 15, or 20 amino acids from the N-terminus or the C-terminus of the RNASET2 polypeptide.

151. The use of embodiment 148, wherein the one or more deletions, substitutions, and/or mutations is internal.

152. The use of any one of embodiments 147-150, wherein the agonist or partial agonist comprises a fusion protein, conjugate, or both.

153. The use of embodiment 152, wherein the fusion protein comprises an amino acid sequence of a plasma long half-life polypeptide.

154. The use of embodiment 152, wherein the conjugate comprises an RNASET2 polypeptide comprising at least one amino acid bound to a conjugating moiety.

155. The use of embodiment 154, wherein the conjugating moiety comprises Polyethylene glycol (PEG).

156. The use of any one of embodiments 153-155, wherein the long plasma half-life polypeptide comprises an antibody, or antibody fragment, comprising IgG1, IgG2, IgG4, IgG3, or IgE.

157. The use of any one of embodiments 153-155, wherein the half-life polypeptide comprises HSA, transferrin, IgA monomer, Retinol-binding protein, Factor H, Factor XIII, C-reactive protein, Factor IX, Fibrinogen, IFN-alpha, Pentameric IgM, IL-2, or Thyroglobulin.

158. The use of any one of embodiments 145-157, wherein the agonist or partial agonist is effective to increase expression of RNASET2 in the subject.

159. The use of any one of embodiments 145-157, wherein the agonist or partial agonist is effective to activate RNASET2 activity in the subject.

160. The use of any one of embodiments 147-159, wherein a plasma half-life of the agonist or partial agonist comprises 30 minutes, 45 minutes, 60 minutes, 75 minutes, or 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type RNASET2 protein.

161. The use of any one of embodiments 144-160, wherein the genotype is homozygous or heterozygous.

162. The use of any one of embodiments 145-147, wherein the disease comprises and inflammatory, fibrostenotic, and/or fibrotic disease.

163. The use of embodiment 162, wherein the inflammatory, fibrostenotic, and/or fibrotic disease comprises inflammatory bowel disease (IBD), Crohn's disease (CD), perianal CD, ulcerative colitis (UC), intestinal fibrosis, pulmonary fibrosis, or intestinal fibrostenosis.

164. The use of any one of embodiments 143-163, wherein the genetic material was isolated from a sample obtained from the subject, comprising whole blood, plasma, serum, or biopsy tissue.

165. The use of any one of embodiments 143-164, wherein the subject is mammal.

166. The use of any one of embodiments 143-165, wherein the subject is human.

167. The use of any one of embodiments 143-166, wherein the subject is non-responsive to an induction of anti-Tumor Necrosis Factor (TNF) therapy, or lost response to the anti-TNF therapy after a period of time during treatment.

168. The use of any one of embodiments 162-163, wherein the inflammatory, fibrostenotic, and/or fibrotic disease is refractory.

169. The use of any one of embodiments 143-168, wherein the genotype comprises one or more single nucleotide polymorphisms (SNPs) or indels at Indel1, SNP1, SNP2, SNP3, SNP4, SNP5, SNP6, SNP7, SNP8, SNP9, SNP10, SNP11, SNP12, SNP13, SNP14, SNP15, SNP16, SNP17, SNP18, SNP19, SNP20, SNP21, SNP22, SNP23, SNP24, SNP25, SNP26, SNP27, SNP28, SNP29, SNP30, SNP31, SNP32, SNP33, SNP34, SNP35, SNP36, or a SNP in linkage disequilibrium (LD) therewith, or any combination thereof.

170. The use of embodiment 169, wherein the indel at Indel 1 comprises CCAGGGCTGGGTGAGGG" (SEQ ID NO:14).

171. The use of embodiment 169, wherein the SNP at SNP 1 comprises a "C" allele.

172. The use of embodiment 169, wherein the SNP at SNP 2 comprises a "T" allele.

173. The use of embodiment 169, wherein the SNP at SNP 3 comprises a "G" allele.

174. The use of embodiment 169, wherein the SNP at SNP 4 comprises a "G" allele.

175. The use of embodiment 169 or 170, wherein the indel at Indel 1 is within SEQ ID NO: 1.

176. The use of embodiment 169 or 171, wherein the SNP at SNP 1 is within SEQ ID NO: 2.

177. The use of embodiment 169 or 172, wherein the SNP at SNP 2 is within SEQ ID NO: 3.

178. The use of embodiment 169 or 173, wherein the SNP at SNP 3 is within SEQ ID NO: 4.

179. The use of embodiment 169 or 174, wherein the SNP at SNP 4 is within SEQ ID NO: 5.

180. The use of any one of embodiments 169-179, where LD is defined by an r2 value of at least 0.80, 0.85, 0.90, 0.95, r 1.0.

181. The use of any one of embodiments 143-180, wherein the genotype comprises one or more single nucleotide polymorphisms (SNPs) or indels located at a gene Ribonuclease T2 (RNASET2).

182. The use of any one of embodiments 143-181, wherein the genotype is associated with a risk that a subject has, or will develop, inflammatory bowel disease (IBD), Crohn's disease (CD), or ulcerative colitis (UC), as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.

183. The use of any one of embodiments 143-182, wherein the genotype is associated with a risk that the subject has, or will develop, a subclinical phenotype of the disease as determined by a P value of at most about $1.0 \times 10^{-6}$, about $1.0 \times 10^{-7}$, about $1.0 \times 10^{-8}$, about $1.0 \times 10^{-9}$, about $1.0 \times 10^{-10}$, about $1.0 \times 10^{-20}$, about $1.0 \times 10^{-30}$, about $1.0 \times 10^{-40}$, about $1.0 \times 10^{-50}$, about $1.0 \times 10^{-60}$, about $1.0 \times 10^{-70}$, about $1.0 \times 10^{-80}$, about $1.0 \times 10^{-90}$, or about $1.0 \times 10^{-100}$.

184. The use of embodiment 183, wherein the subclinical phenotype comprises stricturing, penetrating, stricturing and penetrating, disease phenotypes.

185. The use of any one of embodiments 143-184, wherein the genotype comprises one or more SNPs in linkage disequilibrium with SNP 2 as determined by an r2 value of at least about 0.80, about 0.85, about 0.90, about 0.95, or about 1.0.

186. The computer system or use of any one of embodiments 1-46, 49-92, or 144-185, wherein the inhibitor of TL1A activity or expression comprises an anti-TL1A antibody.

187. The computer system or use of embodiment 186, wherein the anti-TL1A antibody comprises an inhibitor of TL1A-Death Receptor 3 (DR3) binding, signaling, or both.

188. The computer system or use of any one of the previous embodiments, wherein the genotype comprises Indel 1.

189. The computer system or use of any one of the previous embodiments, wherein the genotype comprises SNP 1.

190. The computer system or use of any one of the previous embodiments, wherein the genotype comprises SNP 2.

191. The computer system or use of any one of the previous embodiments, wherein the genotype comprises SNP 3.

192. The computer system or use of any one of the previous embodiments, wherein the genotype comprises SNP 4.

193. The computer system or use of any one of the previous embodiments, wherein the genotype comprises Indel 1 and SNP 1.

194. The computer system or use of any one of the previous embodiments, wherein the genotype comprises Indel 1 and SNP 2.

195. The computer system or use of any one of the previous embodiments, wherein the genotype comprises Indel 1 and SNP 3.

196. The computer system or use of any one of the previous embodiments, wherein the genotype comprises Indel 1 and SNP 4.

197. The computer system or use of any one of the previous embodiments, wherein the genotype comprises SNP 1 and SNP 2.

198. The computer system or use of any one of the previous embodiments, wherein the genotype comprises SNP 1 and SNP 3.

199. The computer system or use of any one of the previous embodiments, wherein the genotype comprises SNP 1 and SNP 4.

200. The computer system or use of any one of the previous embodiments, wherein the genotype comprises SNP 2 and SNP 3.

201. The computer system or use of any one of the previous embodiments, wherein the genotype comprises SNP 2 and SNP 4.

202. The computer system or use of any one of the previous embodiments, wherein the genotype comprises SNP 3 and SNP 4.

203. The computer system or use of any one of the previous embodiments, wherein the genotype comprises Indel 1, SNP 1, and SNP 2.

204. The computer system or use of any one of the previous embodiments, wherein the genotype comprises Indel 1, SNP 1, and SNP 3.

205. The computer system or use of any one of the previous embodiments, wherein the genotype comprises Indel 1, SNP 1, and SNP 4.

206. The computer system or use of any one of the previous embodiments, wherein the genotype comprises Indel 1, SNP 2, and SNP 3.
207. The computer system or use of any one of the previous embodiments, wherein the genotype comprises Indel 1, SNP 2, and SNP 4.
208. The computer system or use of any one of the previous embodiments, wherein the genotype comprises Indel 1, SNP 3, and SNP 4.
209. The computer system or use of any one of the previous embodiments, wherein the genotype comprises SNP 1, SNP 2, and SNP 3.
210. The computer system or use of any one of the previous embodiments, wherein the genotype comprises SNP 1, SNP 2, and SNP 4.
211. The computer system or use of any one of the previous embodiments, wherein the genotype comprises SNP 1, SNP 3, and SNP 4.
212. The computer system or use of any one of the previous embodiments, wherein the genotype comprises SNP 2, SNP 3, and SNP 4.
213. The computer system or use of any one of the previous embodiments, wherein the genotype comprises Indel 1, SNP 1, SNP 2, and SNP 3.
214. The computer system or use of any one of the previous embodiments, wherein the genotype comprises Indel 1, SNP 1, SNP 2, and SNP 4.
215. The computer system or use of any one of the previous embodiments, wherein the genotype comprises Indel 1, SNP 1, SNP 3, and SNP 4.
216. The computer system or use of any one of the previous embodiments, wherein the genotype comprises Indel 1, SNP 2, and SNP 3, and SNP 4.
217. The computer system or use of any one of the previous embodiments, wherein the genotype comprises SNP 1, SNP 2, SNP 3, and SNP 4.
218. The computer system or use of any one of the previous embodiments, wherein the genotype comprises Indel 1, SNP 1, SNP 2, SNP 3, and SNP 4.

Definitions

The terminology used herein is for the purpose of describing particular cases only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The term "about" or "approximately" means within an acceptable error range for the particular value as determined by one of ordinary skill in the art, which will depend in part on how the value is measured or determined, e.g., the limitations of the measurement system. For example, "about" can mean within 1 or more than 1 standard deviation, per the practice in the given value. Where particular values are described in the application and claims, unless otherwise stated the term "about" should be assumed to mean an acceptable error range for the particular value.

As used herein "consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed disclosure, such as compositions for treating skin disorders like acne, eczema, psoriasis, and rosacea.

The terms "homologous," "homology," or "percent homology" are used herein to generally mean an amino acid sequence or a nucleic acid sequence having the same, or similar sequence to a reference sequence. Percent homology of sequences can be determined using the most recent version of BLAST, as of the filing date of this application.

The terms "increased," or "increase" are used herein to generally mean an increase by a statically significant amount. In some embodiments, the terms "increased," or "increase," mean an increase of at least 10% as compared to a reference level, for example an increase of at least about 10%, at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, standard, or control. Other examples of "increase" include an increase of at least 2-fold, at least 5-fold, at least 10-fold, at least 20-fold, at least 50-fold, at least 100-fold, at least 1000-fold or more as compared to a reference level.

The terms, "decreased" or "decrease" are used herein generally to mean a decrease by a statistically significant amount. In some embodiments, "decreased" or "decrease" means a reduction by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (e.g., absent level or non-detectable level as compared to a reference level), or any decrease between 10-100% as compared to a reference level. In the context of a marker or symptom, by these terms is meant a statistically significant decrease in such level. The decrease can be, for example, at least 10%, at least 20%, at least 30%, at least 40% or more, and is preferably down to a level accepted as within the range of normal for an individual without a given disease.

The terms "patient" or "subject" are used herein, and encompass mammals. Non-limiting examples of mammal include, any member of the mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. In one aspect, the mammal is a human. The term "animal" as used herein comprises human beings and non-human animals. In one embodiment, a "non-human animal" is a mammal, for example a rodent such as rat or a mouse. In some cases, the subject is a patient that is diagnosed with a disease or disorder described herein. In some cases, the subject is suspected of having the disease or disorder, but is not necessarily diagnosed.

The term "gene," as used herein, refers to a segment of nucleic acid that encodes an individual protein or RNA (also referred to as a "coding sequence" or "coding region"), optionally together with associated regulatory region such as promoter, operator, terminator and the like, which may be located upstream or downstream of the coding sequence.

The term "genetic variant" as used herein refers to an aberration in (e.g., a mutation), or of (e.g., copy number variation), a nucleic acid sequence, as compared to the nucleic acid sequence in a reference population. In some embodiments, the genetic variant is common in the reference population. In some embodiments, the genetic variant is rare in the reference population.

The term, "genotype" as disclosed herein, refers to the chemical composition of polynucleotide sequences within the genome of an individual. In some embodiments, the genotype comprises single nucleotide variant (SNV), a single nucleotide polymorphism (SNP), or and indel (insertion or deletion, of a nucleobase within a polynucleotide sequence). In some embodiments, a genotype for a particular SNV, SNP, or indel is heterozygous. In some embodiments, a genotype for a particular SNV, SNP, or indel is homozygous.

The terms, "single nucleotide polymorphism," or "SNP," as disclosed herein, refer to a variation in a single nucleotide within a polynucleotide sequence. The variation of an SNP may have multiple different forms. A single form of an SNP is referred to as an "allele." An SNP can be mono-, bi-, tri, or tetra-allelic. An SNP may include a "risk allele," a "protective allele," or neither. By way of example, a reference polynucleotide sequence reading 5' to 3' is TTACG. A SNP at allele position 3 (of 5'-TTACG-3') comprise a substitution of the reference allele, "A" to anon-reference allele, "C." If the "C" allele of the SNP is associated with an increased probability of developing a phenotypic trait, the allele is considered a "risk" allele. However, the same SNP may also comprise a substitution of the "A" allele to a "T" allele at position 3. If the T allele of the SNP is associated with a decreased probability of developing a phenotypic trait, the allele is considered a "protective" allele. The SNP, in some cases, is observed in at least 1% of a given population. In some embodiments, the SNP is represented by an "rs" number, which refers to the accession of reference cluster of one more submitted SNPs in the dbSNP bioinformatics database as of the filing date of this patent application, and which is included within a sequence that comprises the total number of nucleobases from 5' to 3'. In some embodiments, a SNP may be further defined by the position of the SNV (nucleotide position) within the dbSNP sequence, the position of which is always with reference to 5' length of the sequence plus 1. In some embodiments, a SNP is defined as the genomic position in a reference genome and the allele change. In some embodiments, the SNP is defined as the genomic position identified with an "N" in a sequence disclosed herein, such as SEQ ID NOS: 1-5.

The term, "indel," as disclosed herein, refers to an insertion, or a deletion, of a nucleobase within a polynucleotide sequence. An indel can be mono-, bi-, tri, or tetra-allelic. An indel may be "risk," a "protective," or neither, for a phenotypic trait. In some embodiments, the indel is represented by an "rs" number, which refers to the accession of reference cluster of one more submitted indels in the dbSNP bioinformatics database as of the filing date of this patent application, and which is included in a sequence that comprises the total number of nucleobases from 5' to 3'. In some embodiments, an indel may be further defined by the position of the insertion/deletion within the dbSNP sequence, the position of which is always with reference to the 5' length of the sequence plus 1. In some embodiments, an indel is defined as the genomic position in a reference genome and the allele change. In some embodiments, the indel is defined as the genomic position identified with an "N" in a sequence disclosed herein in SEQ ID NOS: 1-6.

"Haplotype" as used herein, encompasses a group of one or more genotypes, SNVs, SNPs, or indels, which tend to be inherited together in a reference population. In some embodiments, a haplotype comprises particular SNPs, or indels, and any SNP, or indel in linkage disequilibrium therewith.

"Linkage disequilibrium," or "LD," as used herein refers to the non-random association of alleles or indels in different gene loci in a given population. LD may be defined by a D' value corresponding to the difference between an observed and expected allele or indel frequencies in the population (D=Pab−PaPb), which is scaled by the theoretical maximum value of D. LD may be defined by an $r^2$ value corresponding to the difference between an observed and expected unit of risk frequencies in the population (D=Pab−PaPb), which is scaled by the individual frequencies of the different loci. In some embodiments, D' comprises at least 0.20. In some embodiments, $r^2$ comprises at least 0.70.

The terms "treat," "treating," and "treatment" as used herein refers to alleviating or abrogating a disorder, disease, or condition; or one or more of the symptoms associated with the disorder, disease, or condition; or alleviating or eradicating a cause of the disorder, disease, or condition itself. Desirable effects of treatment can include, but are not limited to, preventing occurrence or recurrence of disease, alleviation of symptoms, diminishing any direct or indirect pathological consequences of the disease, preventing metastasis, decreasing the rate of disease progression, amelioration or palliation of the disease state and remission or improved prognosis.

The term "therapeutically effective amount" refers to the amount of a compound or therapy that, when administered, is sufficient to prevent development of, or alleviate to some extent, one or more of the symptoms of a disorder, disease, or condition of the disease; or the amount of a compound that is sufficient to elicit biological or medical response of a cell, tissue, system, animal, or human that is being sought by a researcher, veterinarian, medical doctor, or clinician.

The terms "pharmaceutically acceptable carrier," "pharmaceutically acceptable excipient," "physiologically acceptable carrier," or "physiologically acceptable excipient" refer to a pharmaceutically-acceptable material, composition, or vehicle, such as a liquid or solid filler, diluent, excipient, solvent, or encapsulating material. A component can be "pharmaceutically acceptable" in the sense of being compatible with the other ingredients of a pharmaceutical formulation. It can also be suitable for use in contact with the tissue or organ of humans and animals without excessive toxicity, irritation, allergic response, immunogenicity, or other problems or complications, commensurate with a reasonable benefit/risk ratio. See, Remington: The Science and Practice of Pharmacy, 21st Edition; Lippincott Williams & Wilkins: Philadelphia, PA, 2005; Handbook of Pharmaceutical Excipients, 5th Edition; Rowe et al., Eds., The Pharmaceutical Press and the American Pharmaceutical Association: 2005; and Handbook of Pharmaceutical Additives, 3rd Edition; Ash and Ash Eds., Gower Publishing Company: 2007; Pharmaceutical Preformulation and Formulation, Gibson Ed, CRC Press LLC: Boca Raton, FL, 2004).

The term "pharmaceutical composition" refers to a mixture of a compound disclosed herein with other chemical components, such as diluents or carriers. The pharmaceutical composition can facilitate administration of the compound to an organism. Multiple techniques of administering a compound exist in the art including, but not limited to, oral, injection, aerosol, parenteral, and topical administration.

The terms "inflammatory bowel disease" or "IBD" as used herein refer to gastrointestinal disorders of the gastrointestinal tract. Non-limiting examples of IBD include, Crohn's disease (CD), ulcerative colitis (UC), indeterminate colitis (IC), microscopic colitis, diversion colitis, Behcet's disease, and other inconclusive forms of IBD. In some instances, IBD comprises fibrosis, fibrostenosis, stricturing and/or penetrating disease, obstructive disease, or a disease that is refractory (e.g., mrUC, refractory CD), perianal CD, or other complicated forms of IBD.

Non-limiting examples of "sample" include any material from which nucleic acids and/or proteins can be obtained. As non-limiting examples, this includes whole blood, peripheral blood, plasma, serum, saliva, mucus, urine, semen, lymph, fecal extract, cheek swab, cells or other bodily fluid or tissue, including but not limited to tissue obtained through surgical biopsy or surgical resection. In various embodiments, the sample comprises tissue from the large and/or small intestine. In various embodiments, the large intestine sample comprises the cecum, colon (the ascending colon, the transverse colon, the descending colon, and the sigmoid colon), rectum and/or the anal canal. In some embodiments, the small intestine sample comprises the duodenum, jejunum, and/or the ileum. Alternatively, a sample can be obtained through primary patient derived cell lines, or archived patient samples in the form of preserved samples, or fresh frozen samples.

The term "biomarker" comprises a measurable substance in a subject whose presence, level, or activity, is indicative of a phenomenon (e.g., phenotypic expression or activity; disease, condition, subclinical phenotype of a disease or condition, infection; or environmental stimuli). In some embodiments, a biomarker comprises a gene, or gene expression product. In some embodiments, a biomarker comprises a cytokine (e.g., IL-1α, IL-1β, IL-2, IL-3. IL-4, IL-5, IL-6, IL-8, IL-9, IL-10, IL-13, IL-17, IL-17F, IL-22, TNF-α, TNF-β, IFN-α1/-α2, IFN-β, IFN-γ, TNFSF superfamily: TNF, TL1A, FasL, LIGHT, TRAIL, and TWEAK). In some embodiments, a biomarker comprises a cell type (e.g., Natural Killer (NK) cells, T cells, Effector T cells (Teff), Regulatory T cells (Treg) B cells, T helper (Th) cells, cluster of differentiation (CD) cells, innate lymphoid cells (ILC), antigen-presenting cells (APC), monocytes Paneth cells, granulocytes, dendritic cells, and macrophages).

The term "serological marker," as used herein refers to a type of biomarker representing an antigenic response in a subject that may be detected in the serum of the subject. In some embodiments, a serological comprises an antibody against various fungal antigens. Non-limiting examples of a serological marker comprise anti-*Saccharomyces cerevisiae* antibody (ASCA), an anti-neutrophil cytoplasmic antibody (ANCA), *E. coli* outer membrane porin protein C (OmpC), anti-*Malassezia restricta* antibody, anti-*Malassezia pachydermatis* antibody, anti-*Malassezia furfur* antibody, anti-*Malassezia globasa* antibody, anti-*Cladosporium albicans* antibody, anti-laminaribiose antibody (ALCA), anti-chitobioside antibody (ACCA), anti-laminarin antibody, anti-chitin antibody, pANCA antibody, anit-I2 antibody, and anti-Cbir1 flagellin antibody.

The terms "medically refractory" or "refractory," as used herein, refer to the failure of a standard treatment to induce remission of a disease. In some embodiments, the disease comprises an inflammatory disease disclosed herein. A non-limiting example of refractory inflammatory disease includes refractory Crohn's disease, and refractory ulcerative colitis (e.g., mrUC). Non-limiting examples of standard treatment include glucocorticosteriods, anti-TNF therapy, anti-a4-b7 therapy (vedolizumab), anti-IL12p40 therapy (ustekinumab), Thalidomide, and Cytoxin.

The terms "anti-tumor necrosis factor (TNF) non-response" or "anti-TNF non-response," as used herein, refer to a subject not responding to the induction of an anti-TNF therapy (primary non-response), or loss of response during maintenance after a successful induction of the anti-TNF therapy (secondary loss of response). In some embodiments, the induction of the anti-TNF therapy comprises 1, 2, 3, 4, or 5, doses of the therapy. In some embodiments, loss of response is characterized by a reappearance of symptoms consistent with a flare after an initial response to the anti-TNF therapy.

EXAMPLES

Example 1. Characterization of Candidate Causal RNASET2 Disease Associated Variants SNP 1 and Indel 1

A candidate causal single nucleotide polymorphism (SNP) at the RNASET2 gene locus, SNP 1, was identified within a putative enhancer region and in linkage with disease tagging SNP 2. To evaluate its functional impact in regulating RNASET2 promoter/enhancer activity, -3.7 kb promoter regions from individuals homozygous for the risk and non-risk alleles were cloned. Sequencing revealed that the 17 bp insertion, Indel 1, located -610 bp from the RNASET2 transcriptional start site (FIG. 1B, right panel), was present only in subjects carrying the risk allele. Regulatory annotation (StatePaintR) corresponds with T cell specific poised promoter/enhancer elements supporting the likelihood this disease associated indel impacts upon transcriptional regulation.

Figure 1C:
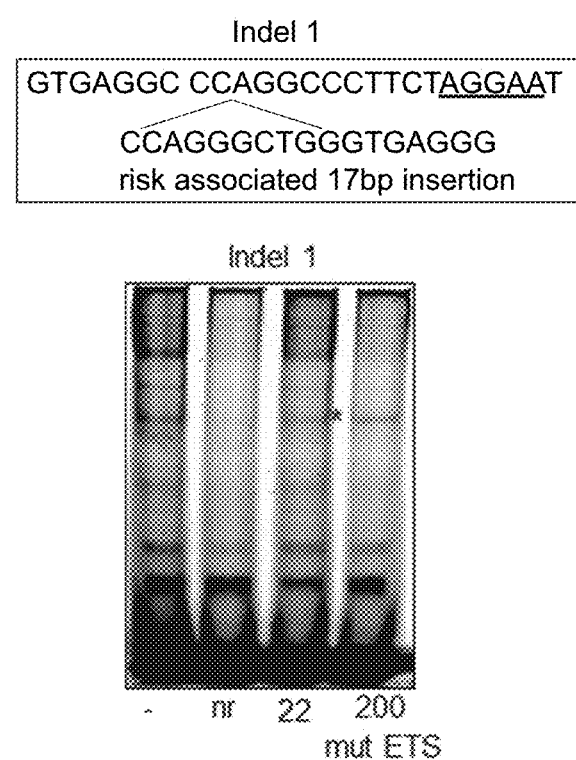
Figure 1D:
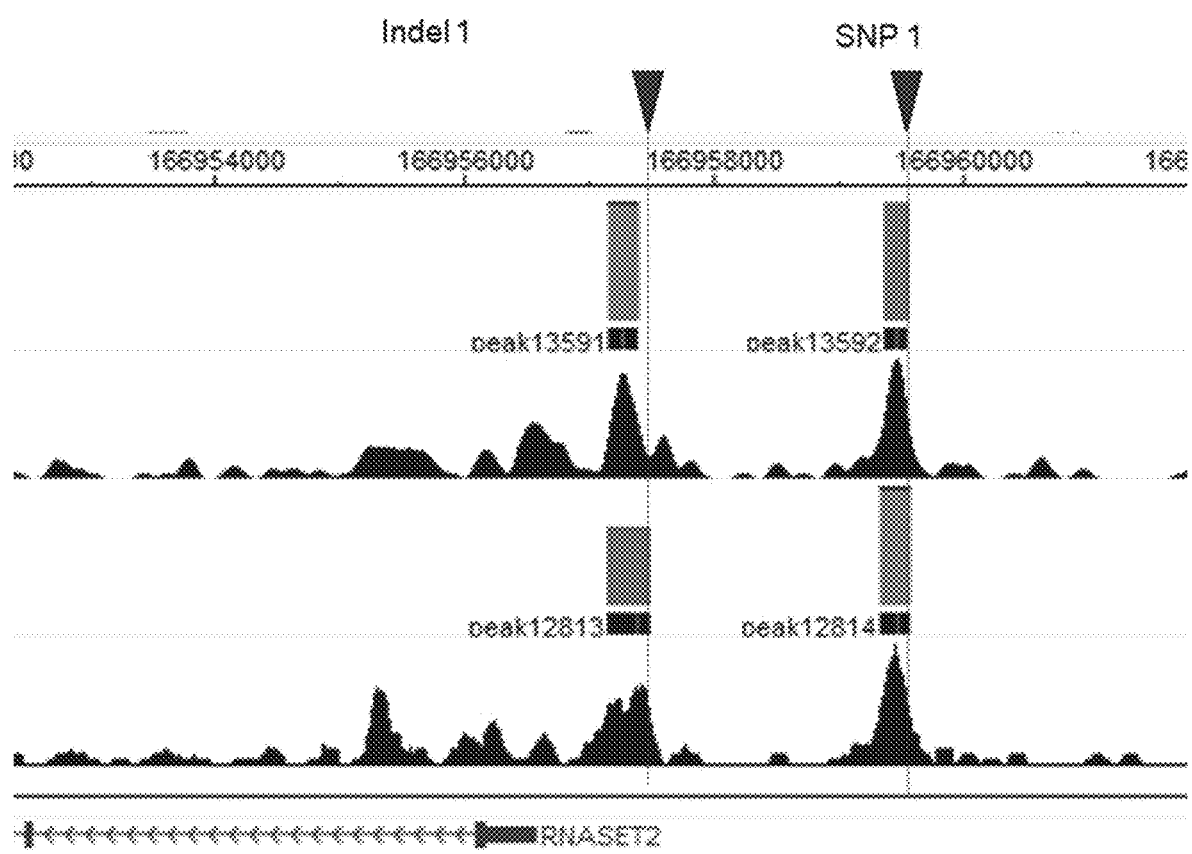
Figure 1E:
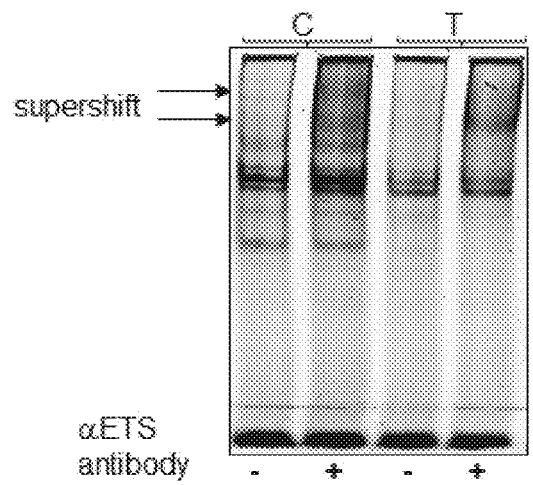

To assess the potential for SNP 1 and Indel 1 variants (FIG. 1B) to alter protein-DNA binding, EMSA analysis was performed using primary CD4+ T cell nuclear extracts binding to allele specific oligonucleotide (oligo) probes. As seen in FIG. 1B, the binding patterns differed for the SNP 1 C and T alleles with an additional DNA-protein complex formed to the C probe (FIG. 1B, arrow). Competition with excess unlabeled oligos showed that the C, but not T, probe abolished C specific complex formation indicating allele-specificity. Multiple DNA-protein complexes bound to non-risk Indel 1 and were not competed by excess 17 bp indel oligo (FIG. 1C). In contrast, FIG. 1A shows that DNA-protein complex did not form to either of the non-risk (G) and risk (T) alleles in SNP2. A strong correlation between expression of RNASET2 and multiple ETS TF family members was demonstrated previously. SNP 1 disrupts and shifts (FIG. 1B, underlined sequence) the conserved TTCC ETS binding sequence and is predicted (DNAshape, TFBSshape analysis) to distort the three-dimensional DNA conformation. The effect on ETS binding to complex formation was examined in EMSA competition assays. Competition with excess unlabeled oligo mutated for the C SNP ETS binding motif abolished selective nucleoprotein binding (FIG. 1B, C panel asterisk). In contrast, binding in context of the T SNP remained intact (FIG. 1B, T panel asterisk) demonstrating allele-specific contribution in ETS binding. A conserved ETS binding motif is likewise adjacent to Indel 1 (FIG. 1A, underlined sequence). In contrast, SNP2 does have contain TFBS. Competition with excess unlabeled ETS mutated indel oligo failed to abolish a selective nucleo-protein complex (FIG. 1C, asterisk). Chip-seq data from human purified T cells confirms binding of ETS1 to both SNP 1 and Indel 1 (FIG. 1D). Moreover, nucleo-protein binding to SNP 1 C and T SNPs was supershifted by ETS1-specific monoclonal antibody confirming an ETS1 component (FIG. 1E).

Figure 2:
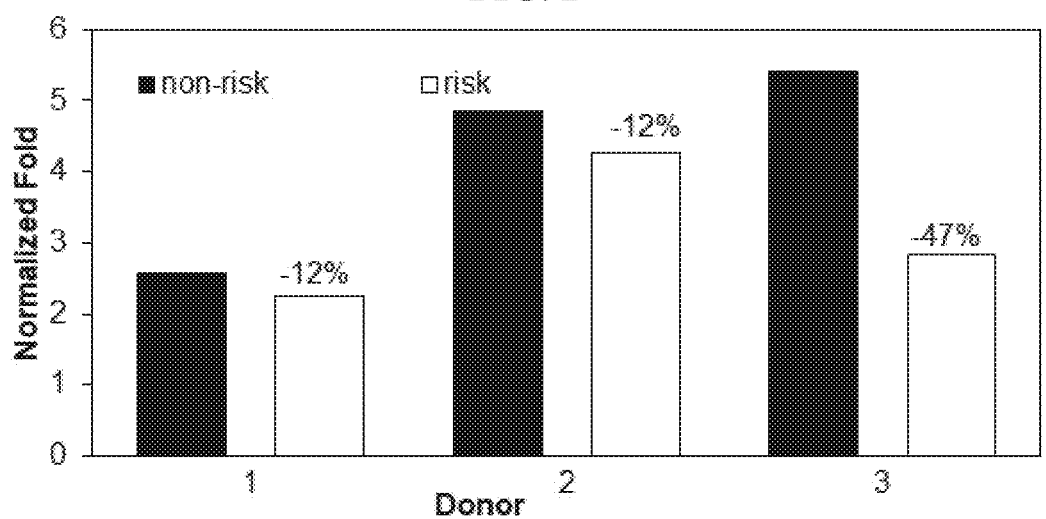
FIG. 2 illustrates a decrease in promoter activity when comparing risk vs non-risk variants when transfected into human CD4+ T cells.

The functional consequence on gene expression was examined utilizing promoter reporter constructs containing the cloned −3.2 kb genomic region (FIG. 11) from individuals homozygous for risk and non-risk SNP 1 and Indel 1 alleles transfected into primary CD4+ T cells. Preliminary data supports a decrease in promoter activity when comparing risk vs non-risk variants (FIG. 2).

Figure 11A:
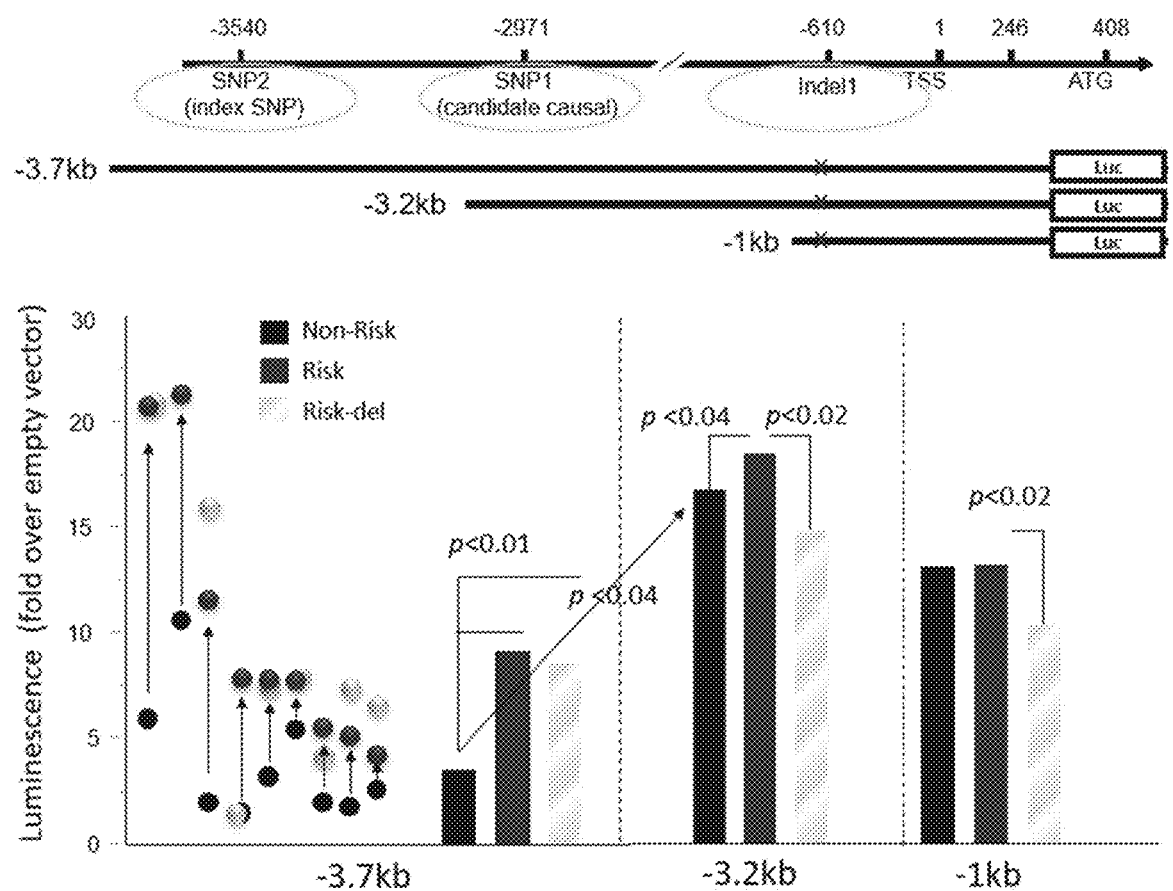
FIG. 11A-11B illustrate that SNP 2 does not alter transcription factor (TF) complex formation of RNASET2 expression, whereas SNP1 and Indel 1 do alter TF complex formation of RNASET2 expression.
Figure 11B:
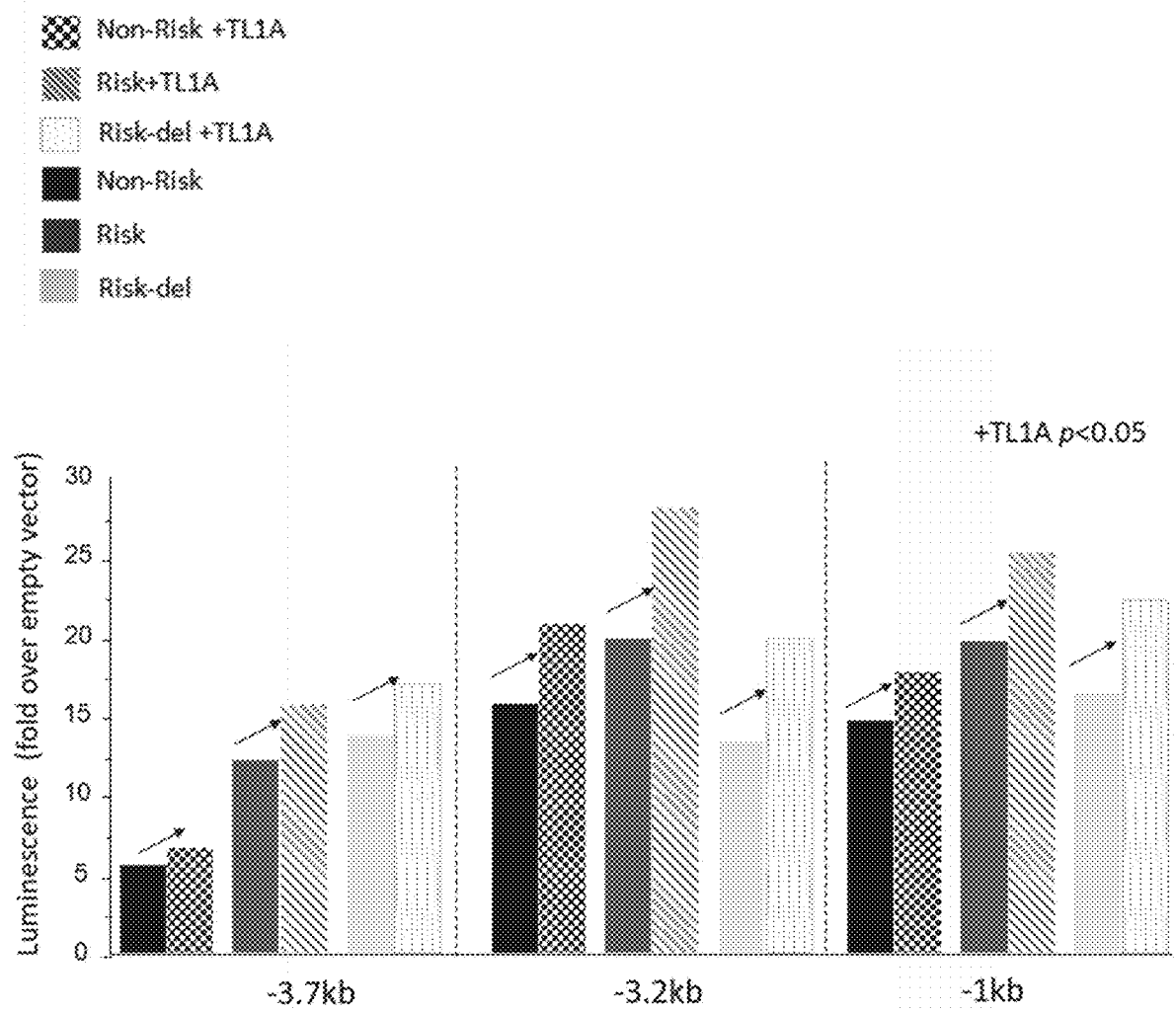

The roles of SNP 1 and Indel 1 variants on RNASET2 transcriptional activation was elucidated by using luciferase promoter reporter constructs transfected into primary T cells, shown in FIG. 11A-11B. Deletion constructs consisting of successive truncated promoter regions defined by the presence or absence of the disease tagging SNP 2 or the candidate causal variants SNP 1 and Indel 1 (FIG. 11A-11B) as well as disease risk constructs in which only the 17 bp indel has been deleted were developed for this purpose. A series of additional constructs will be designed based on the information generated above, in which point mutations will be introduced at functional TFBS allowing us to examine the participation of individual sites, while preserving the multiple cooperative binding regions of the native RNASET2 promoter. Comparing expression of the constructs will allow identification of the cis- and trans-regulatory elements with differential enhancer activity associated with SNP 1 or Indel 1 promoter variants. As regulatory sites are identified, the effect of TFs on promoter transactivation will be tested by co-transfection of WT or mutant TF expression vectors, in conjunction with the promoter constructs, to analyze the nature of these interactions.

Results show that carriage of the disease risk variant will be associated with attenuated RNASET2 promoter activity. Promoter-reporter analysis has been successful in assessing and predicting promoter-enhancer sequences and has the advantage of allowing examination of transcription in purified primary T cell populations. Thus, in this example, the critical regulatory regions and variant functional effects in regulation of the RNASET2 promoter are characterized and validated.

The data underscore the importance of elucidating the role of RNASET2 expression in the context of disease and strengthen the likelihood that SNP 1 and Indel 1 modulate TF-DNA interactions altering gene expression.

Figure 3A:
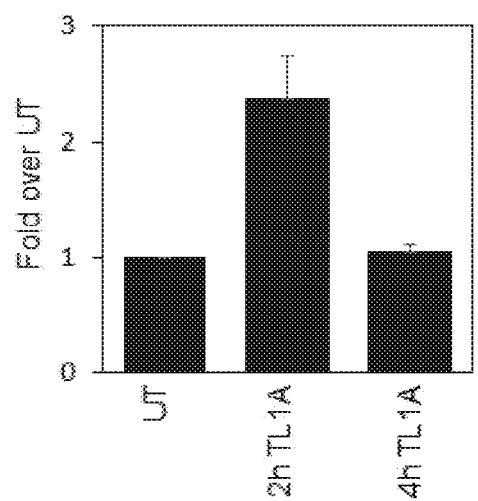
FIG. 3A-FIG. 3B illustrate ICAM1 gene expression plotted as fold over untreated in CD4+ T cells treated with TL1A alone for 2 or 4 hours (n=5) (FIG. 3A) or treated with IL12+IL18 with or without TL1A for 8 hours (n=9) (FIG. 3B).
Figure 3B:
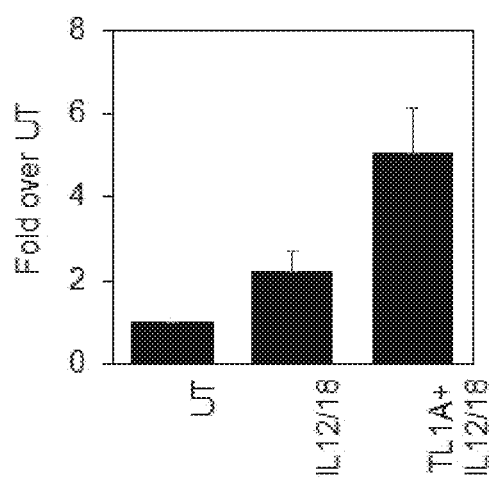

Example. 2. Blocking LFA1/ICAM1 Engagement Inhibited TL1A-Mediated T Cell Aggregation and Subsequent IFNγ Production A functional relationship between RNASET2 and ICAM1 was demonstrated TL1A enhanced IFNγ secretion was accompanied by decreased RNASET2 expression and a concomitant increase in ICAM1 levels. TL1A alone does not promote IFNγ secretion, however does induce early and transient upregulation of ICAM1 mRNA (FIG. 3A). In contrast, the combination of IL12, IL18 and TL1A, conditions which promote IFNγ secretion and down-modulation of RNASET2 expression, results in enhanced and sustained upregulation of ICAM1 (FIG. 3B). Blocking ICAM1/LFA1 engagement on T cells significantly inhibited IFNγ secretion. Enhanced cellular aggregation among IFNγ producing cells and that TL1A-stimulation increased the number and size of the aggregates was also observed. Together, the data suggested that TL1A triggers downregulation of RNASET2 and concomitant LFA1/ICAM1 engagement resulting in T cell aggregation and increased IFNγ secretion.

Figure 4A:
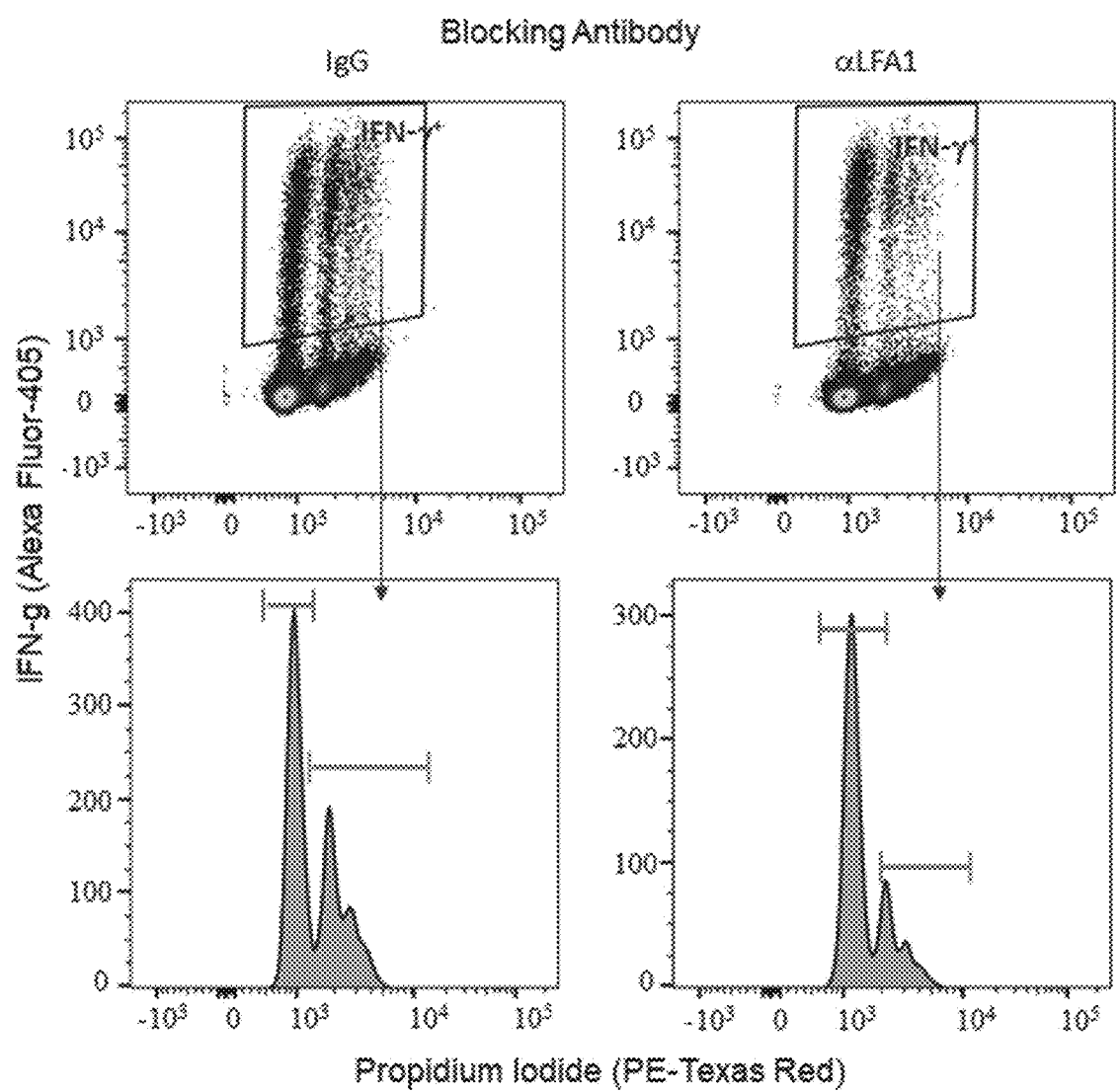
FIG. 4A-FIG. 4C illustrate IFNγ in response to TL1A co-stimulation.
Figure 4B:
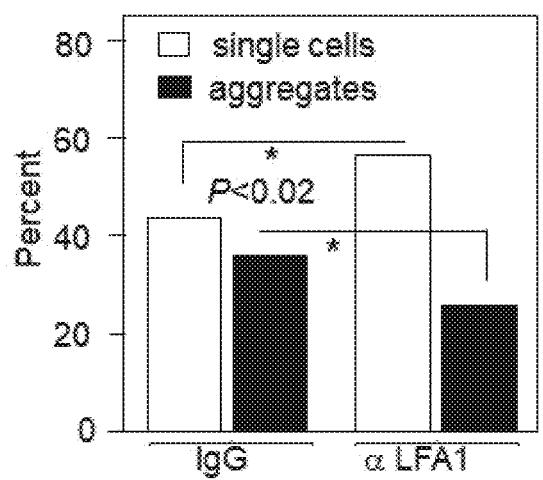
Figure 4C:
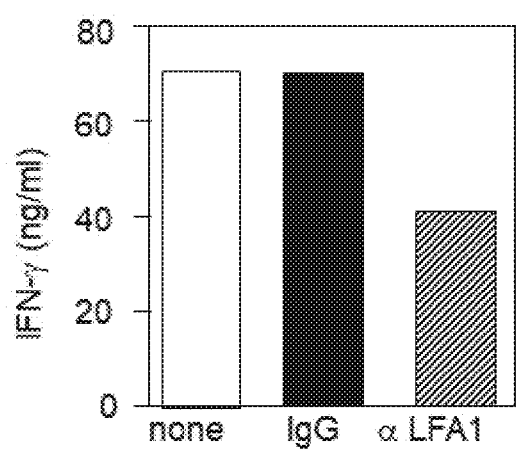

T cells were stimulated with TL1A in the presence of LFA1 blocking or IgG control antibody. Cells were gated on the IFN secreting population and then analyzed for single and aggregate cell fractions using propidium iodide. IFNγ secretion was measured in parallel by ELISA. In response to TL1A co-stimulation, the IFNγ producing CD4+ T cells shifted into cellular aggregates. Blocking LFA1/ICAM1 interaction reduced aggregation by 30% (FIG. 4A-FIG. 4B) and reduced IFNγ secretion by 45% (FIG. 4C).

Figure 5A:
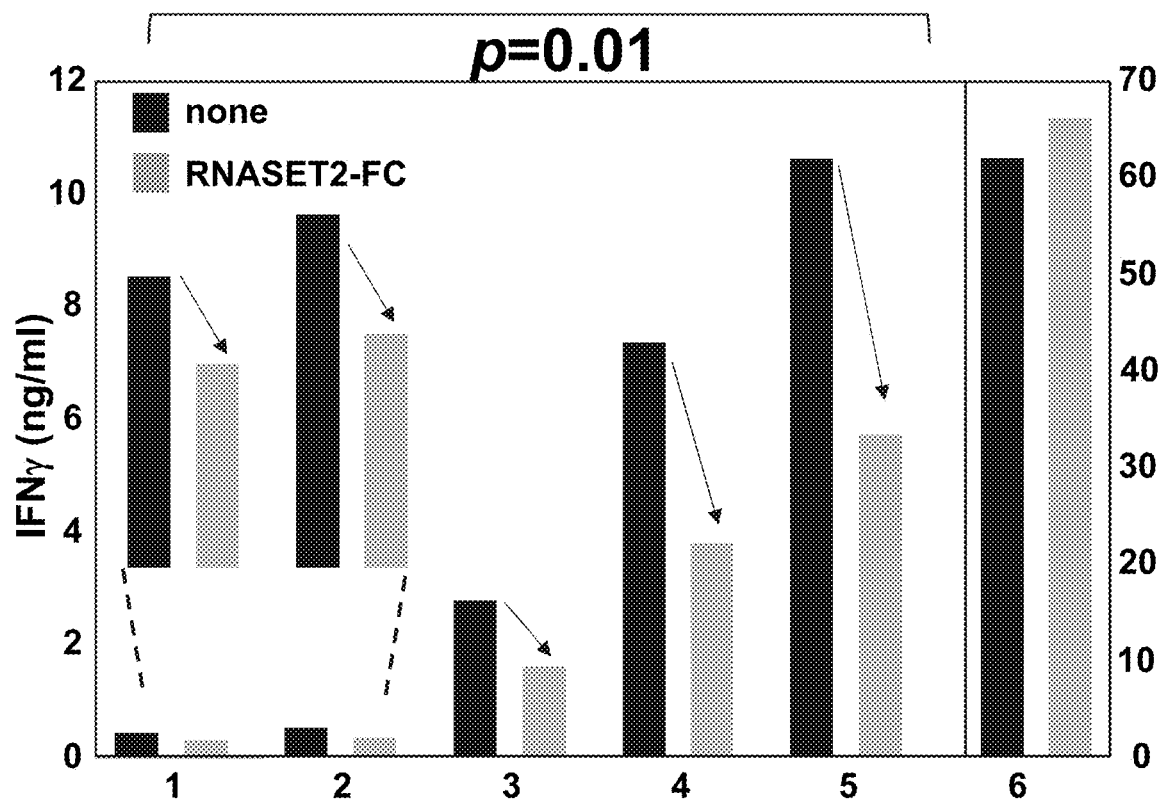
FIG. 5A-FIG. 5B illustrate a direct effect of RNASET2 on IFNγ secretion in CD4+ T cells. In the experiment for FIG. 5A is representative, cells obtained from 6 donors were pre-treated for 2 hr with 1 uM Rnaset2-FC.
Figure 5B:
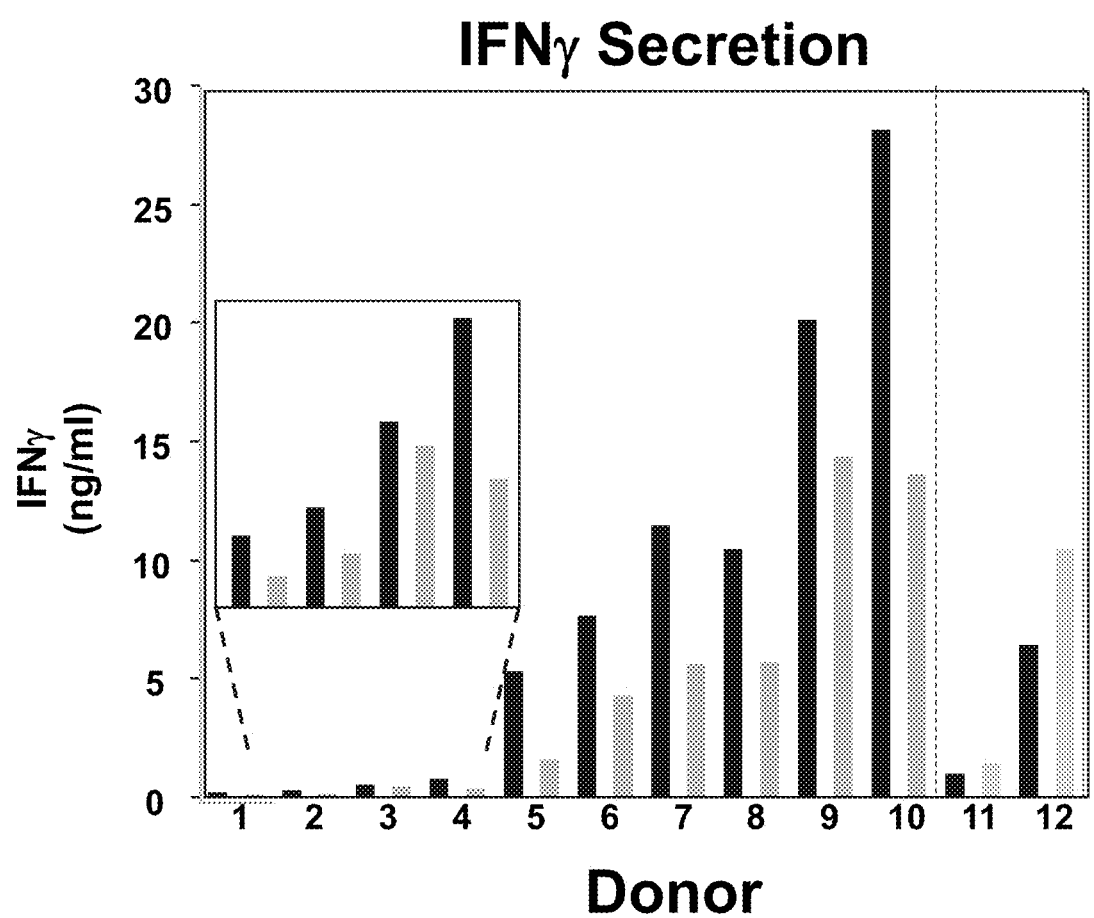

To verify the direct functional role of RNASET2 in regulation of IFNγ secretion, CD4+ T cells obtained from multiple donors were treated with Rnaset2-Fc recombinant protein (FIG. 5A) or transfected with an RNASET2 over-expression vector (FIG. 5B). FIG. 5A-FIG. 5B demonstrate the efficacy of both modalities in decreasing TL1A mediated IFNγ secretion. These data verify the therapeutic potential of attenuating IFNγ secretion via over expression of RNASET2. These findings further support the hypothesis that RNASET2 interacts through the integrin signaling pathway to modulate downstream IFNγ secretion.

Example 3. Enhanced ICAMI Expression Inversely Correlated with H3K9 Tri-Methyltransferase ICAMI plays a key role in facilitating transmigration during inflammation but the molecular mechanisms regulating ICAMI expression remain largely unknown. Chromatin accessibility and repression or activation of transcription is regulated in part through post-translational modification (PTM) of histones via acetylation and methylation of histone residues. The overall methylation status of H3K9, a PTM linked to transcriptional repression, is determined by the enzymatic balance between the methylation Writers' or methyltransferases and 'erasers' or demethylases. TNF-α-mediated increase of ICAMI expression in endothelial cells involves dynamic regulation of these enzymes.

Figure 6A:
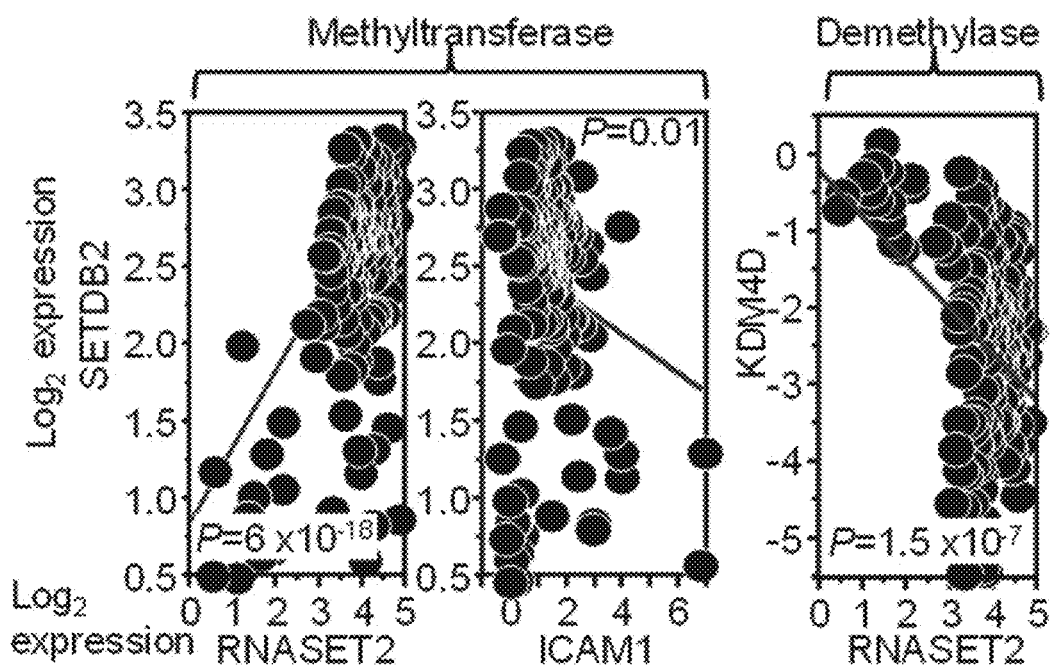
FIG. 6A-FIG. 6C illustrate a correlation of RNASET2 and ICAM11 with H3K9 methyltransferase and demethylase.
Figure 6B:
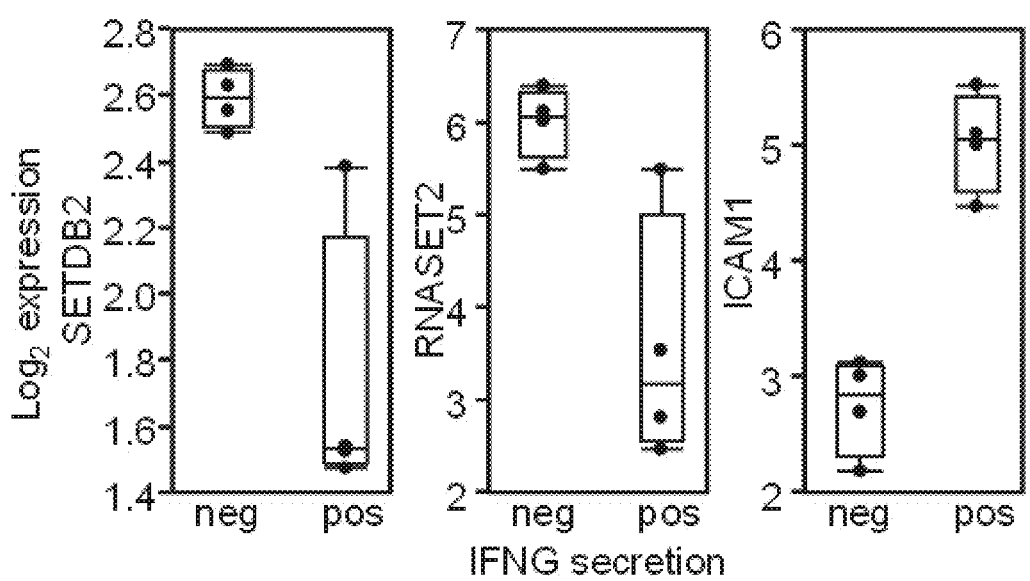
Figure 6C:
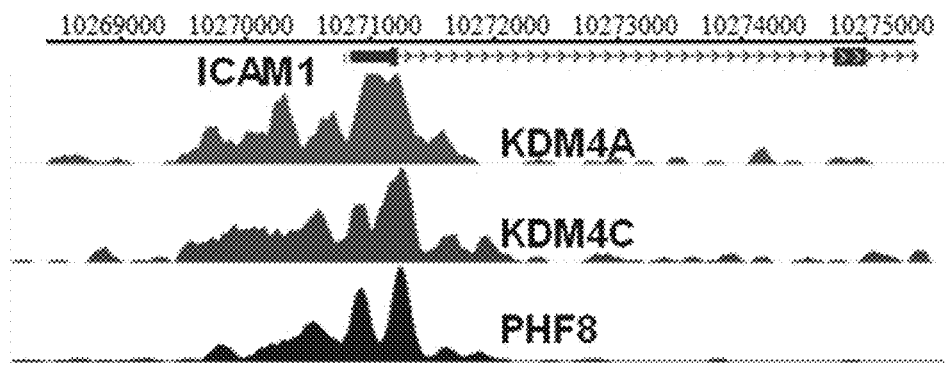

FIG. 6A demonstrates that in T cells isolated from CD patients there was a significant association between decreased levels of RNASET2 and SETDB2, a "writer" for the repressive PTM H3K9me3 (FIG. 6A, left panel) and an association with decreased SETDB2 and enhanced expression of ICAMI (FIG. 6B, middle panel). The KDM4D "eraser" had an opposite effect on RNASET2 expression (FIG. 6A, right panel). Functional annotation of the region flanking the ICAMI promoter (FIG. 6C) confirms binding of H3K9 erasers KDM4A, KDM4C and PHF8 in cell lines consistent with a role for H3K9 methylation as a regulator of ICAMI expression. The data connect RNASET2-mediated enhancement of ICAMI expression with modulators of H3K9 methylation adding an epigenetic component to the molecular pathways associated with coordinated regulation of RNASET2, ICAMI and IFNγ secretion, thereby enhancing the range of potential therapeutic targets. The data support our hypothesis that downregulation of RNASET2 is associated with epigenetic regulation of ICAM1 histone modification.

Example 4. Decreased Expression of RNASET2 in a CD Subset is Associated with Genome Wide Expression Pathways Regulating Leukocyte Extravasation IBD is a pathobiologically heterogeneous disease and predicting disease natural history at time of diagnosis and therapeutic outcomes are challenges faced by clinicians. To stratify patient sub-populations and improve ability to predict therapeutic response CD3+ T cells were isolated and purified from peripheral and mucosal specimens from CD patients undergoing surgical intervention for disease management.

Figure 7:
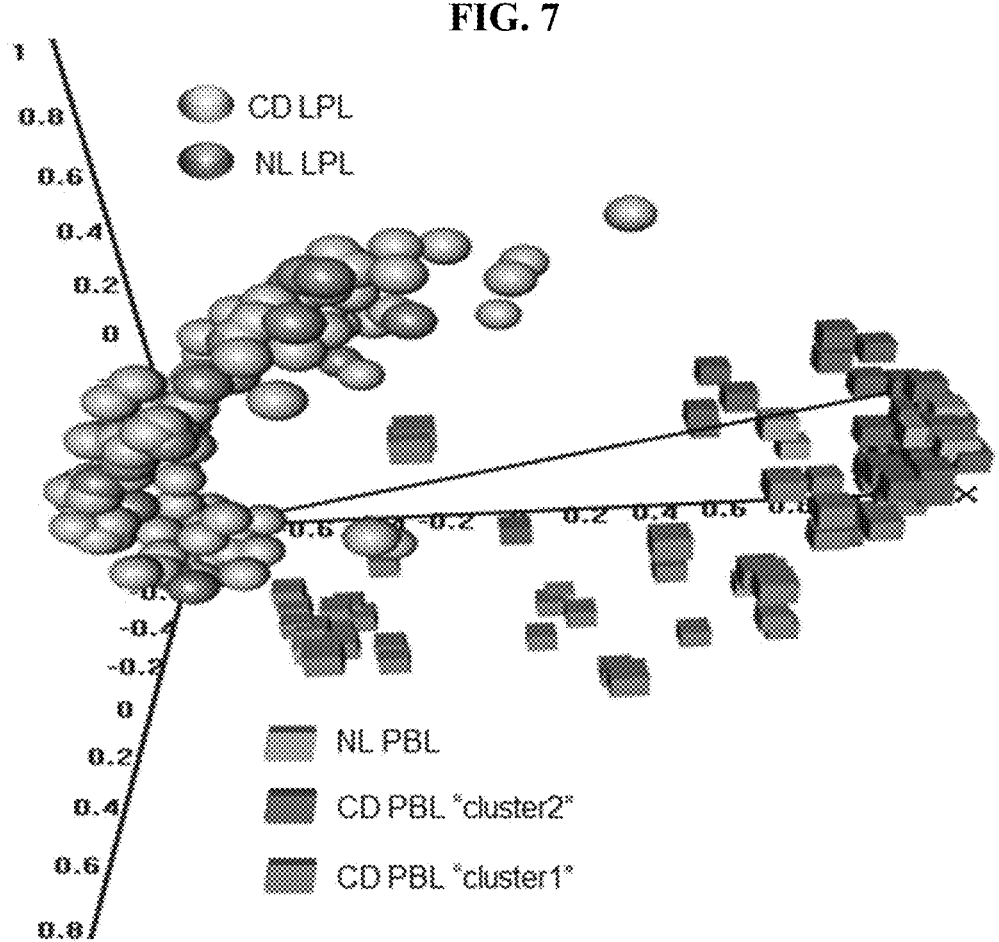
FIG. 7 illustrates a principal component analysis of RNAseq data that identified distinct transcriptome profiles.
Figure 8:
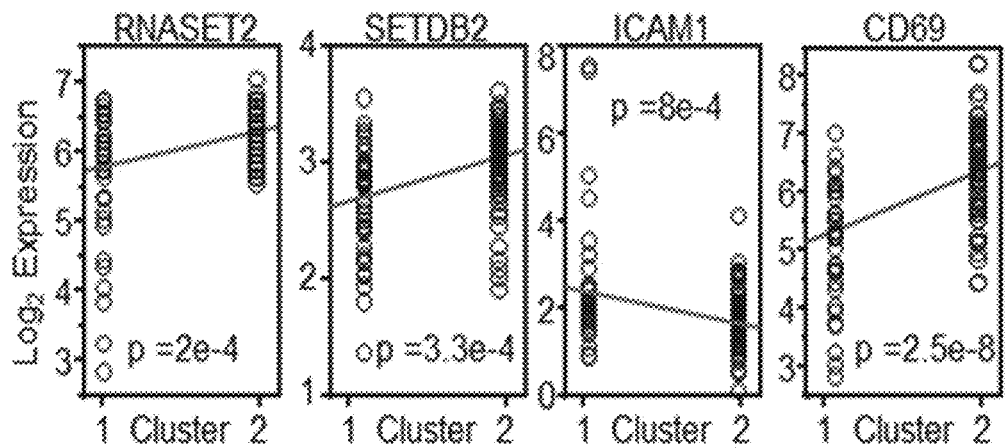
FIG. 8 illustrates differential expression CD subtypes cluster 1 versus cluster 2.
Figure 9:
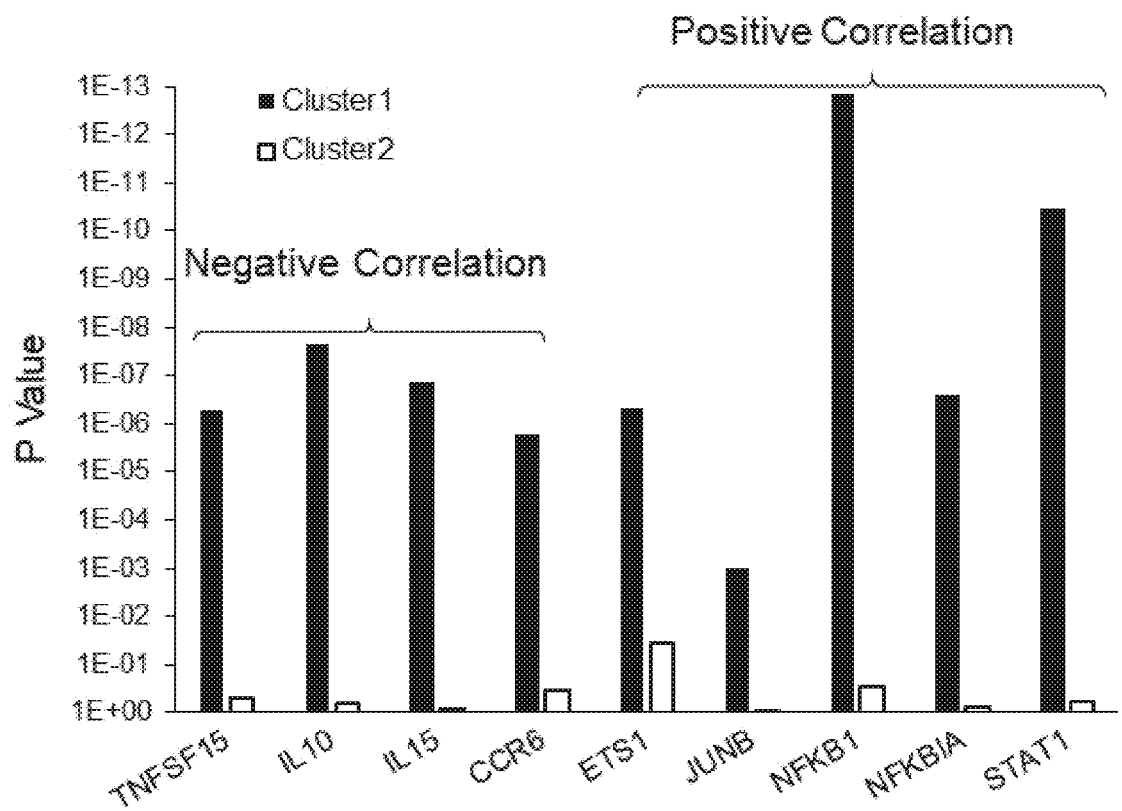
FIG. 9 illustrates a correlation of transcript expression with RNASET2 (p values) in CD cluster 1 versus cluster 2.

Transcriptional profiling was analyzed by RNA-seq. Unsupervised clustering and principal component analysis (PCA) clearly distinguished between gene expression in the periphery versus mucosa (FIG. 7). Moreover, two distinct transcriptome profiles were observed in peripheral T cells isolated from CD patients which were classified as subtype clusters 1 and 2. Subtype cluster 2 co-localized with a normal (NL) transcriptome profile whereas cluster 1 drifted toward a mucosal lamina propria T cell profile. Fifteen hundred genes with at least two-fold differential expression between cluster 1 and 2 subsets ($p<1\times10^{-7}$) were identified. Gene ontology analysis indicated they were enriched in pathways mediating leukocyte adhesion, migration and integrin binding ($p=10^{-2.5-7}$). A significant decrease in expression of RNASET2 and SETDB2 and concomitant elevation in expression of ICAM1 (FIG. 8) and TL1A (FIG. 9) was observed when comparing CD subtype clusters 1 versus 2. A significant negative correlation was observed not only between expression of RNASET2 and TL1A but also with IL10 and IL15 and the adhesion molecule CCR6, a key regulator in homing of immune cells to the gut (FIG. 9). In contrast, a positive correlation between expression of RNASET2 with ETS, JUN, NFKB, and STAT TFs was detected Subtype clustering was not merely a factor of global T cell activation as expression of the activation marker CD69 was decreased in CD cluster subtype 1 (FIG. 8). Recent studies have suggested a role for CD69 expression as a negative regulator of T cell accumulation in the gut during mucosal inflammation. Considering the importance of T cell trafficking to the intestine in the pathogenesis of IBD and the inverse correlation of RNASET2 and ICAM1 expression, our results highlight the importance of understanding the role of RNASET2 in regulation of pathways mediating T cell extravasation, a key pathway implicated in subtype-specific gene expression in the context of disease. These data provide a strong rationale to study allele-specific expression of risk RNASET2 variants as an indicator of functional significance reflective of disease.

Example 5. Enhancement in RNaseT2 Protein Levels can Serve as a Regulator of Inflammatory Response, Targeting Activated T Cells and Secretion of IFNγ

To establish the role of RNASET2 in modifying IFN secretion, CD4+ T cells from healthy donors were transfected with RNASET2 over-expression vectors or treated with recombinant protein followed by TL1A stimulation of cytokine production. Effect on gene expression was measured by qPCR or ELISA Specifically, cells were transfected with RNASET2 vectors encoding either wild type (wt) or RNase catalytic mutant proteins to test the direct functional role of RNASET2 in regulation of IFNγ secretion. Over-expression of cytoplasmic RNASET2 was validated by qPCR and enhanced protein secretion using an ELISA developed (detection range 50-500 pg/ml). As shown in Table 2, in 10 out of 12 donors tested, there was a significant decrease (46%, p=0.02) in post-transcriptional regulation of IFNγ secretion, but not mRNA levels, in response to over-expression of full-length endogenous RNASET2 compared to empty vector. In contrast, in cells over-expressing the catalytically inactive RNASET2 protein (in 3 out of 4 donors) no decrease was observed suggesting that the ribonucleolytic activity is essential for regulation of cytokine secretion. For determination of the regulatory potential of exogenous RNASET2, a recombinant-FC fusion protein was generated that was designed to prolong the in-vivo serum protein half-life. Ribonuclease activity was confirmed. Cells were treated with recombinant protein for 1 hour prior to activation. In 5 out of 6 donors tested exogenous recombinant RNASET2 treatment resulted in a significant decrease (average 40%, p=0.03) in IFNγ secretion. No cytotoxic effect was detected.

Together, these results show that enhancement in RNaseT2 protein levels can serve as a regulator of inflammatory response, targeting activated T cells and secretion of IFNγ. This downregulation requires intact ribonucleolytic activity. IFNγ secretion was decreased in response to exogenous recombinant RNASET2 protein. These data support further development of recombinant RNASET2 as a potential therapeutic in an in-vivo IBD animal model(s) to explore its clinical potential to mitigate disease in a defined CD patient subset associated with decreased expression of RNASET2.

TABLE 2

| | Results | | |
|---|---|---|---|
| | Trait | % change | p-value |
| Over-expression of wt RNASET2 | | | |
| donors no. | 12 | | |
| fraction of donors demonstrating decreased IFNγ secretion | 10/12 (83%) | | |
| IFNγ secretion | decreased | −46 | 0.010 |
| Over-expression of RNASET2 catalytically inactive mutant vs wt | | | |
| donors no. | 4 | | |
| fraction of donors demonstrating reduced IFNγ secretion | 3/4 (75%) | | |
| IFNγ secretion wt RNASET2 vs empty vector | decreased | −44 | 0.028 |
| RNASET2 catalytically inactive mutant vs wt | increased | +55 | 0.054 |
| RNASET2 catalytically inactive mutant vs empty vector | no change | +5 | ns |
| Recombinant RNASET2-Fc | | | |
| donors no. | 6 | | |
| fraction of donors demonstrating reduced IFNg secretion | 5/6 (83%) | | |
| IFNγ secretion | decreased | −40 | 0.010 |

Example 6. RNASET2 Downregulation is a Hallmark of T Cell Activation

Figure 18A:
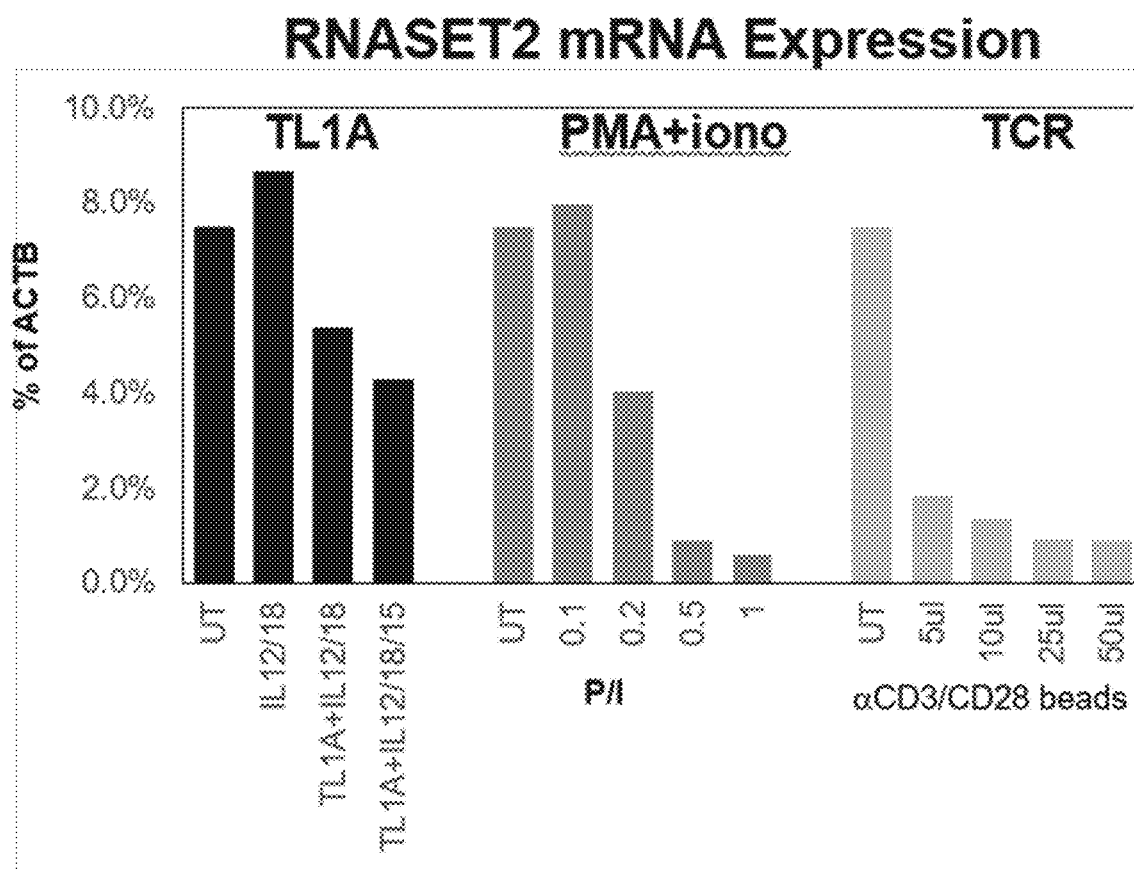
FIG. 18A-18B illustrates RNASET2 mRNA expression and IFNγ secretion in the presence of TL1A (left), PMA/ionomycin (middle), and T cell receptor (TCR) (right).
Figure 18B:
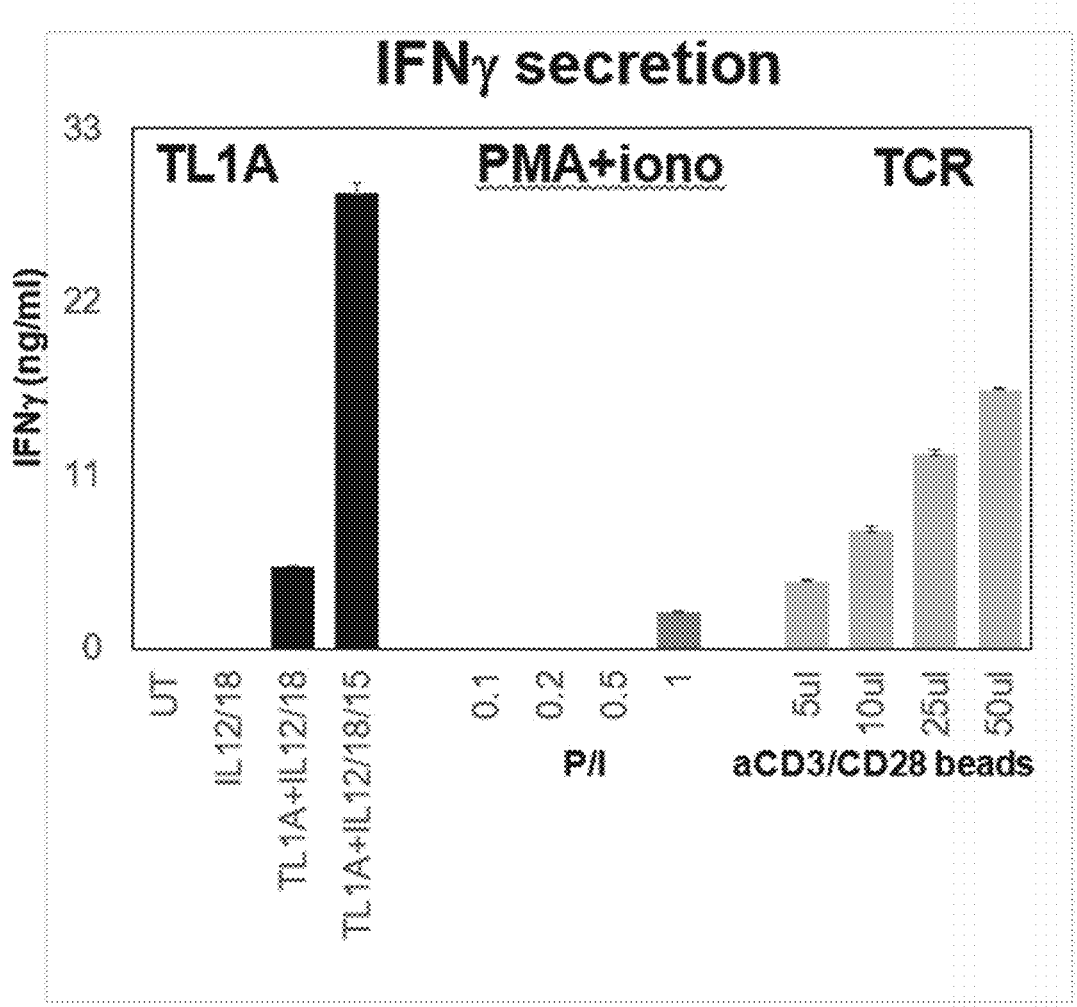

To determine whether RNASET2 is an independent hallmark of T cell activation, CD4+ T cells treated with or without RNASET2 recombinant protein or transfected with over-expression vectors and stimulated with CD3/CD28, PMA/ionomycin or TL1A. Gene expression was measured by qPCR and cytokine production by ELISA Results show a decrease in RNASET2 expression (>50%) was observed within 8 hours following stimulation with either CD3/CD28, PMA/ionomycin or TL1A with levels falling below 50% by 24 hrs (FIG. 18A-18B). FIG. 18A shows that RNASET2 mRNA expression decreases in cells in response to TL1A (left), PMA/ionomycin (middle), and TCR (right), as compared to untreated. FIG. 18B illustrates that IFNγ secretion increases in the presence of TL1A (left), PMA/ionomycin (middle), and TCR (right), as compared to untreated.

Recombinant RNASET2 Decreases IFNγ Secretion in a Dose Dependent Manner

Figure 16:
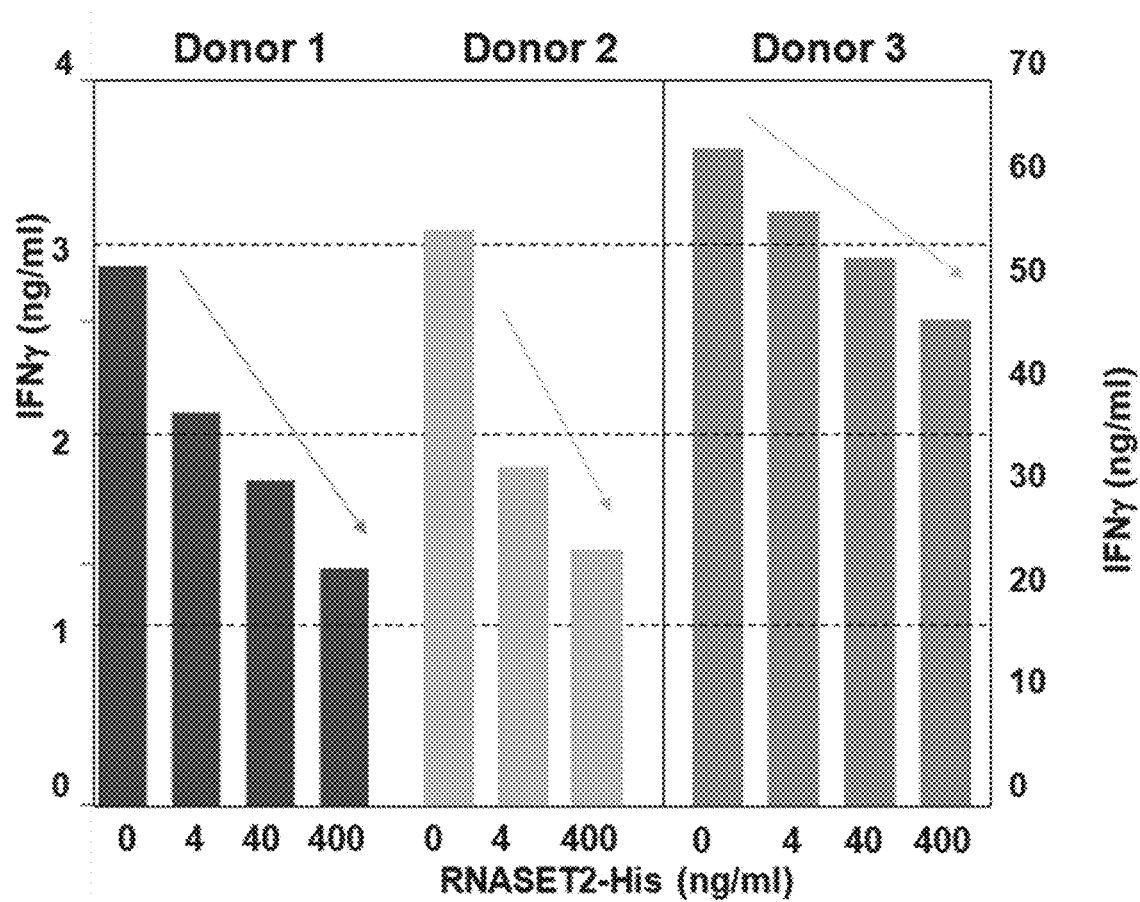
FIG. 16 illustrates that recombinant RNASET2 decreases IFNγ secretion in a dose dependent manner. IFNγ secretion (in nanograms per milliliter) was measured in CD4+ T cells obtained from 3 healthy donors that were exposed to recombinant RNASET2 ex vivo.

T cells stimulated in the presence of recombinant RNASET2 displayed a dose-dependent suppression of IFN mRNA and secretion. To establish whether the role of RNASET2 in modifying IFN secretion in CD4+ T cells from healthy donors was dose dependent, cells were treated with RNASET2 followed by TL1A stimulation of cytokine production. FIG. 16 illustrates that in 3 healthy donors, RNASET2 induced suppression of IFNγ secretion is dose dependent.

A similar decrease in cytokine secretion was observed following over-expression of transfected full-length RNASET2 compared to empty vector (10/12 donors). The response in donors to RNASET2 treatment was tested for variability. RNASET2 mediated attenuation of IFN γ secretion was consistent and reproducible in samples collected from the same donor over months and up to a year apart.

Figure 17A:
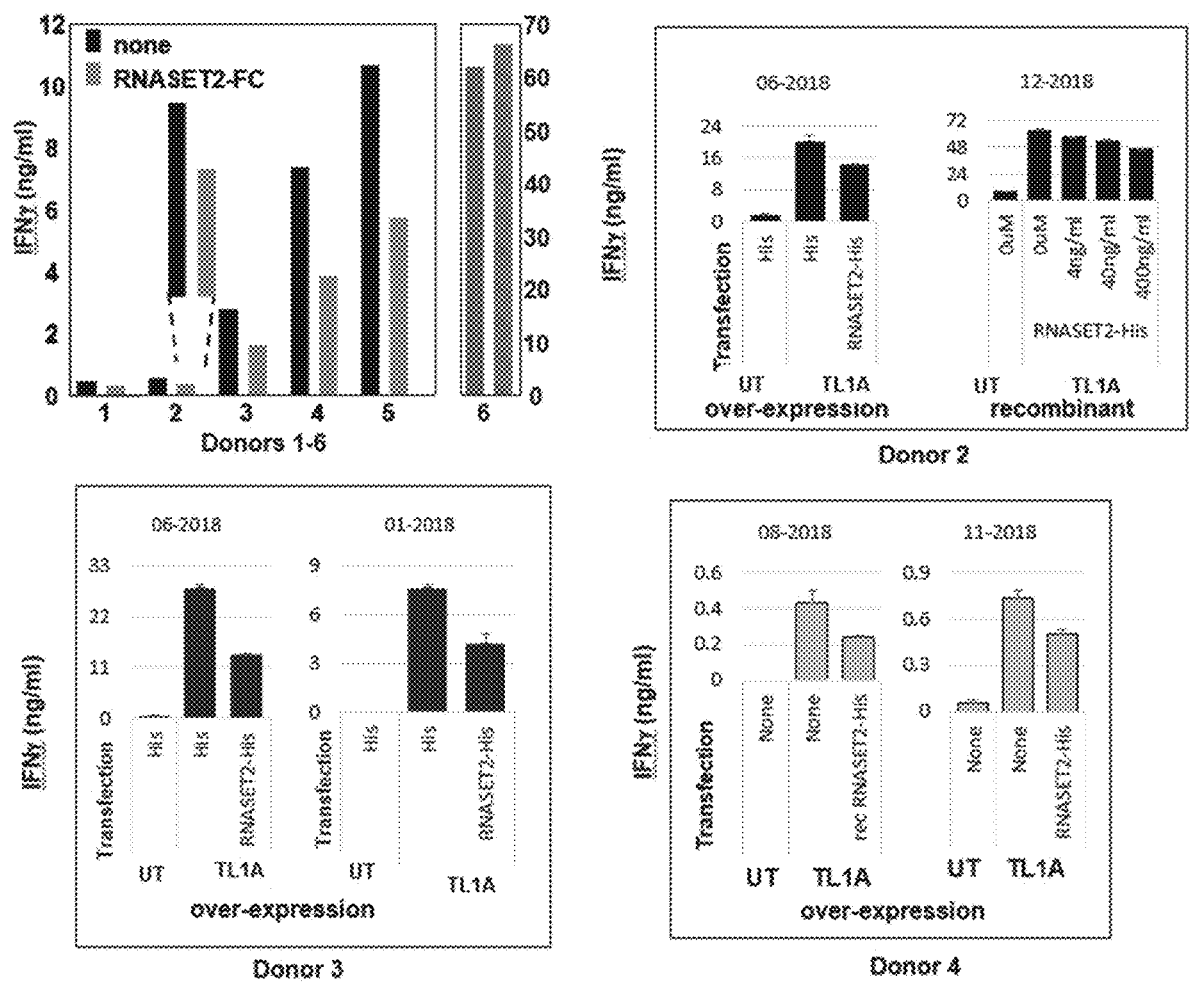
FIG. 17A-17B illustrate that in healthy donors that showed a decrease in IFNγ secretion also showed a corresponding decrease in IFNγ secretion when the same cells were transfected with an overexpression RNASET2 vector or treated with recombinant RNASET2-Fc protein, with or without subsequent treatment with TL1A. Multiple experiments were performed using samples obtained from 6 healthy donors.
Figure 17B:
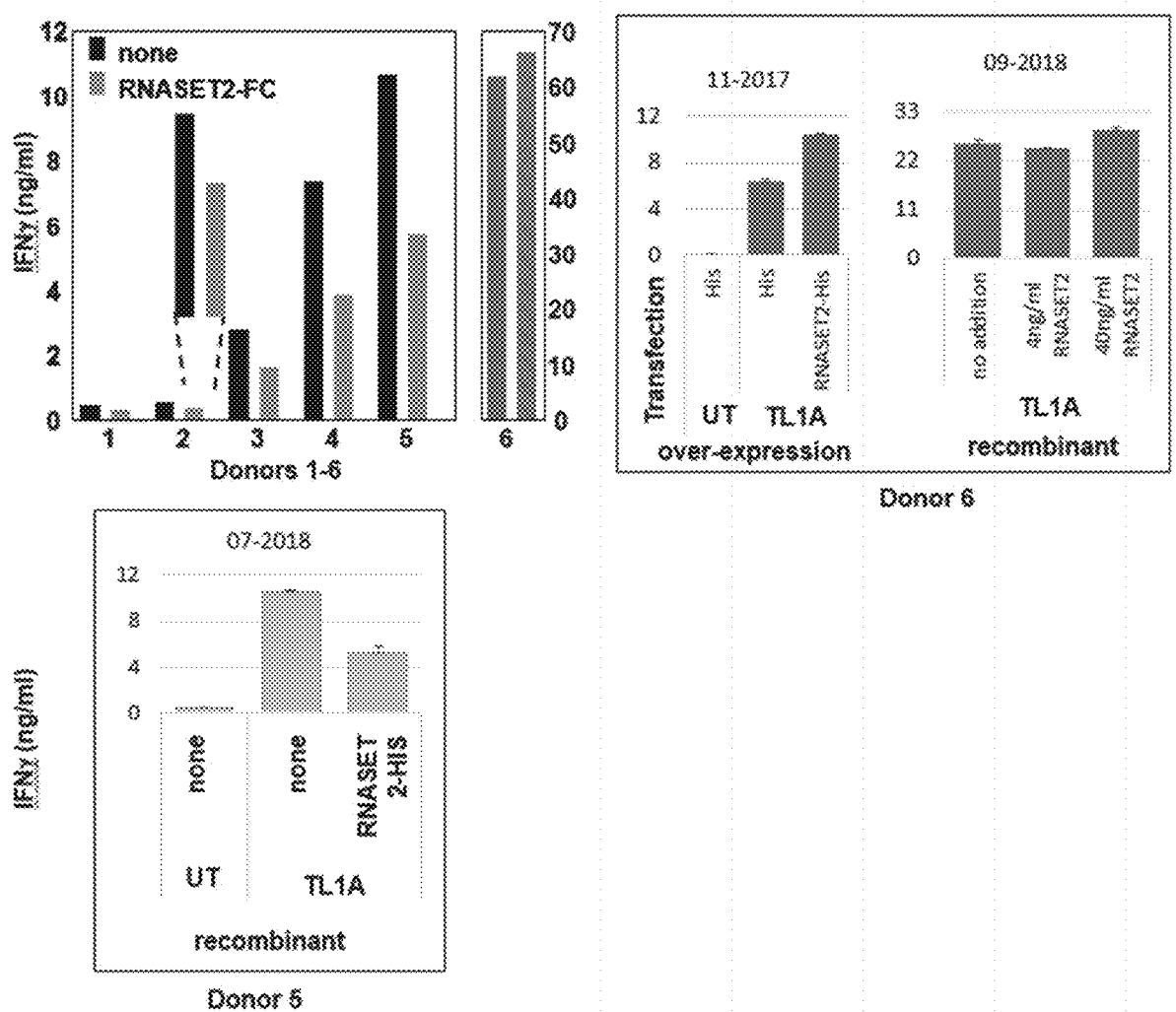

Samples were obtained from give healthy donors, and cells were treated with RNASET2-Fc recombinant protein. IFNγ secretion was measured using an ELISA developed (detection range 50-500 pg/ml). In donors that showed a decrease in IFNγ secretion also showed a corresponding decrease in IFNγ secretion when the same cells were transfected with an overexpression RNASET2 vector or treated with recombinant RNASET2-Fc protein, with or without subsequent treatment with TL1A. FIG FIG. 17A illustrates decreased IFNγ secretion in CD4+ T cells in samples obtained from 6 donors—in response to treatment with exogenous recombinant RNASET2-Fc protein (right); Transient overexpression of RNASET2 or treatment with recombinant RNASET2 cause TL1A expression to decrease in a dose dependent manner in in samples obtained from donor 2 6 months apart.(left). A similar result was reported for donors 3 and 4 in samples obtained 3-6 months apart. FIG. 17B illustrates similar results for donor 5 (bottom) in response to exogenous recombinant RNASET2. FIG. 17B also illustrates that in donor 6 in which decreased IFNγ secretion was not observed, the transient expression of recombinant RNASET2, did not cause a statistically significant decrease in TL1A, whereas an increase in TL1A was observed when RNASET2 is overexpressed (top left). "UT" refers to "untreated."

RNASET2 Risk SNP 1 is Associated with Decreased Plasma RNASET2 Protein Levels

An ELISA assay was developed to examine whether the levels of circulating RNASET2 in blood was associated with disease risk carriage. In subjects homozygous for RNASET2 disease associated variant there was a significant decrease (1.7-fold, p<0.01) in circulating RNAST2 compared to non-risk individuals, as shown in FIG. 19.

This example shows that down-modulation of RNASET2 is a hallmark of T cell activation. Pro-inflammatory cytokine secretion is suppressed in a dose-dependent and reproducible manner in response to recombinant RNASET2. RNASET2 risk variants are associated with both decreased expression and circulating protein levels. These results taken together with our previous findings highlight the potential of RNASET2 as a precision therapeutic which includes a diagnostic application to select patients who may benefit from a RNASET2 treatment approach.

Single Nucleotide Polymorphisms in Cis-eQTL and mQTL with RNASET2

To identify additional genetic variants that might be useful predictors of decrease in RNASET2 in patients with Crohn's disease, cis expression quantitative trait loci (eQTL) and methylation quantitative trait loci (mQTL) were analyzed. Genetic variants that are associated with expression (eQTL) and methylation (mQTL) of RNASET2, that are predicted to disrupt transcription factor binding are provided in Table 3. Without being bound by any particular theory, the genetic variants provided in Table 3 may be useful in predicting variation in RNASET2 expression as a means for selecting a patient for treatment with therapeutic agent described herein (e.g., RNASET2 agonist, TL1A inhibitor).

TABLE 3

| SEQ ID NO: | Identifier | dbSNP | Allele |
|---|---|---|---|
| 15 | SNP5 | rs408080 | T/A/C |
| 16 | SNP6 | rs6456143 | C/A |
| 17 | SNP7 | rs34560498 | A/G/T |
| 18 | SNP8 | rs12525855 | T/G |
| 19 | SNP9 | rs2769346 | A/C/G |
| 20 | SNP10 | rs12213683 | G/A |
| 21 | SNP11 | rs12208359 | G/A |
| 22 | SNP12 | rs405553 | A/G |
| 23 | SNP13 | rs444988 | A/T |
| 24 | SNP14 | rs3752520 | T/A/C |
| 25 | SNP15 | rs12203510 | C/T |
| 26 | SNP16 | rs9295384 | T/A |
| 27 | SNP17 | rs9457260 | C/T |
| 28 | SNP18 | rs424185 | C/T |
| 29 | SNP19 | rs2757042 | A/T |
| 30 | SNP20 | rs4710171 | A/G/T |
| 31 | SNP21 | rs398278 | A/G |
| 32 | SNP22 | rs9459849 | G/T |
| 33 | SNP23 | rs2757050 | G/T |
| 34 | SNP24 | rs6456151 | A/C/T |
| 35 | SNP25 | rs365189 | G/A/C |
| 36 | SNP26 | rs7748224 | C/T |
| 37 | SNP27 | rs239934 | G/A |
| 38 | SNP28 | rs4060951 | C/T |
| 39 | SNP29 | rs2757046 | C/T |
| 40 | SNP30 | rs364283 | C/T |
| 41 | SNP31 | rs12527827 | C/T |
| 43 | SNP32 | rs439553 | A/G |
| 2 | SNP1 | rs2149092 | C/T |
| 45 | SNP33 | rs2149091 | C/A/T |
| 46 | SNP34 | rs2038580 | A/T |
| 47 | SNP35 | rs385113 | A/G |
| 48 | SNP36 | rs1060404 | A/G |

Figure 10:
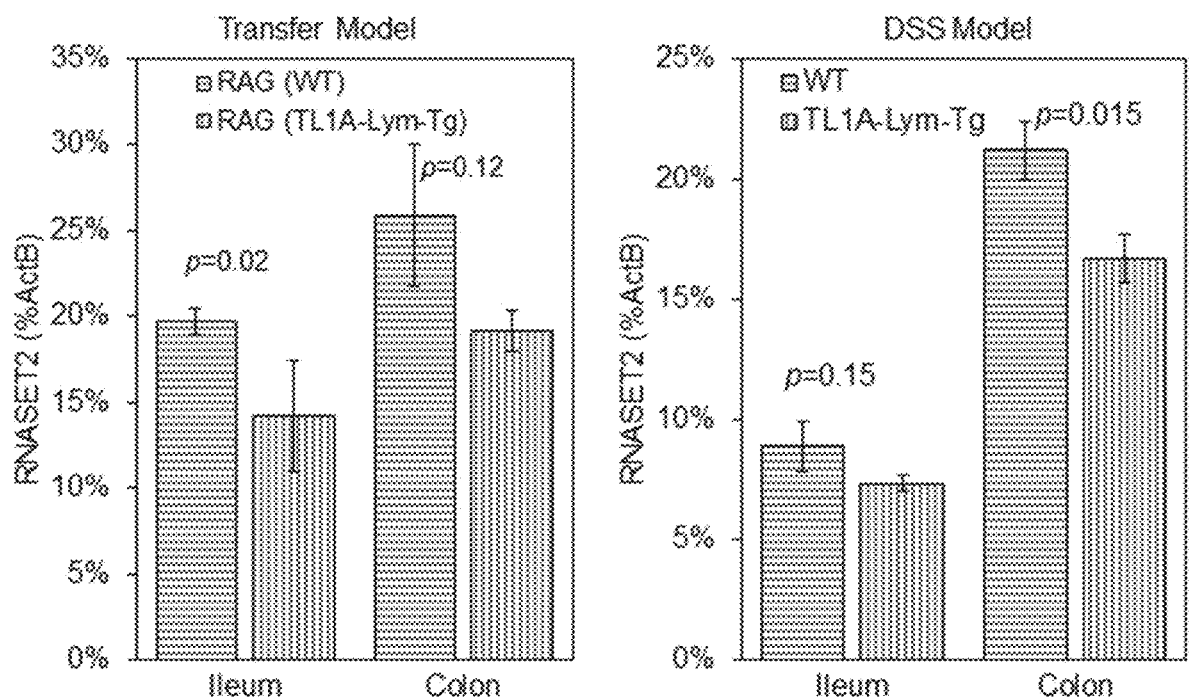
FIG. 10 illustrates a reduction of RNASET2 expression in the intestines of RAG mice transferred with T cells from TI1a lymphoid TG mice (left) and TI1a lymphoid TG mice treated with DSS (right).

Example 7. Use of a Transgenic (TG) Model of TL1A Over-Expression to Probe RNASET2 Activity In Vivo TG mice were developed that over-express murine TI1a mice display many of the characteristics associated with CD including fibrosis and stricturing disease. TI1a neutralizing antibodies reduced and reversed proinflammatory cytokine expression, inflammation and fibrosis in both models. In T cells, TL1A expression is inversely correlated with RNASET2 expression. Without being bound by any particular theory, it is hypothesized that mice with overexpression of TI1a would exhibit lower Rnaset2 expression in vivo. RNA from whole ileum and colon samples from WT and TI1a lymphoid TG mice was extracted and Rnaset2 measured by qPCR Mice that overexpressed TI1a demonstrated reduced Rnaset2 expression in the ileum and colon in the DSS and Ragl$^{-/-}$ transfer models compared to WT (FIG. 10). The results support an in vivo association between enhanced TI1a production and down modulation of Rnaset2 in TI1a-driven colitis within whole tissue. Furthermore, it supports the use of these models of ileo-colonic inflammation as a tool to evaluate and validate in-vivo the efficacy of therapeutic targets identified in our proposal.

The data presented above demonstrate genetic, molecular and cellular evidence of a relationship between TNFSF15 and RNASET2 in human in vitro and murine in vivo experimental systems. The results show that risk variants SNP 1/Indel 1 and markers of consequential downstream function define a sub-population of CD.

Example 8. Determine the Candidate Regulatory Variants and Cis- and Trans-Regulatory Pathways Involved in TL1A-Mediated Inhibition of RNASET2 Expression The data in FIG. 1A-1E and FIG. 2 showed that SNP 1 and Indel 1 are candidate causal variants with the potential to alter multiple TF binding motifs. To determine whether the SNP 1 and Indel 1 variants impact TF binding to the RNASET2 enhancer resulting in sequence- and TL IA-dependent regulation of enhancer activity as well as gene expression, a) evaluation of the functional impact of these variants on regulation of TF binding, b) validation of candidate regulatory elements using enhancer/promoter luciferase assays in primary T cells, c) identification and validation of the physical interaction between risk variants and RNASET2, and d) assessment of the nature of the functional impact of the variant in the context of TL1A-dependent regulation of RNASET2 expression will be performed.
Define the Protein-DNA Interactions and SNP Specific Binding Additional characterization of allele-specific TFBS via EMSA analysis through consecutive oligo sequence mutation and competition will be performed. Super-shift assays targeting specific ETS factors or KLF4 will confirm the composite of the variant-specific nucleoprotein complex Allele-specific TF binding will be verified in a cellular context by CHIP qRT-PCR utilizing T cell samples from individuals homozygous for either the non-risk or risk alleles to confirm inherent differences in DNA sequence preferences.

Several nucleo-protein complexes binding to both variant regions would suggest a multifaceted process of allele-specific regulation. Some of the protein binding seems to be allele-specific while others are indistinguishable. The SNP 1 C/T variant disrupts and shifts the ETS core motif and the DNA conformation. Results will indicate that the Indel 1 17 bp insertion can dramatically alter the DNA conformation and spacing of TF binding motif sequences within the promoter as well. Likewise, the indel possesses a redundant CCCAG motif suggested to facilitate enhancer accessibility and epigenetic remodeling. The EMSA oligos have thus far been designed with the SNP located at the center of each probe. However, additional EMSA oligos will be developed that shift/extend into regions outside of the variant site particularly to accommodate for flanking TFBS which play a critical role in selective ETS factor binding and gene activation. Considering the preliminary data confirming allele-specific nucleo-protein binding and confirmation of ETS1 as a TF binding component, EMSA analysis followed by CHIP qRT-PCR will identify the common and allele-specific TF binding to this region.
Identify and Evaluate the Chromosomal Long-Range Interactions Between the RNASET2 Locus and Associated Regulatory Regions Chromosome conformation capture (3C) analysis suggests the physical juxtaposition of enhancer regions with distal target genes via chromosomal looping facilitates regulation of gene expression 3C will be used to validate the interaction between enhancer variant regions. The presence of 3C-compatible enzyme sites in between SNP 2 and SNP 1 and between SNP 1 and Indel 1 will allow us to distinguish if any (or all) variants interact with SNP 3. SNP 3 will also be investigated to see whether it interacts with the RNASET2 promoter directly. Other candidate regions will be selected based upon functional evidence of significant regulation at the level of gene expression e.g., eQTL and mQTL, and upon display of putative activation marks as determined by "StatePaintR tracks" and data above.

3C is considered a "hypothesis driven" technique in which prior knowledge about the functional elements within target genomic locations is required Prescreening candidate regions based on our previous functional evidence of eQTL, mQTL and epigenetic activation will enable the successful definition of distal RNASET2 regulatory elements. Physical interactions between the enhancer-enhancer regions adjacent to Indel 1/SNP 1/SNP 2 and SNP 3 and between SNP 3 and the RNASET2 promoter in which not only eQTL data, but also clinical indicators that correlate with disease severity, will be analyzed A selective choice of 3C-compatible enzymes will discriminate between interactions of Indel 1, SNP 1 and/or SNP 2. It is possible that additional enhancer/regulatory regions will impact RNASET2 expression. Because 3C is limited to pair-wise interaction and is constrained to genomic distance <1 MB, if needed, 4C analysis to expand and identify intra- and inter-chromosomal interactions will be performed.
Assess the Functional Impact of SNP 1, Indel 1 and SNP 3 Risk and Non-Risk Variants in the Context of TL1A-Dependent Regulation of RNASET2 Expression The TFs participating in TL1A-mediated expression of the RNASET2 promoter-enhancer and the functional impact of risk and non-risk variants will be examined and defined. The allele-specific pattern of nuclear proteins binding to defined regions identified will be compared following TL1A stimulation and kinetics in the alteration of nucleo-complex formation assessed. A parallel series of transfections with promoter-reporter constructs as well as wt and mut TF expression will be carried out comparing expression of the numerous constructs to determine which of the known cis-regulatory regions identified participate in TL1A-mediated expression of the RNASET2 promoter and IFNγ secretion. These studies will yield important information regarding the identity of cooperative binding regions.

Preliminary data indicate allele-specific nucleoprotein complex formation as well as a decrease of enhancer-promoter activity when comparing the SNP 1 and Indel 1 risk and non-risk variants. Both SNP 1 and Indel 1 are strong candidates as functional/causal variants based upon multiple lines of evidence: 1) they are in strong linkage disequilibrium (LD) ($r^2$=1) with the RNASET2 IBD index SNP (SNP 2); 2) eQTL and mQTL data associated with altered gene expression and methylation have been reported for the index SNP; 3) functional annotation suggests they are located in an active T cell enhancer-promoter region; 4) the variants disrupt multiple overlapping TFBS in particular members of the ETS family; 5) the nucleotide variations are predicted to distort 3 dimensional DNA conformation. TL1A-mediated alteration in the nucleoprotein and expression patterns is expected, particularly considering the correlation of ETS expression with RNASET2, and the fact that TL1A diminishes the level of ETS expression in IFNγ secreting cells.

Figure 12:
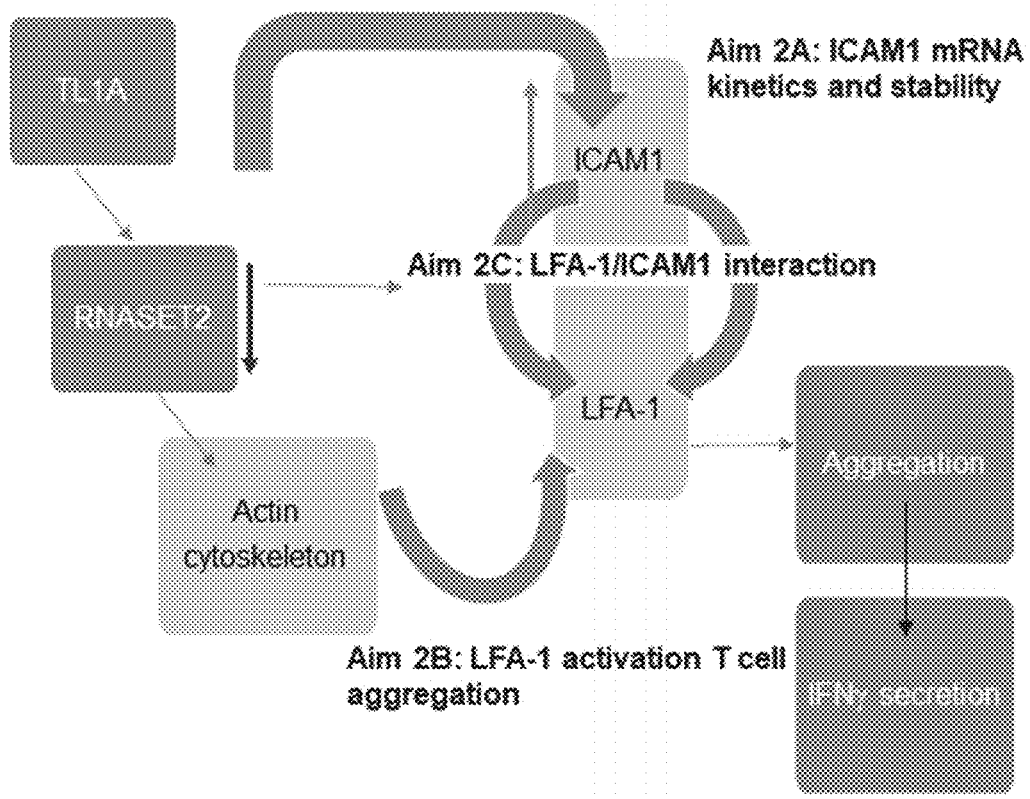
FIG. 12 is a schematic representing a strategy for determining the cellular and molecular pathways by which decreased RNASET2 expression drives enhanced FLA1/ICAM1 interaction and subsequent IFNγ secretion.

Example 9. Determine the Cellular and Molecular Pathways by which Decreased RNASET2 Expression Drives Enhanced LFA1/ICAM1 Interaction and Subsequent IFNγ Secretion Findings show a relationship between decreased RNASET2, enhanced ICAM1, cellular aggregation and IFNγ secretion. The specific molecular mechanisms by which downregulation of RNASET2 influences the expression of ICAM1 will be further explored By further defining the interface between TL1A-mediated downregulation of RNASET2 and LFA1/ICAM1-mediated T cell-T cell interactions, further understanding of the enhanced TL1A-mediated IFNγ production will be obtained to uncover additional molecules and signaling pathways thereby increasing our repertoire of therapeutic targets. FIG. 12 provides the strategy. The molecular events involved in and the effect of RNASET2 downregulation on: a) enhanced ICAM1 expression, b) LFA1 activation and cellular aggregation, c) actin cytoskeletal restructuring and its association with LFA1/ICAM1 interaction, and d) epigenetic modulation of ICAM1 promoter histone modifications will be investigated.

Identify the Molecular Events Involved in Altered ICAM1 Expression Resulting from Reduced RNASET2 Expression Whether the effect of RNASET2 downregulation on ICAM1 expression is multifaceted, involving coordinated kinetic interplay of transcriptional upregulation and mRNA stability, resulting in regulation of ICAM1 gene expression and protein production will be investigated.

To identify the roles of transcriptional upregulation versus mRNA stabilization as mechanisms of increased ICAM1 expression, kinetics of ICAM1 mRNA expression will be determined. The rate of ICAM1 mRNA transcription and post transcriptional modulation of stability will be examined using 4-thiouridine (4sU) incorporation, a naturally occurring uridine analog that is incorporated into nascent mRNA. Isolation of total RNA is followed by thiol-biotinylation and streptavidin bead separation of newly transcribed (4SU-tagged) from existing (un-tagged) mRNA[41] qPCR will then be performed on each population of RNA. Overall expression is calculated based on total RNA. Changes in transcription rate are calculated based on 4sU fraction of mRNA and the rate of mRNA decay/stabilization as a function of the ratio of 4sU-tagged to un-tagged mRNA. This technique has been used effectively to quantitate the rates of mRNA synthesis and decay in purified T cells. CD4+ T cells will be treated with IL12/IL18 or TL1A alone or in combination. Kinetics and peak expression of ICAM1 mRNA expression will be assayed by qPCR. Alteration in the rate of mRNA transcription and decay will be analyzed following washout of the stimulatory cytokine cocktail (TL1A, IL2 & IL18). Kinetics of ICAM1 protein levels measured by flow cytometry (FCM) will be correlated with mRNA expression. The direct impact of RNASET2 on ICAM1 mRNA upregulation and stability will be tested in cells following siRNA knockdown.

It is expected that TL1A and RNASET2 contributes to regulation of ICAM1 expression. In other cell types a low basal level of ICAM1 expression is generally observed which increases substantially in response to immune activation and inflammation. While exposure to TL1A alone does not elicit IFNγ expression or regulation of RNASET2 expression, the preliminary data (FIG. 3A-FIG. 3B) suggest it does play a role in mediating a transient transcriptional upregulation of ICAM1 expression. Increased and sustained ICAM1 expression following exposure to the combination of TL1A with IL12 plus IL18, conditions which contribute to IFNγ production and decreased RNASET2, suggests a significant regulatory component might occur at the level of mRNA stability. WIt is anticipated that RNASET2 silencing will further contribute to enhanced ICAM1 mRNA stability and enhanced protein expression. A critical parameter in the success of the experiments outlined above is the ability to successfully monitor ICAM1 expression as a function of knockdown of RNASET2 expression via siRNA silencing. RNASET2 knockdown parameters have been optimized and demonstrate consistent inhibition of RNASET2 expression (~70%). Likewise, significant differences in expression of ICAM1 following knockdown of RNASET2 by siRNA are observed in CD4+ T cells even without sorting for the IFNγ secreting cell population.

Define the Role of RNASET2 Downregulation in Cellular Aggregation and LFA1 Activation Whether RNASET2 downregulation induces LFA1 activation triggering and promoting LFA1/ICAM1 binding that augments TL1A-mediated ICAM1 expression will be investigated. The experiments are designed to characterize the crosstalk between LFA1 and RNASET2 resulting in T cell aggregation and cytokine secretion and to assess the effect of LFA1 activation on ICAM1 expression. An evaluation of TL1A-mediated intracellular IFNγ expression and cellular aggregation will be performed. The effect of TL1A and siRNA-mediated decrease in RNASET2 on LFA1 activation will be measured with an antibody specific for the active form of LFA1 (KIM127 or 327C) by FCM Overexpression of RNASET2 or treatment with recombinant protein results in inhibition of IFNγ secretion in stimulated CD4+ T cells (FIG. 5A-FIG. 5B). The role of RNASET2 in regulating LFA1/ICAM1 interaction through these modalities will be examined. The experiments will provide mechanistic information regarding the role of RNASET2 in mediating LFA1 activation and how this impacts upon T cell aggregation and cytokine production and in addition understanding of its potential therapeutic effect. To investigate the inter-relationship between LFA1 activation and ICAM1 whether blocking the LFA1/ICAM1 interaction alters expression of ICAM1 and whether inhibition of ICAM1 expression following siRNA silencing impacts LFA1 activation and ultimately cellular aggregation and cytokine production will be measured. Kinetics of ICAM1 mRNA and protein expression will be examined in the presence or absence of TL1A and in response to blocking LFA1 engagement. T cell aggregation will be assayed as above and IFNγ secretion measured by ELISA.

A conformational change leading to LFA1 activation is an integral component of TL1A-mediated decreased expression of RNASET2 resulting in downstream enhancement of cellular aggregation events and IFNγ secretion is expected Thus, silencing of RNASET2 may well increase LFA1 activation. FCM using multi-staining of cells for IFNγ, RNASET2 and activated LFA1 will allow identification of T cell subset(s) and will measure cellular aggregation and LFA1 activation within this population. TCR activation studies indicate that LFA1 activation and ICAM1 upregulation are interdependent, and this relationship is anticipated to also apply to homotypic T cell interaction. Thus, ICAM1 silencing is expected to reduce LFA1 activation and inhibition of LFA1/ICAM1 interaction to reduce ICAM1 expression in TL1A stimulated cells.

Determine the Involvement of Actin Cytoskeleton in Enhanced Cellular Aggregation and LFA1/ICAM1 Interaction Resulting from Down-Regulated RNASET2

Whether TL1A-mediated cellular aggregation via LFAVICAM1 interaction, requires actin cytoskeleton rearrangement and decreased RNASET2 enables this process will be investigated. Using findings above, and the kinetics defined therein, the dynamics of the T cell cytoskeleton rearrangement in response to TL1A-mediated decrease in RNASET2 will be characterized in T cells stimulated in the presence or absence of TL1A and sorted into IFNγ-secreting and non-secreting subsets as described above. Cells will be fixed and actin cytoskeleton will be stained (fluorescently tagged phalloidin) and imaged via confocal microscopy to assess alterations in the pattern of actin filaments and stress fibers. Cytochalasin, will be used to inhibit actin polymerization and evaluate the role of actin cytoskeletal rearrangement in regulating T cell aggregation, LFA1 activation and ICAM1 expression in particular in the context of TL1A-mediated IFNγ expression and secretion. The direct role of RNASET2 in maintaining cytoskeletal structures will be examined in cells transfected with fluorescently tagged over-expressing RNASET2 vector or control vector prior to TL1A co-stimulation. Actin cytoskeleton will be imaged and membrane and cytosolic fractions will be isolated and assayed by western blot.

Ribonuclease T2 proteins are highly conserved among the phyla from viruses to humans suggesting an important evolutionary function. The parasite ribonuclease T2 protein, Omega-1 and fungal ACTIBIND bind actin and affect cytoskeletal organization. More recent studies have shown a role for RNASET2 in actin organization in human cancer cells and ability to bind to actin in vitro. Exposure to TL1A is expected to trigger cytoskeletal reorganization and actin recruitment to the membrane and overexpression of RNASET2 will inhibit this process. Likewise, it is anticipated that actin reorganization will affect downstream pathways including LFA1 activation, ICAM1 expression, cellular aggregation and ultimately IFNγ secretion.

Determine the Role of RNASET2 in Triggering Enhanced ICAM1 Expression by Epigenetic Regulation of Histone Modification Whether TL1A-mediated downregulation of RNASET2 is associated with epigenetic alterations in histone methylation of ICAM1 thereby inducing enhanced expression, will be investigated. The initial studies will focus on testing the role of RNASET2 in regulating of H3K9 methylation. T cells will be stimulated in the presence or absence of TL1A The kinetics of ICAM1 expression will determine the duration of treatment. The level of histone modification will be assayed using a histone multiplex bead-based ELISA Assay. The role of RNASET2 will be determined following siRNA mediated knockdown. Once an association of RNASET2 with the specific H3K9 modification is established, the ICAM1 promoter region involved will be identified through ChIP analysis and alteration in the histone binding levels will be validated. Epigenetic dysregulation in cancer has been investigated extensively and several specific pharmacological inhibitors disrupting histone methylation have been developed for clinical trials. These inhibitors, together with histone methylase/demethylase over-expression vectors, and siRNA knockdown will allow evaluation of the specificity of histone modification affecting RNASET2 mediated enhancement of ICAM1 expression. In parallel, how alteration of histone methylase/demethylase affects downstream T cell aggregation and cytokine secretion will be evaluated.

It is anticipated that RNASET2-mediated enhanced ICAM1 expression involves epigenetic modulation of the ICAM1 promoter region. Based on the preliminary data (FIG. 6A-FIG. 6B) identification of the enzymes regulating H3K9 methylation and demethylation will be performed; however, it is possible that other histone modifying enzymes are involved Evidence suggests that the multifaceted interplay between various histone modifications ultimately determines chromatin structure and gene expression. H3K36me3 is enriched within actively transcribed regions and is believed to promote a transcriptional complex with RNA Pol II. Methylation of H3K9 is coordinated with H3K36. H3K9me3 or H3K36me3 can function as substrates for the histone demethylase enzymes KDM3A and KDM4A. Additional preliminary data (not shown) indicate that expression of RNASET2 is positively correlated with multiple H3K36 methyltransferases including NSD1 which is located within 500 kb from an IBD risk-allele. Thus, the H3K9 methylation status and its relationship with ICAM1 expression will be assessed, followed by H3K36 methylation and identification of other histone modifications, such as histone acetylation marks using histone multiplex assays will be done.

Example 10. Determine the Functional Impact in CD of RNASET2 Regulatory Variants and Therapeutic Potential by: A) Allele Specific Expression Analysis and b) Testing the Effect of Recombinant RNASET2 (and Other Identified Targets) in Mouse TL1A Overexpression Models Whether allele-specific expression of RNASET2 risk polymorphisms reflects its functional consequence in the context of disease and in response to exposure to TL1A will be investigated. Evaluation of potential for differential ASE of RNASET2 in T cells isolated from CD patients stimulated with or without TL1A in an in-vitro system, 2) assessment and comparison of ASE of RRNASET2 in purified CD3$^+$ T cells isolated from peripheral and mucosal samples from CD patients at the time of surgery, will be performed.

Evaluate Potential for Differential ASE of RNASET2 in T Cells Isolated from CD Patients Stimulated with or without TL1A in an In-Vitro System The pattern of ASE will be compared with or without exposure to TL1A to measure whether TL1A influences allelic imbalance in expression. These studies will provide a complementary index to those of Aim 1 and establish the functionality of RNASET2 risk variants in cells isolated from CD patients and in response to TL1A Moreover, the findings will provide the groundwork for the studies in Aim 3a2 to establish the molecular consequence of RNASET2 risk variants using cells isolated from patients at the time of surgery, which may be reflective of prior exposure in vivo to TL1A.

Figure 13:
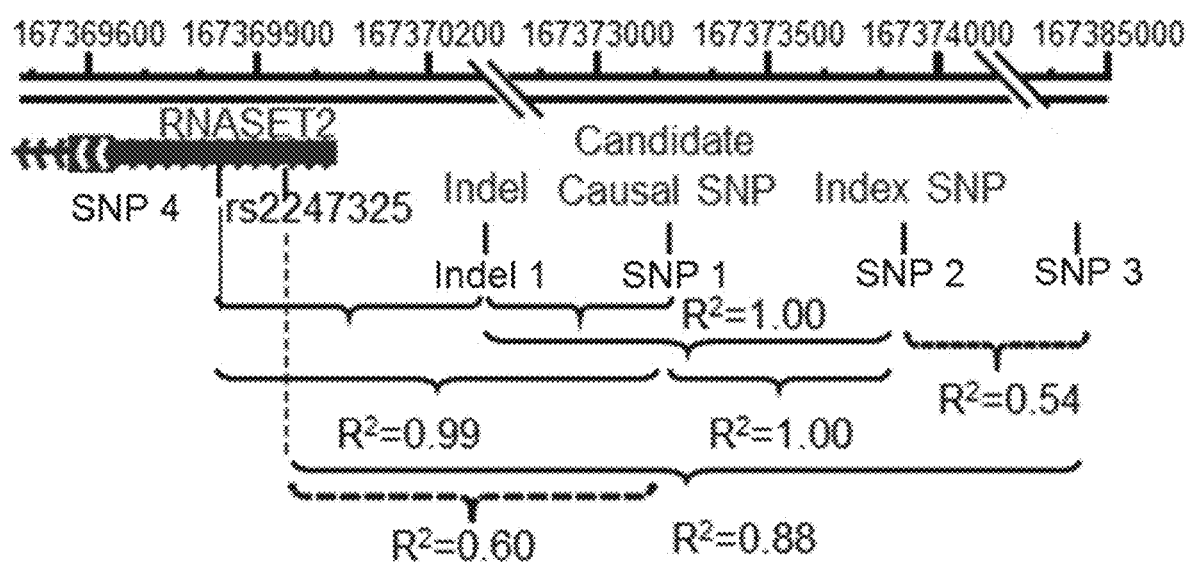
FIG. 13 illustrates genotypes to detect ASE of RNASET2.

ASE will be assayed according to an innovative qPCR Expression of the two alleles are assayed in a multiplex reaction using an adaptation of TaqMan SNP genotyping assay. A common primer pair is used to amplify the cDNA and allele-specific TaqMan probes labeled with either FAM or VIC discriminate and selectively detect the two allele transcripts. Because the candidate causal variants reside within a non-coding region common C/A SNP, SNP 4, was discovered in the 5' UTR of RNASET2 that is in strong LD ($R^2$=0.99) as a surrogate marker (FIG. 13). Allele-specific standard curves will be generated using dilutions of cDNA isolated from individuals homozygous for the C or A allele and mixed at predetermined ratios. A standard curve will be generated using the fluorescence ratio intensity calculated for FAM/VIC probes. The allelic ratio for heterozygous samples can then be assessed by plotting the log FAM/VIC intensity average to the standard curve and ASE will be determined. In parallel production of IFNγ will be evaluated as a biological endpoint. Decreased expression of RNA- SET2 as a component of TL1A-mediated increase in IFNγ production and as a potential biomarker for patients with severe CD. A functional relationship between TL1A-mediated decreased expression of RNASET2, upregulation of ICAM1, homotypic T cell aggregation and augmentation of IFNγ production was demonstrated. These findings support a role for RNASET2 in modulation of cell adhesion and motility. The preliminary data (FIG. 3A-FIG. 3B) builds upon these findings. Transcriptomic data from peripheral T cells isolated from CD patients display two distinct profiles. CD patients classified as cluster 1 drifted away from a "normal" peripheral profile toward a more mucosal T cell expression profile with decreased levels of RNASET2 and enhanced expression of TNFSF15 and ICAM1. The underlying molecular pathways modifying gene expression were predicted to be associated with transmigration of T cells and mucosal homing. These findings further emphasize the importance of RNASET2 regulation in T cells from a selected CD patient subset programmed for mucosal trafficking and activation. A signature of allele-specific expression of RNASET2 in the context of exposure to TL1A will be defined. Differential transcriptional profiles evident in cluster 1 versus 2 are reflective of regulation of RNASET2 expression resulting in altered mucosal homing and inflammation, which may be triggered following exposure to TL1A during disease.

To identify allele-specific expression in the patient clusters, RNA-seq data generated from 101 paired samples of purified $CD3^+$ T cell populations from gut mucosa and peripheral blood (202 total) will be utilized With these datasets, whether GWAS risk alleles (present in RNASET2 transcripts as variants in LD with the causal allele) are differentially expressed in both populations of T cells will be tested. A second possibility is that T cell populations exhibit different expression profiles to meet the different physiobiological requirements of the microenvironment. The differential expression of transcription factors between peripheral T cells and gut T cells leads to TF-dependent RNASET2 deficiency in affected patient populations specifically in the gut due to reduced binding at the GWAS associated risk alleles will also be tested. The families of expressed transcription factors, (e.g. ETS1) previously identified from our MotifbreakR analysis of motif disruption will be the focus of this study. To accomplish these tasks, variants will be called following guidelines outlined by the Genome Analysis Toolkit (GATK) for best practices with RNA-seq. Briefly, the raw sequencing files were originally processed using Star-seq and will be analyzed with the HaplotypeCaller (HC) pipeline in RNA-seq mode. HC performs graph-based reassembly to account for splice junctions and other artifacts that result in false negative calls from the sequence alignment steps. Using essentially the same strategy outlined in SA3a1 (FIG. 13), capturing variants detected in RNASET2 transcripts to infer the associated disease allele, read counts will be modeled in each patient sample as a function of patient genotype, global gene expression and gene expression of the RNASET2 gene. In order to minimize artifacts arising from sample preparation, Bayesian hierarchical models will be used, assuming a beta-binomial background distribution. This approach has been shown in prior studies to result in a lower Type I error rate than the binomial distribution (which assumes uninflated variance at low read counts). Using the same samples and statistical approach, the association of RNASET2 allele-specific expression with ICAM1 (and cytokine) upregulation will be bested.

Evaluate Therapeutic Potential of Recombinant RNASET2 (and Other Identified Therapeutic Targets) to Modify Inflammatory Response Using In-Vivo TL1A Over-Expressing and Knockout Mouse Models with Many of the Characteristics Associated with CD The human RNASET2 gene encodes a highly conserved secreted ribonuclease with oncosuppressive activity. Secretion of RNASET2 triggers cellular migration of monocytes/macrophages into the tumor mass. Additionally, RNASET2 regulates cytoskeletal-action assembly thus supporting an interactive role for RNASET2 with intracellular and extracellular components. However, the ribonuclease catalytic activity is not required for either tumor suppressor or actin binding functions. Recombinant RNASET2 penetrates the cell membrane and can affect actin cytoskeleton reorganization. The efficacy of human recombinant RNASET2 in inhibiting tumor growth, cytoskeletal reorganization and inflammatory response has been demonstrated in a number of disease models supports the potential for RNASET2 as a soluble therapeutic drug.

Data disclosed herein showed that under colitogenic conditions (DSS and adoptive T-cell transfer models) constitutive expression of TI1a led to the development of chronic intestinal inflammation and fibrosis and is accompanied by reduced expression of Rnaset2 compared to wild-type littermates (FIG. 10). These data establish an in vivo model to examine the relationship of TL1A expression, decreased expression of RNASET2 and inflammation and supporting a role for Rnaset2 in the colitis observed in such mice. Because lower RNASET2 expression has been associated with increased expression of TL1A and cytokines implicated in the pathology of IBD, increasing the amount of circulating Rnaset2 might ameliorate colitis in chronic DSS and T cell transfer models.

Figure 14:
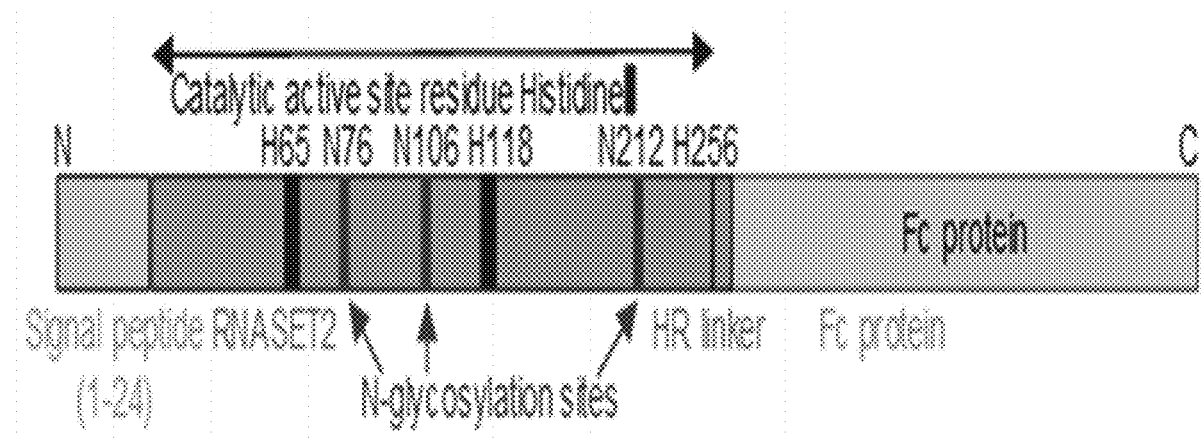
FIG. 14 illustrates a Mouse Rnaset2:pFUSE-mlgG1-FC2 construct.
Figure 15A:
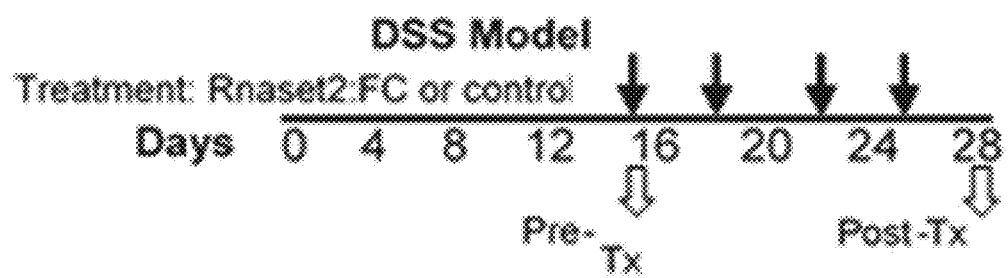
FIG. 15A-15B illustrates an experimental outline using colitis mouse models.
Figure 15B:
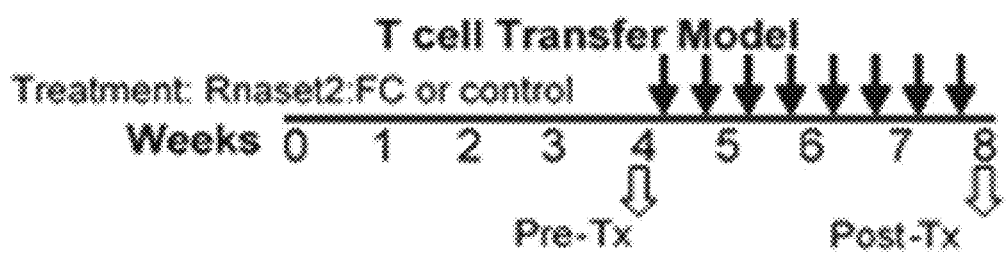

A mouse construct was generated for this purpose designated as Rnaset2:pFUSE-mIgG1-Fc2 (Rnaset2:Fc, FIG. 14). The Fc region comprises the CH2 and CH3 domains of the IgG heavy_chain and hinge region which serves as a flexible spacer between the two parts of the Fc-fusion protein, allowing each part of the molecule to function independently and mediates low CDC and no ADCC. The design of Rnaset2-Fc was based on in-vivo RNASE delivery studies. The FC portion is predicted to prolong serum half-life and is therefore ideal for pre-clinical animal model testing. Rnaset2:Fc was expressed in a mammalian system (HEK-293 cells) to ensure appropriate glycosylation and prevent contaminants associated with bacterial expression and then affinity purified using Protein A columns. Size exclusion chromatography and gel analysis determined >90% purity and ribonuclease activity was confirmed Bioavailability studies (data not shown) using TI1a over-expressing female mice, 8-9 weeks of age injected i.p. with PBS or Rnaset2:Fc (at 1 to 10 mg/kg) will determine dosage. Efficacy of Rnaset2:FC will be evaluated in two mouse models of colitis, chronic DSS and T cell transfer (FIG. 15A-FIG. 15B). Mice will be monitored for body weight and signs/symptoms of colitis including diarrhea and gross rectal bleeding. Colon length and ileal and cecal histological scoring and expression of Rnaset2 and inflammatory cytokines will be evaluated.

A knockout mouse in which TI1a expression has been deleted from all tissue was generated. This mouse will be used in chronic DSS and transfer TI1a/RAG double knock out colitis models to identify TI1a specific versus global activation pathways regulating Rnaset2 expression.

FIG. 5A support the efficacy of Rnaset2-Fc in inhibiting IFNγ secretion, thus it is anticipated that in the TI1a L-Tg T cell transfer and chronic DSS mouse models, Rnaset2:Fc will ameliorate inflammation and attenuate expression of IFNγ as well. Although RNase activity is not required for tumor suppressor or actin binding activity, a recombinant RNASET2 that was generated that lacks catalytic activity may be used to expand the studies. Studies suggest that recombinant human RNASET2 imparts anti-tumorigenic and antiangiogenic activities in a mouse tumor xenograft model and regulates immune response and endogenous RNASET2 expression in a medicinal leech immune response model. This further supports an evolutionarily conserved role for RNASET2 in inflammation and supports the feasibility of using recombinant RNASET2 as a potential therapeutic agent. The potential for neutralizing anti-TI1a antibodies to reduce the severity of inflammation and fibrosis has been demonstrated in murine models of colitis and these antibodies are currently under development as a therapeutic target for IBD.

Example 11. Phase 1 Clinical Trial

A phase 1 clinical trial is performed to evaluate the safety, tolerability, pharmacokinetics and pharmacodynamics of a modulator of RNASET2 activity or expression on subjects having moderate to severe Crohn's disease.

Single ascending dose (SAD) arms: Subjects in each group (subjects are grouped based on the presence Indel 1I (where, for example, I is an insertion comprising or consisting of CCAGGGCTGGGTGAGGG (SEQ ID NO: 14)), SNP 1C, SNP 2T, SNP 3G, SNP 4G, and/or a SNP provided in Table 3, receive either a single dose of the modulator of RNASET2 or a placebo. Exemplary doses are 1, 3, 10, 30, 100, 300, 600 and 800 mg of modulator of RNASET2. Safety monitoring and PK assessments are performed for a predetermined time. Based on evaluation of the PK data, and if the modulator of RNASET2 is deemed to be well tolerated, dose escalation occurs, either within the same groups or a further group of healthy subjects. Dose escalation continues until the maximum dose has been attained unless predefined maximum exposure is reached or intolerable side effects become apparent.

Multiple ascending dose (MAD) arms: Subjects in each group (subjects are grouped based on the same criteria as above) receive multiple doses of the modulator of RNASET2 or a placebo. The dose levels and dosing intervals are selected as those that are predicted to be safe from the SAD data. Dose levels and dosing frequency are chosen to achieve therapeutic drug levels within the systemic circulation that are maintained at steady state for several days to allow appropriate safety parameters to be monitored. Samples are collected and analyzed to determination PK profiles.

Inclusion Criteria: Healthy subjects of non-childbearing potential between the ages of 18 and 55 years. Healthy is defined as no clinically relevant abnormalities identified by a detailed medical history, full physical examination, including blood pressure and pulse rate measurement, 12 lead ECG and clinical laboratory tests. Female subjects of non-childbearing potential must meet at least one of the following criteria: (1) achieved postmenopausal status, defined as: cessation of regular menses for at least 12 consecutive months with no alternative pathological or physiological cause; and have a serum follicle stimulating hormone (FSH) level within the laboratory's reference range for postmenopausal females; (2) have undergone a documented hysterectomy and/or bilateral oophorectomy; (3) have medically confirmed ovarian failure. All other female subjects (including females with tubal ligations and females that do NOT have a documented hysterectomy, bilateral oophorectomy and/or ovarian failure) will be considered to be of childbearing potential. Body Mass Index (BMI) of 17.5 to 30.5 kg/m2; and a total body weight >50 kg (110 lbs). Evidence of a personally signed and dated informed consent document indicating that the subject (or a legal representative) has been informed of all pertinent aspects of the study.

Two groups of subjects are selected: (i) subjects having Indel 1I (where, for example, I is an insertion comprising or consisting of CCAGGGCTGGGTGAGGG (SEQ ID NO: 14)), SNP 1C, SNP 2T, SNP 3G. SNP 4G, and/or a SNP provided in Table 3, (ii) and subjects lacking the risk variant.

Exclusion Criteria: Evidence or history of clinically significant hematological, renal, endocrine, pulmonary, gastrointestinal, cardiovascular, hepatic, psychiatric, neurologic, or allergic disease (including drug allergies, but excluding untreated, asymptomatic, seasonal allergies at time of dosing). Subjects with a history of or current positive results for any of the following serological tests: Hepatitis B surface antigen (HBsAg), Hepatitis B core antibody (HBcAb), anti-Hepatitis C antibody (HCV Ab) or human immunodeficiency virus (HIV). Subjects with a history of allergic or anaphylactic reaction to a therapeutic drug. Treatment with an investigational drug within 30 days (or as determined by the local requirement, whichever is longer) or 5 half-lives or 180 days for biologics preceding the first dose of study medication. Pregnant females; breastfeeding females; and females of childbearing potential.

Primary Outcome Measures: Incidence of dose limiting or intolerability treatment related adverse events (AEs) [Time Frame: 12 weeks]. Incidence, severity and causal relationship of treatment emergent AEs (TEAEs) and withdrawals due to treatment emergent adverse events [Time Frame: 12 weeks]. Incidence and magnitude of abnormal laboratory findings [Time Frame: 12 weeks]. Abnormal and clinically relevant changes in vital signs, blood pressure (BP) and electrocardiogram (ECG) parameters [Time Frame: 12 weeks].

Secondary Outcome Measures: Single Ascending Dose: Maximum Observed Plasma Concentration (Cmax) [Time Frame: 12 weeks]. Single Ascending Dose: Time to Reach Maximum Observed Plasma Concentration (Tmax) [Time Frame: 12 weeks]. Single Ascending Dose: Area under the plasma concentration-time profile from time zero to 14 days (AUC14 days) [Time Frame: 12 weeks]. Single Ascending Dose: Area under the plasma concentration-time profile from time zero extrapolated to infinite time (AUCinf) [Time Frame: 12 weeks]. Single Ascending Dose: Area under the plasma concentration-time profile from time zero to the time of last quantifiable concentration (AUClast) [Time Frame: 12 weeks]. Single Ascending Dose: Dose normalized maximum plasma concentration (Cmax[dn]) [Time Frame: 12 weeks]. Single Ascending Dose: Dose normalized area under the plasma concentration-time profile from time zero extrapolated to infinite time (AUCinf[dn]) [Time Frame: 12 weeks]. Single Ascending Dose: Dose normalized area under the plasma concentration-time profile from time zero to the time of last quantifiable concentration (AUClast[dn]) [Time Frame: 12 weeks]. Single Ascending Dose: Plasma Decay Half-Life (t½) [Time Frame: 12 weeks]. Plasma decay half-life is the time measured for the plasma concentration to decrease by one half. Single Ascending Dose: Mean residence time (MRT) [Time Frame: 12 weeks]. Single Ascending Dose: Volume of Distribution at Steady State (Vss) [Time Frame: 6 weeks]. Volume of distribution is defined as the theoretical volume in which the total amount of drug would need to be uniformly distributed to produce the desired blood concentration of a drug. Steady state volume of distribution (Vss) is the apparent volume of distribution at steady-state. Single Ascending Dose: Systemic Clearance (CL) [Time Frame: 6]. CL is a quantitative measure of the rate at which a drug substance is removed from the body.

Multiple Ascending Dose First Dose: Maximum Observed Plasma Concentration (Cmax) [Time Frame: 12 weeks]. Multiple Ascending Dose First Dose: Time to Reach Maximum Observed Plasma Concentration (Tmax) [Time Frame: 12 weeks]. Multiple Ascending Dose First Dose: Area under the plasma concentration-time profile from time zero to time τ, the dosing interval where τ=2 weeks (AUCτ) [Time Frame: 12 weeks]. Multiple Ascending Dose First Dose: Dose normalized maximum plasma concentration (Cmax[dn]) [Time Frame: 12 weeks]. Multiple Ascending Dose First Dose: Dose normalized Area under the plasma concentration-time profile from time zero to time τ, the dosing interval where τ=2 weeks (AUCτ [dn]) [Time Frame: 12 weeks]. Plasma Decay Half-Life (t½) [Time Frame: 12 weeks]. Plasma decay half-life is the time measured for the plasma concentration to decrease by one half. Multiple Ascending Dose First Dose: Mean residence time (MRT) [Time Frame: 12 weeks]. Apparent Volume of Distribution (Vz/F) [Time Frame: 12 weeks]. Volume of distribution is defined as the theoretical volume in which the total amount of drug would need to be uniformly distributed to produce the desired plasma concentration of a drug. Apparent volume of distribution after oral dose (Vz/F) is influenced by the fraction absorbed Multiple Ascending Dose First Dose: Volume of Distribution at Steady State (Vss) [Time Frame: 12 weeks]. Volume of distribution is defined as the theoretical volume in which the total amount of drug would need to be uniformly distributed to produce the desired blood concentration of a drug. Steady state volume of distribution (Vss) is the apparent volume of distribution at steady-state. Multiple Ascending Dose First Dose: Apparent Oral Clearance (CL/F) [Time Frame: 12 weeks]. Clearance of a drug is a measure of the rate at which a drug is metabolized or eliminated by normal biological processes. Clearance obtained after oral dose (apparent oral clearance) is influenced by the fraction of the dose absorbed Clearance is estimated from population pharmacokinetic (PK) modeling. Drug clearance is a quantitative measure of the rate at which a drug substance is removed from the blood. Multiple Ascending Dose First Dose: Systemic Clearance (CL) [Time Frame: 12 weeks]. CL is a quantitative measure of the rate at which a drug substance is removed from the body.

Multiple Ascending Dose Multiple Dose: Maximum Observed Plasma Concentration (Cmax) [Time Frame: 12 weeks]. Multiple Ascending Dose Multiple Dose: Time to Reach Maximum Observed Plasma Concentration (Tmax) [Time Frame: 12 weeks]. Multiple Ascending Dose Multiple Dose: Area under the plasma concentration-time profile from time zero to time τ, the dosing interval where τ=2 weeks (AUCτ) [Time Frame: 12 weeks]. Multiple Ascending Dose Multiple Dose: Dose normalized maximum plasma concentration (Cmax[dn]) [Time Frame: 12 weeks]. Multiple Ascending Dose Multiple Dose: Dose normalized Area under the plasma concentration-time profile from time zero to time τ, the dosing interval where-=2 weeks (AUCτ [dn]) [Time Frame: 12 weeks]. Multiple Ascending Dose Multiple Dose: Plasma Decay Half-Life (t½) [Time Frame: 12 weeks]. Plasma decay half-life is the time measured for the plasma concentration to decrease by one half. Multiple Ascending Dose Multiple Dose: Apparent Volume of Distribution (Vz/F) [Time Frame: 12 weeks]. Volume of distribution is defined as the theoretical volume in which the total amount of drug would need to be uniformly distributed to produce the desired plasma concentration of a drug. Apparent volume of distribution after oral dose (Vz/F) is influenced by the fraction absorbed Multiple Ascending Dose Multiple Dose: Volume of Distribution at Steady State (Vss) [Time Frame: 12 weeks]. Volume of distribution is defined as the theoretical volume in which the total amount of drug would need to be uniformly distributed to produce the desired blood concentration of a drug. Steady state volume of distribution (Vss) is the apparent volume of distribution at steady-state.

Multiple Ascending Dose Multiple Dose: Apparent Oral Clearance (CL/F) [Time Frame: 12 weeks]. Clearance of a drug is a measure of the rate at which a drug is metabolized or eliminated by normal biological processes. Clearance obtained after oral dose (apparent oral clearance) is influenced by the fraction of the dose absorbed. Clearance was estimated from population pharmacokinetic (PK) modeling. Drug clearance is a quantitative measure of the rate at which a drug substance is removed from the blood. Multiple Ascending Dose Multiple Dose: Systemic Clearance (CL) [Time Frame: 12 weeks]. CL is a quantitative measure of the rate at which a drug substance is removed from the body. Multiple Ascending Dose Multiple Dose: Minimum Observed Plasma Trough Concentration (Cmin) [Time Frame: 12 weeks]. Multiple Ascending Dose Multiple Dose: Average concentration at steady state (Cav) [Time Frame: 12 weeks]. Multiple Ascending Dose Multiple Dose: Observed accumulation ratio (Rac) [Time Frame: 12 weeks]. Multiple Ascending Dose Multiple Dose: Peak to trough fluctuation (PTF) [Time Frame: 12 weeks]. Multiple Ascending Dose Additional Parameter: estimate of bioavailability (F) for subcutaneous administration at the corresponding intravenous dose [Time Frame: 12 weeks]. Immunogenicity for both Single Ascending Dose and Multiple Ascending Dose: Development of anti-drug antibodies (ADA) [Time Frame: 12 weeks].

Example 12. Phase 1B Clinical Trial

A phase 1b clinical trial is performed to evaluate efficacy of a modulator of RNASET2 activity or expression on subjects having moderate to severe Crohn's disease. Arms: 10 patients positive for Indel 1I (where, for example, I is an insertion comprising or consisting of CCAGGGCTGGGTGAGGG (SEQ ID NO: 14)), SNP 1C, SNP 2T, SNP 3G, and/or SNP 4G are administered the modulator of RNASET2. 5-10 patients negative for the Indel 1I (where, for example, I is an insertion comprising or consisting of CCAGGGCTGGGTGAGGG (SEQ ID NO: 14)), SNP 1C, SNP 2T, SNP 3G, and/or SNP 4G are administered the modulator of RNASET2. Patients are monitored in real-time. Central ready of endoscopy and biopsy is employed, with readers blinded to point of time of treatment and endpoints.

Inclusion Criteria: Two groups of subjects are selected: (i) subjects having Indel 1I (where, for example, I is an insertion comprising or consisting of CCAGGGCTGGGTGAGGG (SEQ ID NO: 14)), SNP 1C, SNP 2T, SNP 3G, and/or SNP 4G, and (ii) subjects lacking the risk variant.

Primary Outcome Measures: Simple Endoscopic Score for Crohn's Disease (SESCD), Crohn's Disease Activity Index (CDAI), and Patient Reported Outcome (PRO). If risk either positive group shows 50% reduction from baseline, a Phase 2a clinical trial is performed.

Inclusion Criteria: PRO entry criteria: Abdominal pain score of 2 or more and/or stool frequency score of 4 or more.

Primary outcome would be pain core of 0 or 1 and stool frequency score of 3 or less with no worsening from baseline. Endoscopy entry criteria: SESCD ileum only entry at score of 4 and 6 if colon is involved. Primary endoscopic outcome is 40-50% delta of mean SESCD.

Example 13. Phase 2A Clinical Trial

A phase 2a clinical trial is performed to evaluate the efficacy of a modulator of RNASET2 activity or expression in subjects having an moderate to severe Crohn's disease.

Arms: 40 patients per arm (modulator of RNASET2 and placebo arms) are treated with modulator of RNASET2 or placebo for 12 weeks. An interim analysis is performed after 20 patients from each group are treated at the highest dose to look for a 40-50% delta between placebo and treated group in primary outcome (50% reduction from baseline in SESCD, CDAI, and PRO).

Primary Outcome Measures: Simple Endoscopic Score for Crohn's Disease (SESCD), Crohn's Disease Activity Index (CDAI), and Patient Reported Outcome (PRO).

Inclusion Criteria: PRO entry criteria: Abdominal pain score of 2 or more and/or stool frequency score of 4 or more. Primary outcome would be pain core of 0 or 1 and stool frequency score of 3 or less with no worsening from baseline. Endoscopy entry criteria: SESCD ileum only entry at score of 4 and 6 if colon is involved. Primary endoscopic outcome is 40-50% delta of mean SESCD.

Example 14. Treating an Inflammatory Bowel Disease

A moderate to severe inflammatory bowel disease (IBD), including moderate to severe Crohn's disease or ulcerative colitis, is treated in a subject, by first, determining the RNASET2 risk genotype of the subject. Optionally, the subject is, or is susceptible to be, non-responsive to certain therapies such as anti-TNF, steroids, or immunomodulators, such as those disclosed herein. A sample of whole blood is obtained from the subject. An assay is performed on the sample obtained from the subject to detect a presence or absence of Indel 1I (where, for example, I is an insertion comprising or consisting of CCAGGGCTGGGTGAGGG (SEQ ID NO: 14)), SNP 1C, SNP 2T, SNP 3G, and/or SNP 4G by Illumina ImmunoArray or polymerase chain reaction (PCR) under standard hybridization conditions. In addition, or alternatively, a sample of intestinal tissue is obtained from the subject.

The subject is determined to have, or be at risk for developing, moderate to severe IBD (e.g, CD or UC), if the Indel 1I (where, for example, I is an insertion comprising or consisting of CCAGGGCTGGGTGAGGG (SEQ ID NO: 14)), SNP 1C, SNP 2T, SNP 3G, and/or SNP 4G is detected in the sample obtained from the subject. A therapeutically effective amount of an activator of RNASET2 is administered to the subject, provided the subject is determined to have the Indel 1I (where, for example, I is an insertion comprising or consisting of CCAGGGCTGGGTGAGGG (SEQ ID NO: 14)), SNP 1C, SNP 2T, SNP 3G, SNP 4G, and/or a SNP provided in Table 3.

Example 15. Genotyping by Quantitative Polymerase Chain Reaction (qPCR)

The presence or absence of Indel 1I (where, for example, I is an insertion comprising or consisting of CCAGGGCTGGGTGAGGG (SEQ ID NO: 14)), SNP 1C, SNP 2T, SNP 3G, and/or SNP 4G genotype in a subject is performed by quantitative polymerase chain reaction (qPCR).

Complementary DNA (cDNA) is generated using reverse transcription (see for e.g, High Capacity cDNA Reverse Transcription Kit, ThermoFischer) from Genomic DNA that is purified from a serum sample of the subject. The cDNA is aliquoted into a well of a PCR plate or a PCR tube. A mixture comprising the cDNA, primers, probes comprising a nucleic acid sequence complementary to Indel 1f, SNP 1C, SNP 2T, SNP 3G, and/or SNP 4G (e.g., SEQ ID NO: 5-10), and TaqMan master mix is prepared, and an aliquot of the mixture is added to the PCR well or tube comprising DNA. qPCR is performed as follows: 95° C. for 10 minutes; 40 cycles of 95° C. for 0.15 seconds and 60° C. for 1 minute; and hold at 4° C. The reporter dye is FAM, and the quenching dye is MGB-NFQ.

The number of cycles required to reach the cycle threshold (Ct) is evaluated, where Ct values below 30 cycles indicate presence of the genotype. The subject has a Ct value below 30 cycles.

Example 16. Selecting a Patient for Treatment Using RNASET2 Risk Genotype

A subject having a presence of an RNASET2 risk genotype, as measured using methods described in Example 15, is treated with an anti-TL1A or anti-DR3 antibody disclosed in Table 1. Alternatively, or in addition, the subject having a presence of the RNASET2 risk genotype is treated with a RNASET2 agonist, such as the RNASET-Fc protein described herein.

While preferred embodiments of the present examples have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method of treating or preventing an inflammatory bowel disease (IBD) in a subject, the method comprising administering a therapeutic agent comprising an anti-Tumor Necrosis Factor Ligand 1 (TL1A) antibody comprising a means for binding TL1A or an anti-Death Receptor 3 (DR3) antibody comprising a means for binding DR3 to the subject, provided a genotype comprising an indel at rs16900967 is detected in a sample obtained from the subject.

2. The method of claim 1, wherein the genotype further comprises an insertion at rs16900967.

3. The method of claim 2, wherein the insertion is SEQ ID NO: 14.

4. The method of claim 1, wherein the genotype further comprises a "C" allele at rs2149092.

5. The method of claim 1, wherein the genotype further comprises a single nucleotide polymorphism (SNP) at one or more of rs48080, rs6456143, rs34560498, rs12525855, rs2769346, rs12213683, rs12208359, rs405553, rs444988, rs3752520, rs12203510, rs9295384, rs9457260, rs424185, rs2757042, rs4710171, rs398278, rs9459849, rs2757050, rs6456151, rs365189, rs7748224, rs239934, rs406095, rs2757046, rs364283, rs12527827, rs439553, rs2149091, rs2038580, rs385113, rs1060404, or a SNP in linkage disequilibrium (LD) therewith, or any combination thereof.

6. The method of claim 1, wherein the therapeutic agent is the anti-TL1A antibody comprising the means for binding TL1A.

7. The method of claim 1, wherein the therapeutic agent is anti-TL1A antibody comprising a means for binding TL1A comprises an amino acid sequence comprising:
   a) a heavy-chain complementarity-determining region 1 (HCDR1) comprising SEQ ID NO: 209, a heavy-chain complementarity-determining region 2 (HCDR2) comprising SEQ ID NO: 210, a heavy-chain complementarity-determining region 3 (HCDR3)_comprising SEQ ID NO: 211, a light-chain complementarity-determining region 1 (LCDR1) comprising SEQ ID NO: 212, a light-chain complementarity-determining region 2 (LCDR2)_comprising SEQ ID NO: 213, and a light-chain complementarity-determining region 3 (LCDR3) _comprising SEQ ID NO: 214;

b) a HCDR1 comprising SEQ ID NO: 217, a HCDR2 comprising SEQ ID NO: 218, a HCDR3 comprising SEQ ID NO: 219, a LCDR1 comprising SEQ ID NO: 220, a LCDR2 comprising SEQ ID NO: 221, and a LCDR3 comprising SEQ ID NO: 222;

c) a HCDR1 comprising SEQ ID NO: 225, a HCDR2 comprising SEQ ID NO: 226, a HCDR3 comprising SEQ ID NO: 227, a LCDR1 comprising SEQ ID NO: 228, a LCDR2 comprising SEQ ID NO: 229, and a LCDR3 comprising SEQ ID NO: 230;

d) a HCDR1 comprising SEQ ID NO: 233, a HCDR2 comprising SEQ ID NO: 234, a HCDR3 comprising SEQ ID NO: 235, a LCDR1 comprising SEQ ID NO: 239, a LCDR2 comprising SEQ ID NO: 240, and a LCDR3 comprising SEQ ID NO: 241;

e) a HCDR1 comprising SEQ ID NO: 236, a HCDR2 comprising SEQ ID NO: 237, a HCDR3 comprising SEQ ID NO: 238, a LCDR1 comprising SEQ ID NO: 239, a LCDR2 comprising SEQ ID NO: 240, and a LCDR3 comprising SEQ ID NO: 241;

f) a HCDR1 comprising SEQ ID NO: 246, a HCDR2 comprising SEQ ID NO: 247, a HCDR3 comprising SEQ ID NO: 248, a LCDR1 comprising SEQ ID NO: 249, a LCDR2 comprising SEQ ID NO: 250, and a LCDR3 comprising SEQ ID NO: 251;

g) a HCDR1 comprising SEQ ID NO: 254, a HCDR2 comprising SEQ ID NO: 255, a HCDR3 comprising SEQ ID NO: 256, a LCDR1 comprising SEQ ID NO: 257, a LCDR2 comprising SEQ ID NO: 258, and a LCDR3 comprising SEQ ID NO: 259;

h) a HCDR1 comprising SEQ ID NO: 262, a HCDR2 comprising SEQ ID NO: 264, a HCDR3 comprising SEQ ID NO: 265, a LCDR1 comprising SEQ ID NO: 267, a LCDR2 comprising SEQ ID NO: 269, and a LCDR3 comprising SEQ ID NO: 270;

i) a HCDR1 comprising SEQ ID NO: 262, a HCDR2 comprising SEQ ID NO: 264, a HCDR3 comprising SEQ ID NO: 265, a LCDR1 comprising SEQ ID NO: 268, a LCDR2 comprising SEQ ID NO: 269, and a LCDR3 comprising SEQ ID NO: 270;

j) a HCDR1 comprising SEQ ID NO: 262, a HCDR2 comprising SEQ ID NO: 264, a HCDR3 comprising SEQ ID NO: 265, a LCDR1 comprising SEQ ID NO: 267, a LCDR2 comprising SEQ ID NO: 269, and a LCDR3 comprising SEQ ID NO: 270;

k) a HCDR1 comprising SEQ ID NO: 262, a HCDR2 comprising SEQ ID NO: 264, a HCDR3 comprising SEQ ID NO: 265, a LCDR1 comprising SEQ ID NO: 268, a LCDR2 comprising SEQ ID NO: 269, and a LCDR3 comprising SEQ ID NO: 270;

l) a HCDR1 comprising SEQ ID NO: 263, a HCDR2 comprising SEQ ID NO: 264, a HCDR3 comprising SEQ ID NO: 266, a LCDR1 comprising SEQ ID NO: 267, a LCDR2 comprising SEQ ID NO: 269, and a LCDR3 comprising SEQ ID NO: 270;

m) a HCDR1 comprising SEQ ID NO: 263, a HCDR2 comprising SEQ ID NO: 264, a HCDR3 comprising SEQ ID NO: 266, a LCDR1 comprising SEQ ID NO: 268, a LCDR2 comprising SEQ ID NO: 269, and a LCDR3 comprising SEQ ID NO: 270;

n) a HCDR1 comprising SEQ ID NO: 283, a HCDR2 comprising SEQ ID NO: 284, a HCDR3 comprising SEQ ID NO: 285, a LCDR1 comprising SEQ ID NO: 286, a LCDR2 comprising SEQ ID NO: 287, and a LCDR3 comprising SEQ ID NO: 288;

o) a HCDR1 comprising SEQ ID NO: 298, a HCDR2 comprising SEQ ID NO: 299, a HCDR3 comprising SEQ ID NO: 300, a LCDR1 comprising SEQ ID NO: 301, a LCDR2 comprising SEQ ID NO: 302, and a LCDR3 comprising SEQ ID NO: 303;

p) a HCDR1 comprising SEQ ID NO: 328, a HCDR2 comprising SEQ ID NO: 329, a HCDR3 comprising SEQ ID NO: 330, a LCDR1 comprising SEQ ID NO: 331, a LCDR2 comprising SEQ ID NO: 332, and a LCDR3 comprising SEQ ID NO: 333;

q) a HCDR1 comprising SEQ ID NO: 336, a HCDR2 comprising SEQ ID NO: 337, a HCDR3 comprising SEQ ID NO: 338, a LCDR1 comprising SEQ ID NO: 339, a LCDR2 comprising SEQ ID NO: 340, and a LCDR3 comprising SEQ ID NO: 341;

r) a HCDR1 comprising SEQ ID NO: 346, a HCDR2 comprising SEQ ID NO: 347, a HCDR3 comprising SEQ ID NO: 348, a LCDR1 comprising SEQ ID NO: 349, a LCDR2 comprising SEQ ID NO: 350, and a LCDR3 comprising SEQ ID NO: 351;

s) a HCDR1 comprising SEQ ID NO: 376, a HCDR2 comprising SEQ ID NO: 377, a HCDR3 comprising SEQ ID NO: 378, a LCDR1 comprising SEQ ID NO: 379, a LCDR2 comprising SEQ ID NO: 380, and a LCDR3 comprising SEQ ID NO: 381; or t) a HCDR1 comprising SEQ ID NO: 384, a HCDR2 comprising SEQ ID NO: 385, a HCDR3 comprising SEQ ID NO: 386, a LCDR comprising SEQ ID NO: 387, a LCDR2 comprising SEQ ID NO: 388, and a LCDR3 comprising SEQ ID NO: 399.

8. The method of claim 1, wherein the anti-TL1A antibody comprising a means for binding TL1A comprises a heavy chain variable domain comprising SEQ ID NO: 356 and a light chain variable domain comprising either SEQ ID NO: 356 or SEQ ID NO: 357.

9. The method of claim 1, wherein the anti-DR3 antibody comprising a means for binding DR3 comprises an amino acid sequence comprising the HCDR1, HCDR2, and HCDR3 domains of any one of SEQ ID NOS: 358-370 and the LCDR1, LCDR2, and LCDR3 domains of any one of SEQ ID NOS: 371-375.

10. The method of claim 1, wherein the therapeutic agent is the anti-DR3 antibody comprising the means for binding DR3.

11. The method of claim 1, wherein the inflammatory bowel disease (IBD) is Crohn's disease (CD).

12. The method of claim 11, wherein the CD is perianal CD.

13. The method of claim 1, wherein the inflammatory bowel disease (IBD) is ulcerative colitis (UC).

* * * * *